United States Patent Office 2,994,737
Patented Aug. 1, 1961

2,994,737
TELEGRAPH SWITCHING SYSTEM
Robert E. Stoffels, Oak Park, Richard C. Stiles, La Grange, and Eugene A. Hilker, Addison, Ill., assignors to Automatic Electric Laboratories, Inc., a corporation of Delaware
Filed Apr. 21, 1958, Ser. No. 729,568
33 Claims. (Cl. 178—2)

This invention relates in general to a telegraph system and more particularly relates to an arrangement for processing a telegraph message through a telegraph switching center and to an arrangement wherein a telegraph message tape having indicia relating to the message subject matter is processed through the switching center for transmission to respective message destinations.

The concepts of the present invention are illustrated in conjunction with a telegraph switching center or office whereat a received telegraph message originating or relayed from any one of a number of other offices or stations is perforated on a tape. The relaying or originating offices or stations each includes telegraph apparatus of any well known type for transmitting a message having a start-of-message indicator, message number, precedance designation, routing indicia whereby the message is transmitted to the aforementioned switching center, body of the message and an end-of-message indicator in a predetermined message format. An example of an office at which apparatus for processing a message having such information for transmission to the aforementioned switching center is shown in United States application Serial Number 625,004, filed November 29, 1956, by Stiles, Stoffels and Kolpeck. It will be understood that the just mentioned switching center is part of a telegraph or teletypewriter distribution system network of far-flung offices or stations from which messages pertaining to various classes of subject matter originate and/or are relayed for transmission to the switching center.

The present invention is therefore concerned with processing a telegraph message routed to a telegraph switching center for transmission to one or more final destinations in accordance with certain coded message indicia pertaining to the subject matter of the message. Various classifications of subject matter are therefore given code designations, which are made available to personnel at the originating stations, and the coded information or designations are appended to messages directed towards the switching center. To enable the switching center to process a received message for transmission to stations whereat the subject matter thereof is of interest, the personnel at originating stations are therefore directed to include in addition to the aforedescribed message information, additional message information comprising a second start of message indicator, a second precedence designation, and the coded subject matter indicia in the message format to enable processing of the message at the switching center. The additional message information precedes the body of the message and although transmitted as part of the message, is disregarded in the processing of the message at any relaying or intermediate offices or stations before reaching the desired switching center to which the message is directed, as may be readily understood from the aforementioned application.

Accordingly, it is among the objects of the present invention to provide message routing corresponding to subject matter indicia in a message; to provide message transmission simultaneously to different message receiving points in accordance with subject matter indicia in a message; to provide an arrangement whereby message receiving apparatus can be disconnected from certain transmitting apparatus within the switching center and to provide a flexible message canceling arrangement, which can enable messages being transmitted from different types of apparatus to be canceled.

Other objects together with the features of the present invention whereby the above and other objects are accomplished will become apparent from the following description and accompanying drawings.

The invention, both as to its organization and method of operation will be best understood by reference to the following description in conjunction with the accompanying drawings of which:

FIG. 1 discloses a trunking diagram of Office A together with a portion of the switching network of which Office A is a part.

FIG. 2 is a block diagram disclosing the manner in which the various figures of the drawings may be arranged for the purpose of more easily understanding the invention.

FIGS. 3, 4, 5, and 6 disclose details of the Line Circut 300 at which a message from Office A, for example, is received.

FIGS. 7 and 8 disclose details of the Supervisory Unit 700 forming part of the Register A.

FIGS. 9 and 10 disclose details of the line circuit Finder 900 which is used for associating Register A with one of the line circuits such as 300 or 300A to which it has access.

FIGS. 11, 12, and 13 disclose details of the Route Register 1100 whereby subject matter indicia in a message is registered for translation.

FIGS. 14 and 15 disclose details of the Precedence Register 1400 whereby the priority of precedence designation of a message is registered.

FIGS. 16, 16a, 17, 17a, 18, and 19 show details of the Translator 1600 common to the registers such as A and B at Office A.

FIGS. 20, 21, and 22 show details of the Terminal Register 2000 whereby a translation of message subject matter indicia is registered.

FIGS. 23, 24, and 25 show details of the Sequence Control Unit 2300 forming a portion of Register A.

FIGS. 26 and 26a disclose details of a Terminal Test Unit 2600 and a Multichannel Busy Test Unit 2600a respectively.

FIG. 27 discloses details of the Terminal Finder Switch 2700, which is used for testing for an idle distribution terminal unit such as 2800.

FIGS. 28 and 29 disclose details of a Distribution Terminal Unit 2800.

FIG. 30 shows the manner in which tape perforations are arranged for each possible message character.

FIGS. 33, 33a, 34, 35, 36, and 37 disclose details of a Cross Office Unit 3300 to which messages are routed from a line circuit such as 300 for transmission through an outgoing channel unit such as 7000X or to a distribution terminal unit such as 2800.

Figure 38:
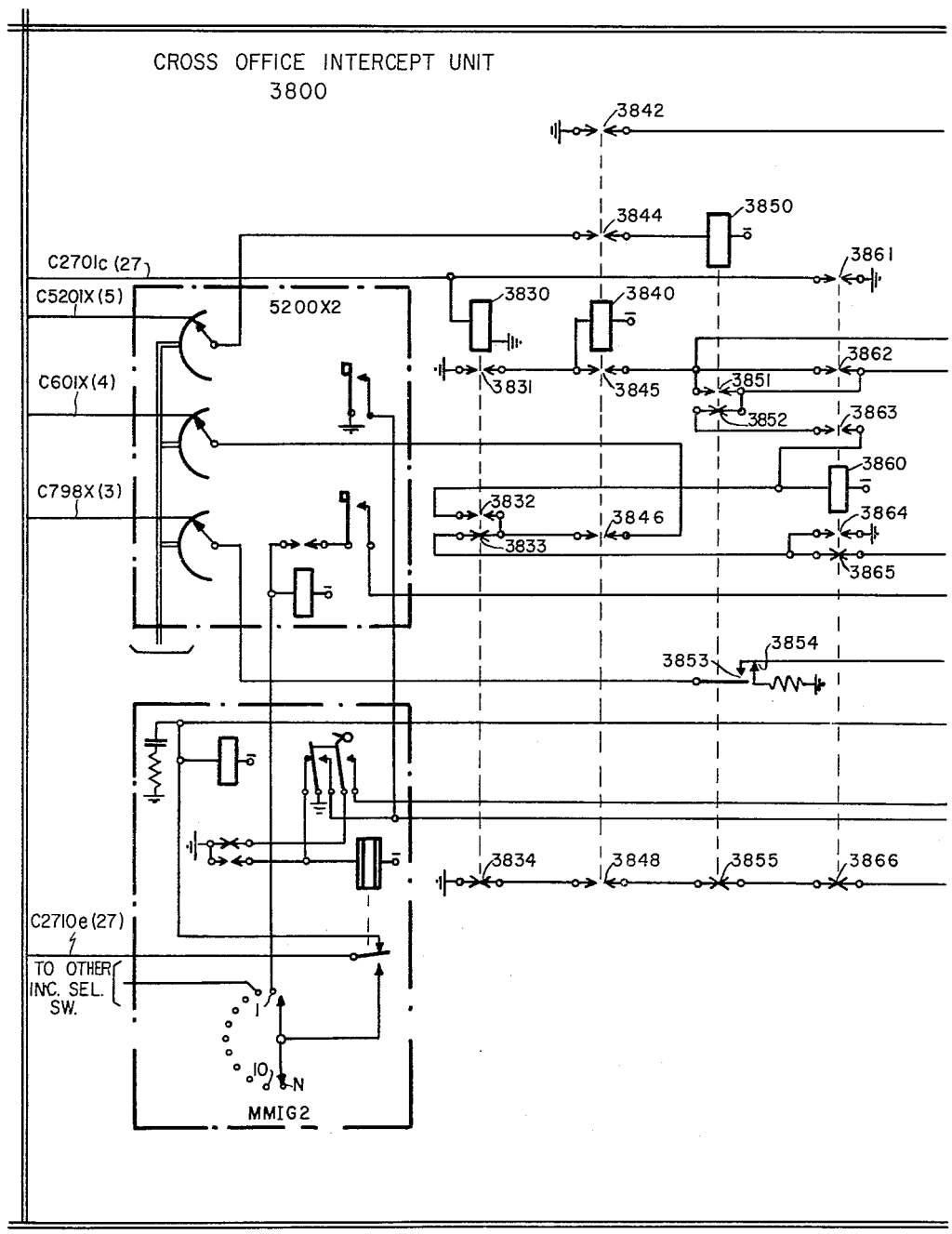
Figure 39:
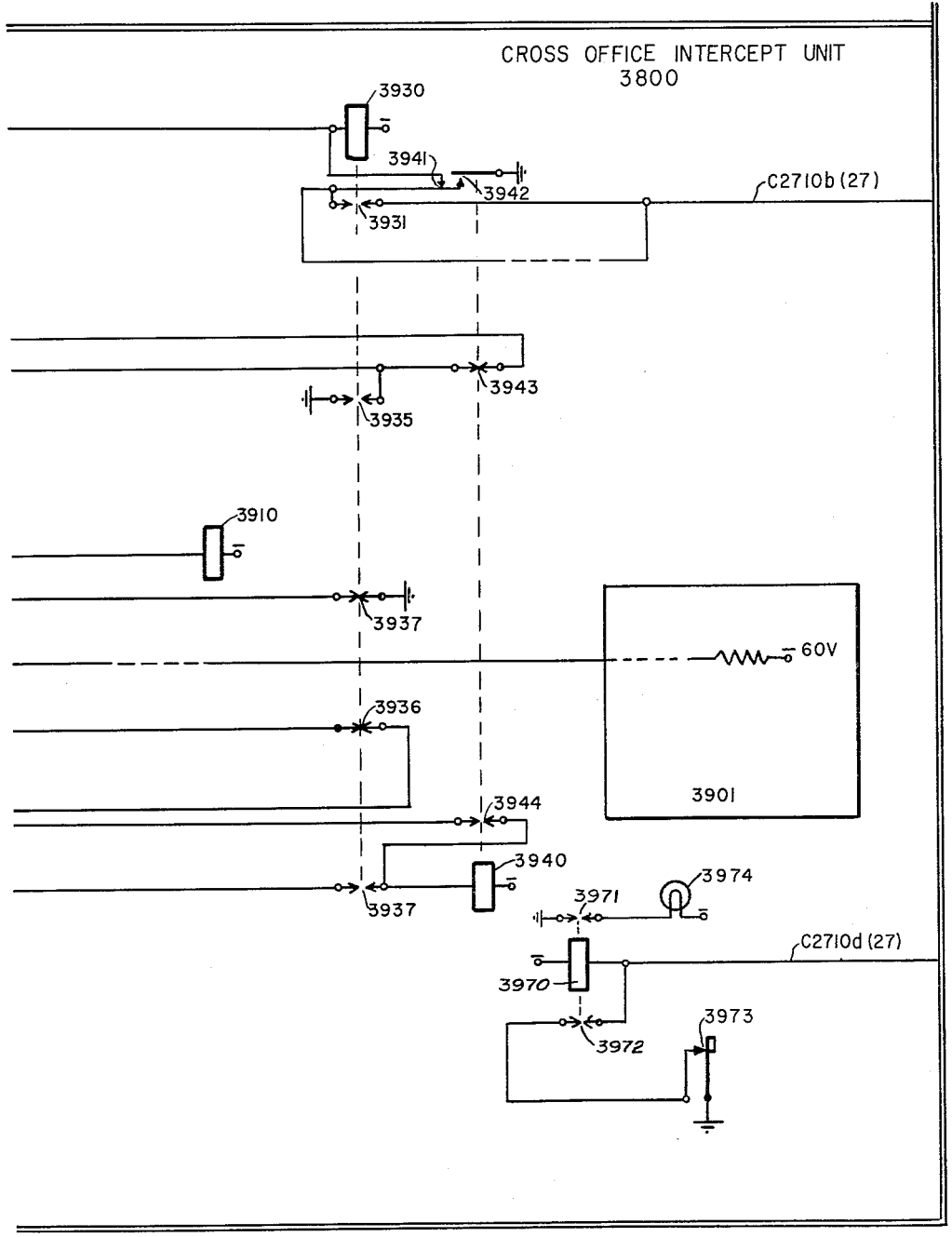

FIGS. 38 and 39 disclose details of a Cross Office Intercept Unit 3800.

Figure 40:
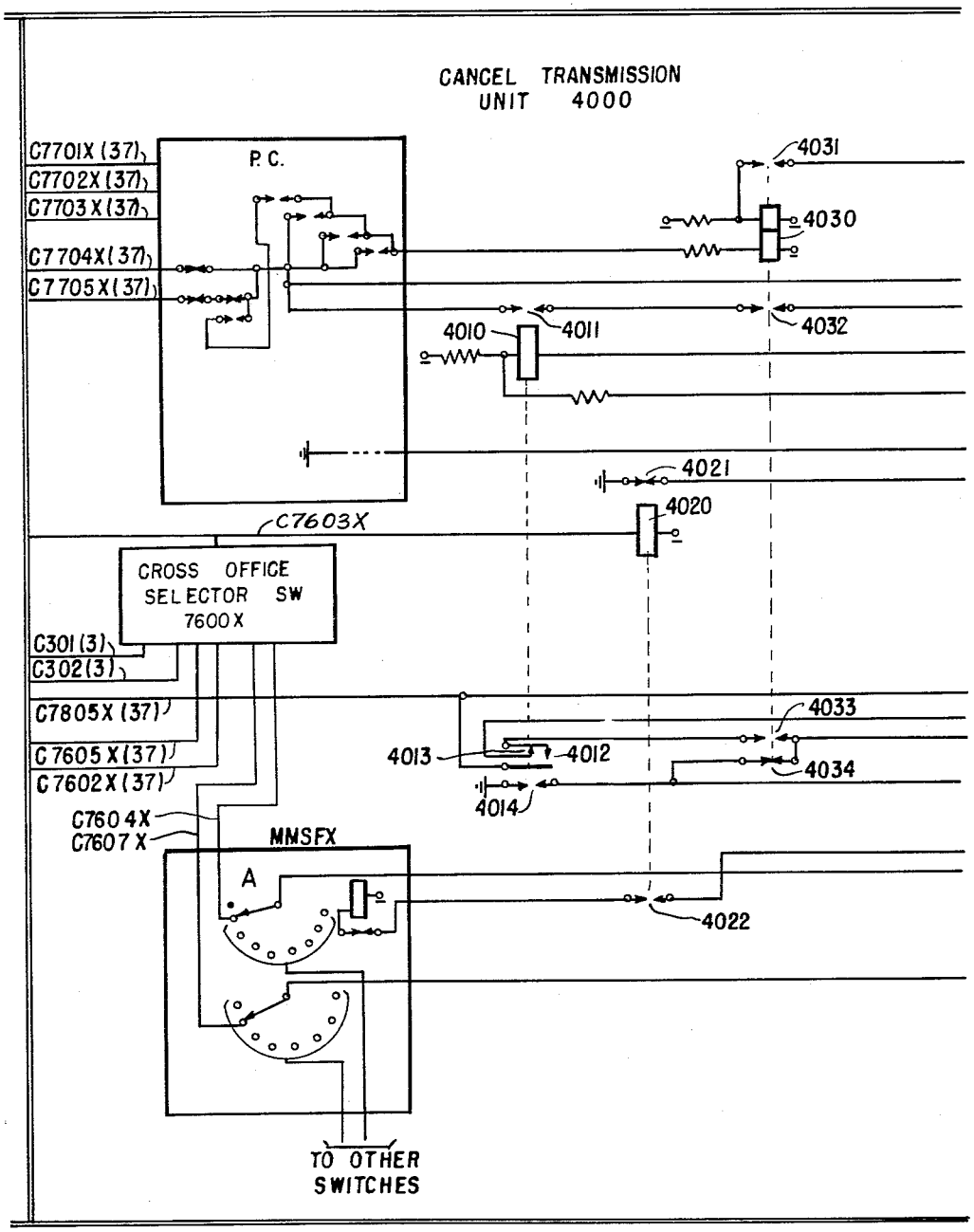
Figure 41:
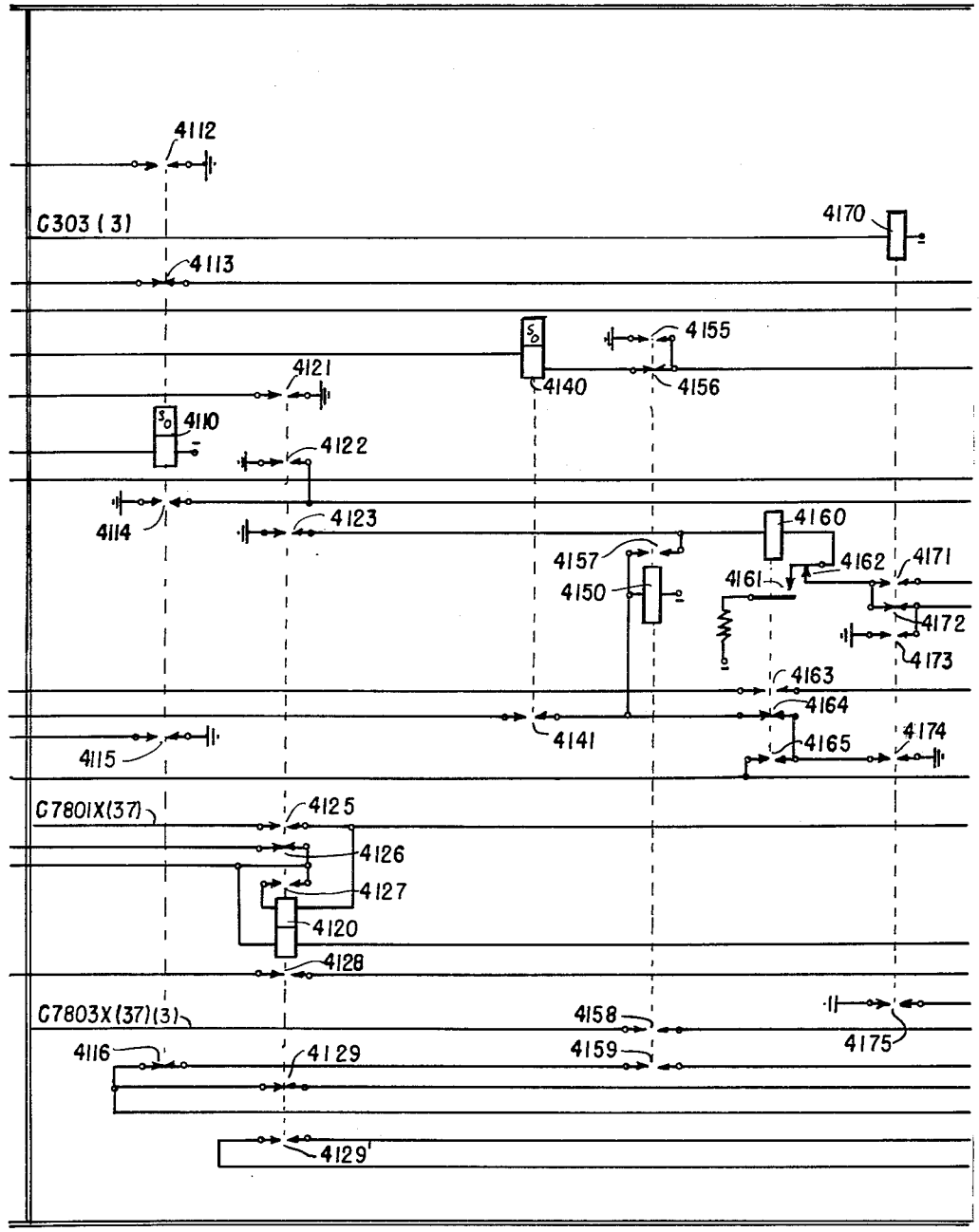
Figure 42:
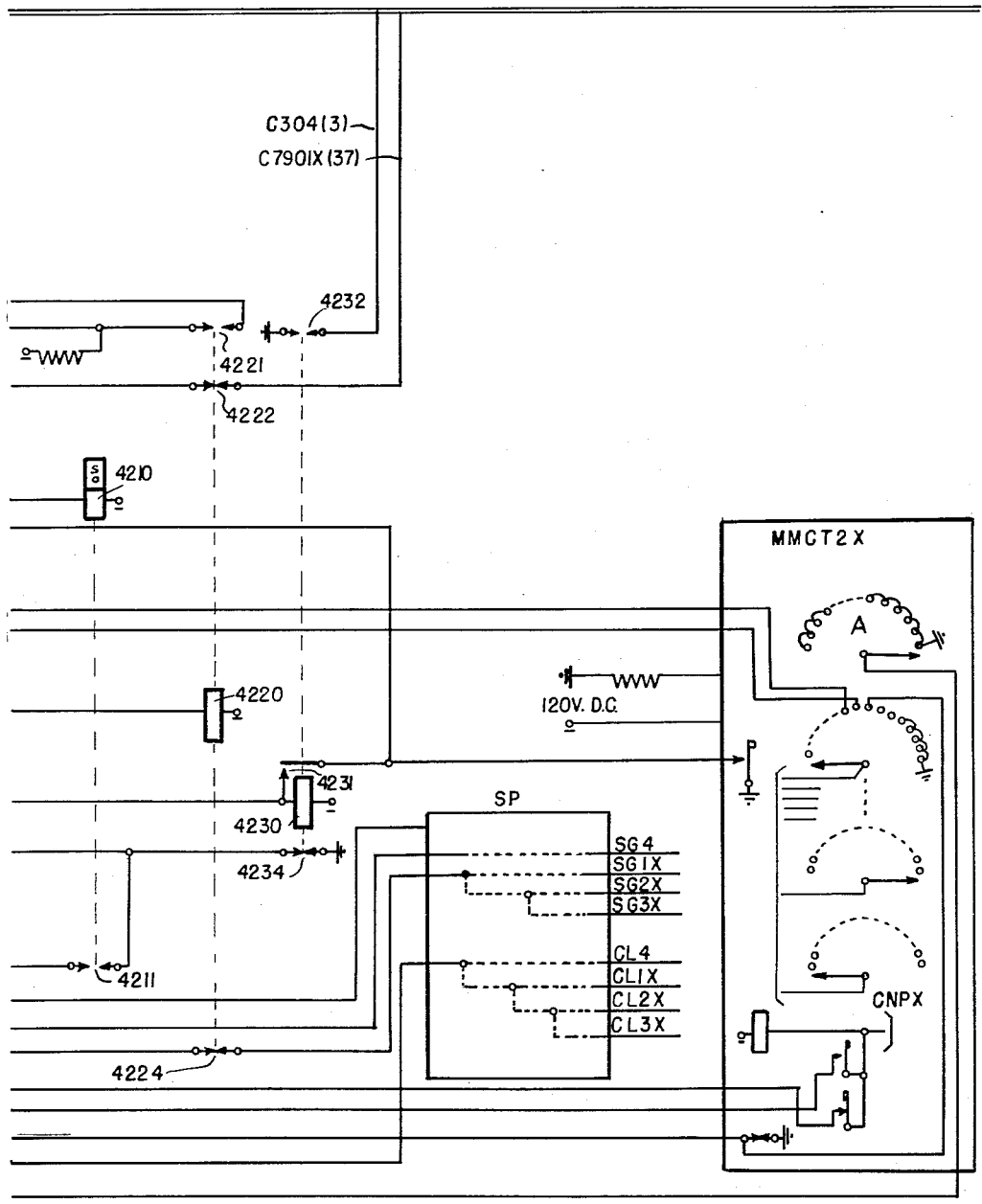

FIGS. 40, 41 and 42 disclose details of the Cancel Transmission Unit 4000 whereby a cross office unit processing a message having high precedence can cancel a message having a lower precedence.

Figure 43:
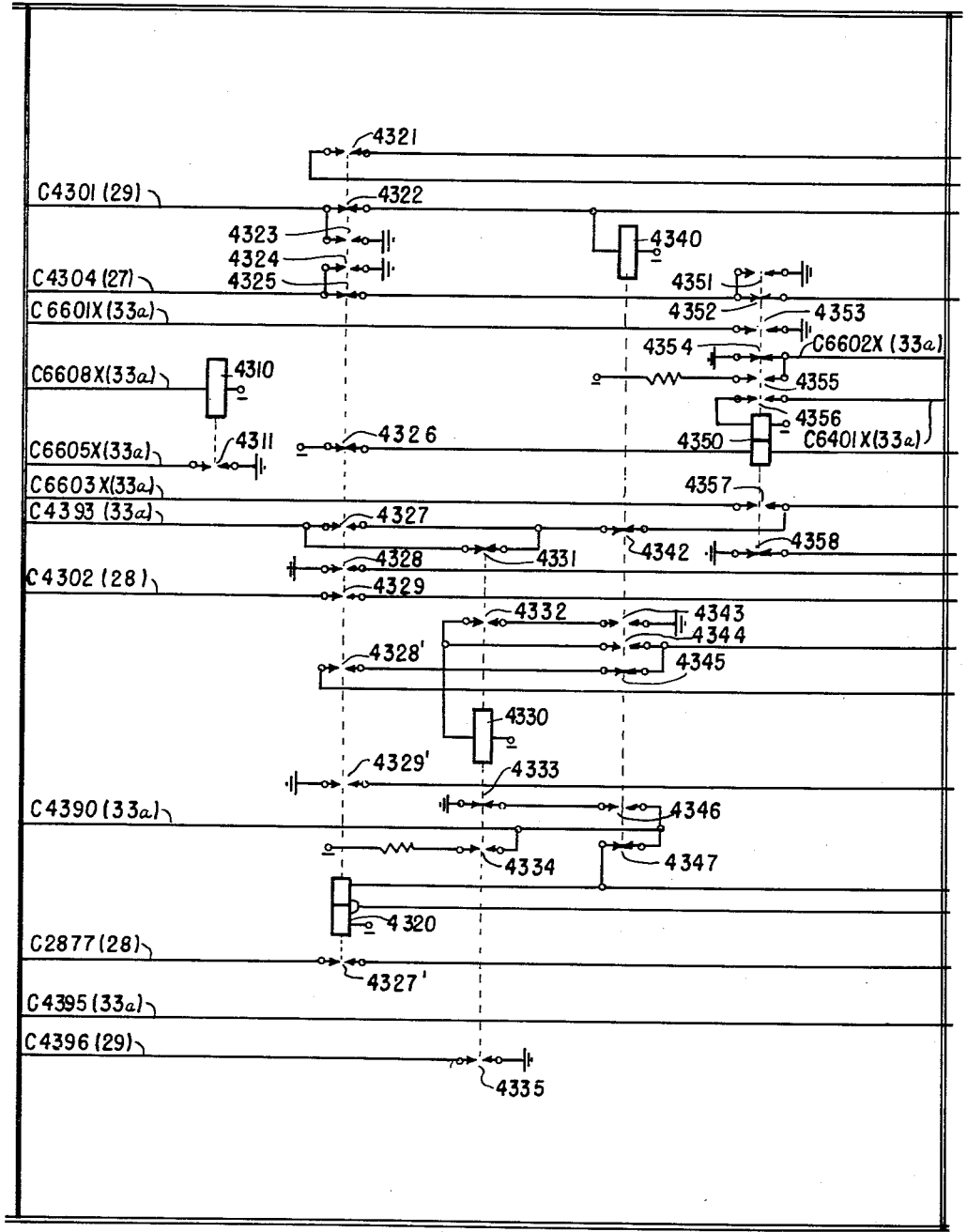
Figure 44:
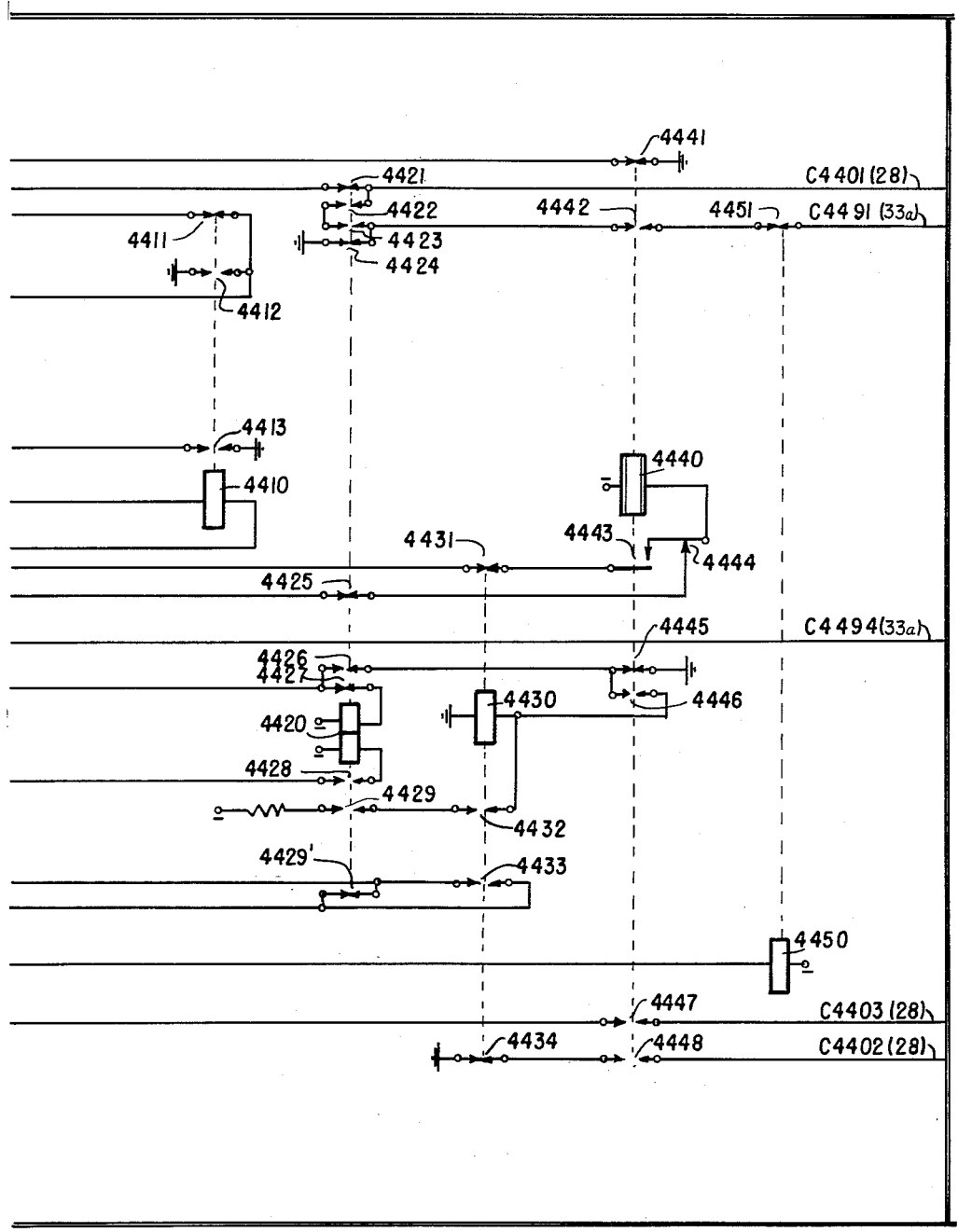

FIGS. 43 and 44 disclose the details of a Distribution Terminal Converter Unit 4300, whereby messages from a cross office unit such as 3300 may be routed to a distribution terminal unit such as 2800 with which the converter unit is individually associated.

Figure 1:
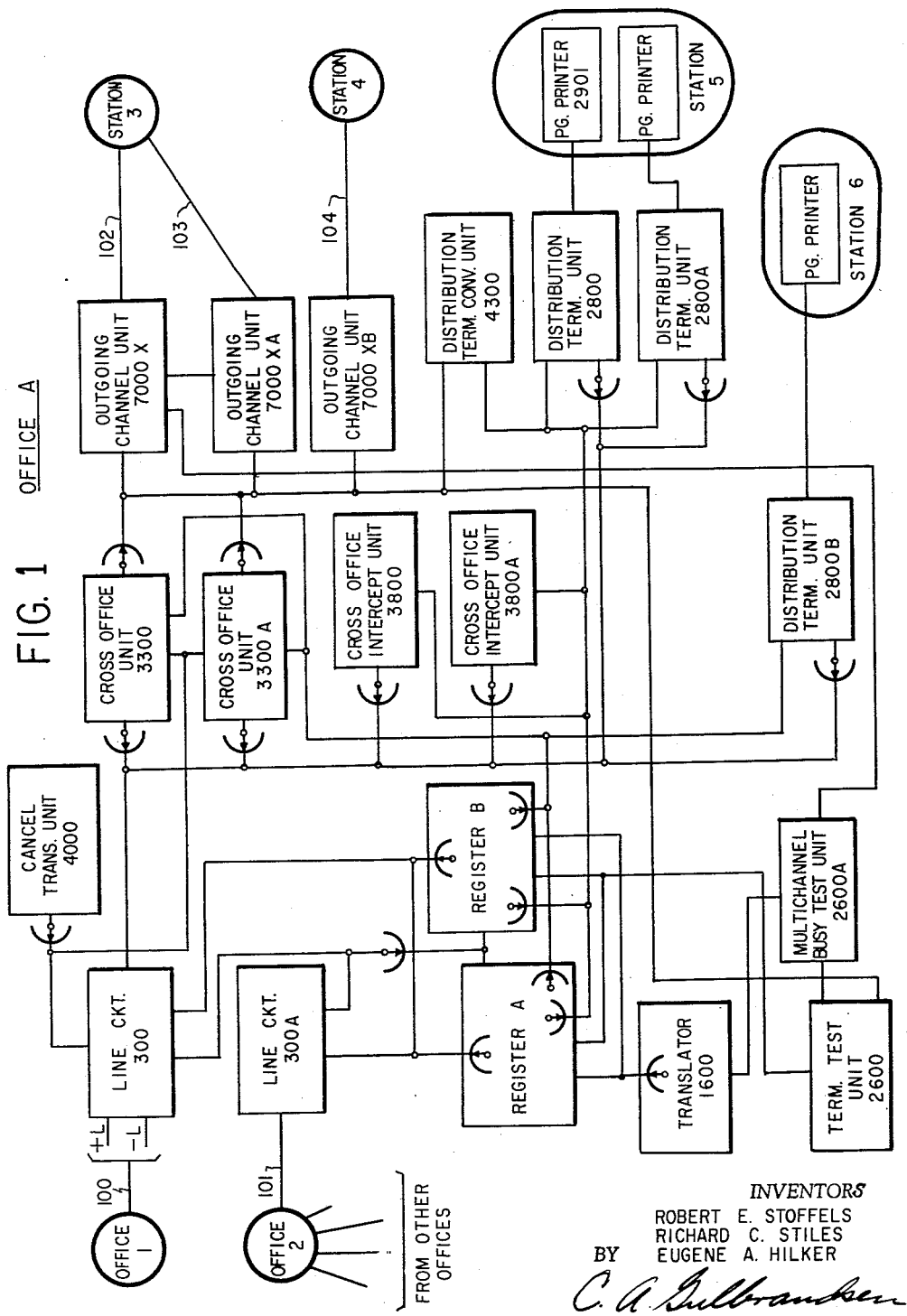
Figure 2:
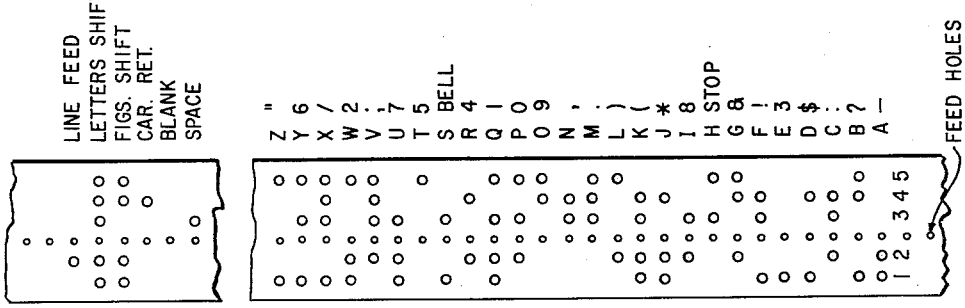

Referring now to FIG. 1 it will be seen that Office A comprises a number of line circuits such as 300 and 300A. A message originating or relayed from Office 1 or Office 2, for example, is transmitted via line 100 or line 101 respectively to the line circuit individual thereto such as 300 or 300A respectively at Office A. Lines 100 and 101 although indicated as a continuous physical connection may include any type of well-known transmission arrangement such as a radio link. A register finder 1200X is provided at Office A to enable a line circuit at which a message is received to demand one of the registers such as indicated by the blocks marked Register A and Register B respectively having access thereto.

Register A and Register B, each having access to twenty-five line circuits, are provided for the purpose of controlling the routing of messages received at the line circuits. Each register comprises a Supervisory Unit 700, a line circuit Finder 900, a Route Register 1100, a Precedence Register 1400, a Terminal Register 2000, a Sequence Control Unit 2300, a number of Terminal Finder Switches 2700–2700J, and a Cross Office Finder 3100X. A Translator 1600 is common to each of the registers at Office A, and is associated with a register on receiving a signal therefrom that it requires a translation of registered message subject matter indicia.

Office A also has a number of cross office units indicated by blocks marked Cross Office Unit 3300 and Cross Office Unit 3300A, by means of which messages received at a line circuit may be stored, for transmission either to a remote station such as Station 3 or Station 4 or to a local station such as Station 5 or Station 6. The cross office units are similar in arrangement and function to similar apparatus described in the aforementioned application. Each transmits via an outgoing channel unit indicated by the blocks marked Outgoing Channel Unit 7000X, Outgoing Channel Unit 7000XA or Outgoing Channel Unit 7000XB to remote stations. The outgoing channel units are similar in arrangement and function to similar apparatus described in the aforementioned application. Each responds to signals received from a cross office unit transmitter connected thereto for transmitting message signals over an individually corresponding line such as 102, 103, or 104 extending therefrom to the desired remote station such as 3 or 4.

Lines 102 and 103 extending to the same Station 3 illustrate one example of a multichannel group. Such a group is one wherein a plurality of lines extend to the same station. To provide for proper traffic distribution over these lines Office A is equipped with a Multichannel Busy Test Unit 2600a, together with a Terminal Test Unit 2600 and certain apparatus in the Translator 1600.

Office A has in the physical proximity thereof a number of stations such as Station 5 and Station 6. Each of these stations comprises one or more page printers each having an individually associated distribution terminal unit indicated by the blocks marked Distribution Terminal Unit 2800 and Distribution Terminal Unit 2800A in the case of Station 5 and Distribution Terminal Unit 2800B in the case of Station 6. The distribution terminal units are each equipped with incoming selector switches of a type described in the aforementioned application whereby the unit can be set to any one of the line circuits to enable the associated page printer to receive message signals directly from the associated line circuit transmitter. Each terminal unit also has a precedence switch, which is set to the message precedence under control of the register to enable message precedence comparison as will be explained. To enable a distribution terminal unit and its associated page printer to receive transmission from a cross office unit transmitter, a distribution terminal converter unit such as 4300, illustrated in conjunction with Terminal Unit 2800 at Station 5, is provided for one distribution terminal unit associated with any one station.

Office A includes a Cancel Transmission Unit 4000, which is an improvement over the cancel transmission apparatus described in the aforementioned application. It is arranged to permit a message in the process of transmission from either a cross office unit or a line circuit to be canceled in favor of a higher precedence message to be transmitted to the same destination.

In addition intercept positions indicated by the blocks marked Cross Office Intercept Unit 3800 and Cross Office Intercept Unit 3800A are provided at Office A. Each includes incoming selector switches of a type described in the aforementioned application to enable the associated message receiving apparatus to be connected to an incoming line circuit transmitter under control of a register, as will be explained.

It will be noted that the trunking diagram illustrated in FIG. 1 discloses a number of blocks intended to refer to apparatus of a similar type for the purpose of indicating that a plurality thereof is provided. Thus, units such as Line Circuits 300 and 300A; Registers A and B; Cross Office Units 3300 and 3300A; Distribution Terminal Units 2800, 2800A, and 2800B; and Cross Office Intercept Units 3800 and 3800A, respectively, are indicated. To avoid duplication and unnecessary description and drawings, only one example of each unit will be illustrated and described in detail, from which, the functions and relationship of the various portions of the apparatus and equipment may easily be understood. Many portions of the equipment and apparatus referred to or described herein are similar to and function in a manner similar to certain apparatus and equipment described in the aforementioned application. Therefore, wherever deemed feasible, such equipment is either shown as a block and/or has a reference character similar to that given in the aforementioned application followed by the character "X." This is done to facilitate understanding of the functioning of the apparatus and for the purpose of indicating quickly wherein reference may be made to such apparatus in the aforementioned application. Thus, the outgoing channel units such as 7000X, 7000XA, and 7000XB are each constructed and function in a manner similar to that described for Outgoing Channel Unit 7000 in the aforementioned application. To avoid unnecessary description, only unit 7000X will be referred to in the following detailed description of the invention although it is not described or illustrated in detail. In addition, certain connections or apparatus are indicated in the drawings by dashed portions or are not shown. This is done to reduce the size and complexity of the specification and drawings, as such connections and apparatus are well understood by those skilled in the art or may either be easily understood by reference to the aforementioned application or has only auxiliary relationship to the present invention. To further facilitate understanding of the invention, each lead or conductor reference character if followed by a number or numbers in parentheses for the purpose of indicating the figure or figures to which the lead extends.

*General description of message processing at Office A*

Messages originating, for example, at Office 1 for transmission to Office A or, for example, at another office and transmitted to Office 2 for transmission to Office A contain a message format similar to that described in the aforementioned application. That is, the message includes a start-of-message indicator hereinafter called an SOM, a message number, a precedence or priority designation, and a routing indicia or address code whereby the message can be processed at the various offices, through which, it must pass for transmission to Office A. The message also contains certain other indicia and the body of the message followed by an end-of-message indicator also called an EOM, all as described in the aforementioned application. In addition, a message directed to Office A comprises a second start-of-message indicator comprising the characters ZKZK also referred to as an SOM, a second message priority or precedence designation and the aforementioned subject matter indicia together with certain other control indicia which will be described.

As a message may pertain to one or more subjects, the subject matter indicia actually comprises a series of code characters for each subject to which the message pertains. As hereinafter described, the code characters comprise a series of three characters for each subject matter class although not necessarily limited to the same. The code characters pertaining to any one subject are otherwise also referred to as a routing indicator or destination delivery indicator sometimes abbreviated as "DDI." As the subject matter indicated by each DDI may be of interest to personnel at more than one station, and as the message may contain several DDI's each referring to different subject matter, the message is routed or transmitted to a corresponding number of stations depending on which station or stations are assigned to a particular DDI and how many DDI's are in the message. As personnel at one station may have an interest in several classes of subject matter, such stations are assigned different DDI's, and as many of such DDI's are provided in the message as to insure that the message is routed to each required destination.

Each line circuit such as 300 and 300A respectively is individual to one transmitting office such as Office 1 and Office 2 respectively. These offices may transmit messages over lines 100 and 101 respectively to the respective line circuits at Office A. The messages may either originate at the transmitting office or from another location and be forwarded thereto in a manner explained in the aforementioned application for transmission to Office A. Each of the lines comprises a +L and —L conductor such as shown extending from line 100. Each line extends to a line circuit reperforator, which perforates a message tape in accordance with message characters received over the line. As the tape is perforated, it is advanced towards the line circuit tape reader, which reads by means of sensing pins the perforations in the tape in a manner described in the aforementioned application. The reader advances the tape towards a line circuit transmitter, which is used for transmitting message characters in sequence, as a series of electrical conditions over a signal transmission lead in a manner described in the aforementioned application. A reperforator, tape reader, and transmitter are provided at each line circuit and for Line Circuit 300 that apparatus is indicated by the box marked Line Apparatus 305 in FIG. 3.

The tape reader at the line circuit initially reads the first SOM of an incoming message, to control an SOM detector, via a group of sensing relays indicated by the box marked Sensing Control 350. The SOM detector operates to register the first SOM in a manner similar to that described for a similar operation in the aforementioned application. After this, the tape reader reads the message number which is checked in a manner similar to that described in the aforementioned application for a similar operation. Following the message number is the message precedence designation and routing indicia used in routing the message to Office A. These characters, on being read by the tape reader, do not result in the completion of detecting chain circuits by the relays of the Sensing Control 350 and are therefore disregarded. The second SOM of the message comprising the characters ZKZK is then read by the tape reader. It is registered by the SOM detector at the line circuit, while the tape continues to advance towards the line circuit transmitter. When the first character of the first SOM is presented at the transmitter as described in the aforementioned application, the transmitter, which is normally operated with slack tape available thereto, is halted. With the second SOM registered, the Line Circuit 300 extends a signal to the Register Finder 1200X to associate a register with Line Circuit 300. The line circuit also terminates operation of the tape reader and transmitter.

The Register Finder 1200X selects one of the idle registers such as Register A or Register B, each having access to twenty-five line circuits including the signaling Line Circuit 300. In the event Register A is selected, its Finder 900 finds the Line Circuit 300 and extends an operating circuit for the line circuit tape reader into Register A.

Operation of the tape reader is then initiated by the register, and it pulls the tape past its sensing pins. The tape reader transmits signals to a group of sensing relays 1110–1160 in the Route Register 1100 of Register A in accordance with the message characters that the reader senses or reads. The characters succeeding the second SOM comprise the second message precedence designation indicating the message priority. Message precedence is indicated by the following message characters in order of rank with the lowest message precedence at the top:

MM
RR
PP
OO
YY
ZZ

The sensing relays 1110–1150 complete detection chain circuits for registering the message precedence in one of the six provided message precedence register units M, R, P, O, Y, or Z respectively shown in the Precedence Register 1400 in a manner similar to that described for a similar operation in the aforementioned application.

Following the message precedence designation, the first of the subject matter indicia referred to as a routing indicator or DDI is read at the tape reader and corresponding signals transmitted to the sensing relays 1110–1160. These relays now complete detection chain circuits for registering each character of the first DDI in the Route Register 1100. The DDI is registered in a manner similar to that described in the aforementioned application for registering a route indicator with the exception that in this case each DDI comprises only three characters instead of the possible three, four, five, or six character type of routing indicator described in the aforementioned application.

The three characters of the first DDI are registered in sequence in the relay groups R1a–R1e, R2a–R2e, and R3a–R3e respectively, which are partially shown in the Route Register 1100. Thereafter, operation of the tape reader is halted, and Register A signals the Translator 1600. The Translator 1600 is common to all the registers, and on receipt of the signal, if it is idle, it associates itself with the signaling Register A. The route register then extends markings corresponding to each registered DDI character to respective decode relay groups in the translator.

The translator comprises a control group of decode relays 1610–1650 for decoding the first character of the DDI. Relays 1610–1650 respond to the markings corresponding to the first DDI character, which are extended thereto, to extend a detection chain ground corresponding to the decoded first character. The detection chain ground is used to operate a corresponding relay such as DTF1 for selecting a corresponding one of a number of groups of second and third character decode relays such as indicated by the blocks marked Decoder 1660 and Decoder 1670 respectively. Each of the groups of second and third character decode relays are each controlled by respective second and third character DDI markings extended from the route register to extend corresponding detection chain grounds. However, only the selected second and third character decode relays, on extending a respective detection chain grounds, operate a relay corresponding to the respective decoded character in a group of relays individual to the decode group. In addition, a translation count group of relays TCA–TCJ associated with the selected second and third character decode relays 1660 and 1670 is selected by the operated relay corresponding to the first character. The number of second and third character decode relay groups and groups of translation count relays provided, correspond to the number of possible first characters used in the DDI's.

The second and third character decode relay groups that are used to decode the second and third characters respectively of the DDI on operating a respective relay such as DTS1 and DTT1 respectively, which correspond to the second and third characters, cause these relays to extend a relay tree ground from contacts of relay DTF1 for example. The relay tree ground is extended to the translation count relays TCA-TCJ. On a first translation of a particular DDI, the first translation count relay TCA is operated by the register, and it extends the relay tree ground to the first terminal in a row of jacks or terminal corresponding to the DDI in Terminal Field Patch Panel 1700.

A terminal field patch panel is provided for each second and third character decode relay group and comprises rows of terminals 1701-1701(199) individual to each DDI represented by a relay tree ground extended under control of the corresponding decode relay group. Each successive terminal in one of these rows represents a successive translation of a DDI. Therefore, a relay tree ground extended as a result of the translation of one DDI, is extended on the first translation thereof, to the first terminal in the row of terminals such as 1701 individual to the DDI. Relay tree grounds corresponding to the same DDI are extended on successive translations to successive terminals in the same row, as a result of the successive operation of the translation count relays TCA-TCJ.

In addition, the terminal field patch panel comprises groups of multipled station terminals or jacks such as terminals A-G in row 1710 and groups of last translation multipled terminals or jacks such as H-J in row 1720. Each row of multipled station jacks A-G is individual to a station. On other than a last translation, the corresponding relay tree ground is extended from the corresponding terminal in rows 1701-1701(199) to one of the station jacks in one of the rows 1710-1710(199) corresponding to a station represented by the particular translation. If, however, the translation is the last translation for a particular DDI, the relay tree ground from the terminal in rows 1701-1701(199) is extended to one of the last translation station jacks in one of the rows 1720-1720(199) corresponding to a station represented by the last translation of the DDI.

In this arrangement any DDI may correspond to a message routing of from 1 to 10 different stations, and, therefore, ten terminals are provided in each of the rows 1701-1701(199) to permit a separate relay tree ground to be extended therefrom for each of ten possible translations thereof. If the DDI has been assigned only one station, the first terminal in the corresponding one of the rows 1701-1701(199) is jumpered to the corresponding station last translation multiple in the rows 1720-1720 (199) each comprising three terminals H-J. If, on the other hand, it is not a last translation, it is jumpered to the corresponding station multiple in the rows 1710-1710 (199) each comprising seven terminals A-G. Thus, as many as seven translations corresponding to a particular station, which are not last translations, may be multipled in the corresponding group of station jacks in row 1710-1710(199). The last translation multiples in row 1720-1720(199) accommodate three last translations corresponding to any particular station. Idle multiples such as 1790 are provided in the event more than seven translations are provided for a particular station not counting last translations. Likewise, idle multiples such as 1780 are provided in the event more than three last translations are provided for a particular station.

Thus, the relay tree ground extended to the corresponding DDI row 1701, for example, in Terminal Field Patch Panel 1700 is extended to one of the station multiples 1710, for example, or last translation station multiple 1720, for example, if it represents the last translation for the particular DDI. From the respective station multiples in conjunction with corresponding station multiples in other terminal field patch panels, individual leads are extended to corresponding station jacks T1-T150 shown in Patch Panel 1700A. From the respective last translation station multiples in conjunction with corresponding last translation station multiples in other terminal field patch panels, individual leads are extended to corresponding last translation station jacks LT1-LT150 shown in Patch Panel 1700A. The jacks T1-T150 or LT1-LT150 in Patch Panel 1700A are jumpered to corresponding ST or LS jacks respectively in Patch Panel 1700A. These in turn are individually extended to the upper or lower windings respectively of station relays S1-S150 each corresponding to a station. Therefore, a relay tree ground extended to either station multiple 1710 or 1720 respectively is extended via the corresponding one of station jacks T1-T150 and ST1-ST150 or LT1-LT150 and LS1-LS150 respectively to operate the upper or lower winding respectively of the corresponding one of the station relays S1-S150.

An arrangement whereby an intercept relay SIC is operated is also provided in Patch Panel 1700A in the event a message is to be routed to a cross office intercept unit. Certain stations, which are to receive special service, have their T jacks jumpered to respective AT jacks and their LT jacks jumpered to respective CLT jacks. Respective AT and CLT jacks are extended via switch 1919 through respective contacts of the relay NS to respective BS and DLS jacks respectively. Jacks BS and DLS are jumpered to respective ST and LS jacks to normally permit a relay tree ground forwarded thereto via the just described apparatus to be extended to the upper or lower winding of the corresponding station relays S1-S150. When a message is high priority or precedence, relay NS is operated by the register. This permits the intercept relay SIC in the translator to be operated in the event switch 1919 had been operated by an operator so that a high precedence message directed to one of the stations receiving special service is routed to a cross office intercept unit, as will be explained.

It will be noted that only 150 stations are provided in the system, although it may be expanded to accommodate many more stations as indicated by the two hundred respective station multiples in Patch Panel 1700. Certain of the stations correspond to local stations such as Station 5 and Station 6, which are in the physical proximity of Office A, while certain stations are remote from Office A such as Station 3 and Station 4. Each local station may comprise one or more distribution terminal units such as 2800 and 2800A, each having a page printer associated therewith. Each remote station such as Station 3 and Station 4 is accessible over an outgoing line such as 102 and 103 for Station 3 and 104 for Station 4. Each outgoing line has an individual outgoing channel unit such as 7000X, 7000XA, and 7000XB respectively by means of which message signals are transmitted to the remote station in a manner described for transmitting messages for the outgoing channel unit in the aforementioned application.

The operated one of the station relays S1-S150 returns a signal to the Terminal Register 2000 in Register A. This signal comprises an indication of the group to which the station is assigned and to its position in the group. If the translation corresponds to a local station, the station relay also returns a signal corresponding to the terminal finder switch or terminal finder switches which have access to the various distribution terminal units in the station. If the station is a remote station, a signal is returned by the station relay for indicating the speed at which the station receiving apparatus receives transmission. In the event the translation was a last translation and the lower winding of the station relay is operated, a signal indicating that this is the last translation for the particular DDI is also returned to the register.

The Terminal Register 2000, having received the various signals from the translator, then initiates a series of operations for setting up the required apparatus under the control of the Sequence Control Unit 2300. Thus, if the translation corresponded to a local station, a terminal finder switch such as 2700 is selected, and it searches for an idle distribution terminal unit such as 2800 and page printer 2901 associated with the station. If an idle terminal unit and page printer are found, an incoming selector switch such as 5200X at the distribution terminal unit is set to the Line Circuit 300, while a Precedence Switch MMPR2 at the terminal unit is set to the message precedence for the purpose of permitting message precedences to be compared in the event of a cancel transmission sequence. In the event the Terminal Finder Switch 2700 finds no idle distribution terminal unit, among the group to which it has access, the register selects another terminal finder switch having access to other units and associated page printers of the station, if such condition was indicated by the translator. If this condition does not exist or the other switch or switches do not find an idle terminal unit and page printer associated with the station, the Sequence Control Unit 2300 causes a test to be made for a preset or empty cross office unit respectively depending upon the message precedence.

Each cross office unit such as 3300 comprises incoming selector switches such as 5200X1 whereby it is associated with the incoming line circuits, outgoing selector switches such as 4800X whereby it may be set to any outgoing channel unit such as 7000X or terminal convertor unit such as 4300, a precedence switch such as MMPR2X for comparing message precedence, a reperforator for reperforating a tape in accordance with message signals received from a line circuit, a tape reader for reading the perforated tape, and a transmitter for transmitting message signals in accordance with the perforated tape. The reperforator, tape reader, and transmitter operate in a manner similar to that described for corresponding apparatus in the aforementioned application and are indicated by the box marked Line Apparatus 3305.

The test for a preset cross office unit is made in the event a low precedence message is directed to a remote station or in the event an idle distribution terminal unit is not found for a low precedence message directed to a local station. The test proceeds in a manner similar to that described in the aforementioned application, and if such a cross office unit is found, an incoming selector switch 5200X1 is set to the Line Circuit 300. In the case of a preset cross office unit the Precedence Switch MMPR2X and the outgoing Selector Switch 4800X are already set to the message precedence and the desired station respectively, as the unit already has a message in storage of a similar precedence and destined for the same station.

In the event the register fails to find a preset cross office unit destined for either a remote station or a local station or in the event of a high priority message, a test is made for an empty cross office unit under control of a Sequence Control Unit 2300. The test for an empty cross office unit proceeds in a manner similar to that explained in the aforementioned application for such a test. On selection of an empty cross office unit the Incoming Selector Switch 5200X1 thereat is set to the incoming line circuit; the Outgoing Selector Switch 4800X is set to a distribution terminal convertor unit such as 4300, if the message is directed to a local station; or if the message is to be routed to an outgoing station, the switch 4800X is set to the corresponding one of the outgoing channel units such as 7000X, 7000XA, or 7000XB respectively. Likewise, the Precedence Switch MMPRX2 in the empty cross office unit is set to the message precedence.

If the test for an empty cross office unit is unsuccessful, units connected to the line circut are disconnected therefrom in a "flush out" procedure. A Terminal Finder Switch 2700J having access to the cross office intercept units such as 3800 is seized by the register, and it steps in search of an idle cross office intercept unit. On finding the same, an Incoming Selector Switch 5200X2 at the intercept unit is set to the Line Circuit 300. If for some reason no idle cross office intercept unit is found, the register disassociates itself from the Line Circuit 300 and locks out the line circuit in a manner which will be explained.

After setting up a cross office unit or distribution terminal unit respectively, depending on the sequence resulting from the translation, the register again signals the Translator 1600 to associate itself therewith, in the event the prior translation was not a last translation. The succeeding translation count relay TCB for example is now used for again translating the registered DDI. The procedure for selecting and setting a distribution terminal unit or cross office unit respectively is again repeated after the translator signals the register that the translation is complete. After the register has set up a unit for each respective translation, the DDI is again translated. On each translation a succeeding one of the translator count relays TCA–TCJ is operated. The relay tree ground forwarded to the count relays TCA–TCJ is, therefore, forwarded to successive terminals in the row corresponding to the DDI in Terminal Field Patch Panel 1700.

When a last translation indication is received from the translator for a particular DDI, the DDI registered by the route register relays R1A–R1E, R2A–R2E, and R3A–R3E is erased, as these relays are restored. After the distribution terminal unit or cross office unit respectively is set to the Line Circuit 300, the register again initiates operation of the tape reader at the line circuit. If another DDI is read, that DDI is registered in the route register relays R1A–R1E, etc., and the translation operation again takes place. The second DDI is translated as many times as indicated by the translator and a respective unit is set to the Line Circuit 300 for each translation. After the last translation, the procedure is again repeated if another DDI is read by the tape reader.

After the last DDI is processed, a control character sequence appears in the message tape, and this indicia is used to signal the register that no further DDI's are present in the message. The register accordingly releases from the line circuit. The line circuit transmitter, which is now connected to each page printer and/or reperforator at each connected distribution terminal unit and/or cross office unit respectively, initiates message transmission thereto.

In the event one or more units were set to the Line Circuit 300 at the time an intercept routing is indicated, the line circuit is signaled accordingly by the register. The line circuit then releases from each of the connected cross office units and/or distribution terminal units in a "flush out" procedure. On release of each of these units from the line circuit the line circuit signals the register accordingly. A cross office intercept unit is then set to the incoming line circuit and the message transmitted thereto. A message transmitted to the cross office intercept unit is perforated on a tape. The tape must be removed by an operator from the reperforator thereat and again inserted in a tape reader at a line circuit provided for that purpose. The message is then processed again to permit routing to the proper destination. If it is high priority message, the operator may telephone its contents to the desired destination.

On transmission of a message to a cross office unit it is reperforated in a tape in the manner explained in the aforementioned application. The tape is fed out to a tape reader. The tape reader in turn reads the message perforations and feeds the tape out to a cross office unit transmitter in the manner explained in the aforementioned application. The cross office unit is equipped with an SOM detector and an EOM detector both of which perform functions similar to that described in the aforementioned application for registering the SOM and EOM respectively. In the cross office unit only the first SOM need be read to initiate message processing. After reading the SOM, the cross office unit can seize an outgoing channel unit such as 7000X over which it has access to a remote station such as 3, or it may seize a distribution terminal converter unit such as 4300 over which it has access to a local station distribution terminal unit such as 2800. In both cases several units may attempt to seize the desired unit. A message comparison arrangement is provided utilizing Outgoing Finder Link 6400X, which functions in a manner described in the aforementioned application for similarly marked apparatus. It permits the cross office unit having the message of highest precedence to seize the desired unit.

On seizing an Outgoing Channel Unit 7000X or Distribution Terminal Converter Unit 4300, the cross office unit transmits its identifying number to the outgoing channel unit or via the associated distribution terminal unit to the page printer respectively. After this, the message is transmitted to the respective unit connected to the cross office unit and the cross office unit is released therefrom.

If the channel unit is part of a multichannel group such as illustrated by Outgoing channel Units 7000X and 7000XA having access over lines 102 and 103 respectively to Station 3, and both channels become busy, a signal is returned to the Multichannel Busy Test Unit 2600a. This permits the Multichannel Busy Test Unit 2600a to control a marking provided by the Terminal Test Unit 2600 accordingly. The marking controls a switch individual to the group such as MM1 in the translator to provide for even distribution of the messages between the two outgoing channel units having access to Station 3.

Figure 3:
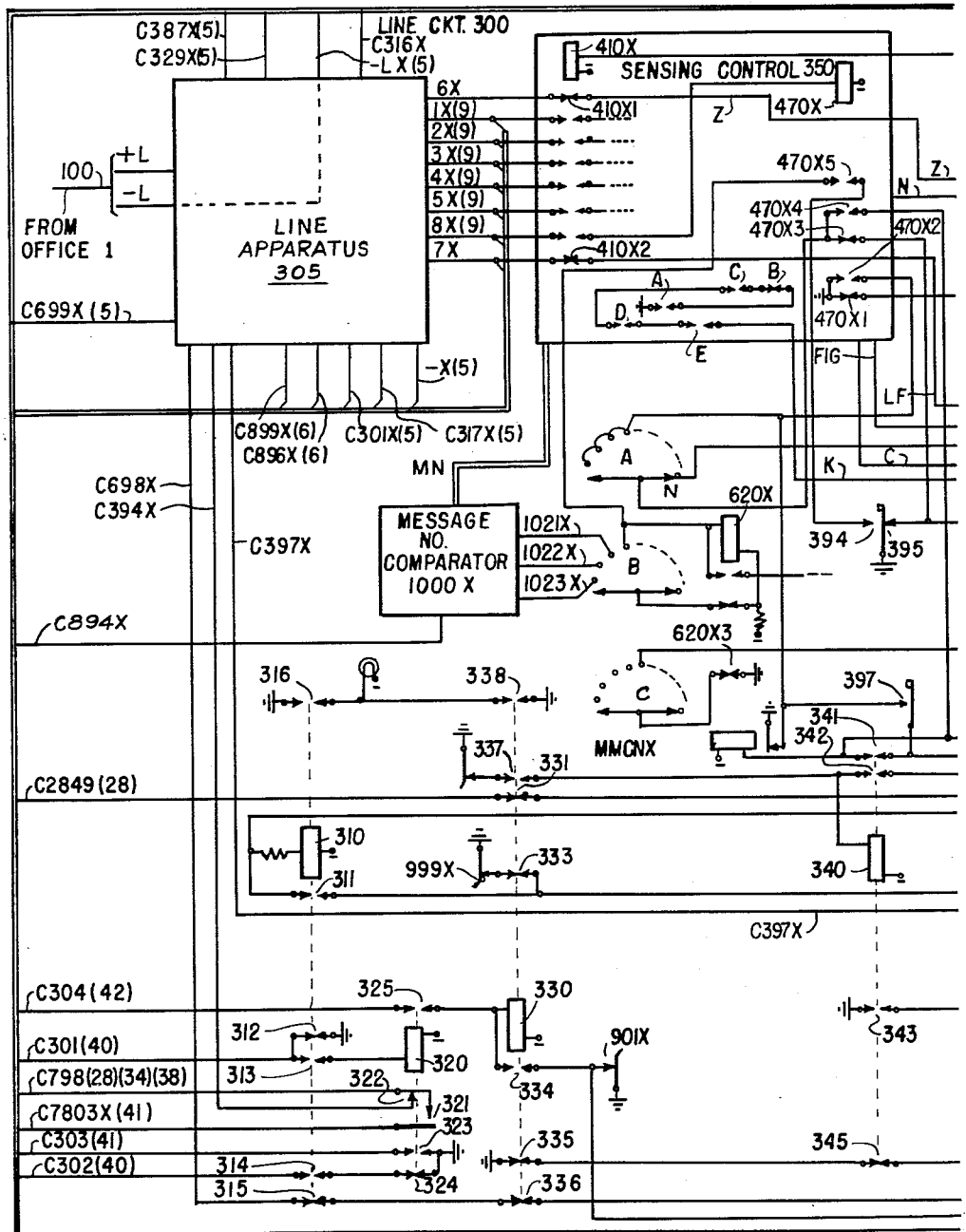
Figure 4:
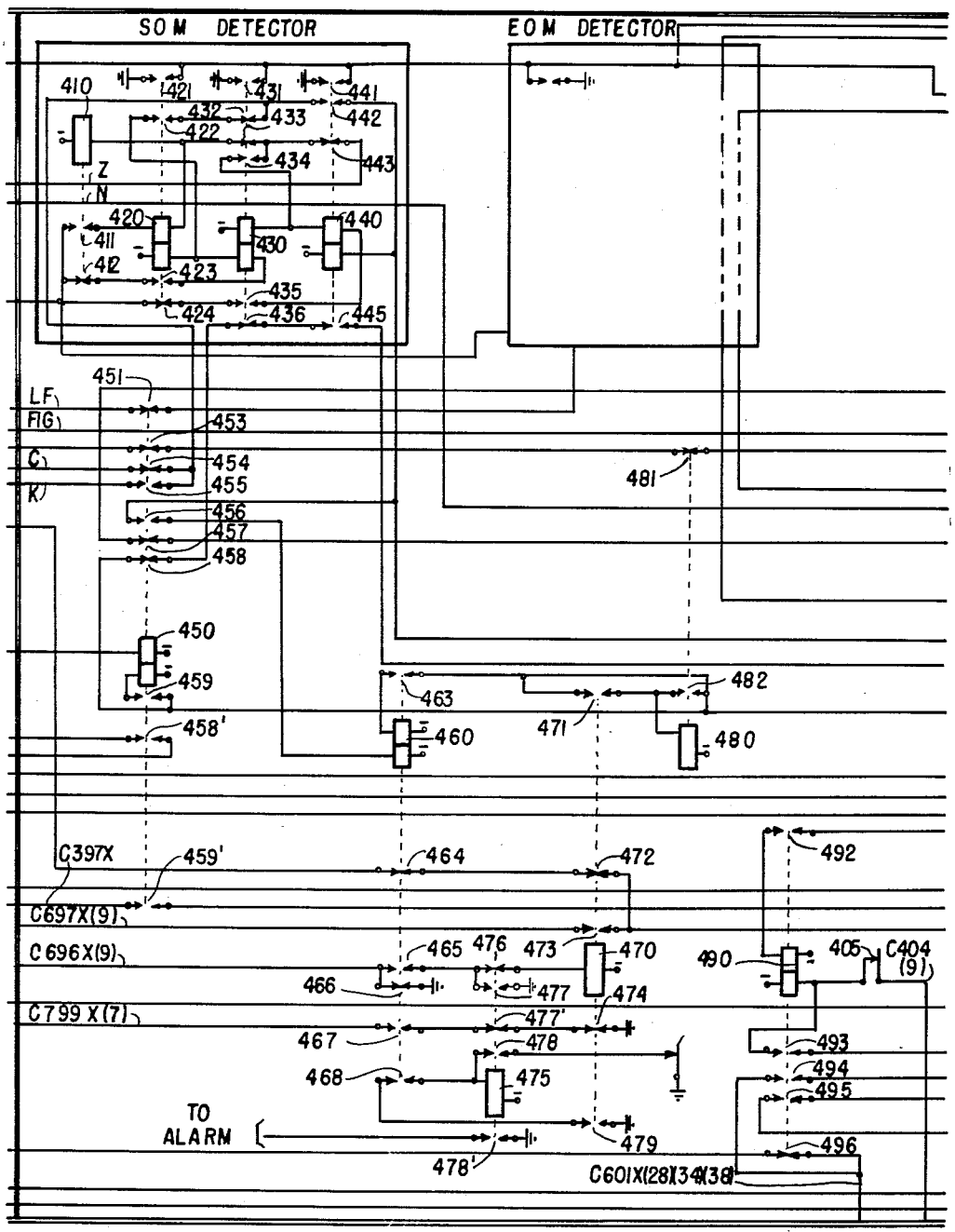
Figure 5:
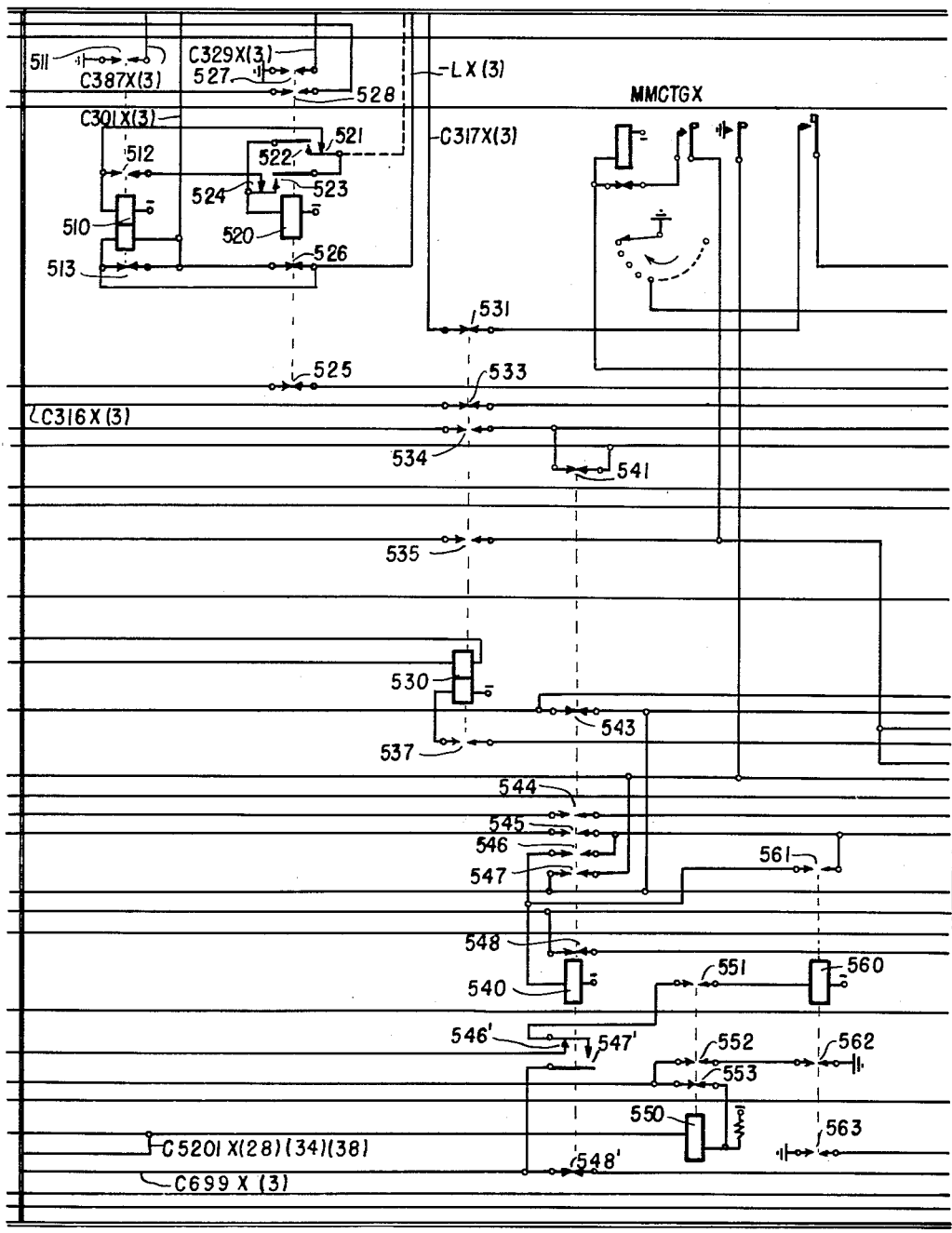
Figure 6:
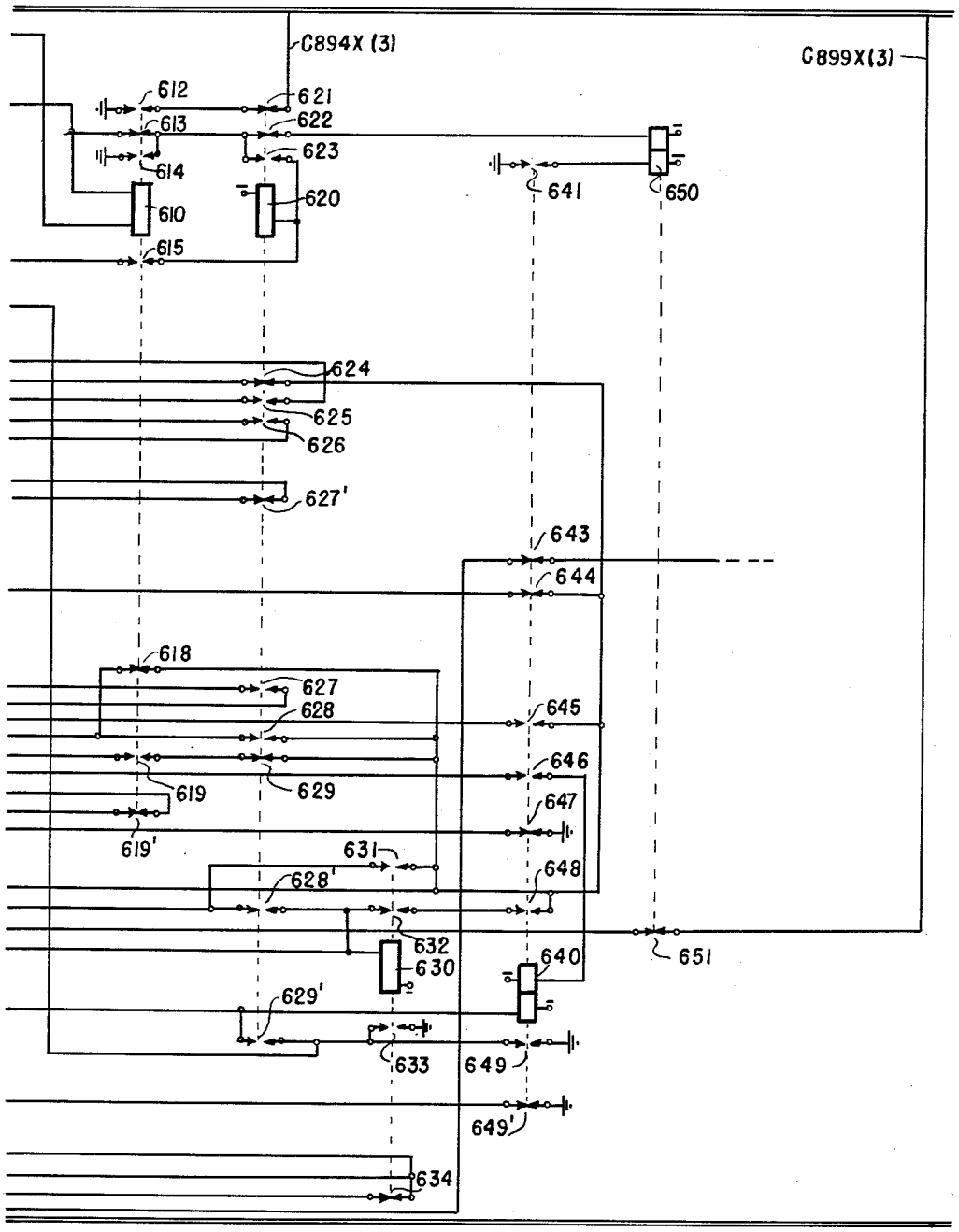

The detailed description of the manner in which the invention functions may best be understood by first referring to FIG. 3. It will be noted that Line 100 therein extending from a transmitting office to Office A comprises at the terminating end thereof +L and —L conductors. The +L conductor extends to one side of the line windings of a reperforator magnet which is not specifically shown but is indicated by the box marked Line Apparatus 305. The —L conductor extends to conductor —LX(5) and through the lower winding of Relay 510 in shunt with Contacts 513 and 526 to Lead C301X(3). Lead C301X(3) extends to the other side of the line windings of the reperforator magnet. The magnet therefore responds to changes of electrical condition representing message signals and control signals on Line 100 to reperforate a message tape accordingly and advance the tape towards the associated tape reader as explained in the aforementioned application.

*SOM detection*

When the tape between the reperforator and tape reader becomes slack, the reader slack tape switch contacts (not shown) close to extend the ground from Off-normal Springs 395, Contacts 464, 472, and 651, and Lead C899X(3) to the reader clutch magnet indicated by the box labeled Line Apparatus 305. It energizes, and the tape is pulled across the reader sensing pins. The first Z of the first SOM is sensed by the tape reader pins, and ground is extended over Lead 6X, past Contact 410X1 of Relay 410X in the Sensing Control 350, Lead Z, Contacts 443 and 433 to energize Relay 410.

Relays 410, 420, 430, and 440 comprise an SOM Detector, which detects the message SOM as described in the previously mentioned application. The SOM Detector operates in a similar manner to the apparatus described in the aforementioned application, with the exception that in the present application it serves to detect two SOM's. The first SOM comprises the characters ZCZC, as described in the previously mentioned application, while the other SOM constitutes the characters ZKZK and occupies a position on the tape succeeding the precedence and routing indications used in transmitting the message to the present office.

Relay 410 closes Contacts 411. At the end of the tape reader sensing cycle, ground is removed from Lead Z, and the upper winding of Relay 420 energizes in series with Relay 410 over Contacts 411 and 470X1. At Contacts 421 it energizes Relay 410X in the Sensing Control 350, which operates its contacts to connect each of the Leads 1X–5X and 8X from the taper reader sensing pins to a respective relay in the Sensing Control 350.

Sensing Leads 1X–5X are grounded in various combinations under control of the tape reader sensing pins in accordance with each character read by the tape reader, while lead 8X is grounded once for each character sensed or read by the tape reader. Relay 470X in the Sensing Control 350 is operated by the ground on Lead 8X slightly after the start of each reader sensing cycle and is restored slightly before the end of each sensing cycle by removal of ground from Lead 8X. The sensing control relays (not shown) on operating, control detecting chain contacts to extend ground to respective detection chain leads corresponding to certain characters read by the tape reader as explained in the aforementioned application. Thus, when the second character C of the SOM is read, corresponding relays in the Sensing Control 350 are operated from ground on Leads 2X, 3X, and 4X to extend ground to the Detecting Chain Lead C as explained in the aforementioned application. This ground is extended over Contacts 454, 432, and 422 to energize the lower winding of Relay 420 during the sensing cycle. Relay 410 and the upper winding of Relay 420 are deenergized, when Contacts 470X1 open, due to the operation of Relay 470X during the sensing cycle. At the end of the C sensing cycle, the lower winding of Relay 430 energizes in series with the lower winding of Relay 420 over Contacts 423, 412, and 470X1.

At Contacts 431 Relay 430 maintains Relay 410X energized, and at Contacts 433 it opens the circuit for extending ground from Lead Z to Relay 410. At Contacts 434 Relay 430 extends Lead Z to its own upper winding. When the third character Z of the first SOM is read, corresponding relays in the Sensing Control 350 are operated to Ground Lead Z. That ground is extended over Contacts 443 and 434 to energize the upper winding of Relay 430. Relay 430 also opens Contacts 436 to prevent the completion of a circuit to Relay 530 before the end of the succeeding C sensing cycle. The respective lower windings of Relays 420 and 430 are deenergized when Contacts 470X1 open. At the end of the sensing cycle, ground is removed from Lead Z, and the upper winding of Relay 440 energizes in series with the upper winding of Relay 430 over Contacts 435, 424, and 470X1. At Contacts 443 Relay 440 opens the circiut for extending the Z detection chain ground to Relay 430.

When the last character C of the first SOM is read, the corresponding sensing control relays are operated to Ground Lead C. This ground is extended over Contacts 454 and 442 to energize the lower winding of Relay 440. The respective upper windings of Relays 430 and 440 are deenergized when Contacts 470X1 open during the sensing cycle. The ground on Lead C, which energizes the lower winding of Relay 440, is also extended to the upper winding of Relay 530. This prevents the ground extended from Key Contacts 999X, Contacts 333, 543, 458, 436, and 445 from energizing the upper winding of Relay 530 on release of Relay 430. Relay 530 therefore remains shunted until the end of the sensing cycle, when ground is removed from the C lead. At that time the battery through the lower winding of Relay 440 is extended through the upper winding of Relay 530 and over the aforementioned contacts to ground at Key Contacts 999X to energize Relay 530.

Relay 530 energizes its lower winding over Contacts 537, 618, and 333 to ground at Key Contacts 999X. At Contacts 531 it opens a point in an incomplete circuit to Relay 620. At Contacts 534 Relay 530 prepares a circuit from the sensing control detection chain lead FIG to the motor magnet of switch MMCNX. This lead is grounded by the relays of the Sensing Control 350, when a figure shift character is sensed by the tape reader, to energize the motor magnet of Switch MMCNX as will be explained.

*Channel number check*

The reader continues to operate after the first SOM is detected. It senses further characters of the message and transmits ground over Leads 1X–5X in accordance with the sensed characters. Following the SOM, the channel designation is read. However, the relays of the Sensing Control 350 extend no effective detection chain grounds corresponding to the various characters of the channel designation. After the channel designation is read, a figure shift character followed by the message number is read. The message number indicates the numerical order of the current message received over the particular incoming line or channel. The figure shift character, on being sensed at the tape reader, results in the operation of the corresponding sensing relays in the Sensing Control 350, which extend a detection chain ground over lead FIG. Ground is, therefore, extended past Contacts 534, 541, 481, 453, Contact N, and the wiper of Level A of Switch MMCNX to Contacts 470X4. Relay 470X operates from the ground on Lead 8X following the beginning of the sensing cycle, and Contacts 470X4 close to forward the ground from lead FIG to the motor magnet of Switch MMCNX.

The motor magnet energizes and when Contacts 470X4 open, before the end of the sensing cycle, the magnet deenergizes to step the switch wipers to their first position. When the switch takes its first step, Off-normal Springs 395 open to remove ground from Lead C899X(3) extending to the reader clutch magnet. With Switch MMCNX in its first position, ground from the switch self-interrupting springs is forwarded over the first four multipled contacts and switch wiper of Level A, through Contacts 470X3, and over already described contacts to Lead C899X(3) for energizing the reader clutch magnet. The reader then operates to sense the next message character.

The hundreds digit of the message number is read next by the tape reader, and Leads 1X–5X are grounded accordingly. The sensing relays in Sensing Control 350 are operated to extend ground over a detection chain lead corresponding to the digit. This lead is extended through Cable MN to the Message Number Comparator 1000X and through a hundredths switch in the comparator, set in a manner similar to that explained in the previously mentioned application to a position corresponding to the hundreds digit of the message now being received. If the switch is set in a position corresponding to the grounded lead, the ground is extended to Lead 1023X. Lead 1023X extends to the first contact of Level B of Switch MMCNX. With the Switch Wiper B on Contact 1, the ground on Lead 1023X is forwarded to resistance battery to shunt Relay 620X. If the appropriate lead in Cable MN is not grounded, the resistance battery extended to Relay 620X is effective to operate Relay 620X over Contacts 470X5 as soon as Relay 470X operates, as Off-normal Springs 394 are reclosed at this time. Relay 620X on operating completes an alarm function, as described for a corresponding relay in the aforementioned application.

During the sensing of the hundredths digit, Contacts 470X2 close to extend ground over the first to the fourth multipled contacts and wiper of Level A of Switch MMCNX and Contacts 470X4 to energize the motor magnet of Switch MMCNX. Simultaneously Contacts 470X3 open to deenergize the reader clutch magnet. This ensures stopping of the reader at the end of the cycle, so that it operates in synchronism with Switch MMCNX. When Contacts 470X4 open on release of Relay 470X, the motor magnet of Switch MMCNX is deenergized, and it steps the switch wipers to their respective second contacts. With Contacts 470X3 closed and the magnet self-interrupting ground extended thereto, the reader clutch magnet is again energized, and the reader goes through another cycle.

With Switch MMCNX in its second position and the reader operating, a test is performed for the tens digit of the message number in a manner described for the hundredths digit, except that a tens switch in the Comparator 1000X and the Tens Lead 1022X are used. The reader is stopped and the Switch MMCNX is stepped to Contacts 3 in a described manner. When Switch MMCNX self-interrupting springs and Contacts 470X3 close, the reader is again started, and a test is performed to determine if the units digit of the message number is correct. The switch motor magnet is again energized on operation of Relay 470X. In this case a units switch in Comparator 1000X and Lead 1021X are used to maintain Relay 620X shunted. The reader is stopped as described, and the switch is stepped to its fourth position in a manner described. In each case the reader clutch magnet is operated in synchronism with the deenergization of the switch motor magnet and release of Relay 470X, as explained.

When the switch is in its fourth position, a letter shift character is sensed by the tape reader, which is operated as already described. During this sensing cycle, ground from Off-normal Springs 394 is extended through Contacts 470X5 and over Switch Wiper B to maintain the shunt on Relay 620X. The motor magnet of Switch MMCNX is energized, as described, and on its release steps the switch wipers to their respective fifth contacts. At that time the Switch MMCNX Level C wiper forwards ground from Contacts 620X3, over Contact 5 to the upper winding of Relay 450, and it operates. At Contacts 459 it energizes its lower winding over Contacts 543 and 333 and Key Contacts 999X. The reader clutch magnet remains deenergized when Switch MMCNX steps to its fifth position, as the switch self-interrupting ground is no longer forwarded through the multipled contacts of Level A to Lead C899X(3).

At Contacts 458', Relay 450 completes a self-interrupted homing circuit for Switch MMCNX from Off-normal Springs 397. At Contacts 458 the series circuit between Relay 440 and the upper winding of 530 is opened, and Relay 440 restores. Relay 440 opens Contacts 441 to restore Relay 410X. The lower winding of Relay 530 remains energized, and maintains the relay contacts operated. At Contacts 453, Relay 450 opens a possible circuit for energizing the motor magnet of Switch MMCNX in the event Lead FIG is subsequently grounded. At Contacts 451, Relay 450 opens a possible circuit for energizing relays of the EOM Detector 400, in the event a line feed character is sensed by the tape reader, to operate the relays in the Sensing Control 350 accordingly.

With Switch MMCNX in its home position, ground from Off-normal Springs 395 is extended over Contacts 464, 472, and 651 to Lead C899X(3) to again energize the tape reader clutch magnet. It now operates the reader continuously to ground Leads 1X–5X in accordance with succeeding message characters. As Relay 410X is restored, the relays in the Sensing Control 350 remain unoperated.

When the tape between the reader and transmitter becomes slack, slack tape switch contacts thereat close to ground Lead C699X(5) extending to Contacts 548'. This ground is extended over Contacts 634, 336, and 315 to Lead C6698X and battery through the transmitter clutch magnet (not shown). It operates to advance the tape through the transmitter. When the first Z of the first SOM approaches the transmitter, it is presensed thereat in a known manner to ground Lead C397X. The ground on Lead C397X is extended past Contacts 459' and 548 to energize Relay 630. Relay 630 opens Contacts 634 to deenergize the transmitter clutch magnet and prevent its further operation at this time. At Contacts 631 it completes its own holding circuit through Contacts 543 and 333 to ground at Key Contacts 999X.

Second SOM detection

When the first Z of the second SOM (ZKZK) is sensed by the tape reader, which is still operating, Lead 6X is grounded as before. Message characters between the message number and the first Z of the second SOM, when sensed by the tape reader, do not result in the completion of any circuits. It extends ground past Contacts 410X1 to operate Relay 410. Relay 420 operates thereafter in a manner already explained. The following character of the SOM is K. Leads 1X–4X are grounded in accordance with the character K, resulting in the Operation Detection Chain Contacts A, C, D, and E by the appropriate sensing relays in Sensing Control 350. Ground is forwarded from Contacts A, through Contacts B, C, D, and E to Lead K, and over Contacts 455, 432, and 422 to energize the lower winding of Relay 420.

The remaining characters of the second SOM on being sensed by the tape reader result in the operation and control of Relays 430 and 440 in a manner already described for the first SOM. Relay 440, operating after the sensing of the second Z, prepares a circuit for its lower winding at Contacts 442. When the second K of the SOM is sensed, ground extended from Contacts 455 is now extended past Contacts 442 to energize the lower winding of Relay 440. It is also now extended past Contacts 456 to energize the lower winding of Relay 460. Relay 460, at Contacts 463, energizes its upper winding over Contacts 543 and 333 and Key Contacts 999X. Relay 440 and the lower winding of Relay 460 restore when the detection chain ground is removed from Lead K at the end of the sensing cycle. Relay 440 restores Relay 410X to disconnect Leads 1X–5X and 8X from the Sensing Control 350.

At Contacts 464, Relay 460 opens a point in the reader clutch magnet circuit to terminate further tape reader operation at this time. At Contacts 465 it prepares a circuit for Relay 470 and at Contacts 467 extends ground from Contacts 474 to the Register Finder 1200X over Lead C799X(7).

Register seizure

The ground on Lead C799X(7) causes Finder 1200X to seize an idle register in a manner explained in the previously mentioned application. Briefly, this is done by extending the ground on Lead C799X(7) through a switch wiper connected over an associated bank contact with the idle register by means of Lead ST extending to the Register Supervisory Unit 700, over Contacts 1327X to Lead C1391X(9) to operate Relay 920 in Finder 900, as explained in the previously mentioned application for a similarly operated relay.

On operating, Relay 920 connects the motor magnet of Finder Switch MMIF to its associated A wiper over its self-interrupting contacts and Contacts 921, 911, and 1011. At Contacts 922, ground is extended through the lower winding of Relay 910 to the Level A wiper. The wiper is connected over one of its bank contacts to a lead such as C696X(4) individual to one line circuit such as 300 among the twenty-five incoming line circuits to which it has access. If this lead is extended to a line circuit, which does not require use of a register, it extends to ground over contacts such as 466 to ground to shunt the lower winding of Relay 910. The motor magnet of Switch MMIF energizes from the ground, and it steps its wipers in a self-interrupted manner. The Level A wiper of Switch MMIF, on being connected to the line circuit requiring use of the register, which in this example is Line Circuit 300, extends the battery from the winding of Relay 470, Contacts 476, 465, and Lead C696X(9) to the lower winding of Relay 910. Relay 910 energizes as explained for a similar relay in the aforementioned application, while the motor magnet, of course, fails to energize. Relay 910 opens the circuit for the motor magnet at Contacts 911, and extends ground through its low resistance upper winding over Contacts 912 to Lead C696X(4) so that Relay 470 in Line Circuit 300 energizes. At Contacts 913, Relay 910 operates Relay 930 for purposes to be described.

At Contacts 471, Relay 470 completes a circuit to Relay 480 from ground Key Contacts 999X through Contacts 543 and 333. At Contacts 472, Relay 470 opens another point in the circuit for supplying ground from Off-normal Springs 395 to the Reader Clutch Magnet Lead C899X(3). Instead, it extends Lead C899X(3) from Contacts 651, past Contacts 473, to Lead C697X(9) to enable the register to control the reader clutch magnet. Lead C697X(9) is extended into the register over Level B of the aforementioned Finder Switch MMIF. At Contacts 474, Relay 470 removes ground from Lead C799X(7) extending to the Register Finder 1200X.

Relay 930 operates as before mentioned, to close Contacts 931–938. This extends Leads C697X(4), 1X(3)–5X(3), 8X(3), and C404(4) respectively, from the respective wipers of Levels B–I respectively, into the register over Leads C903(8), 1'(11)–6'(11), and C902(8) respectively. At contacts 939, ground is extended over Lead C901(7) to operate Relay 1310X in the Supervisory Unit 700 as explained for a similar relay in the aforementioned application.

Relay 1310X connects ground (for example) at Contacts 1311X to Leads C704(10), C705(15), C706(13), and C707(22) for purposes to be described, and also operates Relay 1320X at Contacts 1316X. Relay 1310X also connects ground from Contacts 1311X through Contacts 731 and 732 to Leads C801(13)(23) and C802(21) respectively, ground from Contacts 1311X through Contacts 733 to Leads C803(25) and C804(31) respectively, and ground from Contacts 1311X past Contacts 721 and 734 in shunt to Lead C805(13).

Ground on Lead C801(13)(23) provides a holding ground for use in the Route Register 1100 and the Sequence Control Unit 2300. Ground on Lead C802(21) provides a holding ground for use in the Terminal Register 2000. Ground on Lead C803(25) is used for a holding ground in the Sequence Control Unit 2300, while ground on Lead C804(31) operates Relay 3130X in Cross Office Finder 3100X. This relay prepares holding grounds for the Cross Office Register Relays L1X–L25X at contacts such as 3131X, as explained for the cross office finder in the aforementioned application. Ground on Lead C805(13) operates Relay 1240 in the Route Register 1100. This relay prepares holding grounds for various relays in the Route Register 1100 including the DDI Register Relays R1A–R3E.

Relay 1320X closes Lead DB2 to Lead DB1 at Contacts 1325X and opens Contacts 1324X to remove ground from Lead DB2. This causes the Register Finder 1200X to select the other idle register in a manner similar to that explained in the aforementioned application. Thus, as soon as ground is applied to Lead DB2 from contacts such as 1324X in the other register, the Register Finder 1200X steps from this register to the other register. At Contacts 1327X, Lead 1391(9) is disconnected from ground to release Relay 920. Relay 920 opens Contacts 921 and 922. However, the upper winding of Relay 910 and Relay 470 remain energized over the aforedescribed circuit including Lead C696X(4).

Previously mentioned Lead C704(10) extends ground from Contacts 1311X through the wiper of Level B of Switch MMIGS in its normal position to energize slow-to-release Relay 1050 in Finder 900. Previously mentioned Lead C705(15) extends ground from Contacts 1311X to the Precedence Register 1400 to provide a holding ground for the Precedence Register Relays 1440–1490. Lead C706(13) extends ground over Contacts 1323 to energize Slow-to-release Relay 1310 in the Route Reigster 1100, and Lead C707(22) extends ground into the Terminal Register 2000 past Contact N Level B of Switch MMOGS to energize Slow-to-release Relay 2250.

In the meantime ground from Contacts 1234 in the Route Register 1100 is forwarded over Lead C806(8), past Contacts 861 to Lead C903(9), Contacts 931, the wiper of Level B of Switch MMIF and over Lead C697X(4) and to Lead C899X(3) over an already described circuit to energize the clutch magnet of the tape reader. The reader now operates and senses the character perforations in the tape to ground Leads 1X(9)–5X(9) in accordance with the character sensed. Ground is also extended on Lead 8X(9) by the tape reader shortly after the beginning of each sensing cycle. The Leads 1X(9)–5X(9) and 8X(9) are extended past Contacts 932–937 respectively to Leads 1'(11)–6'(11) respectively, which in turn are extended to the Sensing Relays 1110–1160 respectively in the Route Register 1100.

*Precedence registration*

Relays 1110–1150 operate in accordance with which one or ones of Leads 1X(9)–5X(9) are grounded, when the tape reader senses the character perforations in the tape. Relay 1160 is connected via Lead 6'(9) to Lead 8X(3), and operates shortly at the beginning of the sensing cycle, and releases shortly before the end thereof in a manner explained for Relay 470X in the Sensing Control 350. The operated one or ones of Relays 1110–1150 complete respective detection chain circuits by extending ground to a detection chain lead corresponding to the character being sensed.

The first character sensed by the reader, to cause a detection chain ground to be extended, is the first character of the precedence designation, which follows the second SOM. Thus, ground is extended over Precedence Detection Chain Leads M(14), R(14), P(14), O(14), Y(14), or Z(14) respectively depending on the precedence designation of the message, as will be explained.

If the message contains the precedence designation MM, Sensing Relays 1130, 1140, and 1150 are operated on reading of the first M by ground forwarded over Leads 3'(11), 4'(11), and 5'(11) respectively from the Reader Sensing Leads 3X(9), 4X(9), and 5X(9) respectively. Ground from Contacts 1414 in the Precedence Register 1400 and Lead C1401(11) is then extended past Contacts 1119, 1149, 1156, 1138, and 1128, Lead M(14), and Contacts 1432 to operate Relay 1420 in the M Precedence Unit as explained for a similar relay in the previously mentioned application. Relay 1160 operating from ground on Lead 8X(9) extended to Lead 6'(11), during the sensing cycle, opens Contacts 1161 to remove ground from Lead C1101(14). Operated Relay 1420 extends Lead C1101(11) to the upper winding of Relay 1430 at Contacts 1422 to prepare a circuit for that winding. Relay 1160 restores, before the end of the sensing cycle, to close Contacts 1161 and extend ground over Lead C1101(14), but Relay 1430 is shunted due to the ground on Lead M(14).

At the end of the sensing cycle, the ground is removed from the Detection Chain Lead M(14), as Relays 1130, 1140, and 1150 are restored. The upper winding of Relay 1430 then energizes in series with Relay 1420 from ground on Lead C1101(14). It closes Contacts 1431 and 1433 and opens Contacts 1432.

During the sensing of the second M of the precedence designation, ground is again extended over Lead M(14) in a manner explained. However, it is now forwarded over Contacts 1433 instead of 1432. This energizes the lower winding of Relay 1430. Relay 1160 operating, after the beginning of the sensing cycle, removes ground from Lead C1101(14) to respectively deenergize the upper winding of Relay 1430 and Relay 1420. Contacts 1422 then open to prevent the later application of ground to Lead C1101(14) from affecting Relays 1420 or 1430. Contacts 1421 on closing extend the ground on Lead M(14) from Contacts 1433 and 1431 to the left side of Relay 1440. This prevents the ground on Lead C705(7) from operating Relay 1440 in series with the lower winding of Relay 1430.

At the end of the sensing cycle ground is removed from Lead M(14) so that Relay 1440 operates in series with the lower winding of Relay 1430 from the ground on Lead C705(7) extended past Contacts 1421 and 1431.

In a similar fashion one of the Relays 1450, 1460, 1470, 1480, and 1490 individual to one of the Precedence Units R, O, P, Y, and Z is operated in the event the Sensing Relays 1110–1150 are controlled by an RR, PP, OO, YY, or ZZ precedence designation respectively in the message. This results from ground forwarded over the respective Detection Chain Leads R(14) from Contacts 1414, Lead C1401(11), Contacts 1119, 1149, 1157, 1139', and 1129'; P(14) from Contact 1414, Lead C1401(11), Contacts 1148, 1136, 1154, 1125, and 16; O(14) from Contacts 1414, Lead C1401(11), Contacts 1119, 1149, 1156, 1139, and 1129; Y(14) from Contacts 1414, Lead C1401(11), Contacts 1148, 1136, 1154, 1126, and 1117; or Z(14) from Contacts 1414, Lead C1401(11), Contacts 1148, 1137, 1155, 1127, and 1118 respectively in a manner similar to that explained for Lead M(14) on operation of the corresponding sensing relays. The Precedence Units R, O, P, Y, and Z respectively each have a pair of relays arranged in a manner similar to that explained for Relays 1420 and 1430 respectively and function in a similar manner in response to ground extended over Leads R(14), O(14), P(14), Y(14), or Z(14) respectively to operate the individually associated Precedence Register Unit Relay 1450, 1460, 1470, 1480, or 1490 in a manner similar to that explained for Relay 1440.

One of the six Precedence Register Relays 1440, 1450, 1460, 1470, 1480, or 1490 is therefore operated in response to the receipt of one of the six possible message precedences. At contacts such as 1443, 1453, 1464, 1474, 1484, or 1494 respectively, depending on which one of the precedence register relays was operated, Relay 1410 is operated. In the event one of the four higher Precedence Register Relays 1460, 1470, 1480, or 1490 respectively is operated, contacts such as 1461, 1471, 1481, or 1491 respectively are closed to extend ground over Lead C1403(12) to enable the message to be routed to a cross office intercept position in the event the station to which the message is to be transmitted is closed during evening hours, as will be explained. If either Relay 1480 or 1490 is operated, Contacts 1483 or 1493, respectively, close to connect Lead C1497(23) to Lead C1499(23) to provide a high precedence message indication to the Sequence Control Unit 2300 to enable direct message routing to an empty cross office unit, if necessary. Likewise, Lead C1449(24) is connected to Lead C1404(24) over either Contacts 1482 or 1492 respectively to provide a high precedence message indication in the event the message is to be routed to an intercept unit.

At contacts such as 1442, 1452, 1463, or 1473 respectively, depending on which one of the four lowest Precedence Relays 1440–1470 is operated, Lead C1497(23) is connected to Lead C1498(23) to provide a low precedence message indication to the Sequence Control Unit 2300 to enable it to test for a preset cross office unit, if needed. At contacts such as 1441, 1451, 1462, or 1472 respectively, Lead C1409(24) is connected to either Lead C1408(37), C1407(37), C1406(37), or C1405(37) respectively, depending on which one of the four lower Precedence Register Relays 1440–1470 is operated. These leads extend to the precedence switch such as MMPR1 in each cross office unit such as 3300 to enable a preset cross office test, if needed.

Operated Relay 1410 at Contacts 1411 prepares a circuit for marking the bank contacts of Switch MMPS in accordance with the operated precedence register relay, through contacts such as 1444 individual to the operated one of the Precedence Register Relays 1440–1490. At Contacts 1412 ground is extended through Contact N Level B of Switch MMPS to operate slow-to-release Relay 1590. At Contacts 1414, Lead C1401(11), extending to the precedence designation detecting chain contacts of Sensing Relay 1110–1150, is disconnected from ground. Ground is instead extended over Contacts 1413 to Lead C1402(11) to the space character detecting chain contacts of the Sensing Relays 1110–1150.

Following the receipt of the precedence designation, a space character is sensed by the tape reader, resulting in the operation of Sensing Relay 1130 from ground on Lead 3′(9) forwarded thereto in a manner similar to that already described. The ground on Lead C1402(14) is, therefore, extended from Contacts 1151, 1122, and 1113 to Contacts 1133 and 1144 and Lead C1202(15). The ground on Lead C1202(15) is extended past Contacts 1511 to Lead C1501(12) to energize the motor magnet of Switch MMTR. The ground on Lead C1501(12) is also extended through the wiper and normal contact of Level A of Switch MMTR to energize the lower winding of Relay 1220. Relay 1220 energizes its upper winding over Contacts 1222 and previously operated Contacts 1241. Relay 1160, operating shortly after Relay 1130, which extended ground to Lead C1501(12), opens Contacts 1161 to remove ground from Lead C1101(14) for no purpose at this time.

At the end of the sensing cycle, Relay 1130 restores to remove ground from Lead C1501(12) to restore the lower winding of Relay 1220 and the motor magnet of Switch MMTR. The contacts of Relay 1220 remain operated, as its upper winding is energized. The switch wipers are then stepped to their respective first positions. Off-normal Springs 1294 close to extend another ground past Contacts 1222 for holding the upper winding of Relay 1220 energized.

*DDI registration*

Switch MMTR has six levels of which only Level A is shown in detail. The wipers of Levels B, C, D, E, and F are connected to Contacts 1115, 1124, 1135, 1147, and 1153 respectively. The first bank contact of each of the five levels B–F is individually connected to an individually corresponding one of the five first character Route or DDI Register Relays R1A–R1E. The second bank contact of each level B–F is connected in a similar manner to an individually corresponding second character route or DDI register relay in group R2A–R2E (not shown), while the third bank contact is connected similarly to a corresponding third character route or DDI register relay in group R3A–R3E. Thus, the present route register relay arrangement is similar to that explained in the aforementioned application with the exception that in this case provision need only be made to register three characters instead of the six described in the previously mentioned application.

When the first character of the first route indicator or DDI is sensed at the tape reader, Leads 1′(9)–5′(11) are grounded, in accordance with the sensed character in a manner similar to that already described for other characters. Relays 1110–1150 are operated in accordance with which Leads 1′(9)–5′(11) are grounded in a manner explained. The operated ones of these relays extend ground from contacts such as 1115, 1124, 1135, 1147, or 1153 to the respective wipers and first contacts of the corresponding levels B–F of Switch MMTR to operate corresponding ones of the Route Register Relays R1A–R1E. The operated relay or relays lock operated over contacts such as R1A1 and 1242. The first character of the routing indicator or DDI is thus registered. The operated relay or relays also ground respective leads at contacts such as R1A2 extending towards Leads 1A(16a)–1E(16a) in accordance with the registered DDI character. At contacts such as R1A3, the operated DDI register relay or relays extend ground over Lead C1319(8) for a purpose to be explained.

As a DDI cannot be a space character, at least one of the sensing relays 1110, 1120, 1140, or 1150 is operated to extend ground from either Contacts 1114, 1123, 1145, or 1152 singly or in combination, depending on which sensing relays are operated, past Contacts 1121 to Lead C1202(15). Ground on Lead 1202(15), as described before, is extended to lead C1501(12) for energizing the motor magnet of Switch MMTR. At the end of the reader sensing cycle, ground is removed at either Contacts 1114, 1123, 1145, or 1152 from Lead C1501(12). The motor magnet of Switch MMTR deenergizes to step the switch wipers of each level to their respective second contacts.

The second character of the route indicator or DDI is then sensed by the tape reader and registered in a group of five relays R2A–R2E (not shown) in a manner similar to that described for registering the first character in the group of relays R1A–R1E. The second group of route register relays control contacts extending ground in accordance with the registered character towards Leads 2A(16)–2E(16). Switch MMTR is then stepped at the end of the sensing cycle, as described, to Contacts 3 at which time the third character of the DDI is registered in a third group of five relays R3A–R3E in a manner similar to that already described. Relays R3A–R3E in turn extend ground towards Leads 3A(16)–3E(16) in accordance with the third DDI character.

With the wiper of Switch MMTR Level A on its third contact, ground from one of the sensing relay contacts such as 1114 is forwarded in a manner explained over Lead C1501(15) and from there past the third contact of Level A of Switch MMTR via the switch wiper. In addition, this ground energizes the motor magnet of Switch MMTR, as described. From the third contact of Level A, a ground is forwarded past Contacts 1162, as soon as Relay 1160 operates, to energize the lower winding of Relay 1230. Relay 1230 energizes its upper winding over Contacts 1232 to ground at both Contacts 1241 and Off-normal Springs 1294. Relay 1160 restoring, before the end of the sensing cycle, opens Contacts 1162 to deenergize the lower winding of Relay 1230. However, its upper winding holds its contacts operated.

At Contacts 1231, Relay 1230 extends ground over Lead C1201(8) to energize Relay 860. Relay 860 opens Contacts 861 to disconnect Lead C806(12) from Lead C903(9) extending to the reader clutch magnet in a manner already explained. In addition, Relay 1230 opens Contacts 1234 to remove ground from Lead C806(8). Thus, with ground removed from Lead C903(9), the reader clutch magnet is deenergized and the reader is stopped at the end of the cycle. At Contacts 1235, a self-interrupted stepping circuit for the motor magnet of Switch MMTR is prepared through Off-normal Springs 1295. Ground supplied to Lead C1501(15) during the sensing cycle holds the motor magnet energized. At the end of the sensing cycle, the ground is removed from Lead C1501(15) as explained, and the self-interrupted stepping circuit is completed to step the switch home. It opens Off-normal Springs 1294 and 1295. Off-normal Springs 1294 open to remove a holding ground for both Relays 1220 and 1230. However, ground at Contacts 1241 holds them operated. At Contacts 1233, Relay 1230 also extends ground over Contacts 1331 to energize Relay 1340.

Relay 1340 locks operated over Contacts 1341 and 1363 to ground on Lead C805(8). At Contacts 1345, ground is extended past Contacts 1353 to Lead C1302(19) to energize the Translator Register Start Relay 1920 in the Translator 1600. At Contacts 1344, ground is removed from Lead C1301(19) extending to a contact individually corresponding to this register on Switch MM1T in Translator 1600. At Contacts 1343, battery from the lower winding of Relay 1350 is connected over Contacts 1366 to mark Lead C1301(19) accordingly. At Contacts 1342, a circuit is prepared to the upper winding of Relay 1350.

*Translator-register connect*

Translator register start relay 1920 closes contacts 1921 to connect the motor magnet of switch MM1T through its self-interrupting springs and contacts 1912 to the wiper of switch MM1T. When the wiper is connected to its normal contact, ground therefrom is forwarded to energize the motor magnet and it steps in a self-interrupted manner to contact 1. If the switch wiper is standing on a contact corresponding to a register, which does not require the translator, it is connected over a lead such as C1301(13) and contacts such as 1366 and 1344 to ground. The motor magnet of the switch is therefore energized and steps its wipers in a self-interrupted manner in search of a contact connected over a lead such as C1301(13) to battery through the lower winding of relay 1350. It will be noted that with ground connected to the contact to which the wiper of switch MM1T is connected, that the upper winding of relay 1910 remains shunted.

On reaching for example the third contact corresponding to the demanding register, the switch MM1T wiper is connected via lead C1301(13), contacts 1366 and 1343 to battery through the lower winding of relay 1350. The switch motor magnet therefore fails to energize, while the battery from relay 1350 is extended through the upper winding of relay 1910 to ground. Relay 1910 only operates in this circuit.

Relay 1910 on operating opens contacts 1912 to disconnect the switch motor magnet from the switch wiper. Likewise it closes contacts 1911 to complete a circuit from battery through relay 1350 extended over the switch wiper to ground through its own lower winding. This is a low resistance winding so that relay 1350 now also operates.

Relay 1350 closes a circuit to its upper winding over contacts 1342 and 1352. At contacts 1351 it extends ground over contacts 1364 and lead C1303(20) to operate bar relays 2050A and 2150B in parallel. These relays at their respective contacts connect the terminal register relays TG1'-TG6', TT1'-TT25', OS1'-OS3', IC1 and TF1'-TF9' of Terminal Register 2000 to the Translator 1600. At contacts 1353 relay 1350 disconnects ground from lead C1302(19) so that the translator start relay 1920 restores. It opens contacts 1921. Another register on applying ground to lead C1302(19) operates relay 1920, however battery from relay 1350 holds relay 1910 operated so that switch MMT1 cannot be stepped in search of the other register, until the present one is released. At contacts 1354 ground is extended from contacts 1368 to the motor magnet of switch MMTC so that it energizes. At contacts 1355 a circuit is completed for slow-to-operate relay 1320 from ground on lead C706(7) and contacts 1367'. At contacts 1356 ground is extended from contacts 1369' to energize the bar relay 1250.

Slow-to-operate relay 1320 provides a translator timing function. It eventually operates, if relay 1360 does not open contacts 1367' before that time, to open the circuit to slow-to-release relay 1310 at contacts 1323. On operating relay 1320 also extends the ground on lead C706(7) from contacts 1314, when relay 1310 restores, past contacts 1322 to provide its own holding circuit. At contacts 1324 relay 1320 completes a circuit from contacts 1315, when relay 1310 restores, to energize relay 1360. Relay 1360 opens the circuit to relay 1250 at contacts 1369' and at contacts 1362 maintains ground on lead C1201(8) to hold relay 860 operated. At contacts 1366 it opens the circuit between relay 1910 and the lower winding of relay 1350 to permit the translator to be used with another register. At contacts 1364 it releases relays 2050A and 2150B. Relay 1310 also extends ground from contacts 1316, through contacts 1325 to lead C1305(7). Ground on lead C1305(7) energizes intercept relay 810 so that the message is routed to intercept as will be understood from the explanation of an intercept routing. At contacts 1312 ground is extended past contacts 1321 to light alarm lamp 1326. It will be understood that the just described operation resulting in restoration of relay 1310 to forward ground over lead C1305(7) will not occur before the translator operation is completed, unless a trouble condition has arisen.

Returning now to the normal operation, it will be recalled that relay 1350 operates relay 1250. Relay 1250 closes contacts 1251A–1251E, 1252A–1252E, 1253A–1253E, 1254A–1254J and 1255. Closing contacts 1251A–1251E, 1252A–1252E and 1253A–1253E extends each respective lead controlled by the route or DDI register relays R1A–R1E, R2A–R2E and R3A–R3E respectively to the individually corresponding leads in the groups of five leads 1A(16a)–1E(16a), 2A(16)–2E(16) and 3A(16)–3E(16) respectively. At contacts 1254A–1254J the leads from the bank contacts of switch MMTC are extended to leads TC1(16)–TC10(16) respectively, and at contacts 1255 lead C1403(14) is extended to lead NS(19) to enable an intercept translation in the event ground is extended to lead C1403(14).

*Translator operation*

Figure 12:
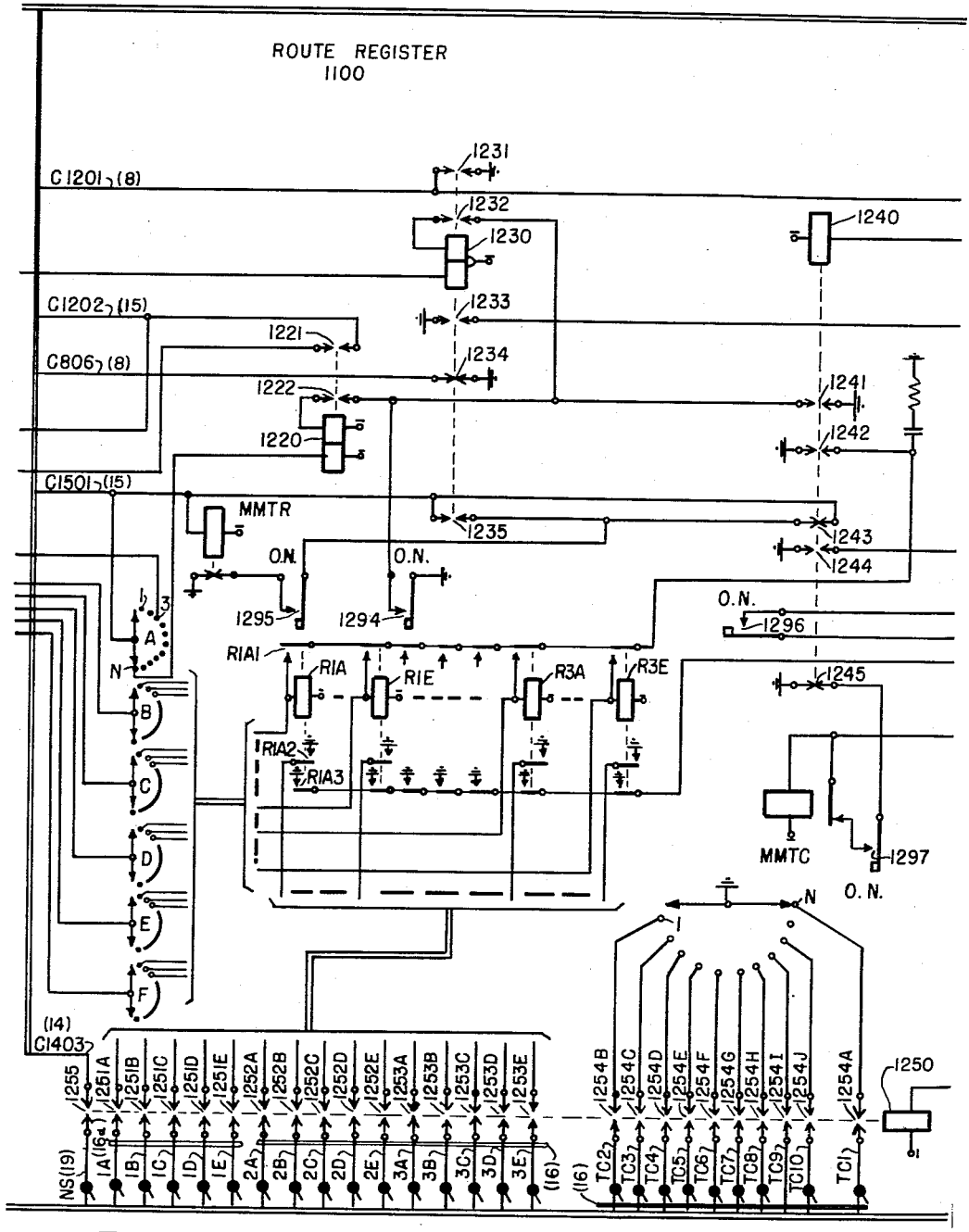
Figure 13:
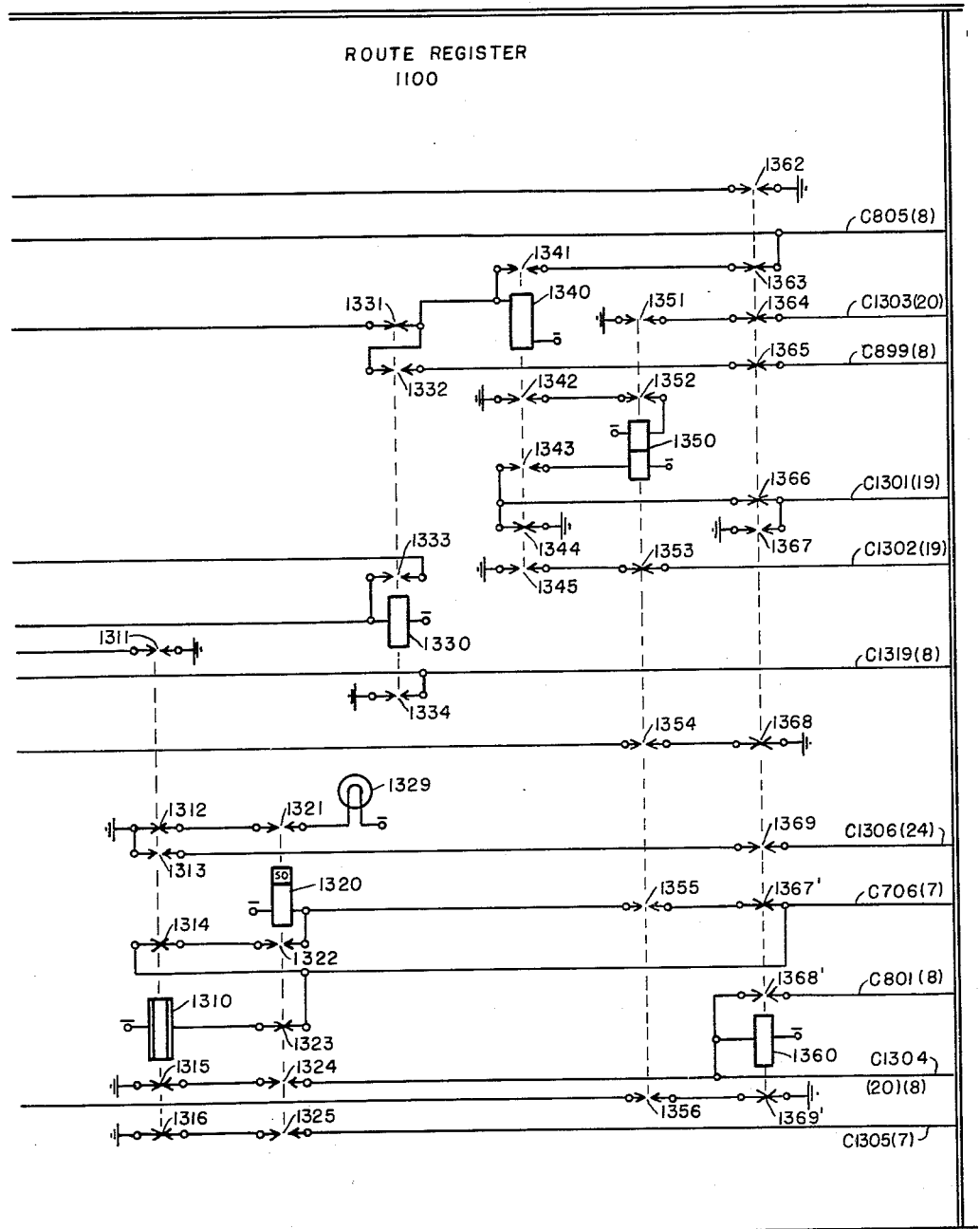
Figure 14:
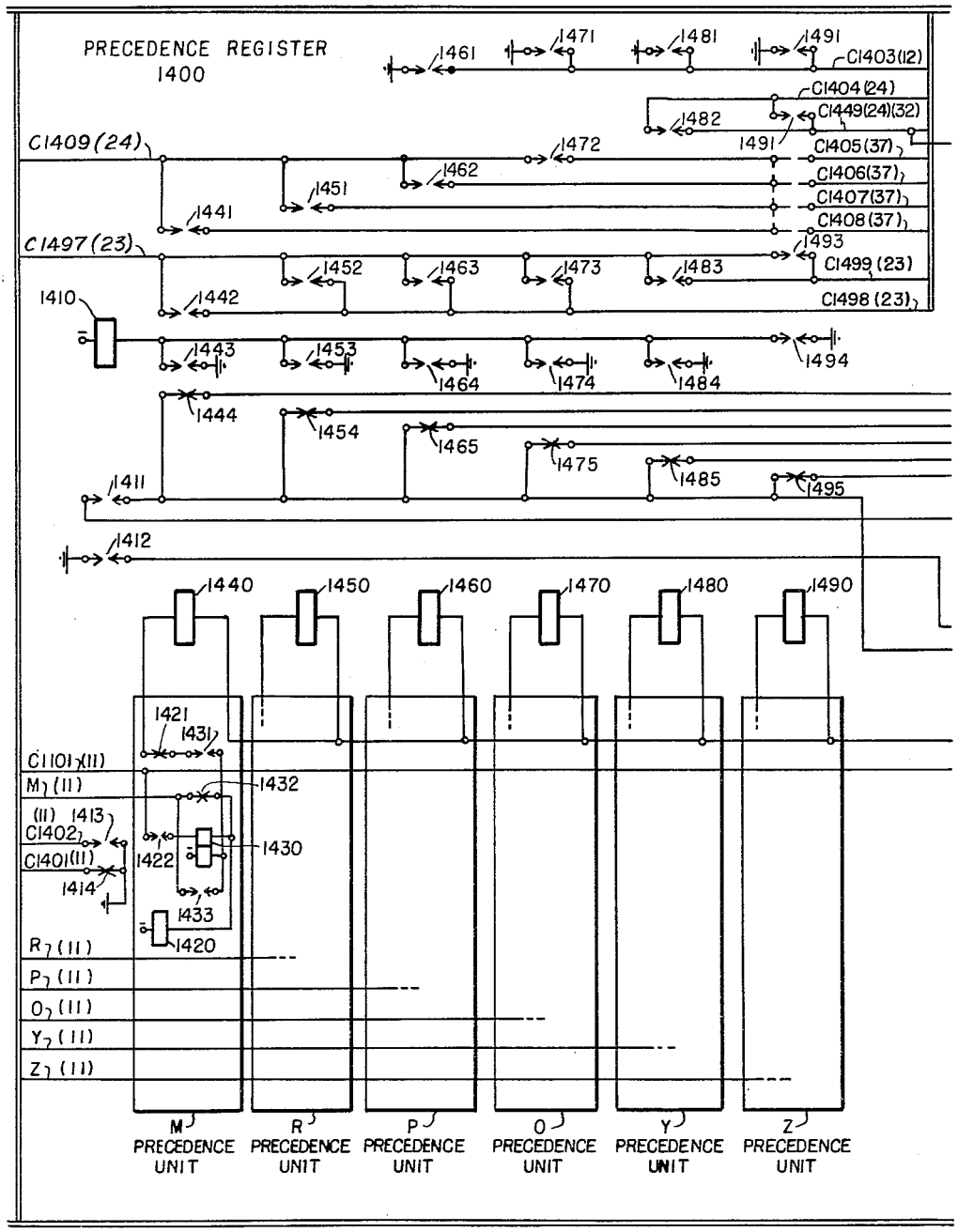
Figure 15:
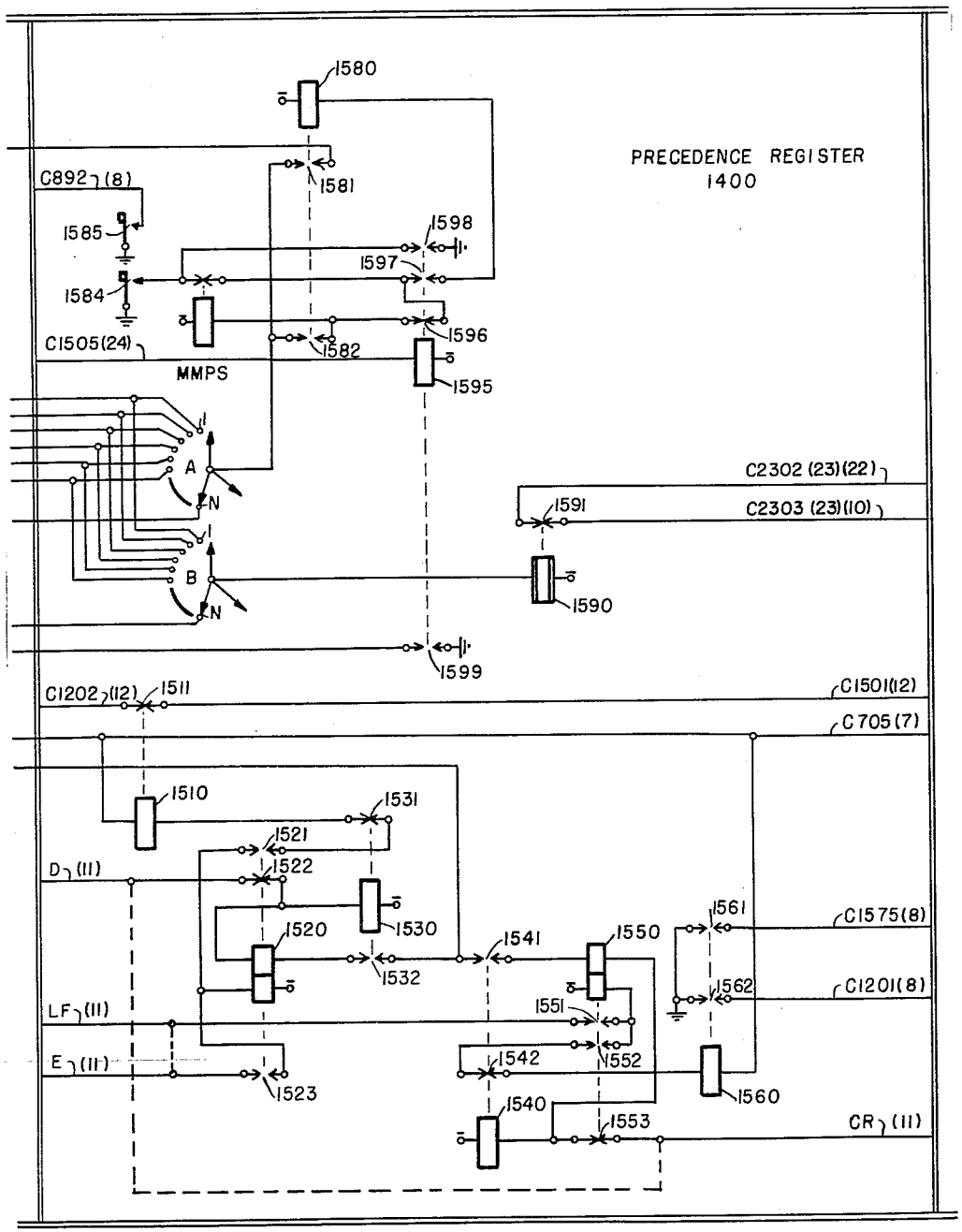
Figure 16:
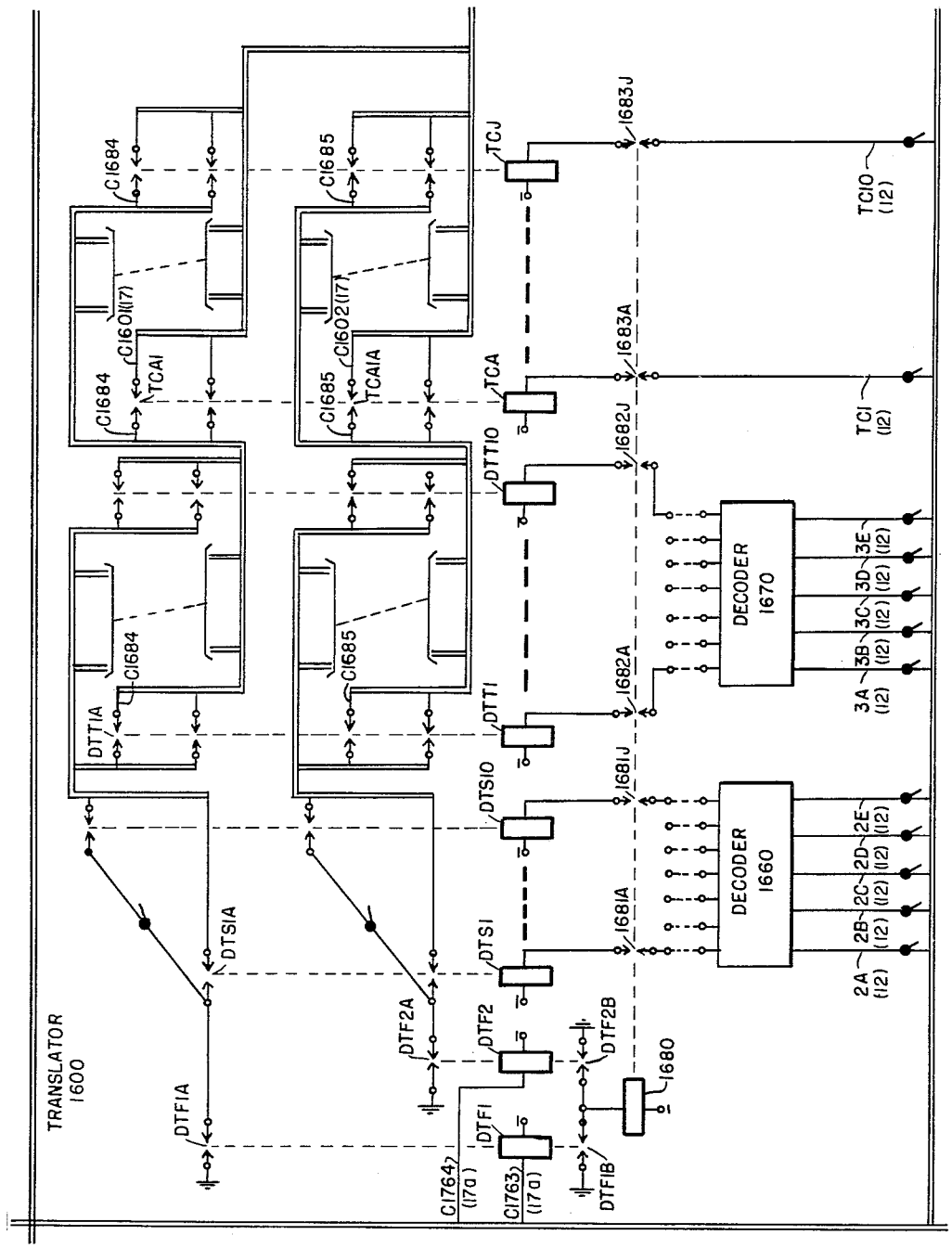
Figure 16A:
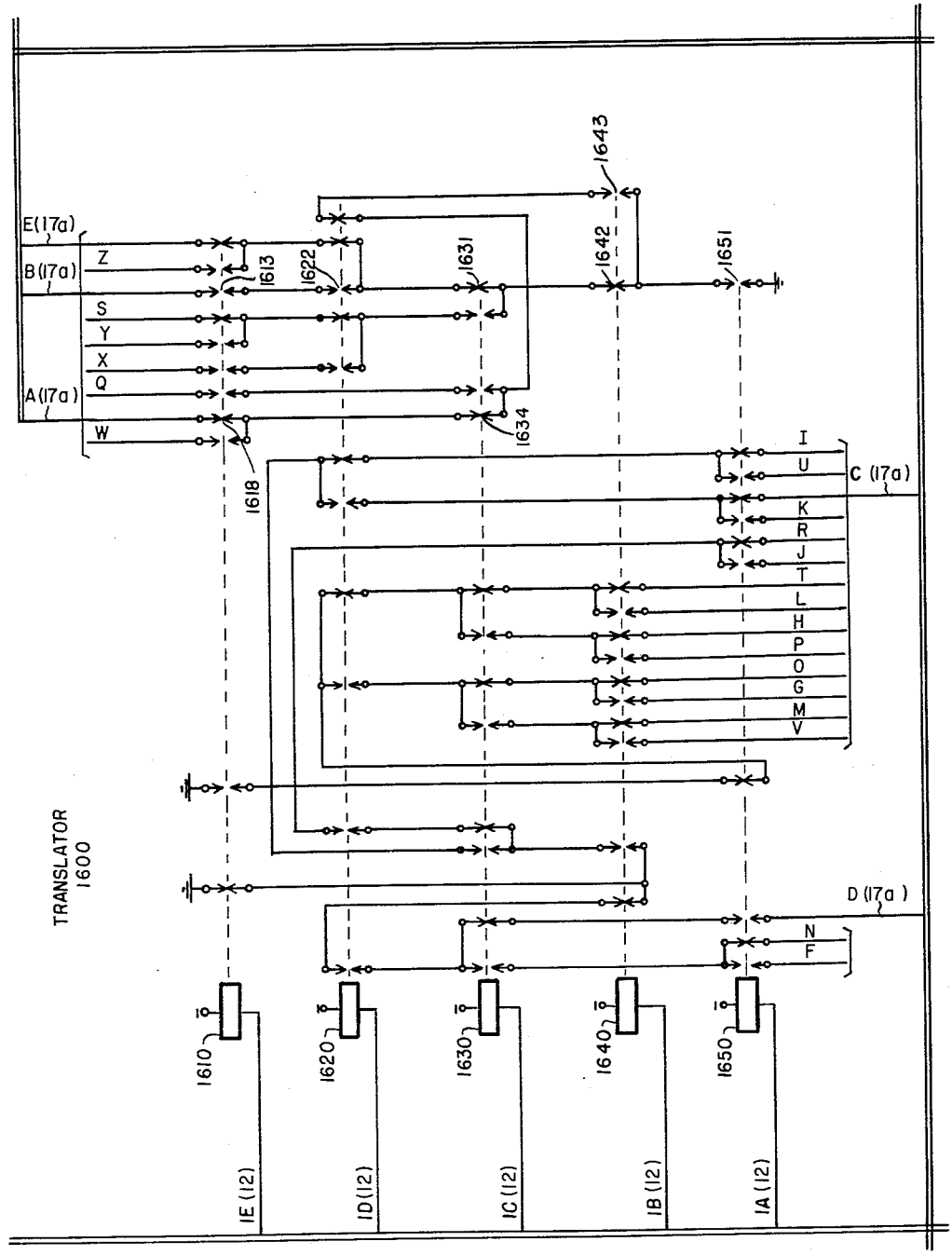
Figure 17:
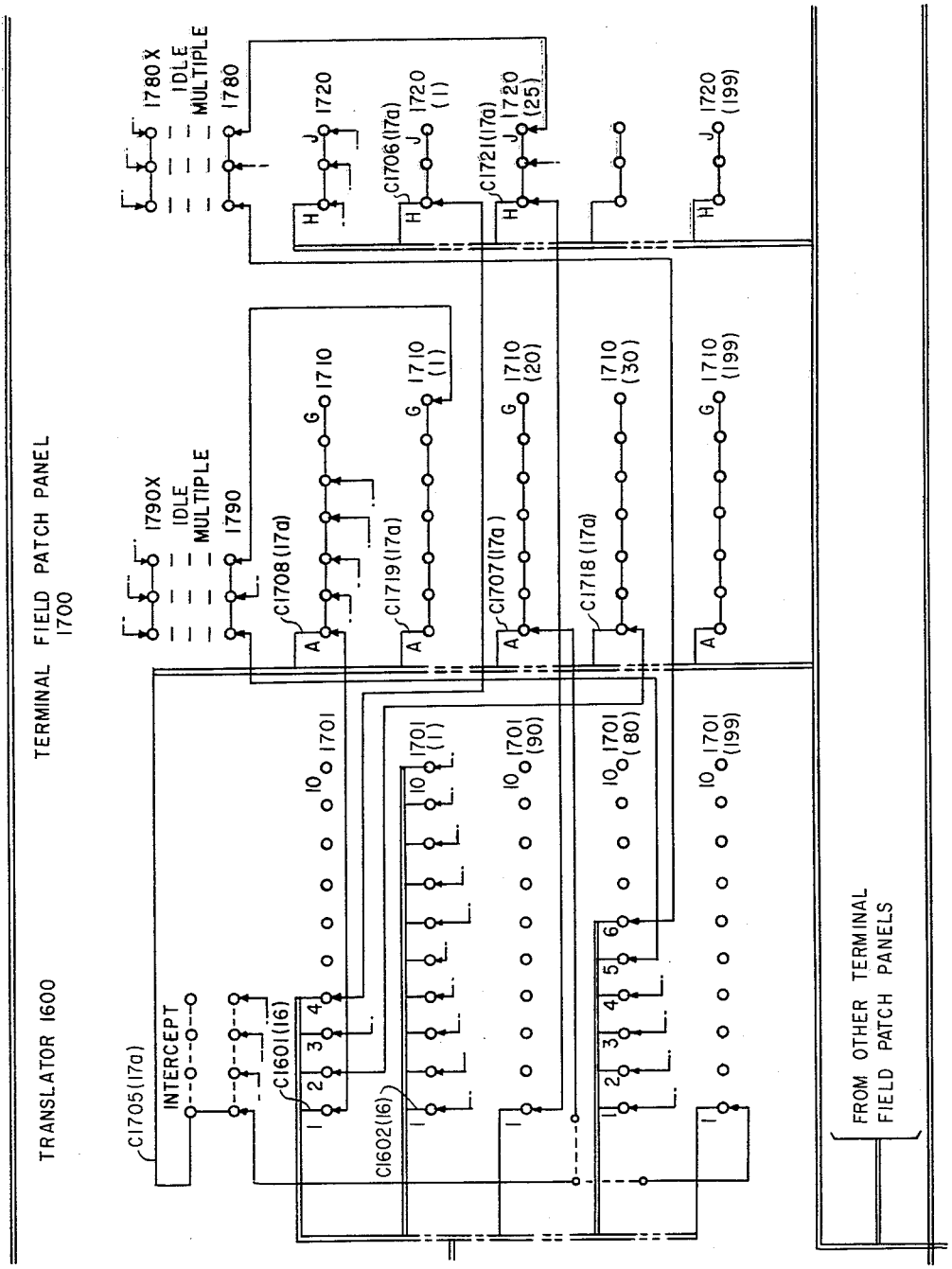
Figure 17A:
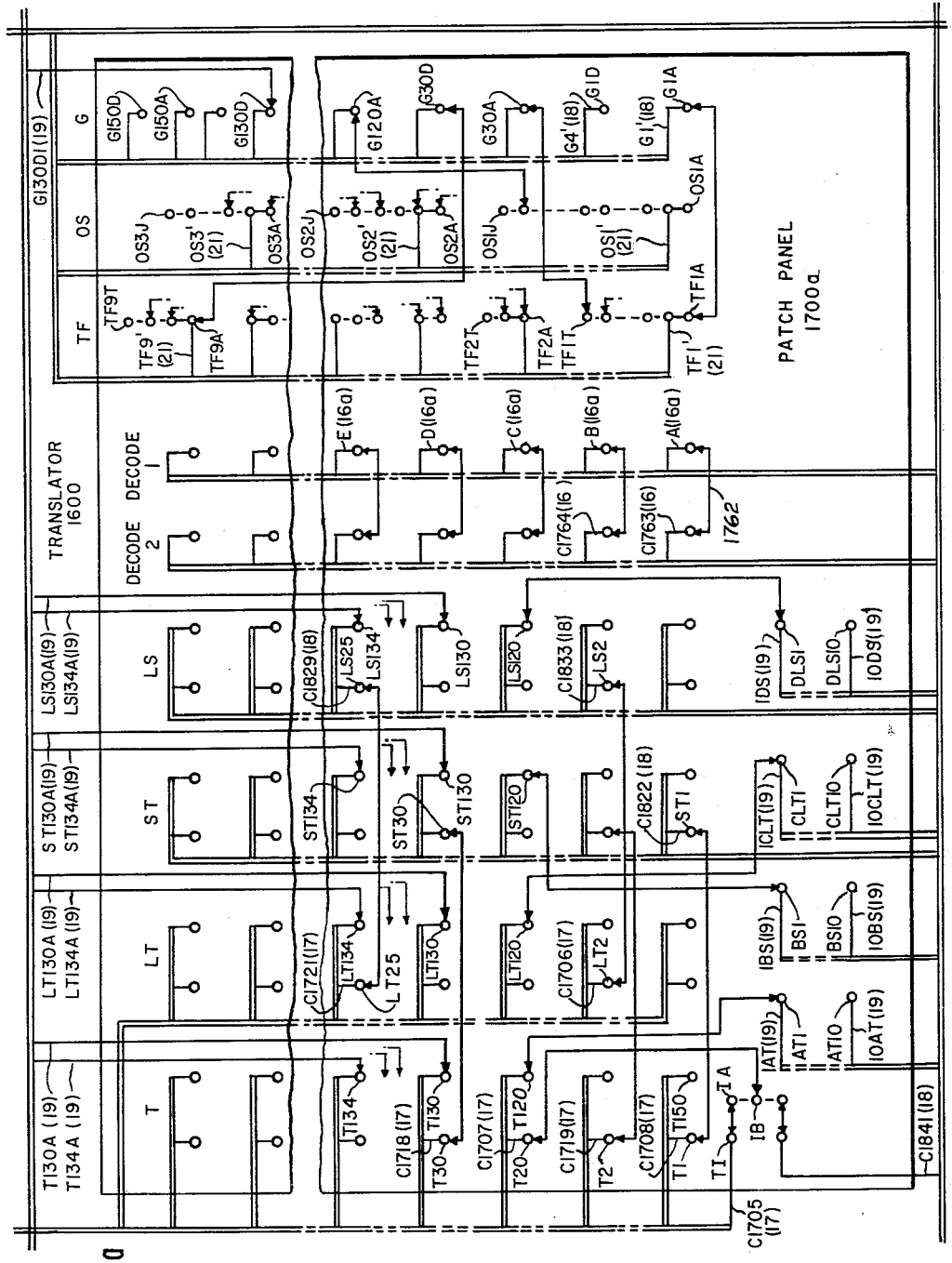
Figure 18:
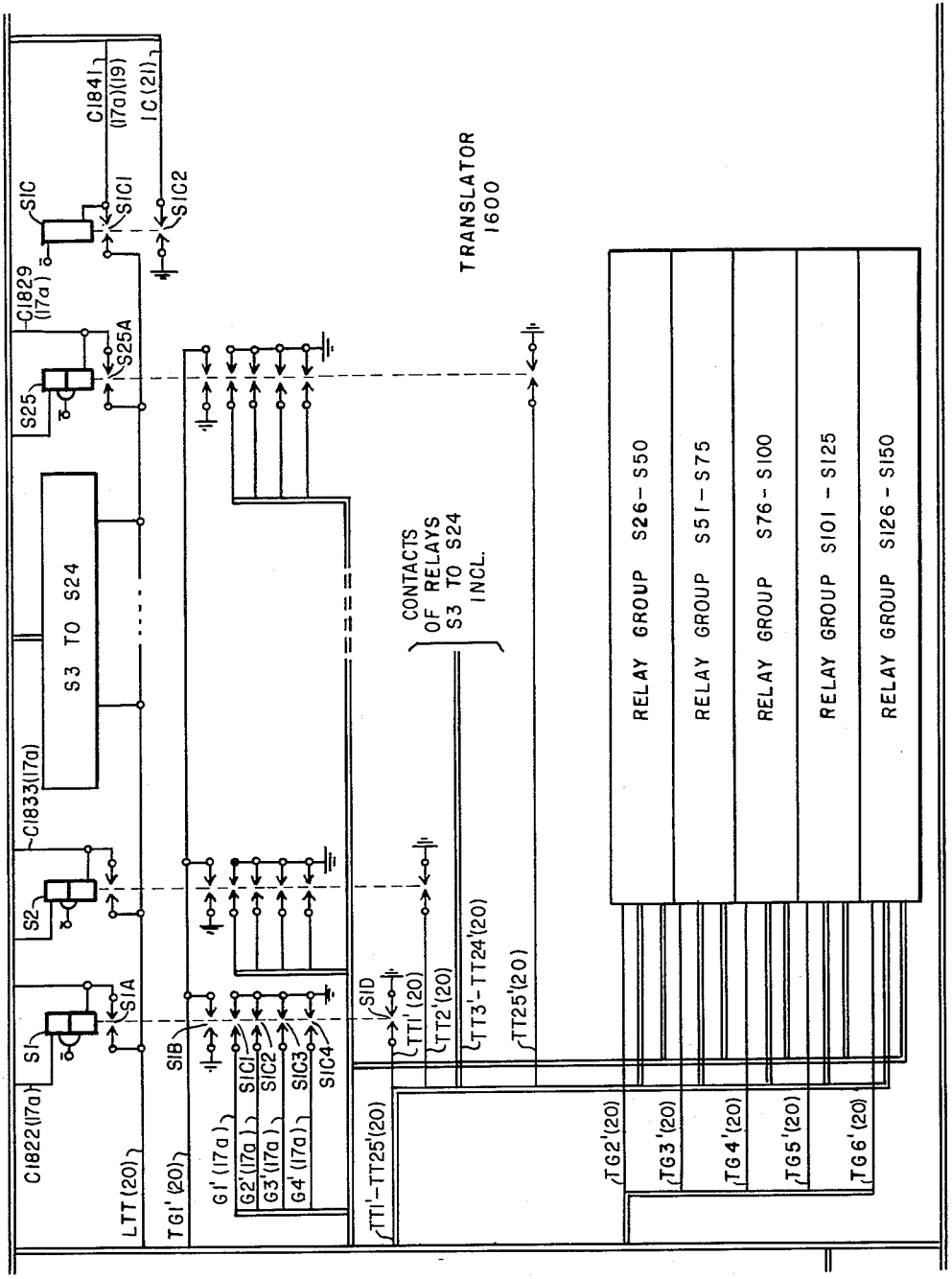

Switch MMTC (FIG. 12) extends ground from its wiper over contact N, contacts 1254A, lead TC1(16). Each of the leads TC1(16)–TC10(16) extends toward an individually corresponding one of the relays TCA–TCJ in each group of such relays in the translator. A group of relays such as TCA–TCJ is associated with each group of third character decode relays, one group of which is indicated by the box marked Decoder 1670. In this translator three groups of relays such as TCA–TCJ are provided, and each group is associated with one of the three groups of third character decode relays in the translator. The determination of which group, leads TC1(16)–TC10(16) are extended to, is made on decoding the first character of the DDI. This results in the operation of a relay such as 1680 associated with one of the three relay decode groups, as will be explained, to connect leads TC1–TC10 to the associated relay group TCA–TCJ.

The two groups of leads 2A(16)–2E(16) and 3A(16)–3E(16), which are grounded in accordance with the second and third character respectively of the DDI, extend to the three groups of second and third character decode relay groups respectively, one of each second and third character group being indicated by the blocks marked Decoder 1660 and Decoder 1670 respectively. The selection of which second and third character decode relay group is effective to extend detection chain grounds therefrom to relays such as DTS1–DTS10 and DTT1–DTT10 respectively and individual thereto, is likewise made on the basis of the first character decoding, which results in the operation of a relay such as 1680 individual to a second, and third character relay decoder. The decode relay groups such as 1660 and 1670, as explained for similar translator apparatus in the aforementioned application, each comprise a group of five relays, which in turn extend a respective detection chain ground corresponding to the character, which is decoded, by the operated relay or relays thereof. Likewise the operation thereof is analogous to the first character decode group of relays 1610–1650, which will be explained below.

Leads 1A(16a)–1E(16a), which are grounded in accordance with the first DDI character registered by relays R1A–R1E, extend to a first group of decode relays 1610–1650 respectively. Relays 1610–1650 are therefore operated in various combinations corresponding to which one or ones of leads 1A(16a)–1E(16a) have ground thereon. The operated relays in turn extend a detection chain ground corresponding to the first character, which is registered in relay group R1A–R1E. In this example the first character of the DDI to be decoded may be any one of the five characters A, B, C, D or E, although the decode relays can decode each of the 26 alphabet characters A–Z, if provided with detection chain circuits therefor.

A detection chain ground is therefore extended in accordance with the control exercised over relays 1610–1650 to one of the leads A(17a)–E(17a) depending on whether relays 1610–1650 are operated in accordance with an A, B, C, D or E character. These leads extend to individually corresponding terminals in the column labeled Decode 1 in Patch Panel 1700A.

The terminals in this column are individually connected over jumpers such as 1762 to individually corresponding terminals in column Decode 2 in the Patch Panel 1700A. As only the five characters A, B, C, D and E are used, only the corresponding leads A(17a)–E(17a) are jumpered to respective terminals in the column Decode 2. From the respective terminals in column Decode 2, leads individual thereto such as C1763(16) and C1764(16) extend to individually corresponding relays such as DTF1 or DTF2 respectively representing the characters A and B respectively and associated with one group of second and third character relay decode groups indicated by the boxes marked Decoder 1660 and 1670. In a similar fashion, leads C(17a), D(17a) and E(17a) are jumpered to respective leads via their respective terminals in column Decode 2 to relays (not shown) such as DTF1 and DTF2. The relays controlled by leads C(17a) and D(17a) likewise have associated therewith a corresponding second and third character decode relay groups (not shown), while lead E(17a) controls a relay such as DTF1 (not shown), which also has a second and third character decode relay group associated therewith. It will be noted that in the case of lead E(17a), only one relay corresponding to DTF1 is used with the associated second and third character decode relay group.

Assuming now that only relays 1640 and 1650 in the first character decode relay group 1610–1650 for the character A are operated as a result of ground on leads 1A(12) and 1B(12) 1A(12) under control of the first character route register relays R1A–R1E in the Route Register 1100. It extends a detection chain ground over contacts 1651, 1643, 1634 and 1618 to lead A(17a) jumpered from column Decode 1 in Patch Panel 1700A to a corresponding terminal in column Decode 2 and over lead C1763(16) to operate relay DTF1 corresponding to the character A. In the event relays 1610, 1620 and 1650 corresponding to the character B are operated, ground is extended over contacts 1651, 1642, 1631, 1622 and 1613 to lead B(17a) jumpered to lead C1764(16) to operate relay DTF2.

Relay DTF1, if operated, closes contacts DTF1A and DTF1B, while relay DTF2, if operated closes contacts DTF2A and DTF2B. Contacts DTF1B or DTF2B close to operate relay 1680, which in turn connects the detection chain circuits from the associated second and third character decode relay groups 1660 and 1670 respectively to relays DTS1–DTS10 and DTT1–DTT10 respectively at contacts 1681A–1681J and 1682A–1682J respectively. Likewise leads TC1(12)–TC10(12) respectively are each connected by relay 1680 to a respective one of relays TCA–TCJ associated with Decoder 1670 at contacts 1633A–1633J respectively.

It will be recalled that ground is applied to leads 2A(12)–2E(12) and 3A(12)–3E(12) in accordance with the respective second and third characters registered by relays R2A–R2E and R3A–R3F respectively, while lead TC1(12) has ground applied thereto to indicate this is a first translation. The relays in the second and third character Decoders 1660 and 1670 respectively are controlled by leads 2A(12)–2E(12) and 3A(12)–3E(12) respectively to extend respective detection chain ground corresponding to the character registered in relay groups R2A–R2E and R3A–R3E. Although each decoder 1660 and 1670 can provide a detection chain circuit for each of the 26 letters of the alphabet only ten are provided in this example for each decoder. With the relays DTS1–DTS10, DTT1–DTT10 connected to the respective detection chain leads of Decoder 1660 and 1670 respectively, one relay in each of group relays DTS1–DTS10 and DTT1–DTT10 respectively is operated by a respective detection chain ground extended thereto. Simultaneously relay TCA operates from ground on lead TC1(12).

A relay tree ground from contacts DTF1A or DTF2A respectively is therefore extended past the operated contacts such as DTS1A of the operated one of the relays DTS1–DTS10, past the operated contacts such as DTT1A of the operated one of the relays DTT1–DTT10 to a lead such as C1684 extending to one contact on each of the translator count relays TCA–TCJ. As this is a first translation, relay TCA is operated, as before explained. It extends the relay tree ground from a lead such as C1684 through its operated contacts TCA1 to lead C1601(17). In case contacts DTF2A were closed a relay tree ground is extended over a lead such as C1685 and contacts TC1A1 to lead C1602(17). Leads C1601(17) and C1602(17) each extends for example to the first terminal 1 in the respective groups of ten terminals in rows 1701 and 1701(1) respectively in the Terminal Field Patch Panel 1700.

The Terminal Field Patch Panel 1700A is individual to the decode relay groups represented by the boxes marked Decoder 1660 and Decoder 1670. Each of the rows 1701 and 1701(1) etc. of Terminal Field Patch Panel 1700 comprises ten terminals each representing a different station for each of ten possible translations of a registered DDI. The Patch Panel 1700 has a total of two hundred rows 1701–1701(199) to provide for each of the two hundred DDI's, which may be processed through Decoder 1670. Other decoders such as 1670 each have a Terminal Field Patch Panel such as 1700 to which their respective relay tree grounds are extended. For example in the event one of the relays corresponding to DTF1 or DTF2 associated with another third character decode relay group were operated as a result of characters C, D or E being decoded by relays 1610–1650, ground is extended through a relay tree of the type just described, through the contacts of an operated first translator count relay such as TCA to a first terminal in a terminal field patch panel such as 1700.

It will be recalled that each DDI may signify routing to from one to ten stations. Each row such as 1701 represents a different DDI, and each terminal therein represents a different station to which a message having that DDI is to be routed. If a particular DDI signifies routing to less than ten stations, the excess terminal in the row are unused. Each successive translation of a DDI results in a relay tree ground being routed to successive terminals such as 2 and 3 in for example row 1701 each representing a different station.

Each station in the system is represented by an individually corresponding row of multipled jacks A–G such as row 1710 and by an individually corresponding row such as 1720 of multipled last translation jacks H–J. Thus each terminal representing a particular station in the rows 1701–1701(199) is jumpered to one of the multipled jacks A–G in the corresponding station row such as 1710, unless the terminal representing the particular station corresponds to a last translation for a particular DDI. In this case it is jumpered to one of the multipled terminals H–J in a row of last translation jacks such as 1720 representing that station. Although accommodations are indicated in the terminal field patch panel 1700 for 200 stations, the patch panel actually need provide only 150 station multiples such as row 1710 and only 150 last translation station multiples such as 1720, as only 150 stations are provided in the system.

Continuing now, it will be recalled that the relay tree ground on conductor C1684 is extended over lead C1601(17) to terminal 1 representing the first station to which the message is addressed in row 1701. This terminal is jumpered to one of the multipled jacks A–G in the corresponding station row 1710 as shown. From row 1710, the relay tree ground is extended over conductor C1708(17a) to terminal T1 representing the particular station to which the message is addressed in column T of patch panel 1700A.

Patch panel 1700A is common to and serves all the terminal field patch panels such as 1700. As the translator need only provide translations for 150 stations, the corresponding translations from each of the various terminal field patch panels such as 1700 are multipled to the same terminal in patch panel 1700A. Thus a translation from another decode group and terminal field patch panel and corresponding to that just extended to terminal T1, is also extended thereto. Terminal T1 is jumpered to an individually corresponding station terminal ST1 in column ST. The relay tree ground is therefore extended from terminal T1 to ST1 and extended over a conductor such as C1822(18) to the upper winding of a corresponding station relay such as S1, individually corresponding to one of the stations to which the message is addressed.

Relay S1 operates to close contacts S1A for no purpose on other than a last translation. Contacts S1B close to extend a ground marking to lead TG1′(20), which corresponds to the group to which the station represented by relay S1 is assigned. It will be noted all the translation or station relays S1–S25 of the first group provide a ground marking to lead TG1′(20) to indicate association with group 1. Since 150 stations are provided in the system, 150 stations or translation relays are provided. To provide a code marking for each station, the relays are arranged in six groups of 25 so that on operation of each relay, a marking is provided indicative of the group and the position in the group. Thus, each of the translaton or station relays in groups as S26–S50, S51–S75, S76–S100, S101–S125 and S126–S150 on operation extend a ground marking to leads TG2′(20), TG3′(20), TG4′(20), TG5′(20) and TG6′(20) respectively to indicate that the corresponding station is assigned to group 2, 3, 4, 5 or 6 respectively. In addition, relay S1 closes contacts S1D to extend a ground marking over lead TT1′(20), which corresponds to the first terminal or station in each group. In a similar manner, each of the other relays S2–S25 on operation close corresponding contacts to ground a corresponding one of the leads TT2′(20)–TT25′(20) respectively, which each correspond to a different terminal or station in each group.

At contacts S1C1–S1C4 ground is extended over four leads G1′(17a)–G4′(17a) to four respective corresponding jacks G1A–G1D of which only two are shown in column G of patch panel 1700A. A similar group of four jacks G2A–G2D to G150A–G150D are respectively provided for each one of the station relays S2–S150.

In the event relay S1 corresponds to a local station, one of the jacks G1A–G1D is jumpered to a respective one of a multipled group of twenty jacks such as TF1A–TF1T in column TF so that a ground marking is extended over a lead such as TF1′(21) corresponding to the first terminal finder switch. The group of multipled jacks TF1A–TF1T corresponds to the first terminal finder switch and in this example is the particular terminal finder switch having access to the page printers associated with the station corresponding to relay S1. The first and other terminal finder switches, it will be understood, also have access to page printers associated with other stations. If additional station page printers need be provided for the station corresponding to relay S1, they are made accessible through additional terminal finder switches. In this case other ones of the jacks G1B (not shown)–G1D are jumpered to a respective terminal in whichever multipled groups of terminals TF2A–TF2T to TF9A–TF9T (shown in part) that correspond to the other respective terminal finder switches having access to the additional station page printers. Thereby as many as four terminal finder switches each having access to certain of the station page printers may be selected on a particular translation. If desired this arrangement may be expanded of course.

In a similar manner each of the station relays S2–S150 on operation extend ground to a respective group of four jacks G2A–G2D to G150A–G150D, of which at least one in each group, in the event the station is a local one, is jumpered to a respective terminal in the groups of terminals TF1A–TF1T to TF9A–TF9T to mark a corresponding one of the leads TF1′(21)–TF9′(21) each corresponding to a different terminal finder switch having access to the respective station page printers.

If the station corresponding to the operated S relay is a remote station, one of its corresponding jacks in the G column is jumpered to one of the three OS jack multiples comprising jacks OS1A–OS1J, OS2A–OS2J or OS3A–OS3J partially shown in column OS to extend ground over one of the leads OS1′(21), OS2′(21) or OS3′(21) to mark the lead individually corresponding to the speed at which the remote station receives messages. For example assume relay S120 corresponding to a remote station is operated on the translation and forwards ground to its corresponding four jacks G120A–G120D. The ground is then jumpered from jack G120A for example to one of the group of multipled jacks OS1A–OS1J for example to mark lead OS1′(21). This marking corresponds to the speed at which that station receives message transmission. In this case no jumper is provided to one of TF terminals and therefore no ground is forwarded to a TF′ lead as a terminal finder switch is not used in a test for a cross office unit.

It will be recalled that ground is extended on the operation of one of the station relays such as S1 over a lead such as TG1′(20), TT1′(20) and, in the case it corresponds to a local station, over a lead such as TF1′(21), or if in the case of a remote station over one of the leads such as OS1′(21). Thus assuming that ground has been extended over leads TG1′(20), TT1′(20) and TF1′(21), relays TG1, TT1, and TF1 respectively in the Terminal Register 2000 are operated. In addition relay 2010 operates in series with any operated TG relay from ground on any of the TG′ leads, while relay 2020 operates in series with any operated TT relay from ground on any of the TT′ leads. In addition ground may have been extended over one or more of the other TF′ leads such as TF9′(21) to operate another one of the TF relays such as TF9 in case more than one terminal finder switch has access to the station page printers. In the event the translation involves a remote station, ground is placed on one of the OS′ leads to operate a corresponding one of relays OS1, OS2 or OS3 instead of one or more of the TF relays. It will be noted at this time that bar relays 2050A and 2150B previously operated to close contacts 2051A, 2052A, 2151A, etc. extend the respective TG′, TT′, OS′ and TF′ leads to their respective register relays.

It will be recalled that each DDI in the message may signify routing to from 1 up to 10 stations. As will be expalined, after each translation the register transmits the same DDI to translator for translation, until the translator signals the register that it has made a last translation of a particular DDI. The register counts the number of translations for each DDI by advancing the translation count switch MMTC one position for each translation as will be explained. The switch MMTC in turn operates successive ones of the relays TCA–TCJ associated with the DDI decode relay group such as 1670 in the translator, and each in turn extends the relay tree ground from the Decoder such as 1670 to succeeding terminals of the row of terminals such as 1701 corresponding to the particular DDI in patch panel 1700.

In the event the particular DDI signifies a routing to only one station for example, or otherwise corresponds to a last translation, the particular station terminal such as 1 in for example row 1701(90) of Patch Panel 1700 is jumpered to a group of last translation multiple jacks H–J in row 1720(25) for example, representing a station to which the massage is addressed. From here the relay tree ground is extended over a conductor such as C1721(17a) to a corresponding last translation station jack such as LT25 representing the station to which the message is addressed in column LT, instead of the corresponding station terminal T jack in patch panel 1700A, such as on other than a last translation.

The relay tree ground is extended as explained above to the last translation station jack such as LT25 and from there is jumpered to an individually corresponding station LS jack such as LS25 in column LS of Panel 1700A. From here the ground is extended over a conductor such as C1829(18) extending for example to the lower winding of relay S25 to energize that relay. In addition to operating the corresponding TG, TT and TF or OS relay, it extends its operating ground for example over contacts S25A to lead LTT(20), past operated contacts 2053 to lead C893(8) to energize the upper winding of relay 720. The effect thereof will be described later in the specification.

If for example terminal 4 in row 1701 of patch panel 1700 corresponds to a last translation for the DDI represented by row 1701 it is jacked to a corresponding multipled group of last translation station terminals H–J such as shown in row 1720(1). These terminals are connected in multiple over a conductor such as C1706(17a) with corresponding terminals in other terminal field patch panels such as 1700 to a corresponding last translation station terminal such as LT2 in patch panel 1700A. Terminal LT2 is jumpered to a corresponding last translation station terminal such as LS2 in column LS and from there extended over conductor C1833(18) to energize the lower winding of the corresponding station relay such as S2. Relay S2 operates from the relay tree ground extended thereto, and in addition to operating the corresponding TG, TT and OS or TF relays in a manner already described extends its operating ground to lead LTT(20) for operating the upper winding of relay 720 to provide a last translation indication to the register.

When a particular station is addressed by more than seven translations other than the last translations, the corresponding group of multipled station jacks A–G in row 1710(1) for example, has one jack thereof connected to a corresponding idle multiple such as 1790, of the group of idle multiples 1790–1790X. The idle multiple in turn has the added translations jumpered thereto. Thus for example a translation resulting in ground being extended for example to terminal 5 in row 1701(80) is, if it represents more than the seventh time that the corresponding station is addressed, jacked to the idle multiple 1790 so that the ground is extended by means of the jumper to row 1710(1) to lead C1719(17a) and terminal T2 for operating the corresponding station relay in group S1–S150.

Likewise, if a particular station is addressed by more than the provided number of three last translations, the last translation terminal multiple H–J of the corresponding station has one terminal thereof connected to an idle multiple such as 1780 of the group of idle multiples 1780–1780X. This multiple in turn also has jumpered thereto the additional last translation terminals corresponding to that station in rows 1701–1701(199). Thus assuming ground is extended on a last translation to terminal 6 in row 1701(80), and that this terminal represents more than the third time this station is addressed by a last translation. This ground is jumpered to the corresponding station last translation idle multiple 1780 and from there extended to the corresponding station last translation multipled jacks H–J in row 1720(25) for example. From here it is extended to a corresponding last translation terminal LT25 of panel 1700A to operate the lower winding of the corresponding station relay in group S1–S150.

An intercept translation occurs under two circumstances. The first being when it is desired to intercept all messages intended for a particular station. In this case, any DDI resulting in a translation addressed to the particular station, as before explained, results in a relay three ground being forwarded to the station terminal in the row such as 1701(199) corresponding to the DDI. Instead of being jumpered to a jack in the corresponding group of multipled station jacks in for example row 1710(20) or in the event of a last translation to a jack in the corresponding group of multipled last translation station jacks in for example row 1720(20) (not shown), the relay tree ground is jumpered to one jack in the group of multipled intercept jacks shown in terminal patch panel 1700. From here the relay tree ground is extended over lead C1705(17a) to jack TI in patch panel 1700A. Jack TI is jumpered to one of the associated multipled jacks IA for example to extend ground over lead C1841(18) for operating relay SIC.

If desired, the relay tree ground may be extended in a described manner from the station terminal in row 1701(199) to the station multiple for example row 1710(20). The relay tree ground is therefore instead extended over a lead such as C1707(17a) to a corresponding one of the T terminals such as T20 in the patch panel 1700A. This jack is jumpered to one of the intercept jacks such as IB instead of a corresponding one of the jacks in column ST. The relay tree ground is therefore extended over lead C1841(18) to operate relay SIC. This avoids using the intercept multiple in terminal field patch panel 1700 and permits expanding the number of translations that can be routed to intercept.

The other case in which an intercept translation occurs, is in the event a high precedence message is to be transmitted to a remote station, which may be closed during evening hours or for other reasons. The T terminal corresponding to such a station in patch panel 1700A such as T120 is jumpered to a corresponding AT terminal such as AT1. The ST terminal such as S120 corresponding to the station is jumpered to a corresponding BS terminal such as BS1; the LT terminal such as LT120 corresponding to the station is jumpered to a corresponding CLT terminal such as CLT1 and the LS terminal such as LS120 corresponding to the station is jumpered to a corresponding DL terminal such as DLS1 in patch panel 1700A. Ten stations for example as indicated by jacks AT1–AT10, BS1–BS10, CLT1–CLT10 and DLS1–DLS10 are provided with this service.

It will be recalled that in the event one of the four higher precedence register relays 1460–1490 is operated, indicating the processing of a message of respective precedence, ground is extended from contacts such as 1461, 1471, 1481 or 1491 respectively over lead C1403(12), to contacts 1255. This ground is extended to lead NS(19), when the translator is associated with the register to operate relay NS. It closes contacts NS1B and NS1D–NS10B and NS10D, and opens contacts NS11A and NS11C–NS20A and NS20C. These contacts correspond to ten different stations, for example, over which relay NS has control to provide night intercept. If desired the arrangement may be expanded in an obvious manner by adding AT, BS, CLT and DLS jacks together with either additional contacts on relay NS or relays operated in multiple with relay NS.

A translation relay tree ground is extended, for example, to station terminal T120 in patch panel 1700A in a manner explained for terminal T1. Terminal T120 is jumpered to terminal AT1 so that the ground is extended over conductor 1AT(19), and with toggle switch 1919 unoperated the corresponding unoperated toggle switch contacts 1919A forward the ground over lead 1BS(17a) to terminal BS1 and from there to the corresponding station ST terminal such as ST120. From here the ground is forwarded to operate the corresponding one of the station relays S1–S150 in a manner described for relay S1. The corresponding terminal register TG, TT and TF or OS relays are operated thereby as explained.

In the event the translation was the last translation, the ground is extended from the corresponding station last translation multipled jacks H–J to a last translation jack such as LT120 corresponding to the station in patch panel 1700A. Jack LT120 is jumpered to jack CLT1 in terminal patch panel 1700A so that the ground is extended over conductor 1CLT(19), past the corresponding unoperated contacts 1919C of the toggle switch 1919, over lead 1DS(17a) to jack DLS1. This jack is jumpered as explained, to the terminal LS120 corresponding to the station so that the ground is forwarded over a conductor such as C1829(18) to operate the lower winding of the corresponding station relay S1–S150.

During night hours the operator operates switch 1919. Therefore on a translation corresponding to one of the stations receiving night intercept on a high precedence message, the ground is extended to, for example, jack AT1 and conductor 1AT(19), past the operated contacts 1919B of the toggle switch 1919 and contacts such as NS1B to lead C1841(18) to operate relay S1C. In the event of a last translation the ground is extended, as before explained, to lead 1CLT(19) but with switch 1919 operated the ground instead of being extended to lead 1DS(17a) is extended past contacts NS1D to lead C1841(18) to operate relay S1C.

In the event the message is not of sufficiently high precedence to have resulted in the operation of relay NS, ground extended as explained to either of leads 1AT(19) or 1CLT(19), for example, is extended past operated switch contacts 1919B or 1919D respectively to contacts NS1A or NS1C respectively, and to leads 1BS(17a) or 1DS(17a) respectively. From either of these two leads the ground is extended in a manner explained to operate the corresponding upper or lower winding respectively of the station relay S1–S150 corresponding to the translation. It in turn operates the corresponding terminal register relays as explained.

Relay S1C operates to close contacts S1C1 and extend its operating ground over lead LTT(20), past the operated contacts 2053 of bar relay 2050A in the Terminal Register 2000 to lead C893(8) for energizing the upper winding of relay 720. At contacts S1C2 ground is extended over lead IC(21) and the corresponding operated contacts of bar relay 2150B to energize relay IC1.

Relay IC1 closes contacts IC1a to complete a holding circuit for itself from ground on lead C802(8). At contacts IC1b it extends ground to lead C1304(13) to operate relay 1360. At contacts IC1c lead C891(8) is connected through contacts OS1d, OS2d and OS3d to lead C2101(7) and disconnected from lead C2102(8) at contacts IC1d. The message will now be routed to a cross office intercept unit under control of the register as will be explained.

It will be understood that on other than an intercept translation that a TG, TT and OS or TF relay is operated. Relay TG1 for example, operates in series with relay 2010, while relay TT1 operates in series with relay 2020 as before explained. Relay TG1 on operating closes contacts TG1a to complete a holding circuit for itself and relay 2010 from ground on lead C802(8) extended through contacts IC1a. Relay TT1 completes a holding circuit for itself and relay 2020 from the same ground on the closing of contacts TT1a. Relay TF1 closes contacts TF1a to complete a holding circuit for itself also from ground on conductor C802(8) extended through contacts IC1a. Operation of relays OS1, OS2 or OS3 in place of one of the TF relays, from ground on leads OS1'(21), OS2'(21) or OS3'(21) likewise results in the completion of a holding circuit for the operated one of these relays on the closing of contacts such as OS1a directly from ground on lead C802(8).

Relay TG1 closes contacts TG1b to connect lead C2001(24) common to the six TG relays to lead C2002(26) individual to relay TG1. At contacts TG1c it connects lead C2004(24) common to the six TG relays to lead C2003(26) individual to relay TG1. At contacts TG1e it disconnects ground from a lead individual to itself extending towards a set of make contacts on each of the twenty five terminal register TT relays. Instead it extends resistance battery thereto through contacts TG1d. At contacts TG1f it disconnects a marking ground from lead TA1(22), which extends along with other leads individually corresponding to the other TG relays to individually corresponding bank contacts of levels A and B of switch MMOGS.

Relay TT1 on operating closes contacts TT1b to extend lead C2006(24) common to the twenty-five terminal register TT relays to lead C2007(26) individual to relay TT1. At contacts TT1c it prepares a circuit for extending a marking ground from contacts 2217 to a lead individual to itself connected to an individually corresponding bank contact on switch MMTS. At contacts TT1d1 it extends the resistance battery forwarded from contacts TG1d to lead C2701a(27), while at contacts TT1e1 it removes ground from the lead. It will be noted that each TT relay controls two groups of six contacts such as TT1d1–TT1d6 and TT1e1–TT1e6 to permit a resistance battery marking from the operated one of the TG relays to be forwarded over a lead such as C2701a(27), which is individual to the station selected by the translator. Thus one lead among a total of 150 station leads each corresponding to a different one of the one-hundred and fifty stations is marked by the operated TG and TT relays.

Lead C2701a(27) for example extends through a terminal block to the first bank contact of level A of Terminal Finder Switch 2700. If the station has more than one page printer associated therewith, the lead C2701a is multipled from the terminal block to another contact on level A switch 2700. Each contact on level A of the switch corresponds to a different page printer with its associated Distribution Terminal Unit such as 2800, and all the contacts corresponding to the page printers associated with any one station are grouped in sequence on the switch. A total of nine switches such as 2700 are provided to serve the 450 page printers grouped in a number of stations, while one switch 2700J is provided to serve the cross office intercept units. Each switch such as 2700 is a fifty point switch whereby it has access to fifty page printers assigned in succession as desired to various stations. If all the contacts of the switch are assigned, at a time when it is desired to add a page printer to a station, the corresponding station lead such as C2701a1(20) for example is multipled from the terminal block to a contact on another terminal finder switch such as shown on level A of switch 2700I. This permits several terminal finder switches, which are selected by the ground extended from terminals such as G1A–G1D in the translator to the corresponding TF' leads, to be used to select an idle page printer associated with a station to which the message is to be routed.

As before explained, if the translation indicates routing to a local station, relay TF1, for example, is operated. It closes contacts TF1b to extend ground past contacts 2021 and contacts 2011 closed by relays 2020 and 2010 respectively to lead C1304(13) to energize relay 1360. If one of the OS relays such as OS1 is operated instead of a TF relay thereby indicating a routing to a remote station, ground from contacts such as OS1b is extended past contacts 2021 and 2011 to lead C1304(13) to operate relay 1360. At contacts TF1c relay TF1 extends ground to lead C2103(25) to energize relay 2570, and at contacts TF1d removes ground from a lead individually corresponding to relay TF1, and extends resistance battery thereto at contacts T1e to mark a contact individually corresponding thereto on level A of switch MMTFA. As the relay TF1 corresponds to terminal finder switch 2700, this is equivalent to marking switch MMTFA accordingly.

*Translator disconnect*

Relay 1360 on operating closes contacts 1368' to extend the ground on lead C801(8) to its own winding for the purposes of holding itself operated. At contacts 1369' it opens the circuit to relay 1250 so that relay 1250 restores, and disconnects the leads 1A(16a)–3E(16), TC1(16)–TC10(16) and NS(19) from the Route Register 1100. At contacts 1362 relay 1360 maintains ground on lead C1201(8). This maintains relay 860 operated and holds a point in the circuit to the reader clutch magnet open. At contacts 1363 the holding ground for relay 1340 is disconnected, however, the relay remains operated over its original operating circuit. Likewise at contacts 1365 a point in a possible holding circuit for relay 1340 is opened. At contacts 1364 ground is removed from lead C1303(20) to restore relays 2050A and 2150B. They disconnect the Terminal Register relays from the translator, however the operated relays thereof are held over their described holding circuits. At contacts 1367 ground is extended to lead C1301(19), while at contacts 1366 the lower winding and battery of relay 1350 are disconnected therefrom. Relay 1350 is therefore disconnected from lead C1301(19), but remains operated over contacts 1352 and 1342. Ground on lead C1301(19) restores relay 1910 to permit the translator to initiate search for a demanding register in a manner already explained, as soon as, or if relay 1920 is operated to close contacts 1921. Contacts 1368 open to restore the motor magnet of switch MMTC.

The switch takes its first step to contact 1. Off-normal springs 1296 close to complete a circuit from contacts 1311, as relay 1310 is normally still operated, to energize relay 1330. Off-normal springs 1297 close to prepare a homing circuit for switch MMTC. The switch MMTC can now forward a pulsing corresponding to a second translation of the DDI to the translator, when the register is again associated with the translator.

At contacts 1369 ground is extended by relay 1360 from contacts 1313, as relay 1310 is normally still operated, to lead C1306(24) to energize relay 2410. Contacts 1367' are opened by relay 1360 to open the circuit to relay 1320, normally, before the slow-to-operate relay 1320 can operate. If already operated and relay 1310 restored, its holding circuit is effective over contacts 1322 and 1314 to prevent its release. Lamp 1326 is lighted over contacts 1312 and 1321 to indicate a trouble condition.

Relay 1330 locks operated over contacts 1333 and 1244. At contacts 1331 it opens the original energizing circuit for relay 1340, which restores, and at contacts 1332 prepares a circuit for relay 1340. Relay 1340 restores relay 1350 at contacts 1342.

*Distribution terminal selection*

Relay 2410 closes contacts 2411 and extends ground past contacts 2421, 2433, 2443, lead C2409(7), which in turn is extended past the contacts of an alarm relay (not shown) in the Supervisory Unit 700, to lead C2101(21), contacts OS3d, OS2d, OS1d and IC1d to lead C2102(8), contacts 813 to lead C808(23) and contacts 2322 to energize relay 2310.

Relay 2310 closes contacts 2311 so that it is now connected through the lower winding of relay 2320 and contacts 2331, and 2351 to ground on lead C801(8). Relay 2320 does not operate, however, as it is shunted by the ground on lead C808(8). At contacts 2315 lead C2302(15)(22) is connected to lead C2301(7)(22) for a purpose to be explained. At contacts 2314 ground is extended past contacts 2324 to operate relay 2560.

Relay 2560 closes contacts 2562 to extend ground through the winding of relay 2550 to lead C2502(22) and from the winding of relay 2550 past contacts 2551, 2561 and 2571 to lead C2501(22). It will be recalled that relay 2570 was operated from ground at contacts TF1c forwarded over lead C2103(25), whereby it closed contacts 2571. Lead C2502(22) extends to the wiper of level A of switch MMTFA. The wiper is connected over one of its contacts to a lead individually corresponding to one of the terminal finder relays TF1–TF9 to ground at contacts such as TF9d for example. Lead C2501(22) extends to the self-interrupting contacts of motor magnet of switch MMTFA. The motor magnet is therefore energized from the ground at contacts such as TF9d extended over lead C2502(25).

The motor magnet of switch MMTFA on energization opens its self-interrupting contacts to deenergize itself, and steps its wipers in a self-interrupted manner over its contacts. When on its normal contact ground is connected thereto over the wiper of level A and lead C2502(25) to energize the motor magnet and it steps interruptedly to its first contact. When the wiper of level A is connected over the lead controlled by relay TF1 corresponding to Terminal Finder Switch 2700 having access to a Distribution Terminal Unit such as 2800 assigned to the desired station, resistance battery from contacts TF1e is connected to the wiper of level A of switch MMTFA. The resistance battery is extended over lead C2502(25) to lead C2501(22) to shunt the motor magnet of switch MMTFA and prevent its further operation at this time. The resistance battery on lead C2502(25) is also extended through the winding of relay 2550 to ground at contacts 2562 so that relay 2550 now operates.

It opens contacts 2551 to disconnect lead C2501(22) from lead C2502(22). At contacts 2552 it connects ground over contacts 2564, through the winding of relay 2540, contacts 2542 to contacts 2546 and through contacts 2554 and 2475 to lead C2401(22). At contacts 2553 the ground from contacts 2542 is also extended over lead C2503(22). At contacts 2555 ground is extended to lead C2504(22), and at contacts 2556 a circuit is prepared for extending ground over lead C2505(22).

The ground on lead C2401(22) is extended past the wiper of level B of switch MMTFA, the contact upon which the wiper is standing, which corresponds to the operated TF1 relay and therefore to the terminal finder switch 2700 having access to the desired Distribution Terminal Unit such as 2800, lead C2201a(27) corresponding to switch 2700, and the self-interrupting contacts and motor magnet of the switch 2700. The motor magnet energizes to open its self-interrupting contacts and the terminal finder switch 2700 takes its first step. When the wiper of level A of switch 2700 encounters resistance battery forwarded from lead C2701a(20) as explained, the resistance battery is extended over lead C2202(22) to the wiper of level C of switch MMTFA and lead C2503(25) to contacts 2553, 2542 and ground through the winding of relay 2540 at contacts 2564 and 2552. Relay 2540 energizes. The resistance battery is also extended over contacts 2546 and 2554 to leads C2401(22) and C2201a(27) to shunt the motor magnet of switch MMTFA and terminates its further stepping. Switch 2700 is now associated with the contacts over which it has access to the page printers associated with the station to which the message is to be routed, through respective Distribution Terminal Units such as 2800.

In the meantime ground on lead C2504(22) is extended past the wiper of level E of switch MMTFA connected to the bank contact corresponding to the selected terminal finder switch 2700, and over lead C2297(27) to operate relay 2790 associated with Terminal Finder Switch 2700. It connects the wipers of levels B, C, D and E to leads C795(7), C2799(25), C2798(25) and C2797(25) respectively at contacts 2791, 2792, 2793 and 2794 respectively.

Relay 2540 on operating as before mentioned, closes contacts 2541 to prepare a locking circuit for relay 2470. It opens its own operating circuit at contacts 2542 and closes another circuit for itself over contacts 2543, 2564 and 2552. At contacts 2544 it extends the winding of relay 2520 to lead C2503(22), and at contacts 2546 opens a point in the circuit to motor magnet of switch 2700. At contacts 2548, 2549 and 2547' leads C2798(27), C2797(27) and C2799(27) respectively are extended to contacts 2477, 2478 and 2479 respectively. At contacts 2547 relay 2540 prepares a circuit for the motor magnet of switch 2700 via lead C2201a(22), level B of switch MMTFA and lead C2491(24) extended through contacts 2522. From contacts 2522 the motor magnet is connected through contacts 2512 to ground through the lower winding of relay 2510 and also through contacts 2531 and 2545 to lead C799(7). Lead C799(7) extends through contacts 737 and the contacts of an alarm relay (not shown) to lead C795(27), which in turn is connected over contacts 2791 to the wiper of level B. The switch wipers as previously described have been stepped to the terminal corresponding to a Distribution Terminal Unit such as 2800 associated with the desired station. Lead C795(7) is therefore connected to one of the distribution terminal test leads such as C2701b(29) extending to the desired Distribution Terminal Unit 2800. If more than one distribution terminal unit and associated page printer are provided at the station, the additional units are each connected over leads such as C2701b to successive contacts of switch 2700. If the unit is idle, lead C2701b(27) is extended through contacts 2942 to battery through relay 2920. With battery through relay 2920 connected to lead C799(7), and therefore over lead C2401(22) to lead C2201a(27), the motor magnet of switch 2700 is shunted, while the lower winding of relay 2510 energizes.

It opens contacts 2512 to disconnect lead C799(7) from lead C2401(22) and the motor magnet of switch 2700, and connects lead C799(7) through its upper winding at contacts 2511 to ground through relay 2480. Both relay 2480 and relay 2920 operate in this circuit. Relay 2920 closes contacts 2921 so that lead C2701b(27), over which it is operated, is extended therethrough to contacts 2942.

Relay 2480 closes contacts 2481 to operate relay 2470, which locks operated over contacts 2472 and 2541 to ground on lead C803(8). At contacts 2479' ground is extended past contacts 2548' to operate 2580, which locks operated over contacts 2586 and 2532. Leads C2798(27), C2797(27) and C2799(27) are now connected through contacts 2477, 2478 and 2479 respectively to leads C1449(14), C2405(10) and C2406(8) respectively. At contacts 2478' ground is connected to lead C2407(10) to operate 1020. At contacts 2474 ground is now extended from contacts 2312 to lead C1505(15) to operate relay 1595, and at contacts 2471 a point is opened in a circuit for extending ground past contacts 2582 to step switch 2700.

Relay 2580 on operating places ground at contacts 2584 on already grounded lead C802(21), and at contacts 2585 extends ground over lead C892(8). At contacts 2583 it provides another operating ground for relay 2540, and at contacts 2581 it provides an alternate ground for relay 2550.

If the Distribution Terminal Unit 2800 is arranged to be accessible to a cross office unit such as 3300, it is provided with a Distribution Terminal Converter Unit such as 4300 through which the cross office unit seizes the Terminal Unit 2800, as will be explained. In this case switch 2700 instead of testing for a busy condition over lead C2701b(29), instead utilizes lead C4303(43) extending to the Terminal Converter Unit 4300 associated with Unit 2800. Lead C4304(43) extends over contacts 4352, 4411, 4322, lead C4301(29) and contacts 2942 to relay 2920. When relay 2920 is operated from ground through relay 2480, relay 4340, which is connected to lead C4304(27) over contacts 4411, 4352 and 4322, is operated. It closes contacts 4343, 4344 and 4346 to prepare for a cancellation procedure in the event a cross office unit having a high precedence message desires to transmit to the unit. At contacts 4342 it opens a circuit to relay 4410 to prevent a cross office unit from attempting to seize this circuit.

*Distribution terminal unit set up*

Relay 1020 operates as previously mentioned. It opens contacts 1021 and 1024 to open respective stepping circuits for switches MMIGS and MMITS respectively. At contacts 1022 it completes a circuit to relay 1040 from ground at contacts 1023 extended over previously operated contacts 1053 and the self-interrupting springs of the motor magnet of switch MMIGS. At contacts 1025 a circuit is prepared to relay 1030.

Relay 1040 at contacts 1041 connects the motor magnet of switch MMIGS to the wiper of level A, which is connected over its normal contact to ground over contacts 1053 and 1023. The motor magnet of switch MMIGS is therefore energized. At contacts 1042 the same ground is connected to lead C2405(24), which as has already been pointed out extends through contacts 2478, 2549 and lead C2797(27), past contacts 2794 to the wiper of level E of switch 2700. As the wipers of this switch are each associated with the contact corresponding to the selected distribution terminal unit 2800, the wiper of level E is connected over lead C2701e(28), through contacts 2811 to the motor magnet of switch MMIG1 in unit 2800. It therefore also energizes. It will be noted that with switch MMIG1 in its normal position, its off-normal springs 2875 are closed to hold slow-to-release relay 2810 operated.

When the motor magnet of switch MMIGS energizes, it opens its interrupting contacts to open the circuit to relay 1040, which restores. Relay 1040 restores to open contacts 1041 and 1042 thereby respectively deenergizing the motor magnet of switch MMIGS and the motor magnet of switch MMIG1 in the Distribution Terminal Unit 2800.

Switches MMIGS and MMIG1 therefore each take one step. The interrupting contacts on switch MMIGS close to again complete the circuit for energizing relay 1040, while an additional circuit therefor is completed from ground at off-normal springs 1009. The original circuit for switches MMIGS and MMIG1 is open, when the switch MMIGS level A wiper steps to contact 1. The operating circuit for relay 1050 is also opened, when switch MMIGS level B wiper steps from its normal contact. Ground is strapped to the first terminal of levels A and B on switch MMIGS to provide an operating ground for the motor magnet for the switches MMIGS and MMIG1 and for slow-to-release relay 1050 respectively, if the incoming lines to which this register has access is also accessible to the second of the two incoming selector switches such as 5200X associated with the Distribution Terminal Unit 2800. If the group of lines, which the register serves is accessible to the first of the two incoming selector switches, the first contact on levels A and B of switch MMIGS is not strapped to ground. In this case relay 1050 restores, after the level B wiper is stepped from its normal position, while the motor magnets of switches MMIGS and MMIG1 fail to energize. In the first case the motor magnets of switch MMIGS and MMIG1 energize and relay 1040 receives another energizing spurt as explained. The motor magnet of switch MMIGS opens the circuit to relay 1040, which in turn opens the circuit to the motor magnets of switches MMIGS and MMIG1 as explained. They both step to their respective second contacts. As no ground strap is provided on the second contact, relay 1050 restores and the motor magnets of switches MMIGS and MMIG1 fail to energize. Relay 1040 reoperates, as described above.

When relay 1050 restores, it opens contacts 1053 to remove ground from the normal contact of level A of switch MMIGS. This also removes the original operating ground for relay 1040, however, relay 1040 remains operated from ground at the off-normal springs 1009 forwarded through the self-interrupting springs of the motor magnet of switch MMIGS. At contacts 1054, relay 1050 now operates relay 1030, over contacts 1023, 1054, the self-interrupting springs of switch MMITS and contacts 1025.

In the Distribution Terminal Unit 2800 energizing the motor magnet of switch MMIG1 causes it to close springs 2876 to close a circuit to relay 2810. When the motor magnet restores and switch MMIG1 takes its first step, the circuit to relay 2810 is opened at contacts 2876 and also at off-normal springs 2875. Switch MMIG1 is then on its first contact. If the motor magnet does not then reenergize, due to the failure of switch MMIGS to extend ground to lead C2701e(27), relay 2810 restores. If switch MMIG1 does reenergize, due to switch MMIGS again extending ground to lead C2701e(28), contacts 2876 close, before relay 2810 restores, to hold it operated. The motor magnet again deenergizes as explained and steps the wiper to the second contact. As it now remains deenergized, relay 2810 eventually restores.

When relay 2810 restores, it closes contacts 2812 to extend lead C2701e(27) to the wiper of switch MMIG1, which in turn is now connected to a selector switch indicated by the box 5200X having access to a group of 50 incoming line circuits with which line circuit 300 is associated. At contacts 2877 the motor magnet of switch MMIG1 prepares a homing circuit for itself, which is incomplete as contacts 2925 are open.

In summary it will be noted that switch MMIG1 is stepped to either its first or second contact in synchronism with switch MMIGS to select one of the two fifty point incoming selector switches such as 5200X over which it has access to the incoming line circuits such as 300. The selector switch having access to the incoming line circuit is of the type described in the aforementioned application. As described therein a lead such as lead C2701e(27) is extended on release of a relay similar to 2810 to permit the selector switch to be stepped under control of the register. Thus in the present case contacts 2812 close on release of relay 2810 to extend lead C2701e to the motor magnet of switch 5200X.

With the release of relay 1050 in the Finder Unit 900, a circuit is completed as already mentioned, from contacts 1023 through contact 1054 and the self-interrupting contacts of switch MMITS through contacts 1025 to relay 1030. Switch MMITS has two levels each corresponding to a different group of 25 line circuits among the 50 line circuits to which switch 5200X has access. Whichever group to which the register has access, has the corresponding MMITS wiper A or B strapped to relay 1060. This causes relay 1060 to be operated, when switch MMITS on being stepped over its contacts encounters the ground marking provided from level J of switch MMIF, which is positioned to the incoming line circuit in a manner previously explained.

Thus with relay 1030 operated, contacts 1032 close to extend ground from contacts 1061 for energizing the motor magnet of switch MMITS. This ground is also extended over contacts 1031 and 1052 to lead C2405(24) extending to lead C2701e(28) in a manner already explained, so that this ground is now extended over the wiper of switch MMIG1 to the motor magnet of the selected incoming selector switch 5200X. Both the motor magnet of switch MMIGS and switch 5200X are therefore energized. When the motor magnet of switch MMITS opens its interrupting contacts, relay 1030 is deenergized. It deenergizes the motor magnets of switch MMITS and switch 5200X respectively at contacts 1031 and 1032 respectively, and both switch MMITS and the incoming selector switch each take one step.

The motor magnet of switch MMITS on deenergization closes its interrupting contacts to again complete a circuit to relay 1030. Relay 1030 again completes the respective circuits to the motor magnets of switch MMITS and the incoming selector switch 5200X so that both energize again. Switch MMITS, of course, opening its interrupting contacts to deenergize relay 1030, and the stepping procedure is again repeated. In this manner switch MMITS steps, until the wiper of either level A or level B, depending on which of the two groups of 25 incoming line circuits to which switch 5200X has access are served by the register, reaches the contact marked with ground by level J of switch MMIF so that relay 1060 is energized. The wipers of switch 5200X are now connected to the line circuit 300 with which the register is associated.

Relay 1060 opens contacts 1061 to prevent further energization of the motor magnet of switch MMITS and the motor magnet of the incoming selector switch 5200X. In the meantime, when switch MMITS takes its first step, the off-normal springs 1008 close. Springs 1008 provide a circuit for relay 1030 over the MMITS interrupting springs and contacts 1025 so that the relay is operated, after relay 1060 operates to open contacts 1061. At contacts 1062 relay 1060 extends ground over lead C2303(15) to contacts 1591.

It will be recalled that relay 1595 was operated by ground on lead C1505(24) on operation of relay 2470. It closes contacts 1599 to extend ground past contacts such as 1444 of each unoperated one of the precedence register relays 1440–1490. This ground is also extended past contacts 1411 to the normal contact and wiper of switch MMPS level A. Contacts 1598 close to extend ground past the self-interrupting contacts of switch MMPS and contacts 1597 to energize relay 1580. Contacts 1596, which open on operation of relay 1595, prevent this ground from being forwarded to the motor magnet of switch MMPS. Relay 1580 on operating closes contacts 1582 so that the switch MMPS motor magnet is energized from the ground on the level A wiper of switch MMPS. It also closes contacts 1581 to extend the ground from the level A wiper to lead C1449(24). This lead is connected via lead C2798(27), the level D wiper of switch 2700, lead C2701d(29) to the motor magnet of switch MMPR2 in the Distributional Terminal Unit 2800. The ground is therefore forwarded to energize the motor magnet of switch MMPR2.

The motor magnet of switch MMPS on energizing opens its interrupting contacts to open the circuit to relay 1580, which restores, to open the circuit to the motor magnet of switch MMPS and the motor switch of MMPR2 at contacts 1582 and 1581 respectively. Both switches take one step, while the off-normal springs 1584 of switch MMPS close to provide an alternate ground for relay 1580. When the switch takes its first step, the level B wiper steps from its normal contact and the original circuit to slow-to-release relay 1590 is opened. The wipers of both levels A and B of switch MMPS are connected to their first contact, which in turn is connected to contacts 1444 controlled by precedence relay 1440. If that relay is unoperated, ground from contacts 1599 is extended past contacts 1444 to the respective wipers of both levels A and B to reoperate the motor magnets of switches MMPS and MMPR2 and to maintain slow-to-release relay 1590 operated respectively. Relay 1580 is deenergized, as before, to deenergize the motor magnets of switches MMPS and MMPR2 so that both take another step. This procedure is repeated until the wipers of switch MMPS are associated with the open contacts such as 1475 for example of an operated precedence register relay.

Relay 1580 reoperates as before, but as ground is not forwarded to the motor magnets or to relay 1590, the motor magnets remain deenergized and relay 1590 restores. At that time, contacts 1591 close to extend lead C2303(10) to lead C2302(23). Switch MMPS in the Precedence Register 1400 and the switch MMPR2 in the Distribution Terminal Unit 2800 are then positioned in accordance with the precedence registration.

If relay 1060 has already operated indicating that the incoming selector switch has been stepped to the incoming line, ground is placed on lead C2303(15) at contacts 1062. In any event, as soon as relay 1060 is operated ground is placed on lead C2303(15). This ground is extended past contacts 1591 to lead C2302(23) on restoration of relay 1590. Ground on lead C2302(23) is extended past contacts 2315 to lead C2301(7) to operate relay 740. Relay 740 closes contacts 741 to connect the lower winding of relay 730 to lead C2406(24), and at contacts 742 energizes relay 830. Relay 830 closes contacts 833 to complete its own holding circuit to ground at contacts 1317, and at contacts 832 connects relay 840 through contacts 822 to lead C891(23).

Battery from the lower winding of relay 730 is now connected over lead C2406(24) to lead C2799(27), the wiper of level C of switch 2700, lead C2701c(28) to ground through relay 2820.

Only relay 2820 operates in this circuit to close contacts 2821 for energizing relay 2830. At contacts 2825 resistance battery is connected through a rectifier bridge and an alarm relay (not shown), but indicated by dotted lines, and through contacts 2844 to resistance ground. The alarm relay is of a type described in the previously mentioned application as being included in the signal transmission path, whereby in the event of signal trouble, it functions to operate to provide an alarm.

With the Terminal Unit 2800 idle, —60 volt resistance battery is normally forwarded through the page printer indicated by box 2901 through contacts 2826, the above-mentioned bridge alarm relay to resistance ground at contacts 2844 to hold the alarm relay operated. If the alarm relay should release, it closes contacts to provide an operating circuit as indicated by dotted lines, for relay 2920, and opens the busy test lead C2701b(27).

Relay 2830 closes contacts 2831 to connect the wiper of level A of switch 5200X to relay 2840. At contacts 2832 relay 2830 connects ground to relay 2920 for holding it operated. This ground is also extended over contacts 2942, past contacts 2921 to lead C2701b(27) for shunting down relays 2510 and 2480 in the register. Relay 2480 opens the original operating circuit for relay 2470 at contacts 2481, but relay 2470 remains operated over its holding circuit. If the busy test was performed through a Terminal Converter Unit such as 4300, ground is extended to lead C4301(43) to hold relay 4340 operated, and it is also extended past contacts 4411, 4352 and 4325 to lead C4304(27) to shunt down relays 2480 and 2510. At contacts 2833 relay 2830 completes its own holding circuit over contacts 2943 and 2923. At contacts 2834 the wiper of level B switch 5200X is connected through contacts 2823 to the winding of relay 2850. At contacts 2836 a point is prepared in a circuit to relay 2940 which is incomplete because contacts 2827 are open. At contacts 2837 and 2838 respectively, —120 volt resistance battery and ground respectively are connected to the levels A and B wipers respectively of switch MMPR2 to enable a precedence comparison test to be performed, if necessary. This function was explained in the aforementioned application, and will be again generally described in this specification. At contacts 2839 ground is connected to wipers of levels C of switch MMPR2. Ground on wiper C lights the high precedence lamp 2969 in the event switch MMPR2 has been stepped to contacts 5 or 6 indicating the message is one of the two highest precedences.

The wiper of level B of switch 5200X is connected over lead C601X(4) to the incoming line circuit 300, contacts 496, 345 and 335 to ground. This ground is therefore extended past contacts 2834 and 2823 to operate relay 2850. At contacts 2851 relay 2850 shunts down relay 2820 and extends direct ground to lead C2701c(27). As this lead extends as already described, to battery through the lower winding of relay 730, that relay operates. At contacts 2852 relay 2850 completes another holding circuit for relay 2830 over contacts 2833, 2852 and 2923. At contacts 2853 relay 2850 completes its own holding circuit from contacts 2842 and 2923. At contacts 2854 relay 2860 is prevented from being connected to lead C601X(4), when relay 2820 restores to close contacts 2822, and instead ground is connected to lead C601X(4) from contacts 2855 as soon as contacts 2822 close. The purpose of this ground will be explained later. At contacts 2856 the circuit to relay 2940 is maintained open despite closure of contacts 2827.

Relay 2820 on restoring prepares a circuit to relay 2940 at contacts 2827, and reconnects the —60 volt battery from the page printer 2901 through alarm relay to resistance ground at contacts 2844. At contacts 2821 it opens the original operating circuit for relay 2830, which remains operated over its holding circuits.

*Register-terminal unit disconnect*

With ground on lead C2701c(27), relay 730 operates as already mentioned. Relay 730 closes contacts 736 to energize its upper winding from ground extended to lead C892(10) at off-normal springs 1007 and 1007' and extended to lead C892(25) from contacts such as 2585. Contacts 735 connect ground to relay 860 to hold it operated. Relay 860 maintains one point open in the circuit to the reader clutch magnet. At contacts 731 relay 730 disconnects the ground extended from contacts 1311 from lead C801(13)(23). At contacts 732 it disconnects the same ground from lead C802(21), and at contacts 733 disconnects the same ground from leads C803(25) and C804(31) to restore relay 2470 and relay 3130X respectively. At contacts 737 it disconnects lead C795(27) extending to ground on lead C2701b(29) from lead C799 (25). This removes the shunting ground for already restored relays 2510 and 2480 and also prevents battery from a relay such as 2920 in another idle distribution terminal unit from being forwarded to the register, when switch 2700 is stepped from unit 2800, as will be explained. At contacts 738 it opens an incomplete circuit to relay 850. At contacts 739 it removes ground from lead C899(13) for no purpose at the present time.

It will be recalled that, when ground was connected to either lead C2701b(27) or C4304(27) from the Distribution Terminal Unit 2800, relays 2510 and 2480 are restored. Relay 2480 on restoring opens contacts 2481 to open the original operating circuit for relay 2470. When relay 730 operates to remove ground from lead C803(25), relay 2470 restores, as mentioned above. At contacts 2479' relay 2470 opens the original operating circuit for relay 2580. At contacts 2474 it disconnects ground from lead C1505(15) to restore relay 1595, and at contacts 2478' it disconnects ground from lead C2407(10) to restore relay 1020. At contacts 2475 and 2471 it reconnects lead C2401(22) to ground through contacts 2554, 2547, 2522 and 2582. At contacts 2479 lead C2406(7) is disconnected from lead C2799(27) extending to ground over lead C2701c(22) to open the operating circuit for the lower winding of relay 730. The upper winding of relay 730, however, remains energized over the described circuit therefor. The incomplete stepping circuits for switches 5200X and MMPR2 are opened at contacts 2478 and 2477 respectively.

Ground on lead C2401(22) is extended past the wiper of level B of switch MMTFA to lead C2201a(27) extending to the motor magnet of switch 2700. The switch now steps in a self-interrupted manner, until the wiper of level A of switch 2700 finds ground over one of the leads 2701a1(20) extending to ground at contacts such as TT5e1 (not shown) for example. This ground now extends to lead C2202(22), the wiper of level C of switch MMTFA, lead C2503(25), past contacts 2553 and 2544 to energize relay 2520. Relay 2520 opens contacts 2522 to disconnect ground from lead C2401(22) to prevent further stepping of switch 2700. It closes contacts 2521 to energize relay 2530.

Relay 2530 opens contacts 2531 to disconnect lead C799(7) from lead C2401(22). It opens contacts 2532 to restore relay 2580. At contacts 2533 ground is applied past contacts 2556 to lead C2505(22), level D wiper of switch MMTFA and lead C2298 extended through cable C2299 to shunt down the operated TF1 relay with which switch MMTFA is associated.

Relay 2580 opens contacts 2582 to prevent ground from being applied to lead C2401(22). At contacts 2581 one ground for relay 2550 is disconnected. At contacts 2582 another point in the stepping circuit for switch 2700 is opened. At contacts 2583 one ground for relay 2540 is removed. At contacts 2584 the last ground is removed from lead C802(21) to restore relays TG1, 2010, TT1 and 2020. At contacts 2585 relay 2580 removes ground from lead C892(8) extending to the upper winding of relay 730.

The restored TF1 relay opens contacts such as TF1e, and closes contacts TF1d to extend ground over lead C2502(25) so that relay 2550 now restores. It opens contacts 2552 to restore relay 2540. At contacts 2553 the circuit to relay 2520 is opened. It opens the circuit to relay 2530, which restores to remove the shunting ground applied to lead C2502(22) at contacts 2533. Relay TF1 also opens its holding circuit at contacts such as TF1a. At contacts such as TF1b ground is removed from lead C1304(13) so that relay 1360 in the Route Register 1100 now restores. At contacts such as TF1c ground is removed from lead C2103(25) to restore relay 2570.

At contacts 1362 ground is removed by relay 1360 from lead C1201(8) however, relay 860 remains operated from ground at both contacts 1231 and contacts 735. At contacts 1369 ground is removed from lead C1306(24) to restore relay 2410. Relay 2410 opens contacts 2411 to remove ground from lead C2409(7), which in turn extends to lead C808(8) in a manner already described. This restores relay 2310 as ground has already been removed from lead C801(8) on operation of relay 730. Relay 2310 opens contacts 2314 to restore relay 2560.

It will be recalled that relay 1595 restored on release of relay 2470. It closes contacts 1596 to complete a self-interrupted homing circuit for switch MMPS from off-normal springs 1584. Switch MMPS steps home to open off-normal springs 1584, and reoperate relay 1590 from ground at contacts 1412. At off-normal springs 1585 ground is removed from lead C892(8) extending to the upper winding of relay 730. Relay 1595 also opens contacts 1597 to restore relay 1580.

It will also be recalled that ground was removed from lead C2407(10) to restore relay 1020. Relay 1020 on restoring opens contacts 1022 and 1025 to restore relays 1040 and 1030 respectively. At contacts 1021 a self-interrupted stepping circuit is completed from off-normal springs 1009 for switch MMIGS and the switch steps home to open its off-normal contacts. Likewise at contacts 1024 a self-interrupted stepping circuit is completed for switch MMITS from off-normal springs 1008 and that switch steps home to open its off-normal springs. At off-normal springs 1007 and 1007' respectively ground is removed from lead C892(8) extending to the upper winding of relay 730. When switch MMITS steps, it opens the circuit to relay 1060, which restores. At contacts 1062, 1591 or 2315 depending on which opens first the circuit to relay 740 is opened, and it restores.

*Succeeding translation*

Relay 730 in the Supervisory Unit 700 restores, as soon as each ground is removed from lead C892(8). This occurs after relay 2586 restores to open contacts 2585 and switches MMPS, MMIGS and MMITS have each stepped home to respectively open off-normal springs 1585, 1007 and 1007', whereby respective grounds are removed from lead C892(8). At contacts 731, 732, 733 and 734 a respective ground is again connected to leads C801(13) (23), C802(21), C803(25) and C804(31) and C805(13) for purposes already described. Ground is again connected at contacts 739 through contacts 816 to lead C899(13), and as relay 1360 has restored to close contacts 1365 and relay 1330 is operated to close contacts 1332, relay 1340 is again operated.

Relay 1340 closes contacts 1341 to again lock operated over lead C805(8). At contacts 1345 it again extends ground over lead C1302(19) to operate the translator start relay 1920. At contacts 1344 it removes ground from the marking lead C1301(19) extending to the translator switch MMT1 and instead extends a resistance battery marking thereto from relay 1350 at contacts 1343.

On becoming available, translator switch MMT1 again steps in search of this register and on finding the same, relays 1910 and 1350 are operated in a manner previously described. The motor magnet of switch MMTC is again energized at contacts 1354 and ground is again connected at contacts 1351 to lead C1303(20) to operate the bar relays 2050A and 2150B. At contacts 1356 the bar relay 1250 is operated to again connect lead 1A(16a)–1E(16a), 2A(16)–2E(16), 3A(16)–3E(16), TC1(16)–TC10(16) and NS19 from the translator to the Route Register 1100 in a manner already described.

The translator functions in a manner previously described to again decode each of the three DDI characters registered in the Route Register 1100, and extends a relay tree ground as previously described towards the contacts of the count relays TCA–TCJ. It will be noted that on the present or second translation, the wiper of switch MMTC extends ground past contacts such as 1245B to lead TC2(16). This lead extends to the second translation count relay TCB (not shown). Relay TCB, therefore, operates on the second translation instead of relay TCA, and it extends the relay tree ground to an appropriate terminal in terminal field patch panel 1700. As the delivery indicator is the same as on the first translation the relay tree ground is extended to the second terminal in the terminal field patch panel row 1701.

This terminal is jumpered, for example, to the second row 1710(30) of multipled station jacks A–G corresponding for example to station 30. From here the relay tree ground is extended over lead C1718(17a) and through a corresponding terminal such as T30 in patch panel 1700A, jumpered to a corresponding terminal ST30 and extended to the upper winding of the translator station relay S30 (not shown) to operate that relay in a manner similar to the operation of relay S1.

Relay S30 on operating extends ground over a corresponding TG' and TT' lead in a manner similar to that explained for relay S1. In this case however leads TG2' corresponding to the second ground and TT5' corresponding to the fifth terminal in each group are grounded. In addition, if relay S30 corresponds to a local station, it extends ground over a corresponding group of four G leads such as G1'(17a)–G4'(17a) extending to terminals such as G30A–G30D respectively in column G of Patch Panel 1700A. In this case it will be assumed that this station has a plurality of page printers associated therewith, of which some are accessible through Distribution Terminal Units associated with terminal finder switch 2700 and one of which is accessible through another Terminal Unit associated with another terminal finder switch such as 2700I. Terminal G30A is jumpered to one of the multipled TF1 terminals such as TF1T, and another one of the G30 terminals such as G30D is jumpered to one of the multipled group of TF9 terminals such as TF9A corresponding to the terminal switch having access to the other Distribution Terminal Units or Units. Ground is therefore extended over both leads TF1' and TF9' to operate relays TF1 and TF9.

Ground extended by relay S30 to the appropriate TG' lead such as TG2'(20) operates the corresponding terminal group relay such as TG2 (not shown). Ground also extended over the appropriate TT' lead such as TT5′(20) in a manner similar to that explained previously operates the appropriate TT relay such as TT5 (not shown). These relays operate to extend a resistance battery marking over a lead such as C2701a1(27) individual to the desired station in a manner explained for marking lead C2701a(27). This marks the contacts corresponding to station 30 on terminal finder switches 2700 and 2700I respectively. Only level A of switch 2700I is indicated in the box marked 2700A–2700J. Relays 2010 and 2020 operate as before explained and the operated terminal register relays lock operated as previously described to lead C802(8).

If relay S30 corresponds to a remote station, it grounds lead TG2′(20) and TT′(20) to operate relays TG2 and TT5, as before explained. Relays 2020 and 2010 also operate as explained. In addition it extends ground to its four respective terminals G30A–G30D as explained. Instead of jumpering any of these terminals to corresponding terminals in column TF, one of the terminals is jumpered to a terminal in column OS as illustrated for terminal G120A. Ground is therefore extended over one of the leads OS1′(21), OS2′(21) or OS3′(21) to operate one of the three speed register relays OS1, OS2 or OS3 corresponding to the speed at which the station receives transmission.

Relay OS1 for example operates to extend ground at contacts OS1b, past contacts 2021 and 2011 to lead C1304(13) to operate relay 1360. At contacts OS1a relay OS1 locks operated to ground on lead C802(8). Relay 1360 extends ground from contacts 1313 past contacts 1369 to lead C1306(24) to operate relay 2410 and releases the translator as explained. Relay 2410 extends ground as previously described to lead C2409(7) extending as described to lead C2101(21).

This lead is extended past contacts OS3d, OS2d and OS1c to lead C1497(14), if relay OS1 is operated. If relay OS2 is operated lead C2101(21) is extended past contacts OS3d and OS2c to lead C1497(14). If relay OS3 is operated lead C2101(21) is extended past contacts OS3c to lead C1497(14). In any case ground is extended to lead C1497(14) past the contacts such as 1442 of the operated precedence register relay. If the operated relay is one of the four low precedence register relays ground on lead C1497(14) is extended to lead C1498(23) and contacts 2342 to operate relay 2330.

Relay 2330 locks operated through the lower winding of relay 2340, contacts 2332, 2352 and 2371 to ground on lead C801(8). At contacts 2333, it extends ground from contacts 2313, past contacts 2344 to operate relay 2460. A preset cross office unit test is then initiated as will be explained.

If one of the two highest precedence register relays 1480 or 1490 is operated, ground on lead C1497(14) is extended past contacts 1483 or 1493 to lead C1499(23) and contacts 2362 to operate relay 2350. At contacts 2353 it locks operated through the lower winding of relay 2360 and contacts 2371 to ground on lead C801(8). At contacts 2356 it extends ground from contacts 2313 past contacts 2334 to contacts 2364 for operating relay 2460. An empty cross office unit test is then initiated as will be explained.

*Successive terminal finder switch test*

Assuming several TF relays are operated as result of the translation, ground from contacts such as TF1b and TF9b controlled by the operated TF relays is extended past contacts 2021 and 2011 to lead C1304(13) in a manner already explained to operate relay 1360. At contacts TF1c and TF9c ground is extended to lead C2103(25) to operate relay 2570. Relay 1360 opens the operating and holding circuits for relay 1340 at contacts 1365 and 1363 respectively so that it restores, and enables the translator to find another register at contacts 1367. Relay 1340 on restoring opens the circuit to relay 1350, as described and that relay restores. The circuit to the motor magnet of switch MMTC is opened at contacts 1368 and the switch takes a step to its second position to prepare a circuit to relay TC3. At contacts 1369 ground is again extended over lead C1306(24) to operate relay 2410. At contacts 1369′ relay 1250 is restored, and at contacts 1364 relays 2050A and 2150B are restored.

Relay 2410 closes contacts 2411 to extend ground over lead C2409(7), which as before explained extends to lead C2102(8) and from there over lead C808(23) to provide an operating ground for relay 2310. Relay 2310 operates to close contacts 2314 for operating relay 2560, as explained before.

When relay 2560 operates, ground is extended from contacts 2562 through relay 2550 as before explained to lead C2502(22). If ground is connected at the contacts such as TF3e (not shown) of an unoperated terminal finder relay such as TF3 (not shown), the motor magnet of switch MMTFA is energized over lead C2501(22) extended through contacts 2571, 2561 and 2551 to lead C2502(22) and level A of switch MMTFA. The switch wipers are stepped in a self-interrupted manner as explained. When lead C2502(22) is connected over level A of switch MMTFA to resistance battery at contacts TF1e or TF9e for example depending on which it just encounters, relay 2550 operates. Relay 2550 connects ground at contacts 2552 through the winding of relay 2540 in a manner explained to leads C2503(22) and C2401(22).

Lead C2503(22) is extended in the manner previously explained through level C of switch MMFTA and lead C2202(27) to the wiper of level A of Switch 2700 selected by switch MMTFA, if it stops on its first contact. Lead C2401(22) is extended through level B of switch MMTFA to lead C2201a(27) so that the ground thereon energizes the motor magnet of the selected Terminal Finder Switch 2700. At contacts 2555 ground is extended on lead C2504(22), and level E of switch MMTFA and lead C2297(22) to operate relay 2790 of the selected Terminal Finder Switch 2700.

Switch 2700 now steps in a self-interrupted manner in search of the lead such as 2701a1(27) having a resistance battery marking extended thereon. Lead C2701a1(27) corresponds to the desired station, which comprises a number of page printers and associated Distribution Terminal Units certain of which are accessible through successive contacts of switch 2700 and others of which are accessible through successive contacts of the terminal finder switch 2700I corresponding to relay TF9. Therefore lead C2701a1(27) is multipled to a plurality of contacts on level A of switch 2700 each corresponding to a different Terminal Unit at the desired station, and in addition is multipled to one or more contacts on the other one of the switches 2700A–2700I having access to the other Terminal Unit or Units and associated page printers at station 30. This is done, if as has previously been pointed out, switch 2700 did not have enough available terminals at the time the number of page printers at station 30 was expanded. If all the Terminal Units and page printers at station 30, which are accessible to switch 2700 are found busy then the switch such as 2700I corresponding to the other terminal finder relay TF9 is called into use to search the Terminal Units of station 30 to which it has access as will be explained.

Switch 2700 steps, as before described, to the first contact having a resistance battery marking thereon, which in this case is the first one of the group of multipled contacts connected to lead C2701a1(20). The resistance battery is extended over lead C2202(22) to lead C2503(25) in a manner already explained to operate relay 2540. It opens the circuit to the motor magnet of switch 2700 at contacts 2546 and connects the motor magnet to the Terminal Unit busy test lead over lead C799(7) to switch stepping as previously explained.

Lead C799(7) is connected over lead C795(27), through level B of switch 2700, and over a lead, not shown, such as C2701b(29) extending in this case to the first distribution terminal unit associated with station 30. As explained for Distribution Terminal Unit 2800, if the terminal unit is busy, it places ground on lead C2701b(27) so that relay 2510 does not operate. If the terminal unit is idle, resistance battery is transmitted through a relay therein corresponding to relay 2920, to the lead corresponding to C2701b(27). The battery on the lead corresponding to lead C2701b(27) is therefore extended past lead C795(7) to lead C799(25) to energize the lower winding of relay 2510 in a manner previously explained. The register then functions to set the incoming selector switch such as 5200X to the incoming line circuit 300 and the precedence switch such as MMPR2 in the selected distribution terminal unit to the proper precedence, as explained for Distribution Terminal Unit 2800, and then disconnects therefrom in a manner previously explained. Another translation is then made in a manner described.

If, however, the terminal unit is busy, ground is placed as mentioned on its busy test lead corresponding to lead C2701b (27), in a manner similar to that explained for Unit 2800 placing a busy ground condition on lead C2701b(27). Relay 2510 therefore fails to energize, when the wiper of level B of switch 2700 encounters the busy test lead. The direct ground then on the busy test lead is forwarded over lead C795(7) to lead C799(25) past contacts 2545, 2531, 2512, 2522, 2547, 2554 and 2475 to lead C2401(22) and from there over level B of switch MMTFA to lead C2201a(27) to again energize the motor magnet of switch 2700. The switch takes another step in a self-interrupted manner, as explained, to the succeeding distribution terminal unit associated with station 30.

If the next distribution terminal unit is busy, the ground condition on the lead corresponding to lead C2701b(27) is extended as previously described to energize the motor magnet of switch 2700, and the switch steps again. Thus switch 2700 steps in search of another idle distribution terminal unit associated with station 30. If an idle unit is found, battery from the relay corresponding to 2920 is extended to the lead corresponding to lead C2701b(27) to energize the lower winding of relay 2510 in a manner previously explained. That circuit is then set up in an explained manner and another translation performed.

If switch 2700 finds no idle units, it steps from the last busy distribution terminal unit of station 30 to which it had access, to the distribution terminal unit associated with another station. Ground is then extended over for example, lead C2701y(27) connected to the unoperated TT relay contacts TT25e6, or if contacts TT25e6 are open, to unoperated TG relay contacts such as TG6e via contacts TT25d6. This ground is extended over level A of switch 2700 to lead C2202(22), level C of switch MMTFA to lead C2503(25) to operate relay 2520.

Relay 2520 opens contacts 2522 to open the circuit to the motor magnet of switch 2700 and closes contacts 2521 to energize relay 2530. At contacts 2522 it opens the circuit to the motor magnet of the terminal finder switch 2700 to prevent it stepping. Relay 2530 opens contact 2531 to open a possible circuit for relay 2510. At contacts 2533 it forwards ground over contacts 2556 to lead C2505(22), the level D wiper of switch MMTFA and over the lead such as C2298 corresponding to the operated TF relay extended through cable C2299 to shunt operated relay TF1. It restores to open contacts TF1b. This removes one ground from lead C1304(13), however relay TF9 being operated maintains ground thereon at contacts TF9b. At contacts TF1c, one ground is removed from lead C2103(25), however ground is maintained thereon from operated contacts TF9c. At contacts TF1e it removes battery from its corresponding contact of level A of switch MMTFA, and instead extends ground thereto from contacts TF1d.

This ground is extended over lead C2502(25) to shunt relay 2550, which restores. Relay 2550 on restoring opens the circuit to relay 2540 at contacts 2552, and relay 2540 restores. Contacts 2553 opens to restore relay 2520, which in turn opens contacts 2521 to restore relay 2530.

Lead C2501(22) is now connected by way of contacts 2551, as before described, to lead C2502(22) extending to ground at the wiper of level A at switch MMTFA. The motor magnet of switch MMTFA therefore operates and steps the switch in a self-interrupted manner in search of resistance battery at contacts TF9e. On finding the same the switch MMTFA terminates stepping and relay 2550 is again operated all as previously described.

With switch MMTFA wiper A connected to a resistance battery at contact TF9e, the motor magnet (not shown) of Terminal Finder Switch 2700I indicated by block marked Terminal Finder Switches 2700A–2700J is connected over a lead corresponding to lead C2201a(27) to lead C2401(24), which in turn is connected over lead C2503(22) and switch MMTFA wiper C to a lead such as C2202(g) extending to the wiper of level A of switch 2700I. With the wiper of level A of switch 2700I connected to ground over a lead such as lead C2701a(20) the motor magnet of switch 2700I is energized, and the switch steps in a self-interrupted manner.

It will be noted that lead C2701a1(20) is the only one marked by resistance battery in accordance with the corresponding operated TG and TT relays (TG2 not shown and TT5 not shown) of the Terminal Register 2000. This lead is multipled from the terminal block associated with switch 2700 to one or more bank contacts on level A of terminal finder switch 2700. The number of bank contacts of switch 2700I connected to lead C2701d(20) of course depends on the number of distribution terminal units associated with station 30 to which the switch has access. Therefore, when the level A wiper of switch 2700I finds the resistance battery, the motor magnet of switch 2700I terminates further switch stepping and relay 2540 is operated in an explained manner.

The distribution terminal unit associated with this contact now extends its busy test lead such as lead C2701b(29) over lead C799(7) and lead C795(25) and contact 2545 to the lower winding of relay 2510. If the distribution terminal unit is idle, relay 2510 is operated and the register proceeds to set up the unit and disconnect therefrom in a manner explained for distribution terminal unit 2800. If on the other hand the terminal unit is busy the switch 2700I tests for other distribution terminal units associated with station 30 in the same manner as explained for switch 2700.

*Unsuccessful terminal unit test*

In the event no idle distribution terminal units associated with switch 2700I are found, relay 2520 is operated as previously described to in turn operate relay 2530. Relay 2530 grounds lead C2505(22) to shunt down the last operated terminal finder register relay TF9, as explained for TF1. When relay TF9 restores, the last ground is removed at contacts TF9b from lead C1304(13), and at contacts TF9c from lead C2103(25). At contacts TF9d ground is connected to lead C2502(25), and relay 2550 restores to restore relay 2540. The operating circuit for relay 1360 is opened, when ground is removed from lead C1304(13), however the relay remains operated over contacts 1368' and ground on lead C801(8). Ground removed from lead C2103(25) restores relay 2570. It opens contacts 2571 to disconnect the motor magnet of switch MMTFA from lead C2502(22) despite the closure of contacts 2551.

Relay 2540 restores relay 2520 at contacts 2543, which restores relay 2530 at contacts 2521. At contacts 2572 ground is extended past contacts 2563 to operate relay 2420, which opens contacts 2421. This removes ground from lead C2409(27) to in turn remove ground from the lead C2101(21) extending by means of lead C2102(8) to lead C808(23). With the ground removed from lead C808(23), the lower winding of relay 2320 energizes in series with relay 2410 over contacts 2311, 2331 and 2351 to ground on lead C801(8).

Relay 2320 on operating energizes its upper winding at contacts 2321 and ground on lead C801(8), and at contacts 2322 opens a point in the incomplete original operating circuit for relay 2310. At contacts 2323 it connects lead C808(8) to lead C1497(14). At contacts 2324 the circuit to relay 2560 is opened. Relay 2560 restores to open contacts 2563, and restore relay 2420. Relay 2420 in turn again applies ground to lead C2409(27) to extend the ground serially over leads C2101(21), C2102(8), C808(23) and C1497(14).

The ground on lead C1497(14) is extended past the contacts such as 1442 of the operated one of the precedence register relays such as 1440 to lead C1498(23), and contacts 2342 to energize relay 2330. If one of the two higher precedence relays 1480 or 1490, instead of one of the four lower precedence relays 1440—1470 is operated, the ground on lead C1497(14) is extended past contacts 1483 or 1493 respectively to lead C1499(23) instead of C1498(23) and over contacts 2362 to operate relay 2350 instead of relay 2330.

Relay 2330 on operating opens contacts 2331 to de-energize relay 2310 and the lower winding of relay 2320 and at contacts 2332 prepares an operating circuit to the lower winding of relay 2340 through contacts 2352 to ground on lead C801(8). With relay 2310 restored ground is extended from contacts 2313, past contacts 2333 and 2344 to energize relay 2460. The Sequence Control Unit 2300 will now control a test for a preset cross office unit in a manner which will be described.

If, instead of relay 2330 being operated, relay 2350 is operated as explained above, the circuit through the lower winding of relay 2320 to relay 2310 is opened at contacts 2351 and relay 2310 restores. Contacts 2353 close to prepare a circuit for the lower winding of relay 2360 over contacts 2371 to ground on lead C801(8). In this case ground is extended from contacts 2313 past contacts 2334, 2356, and 2364 to operate relay 2460. An empty cross office unit test will then be performed under control of the Sequence Control Unit 2300 in a manner which will be described.

*Preset cross office unit test*

Figure 24:
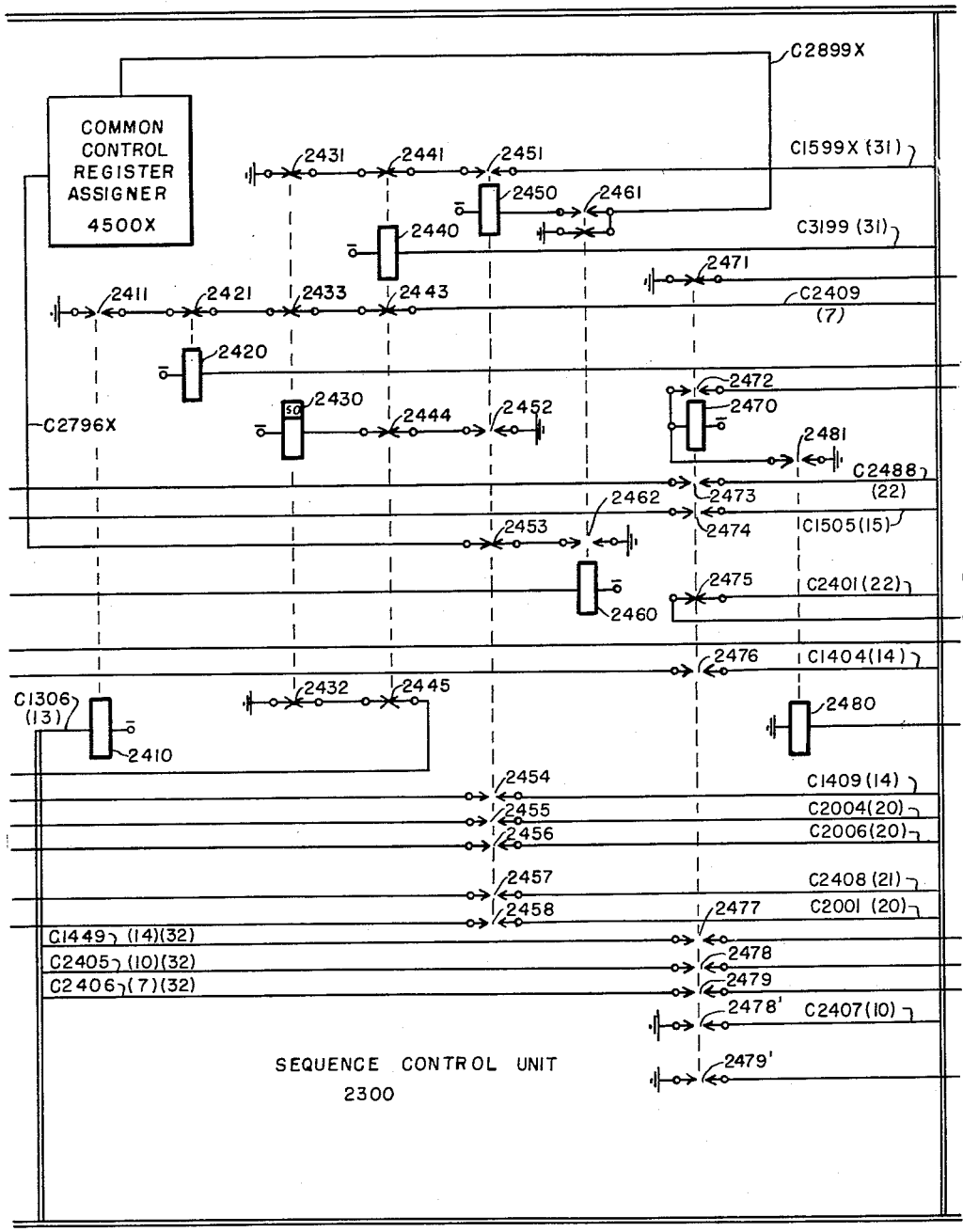
Figure 25:
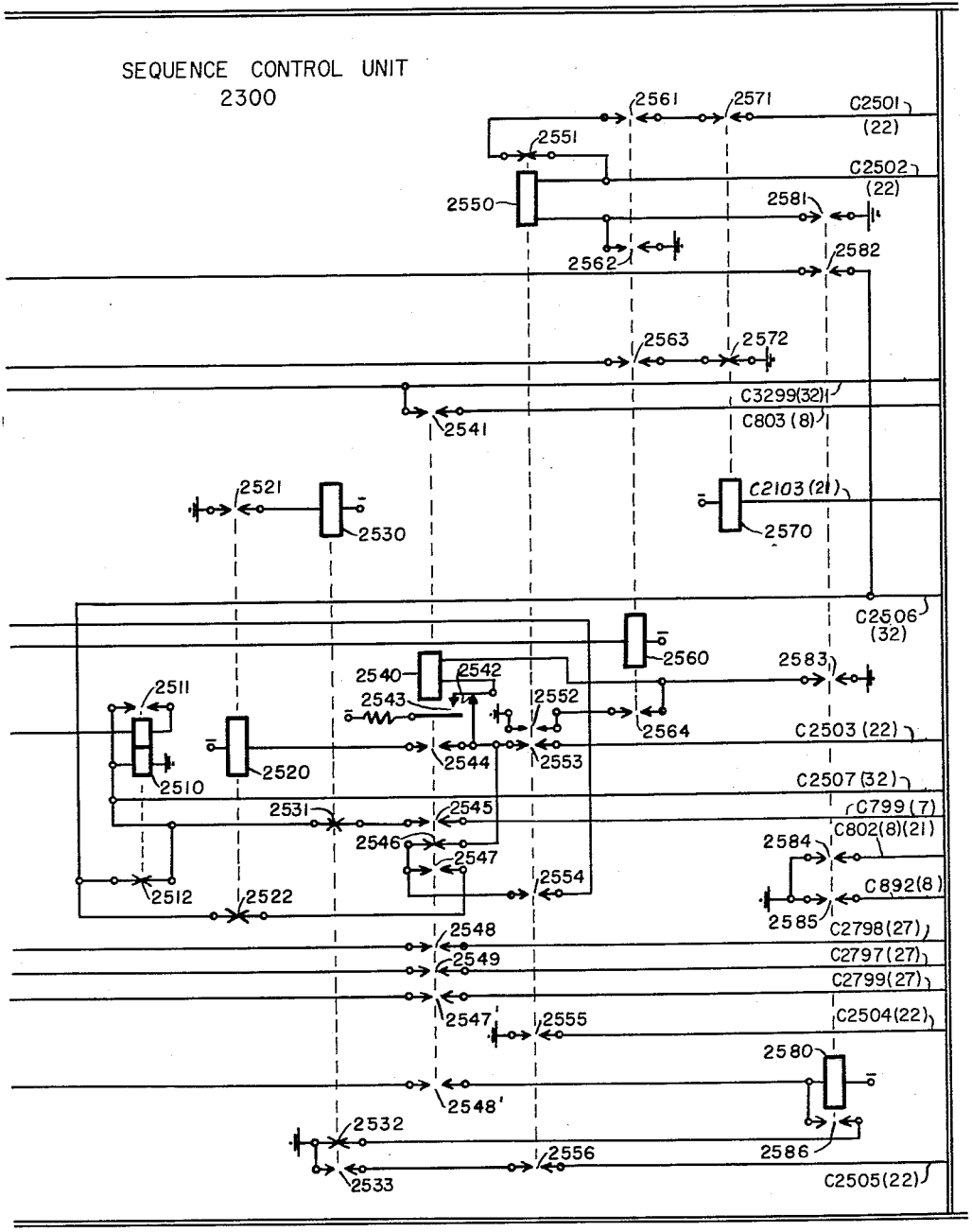
Figure 26:
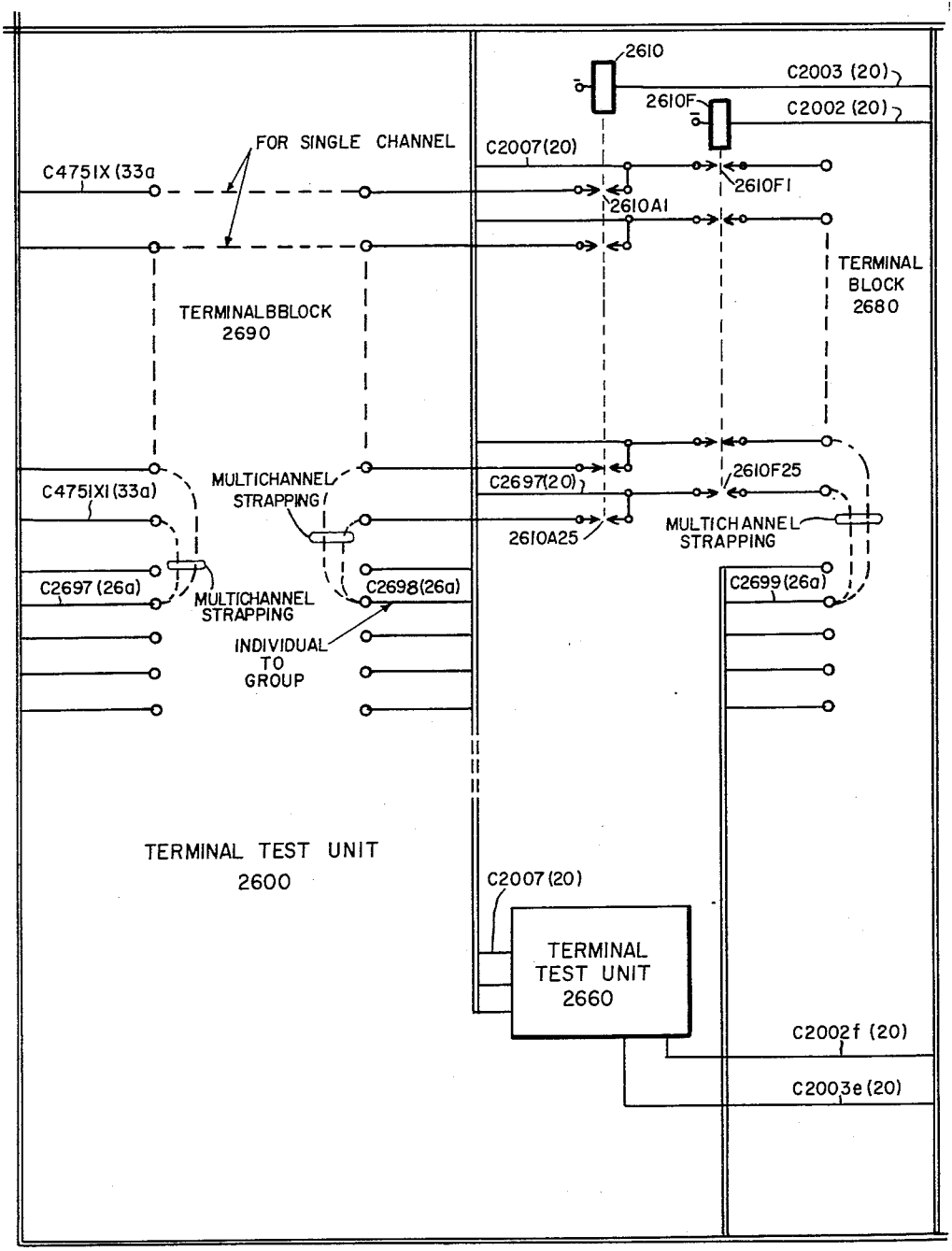
Figure 26A:
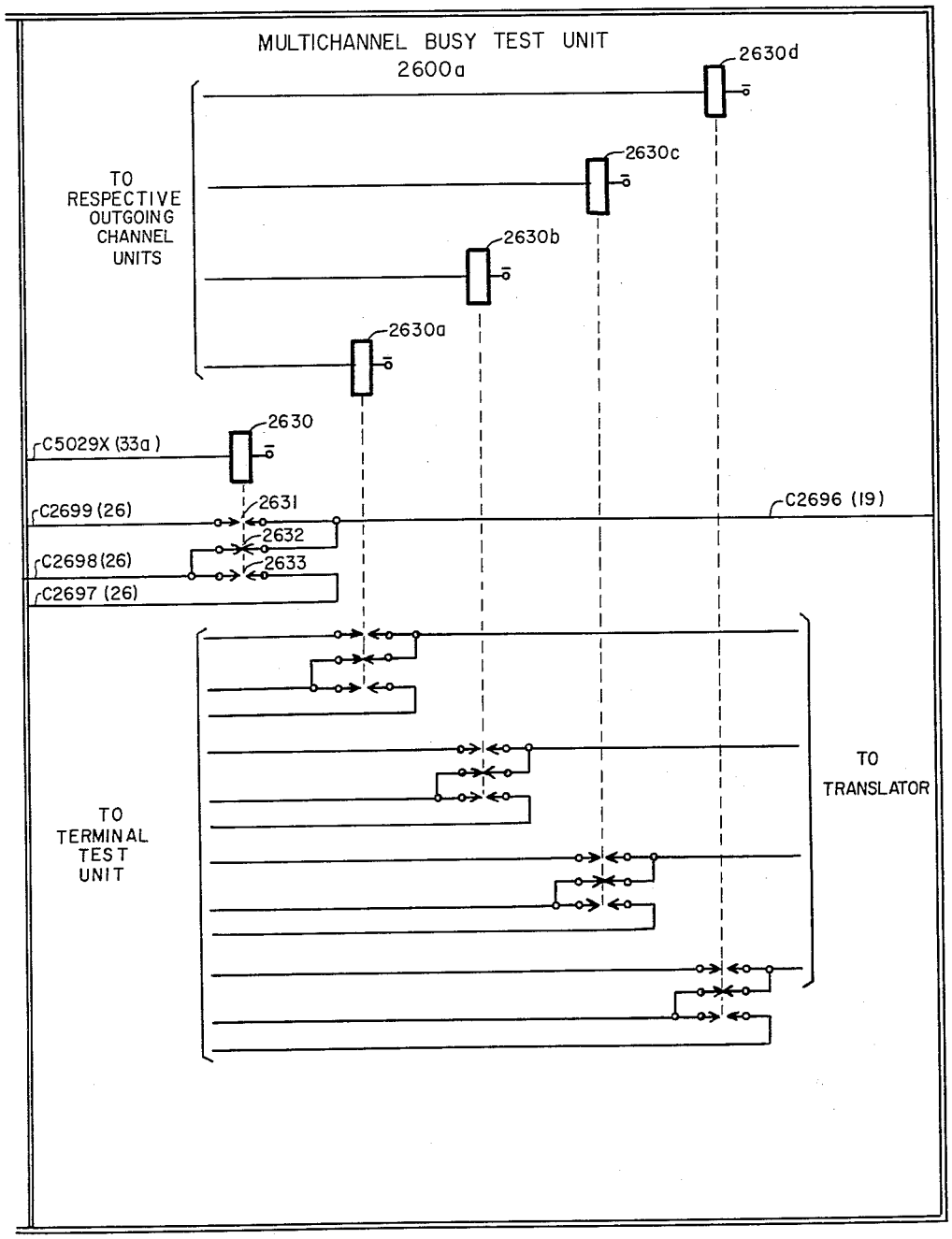
Figure 27:
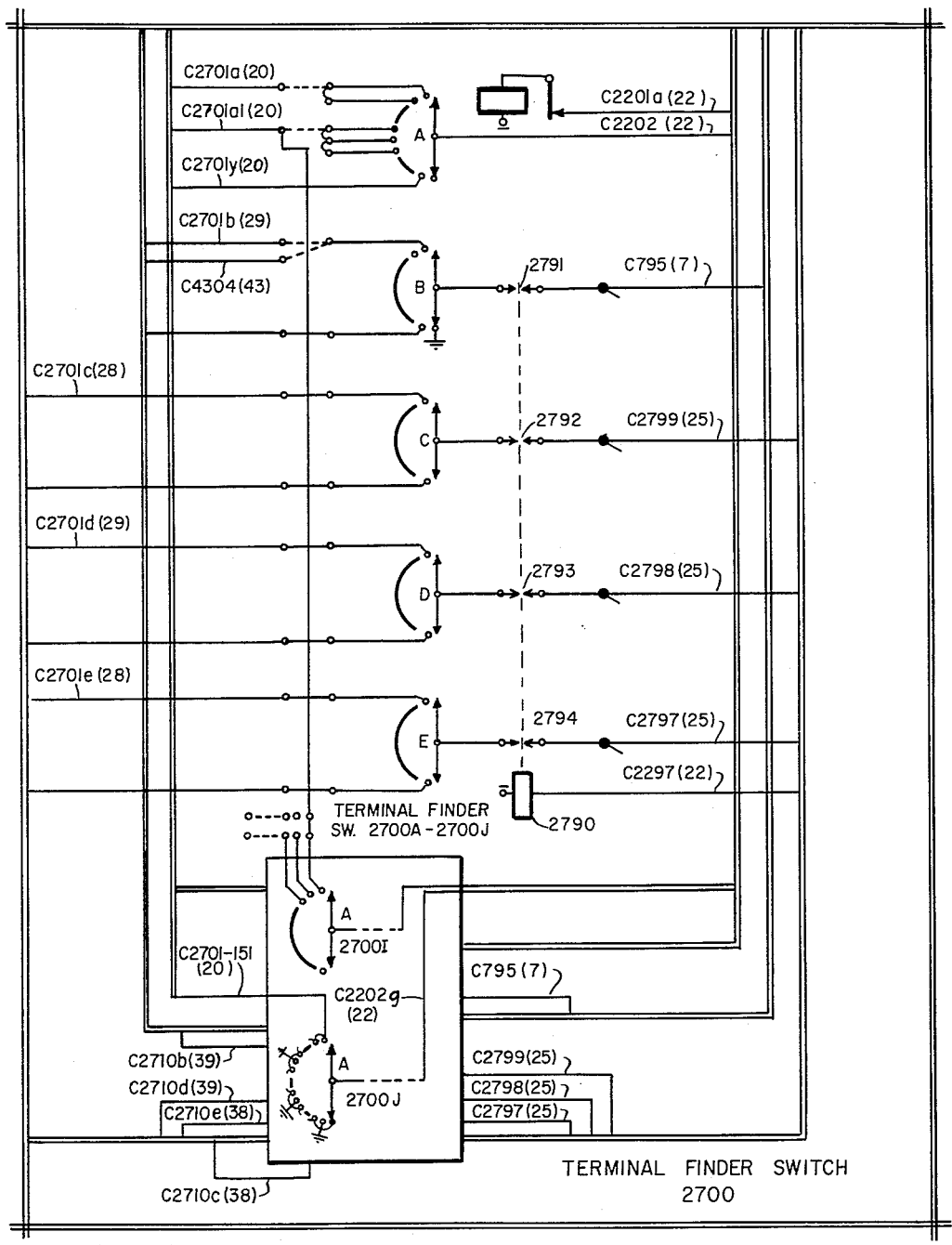
Figure 28:
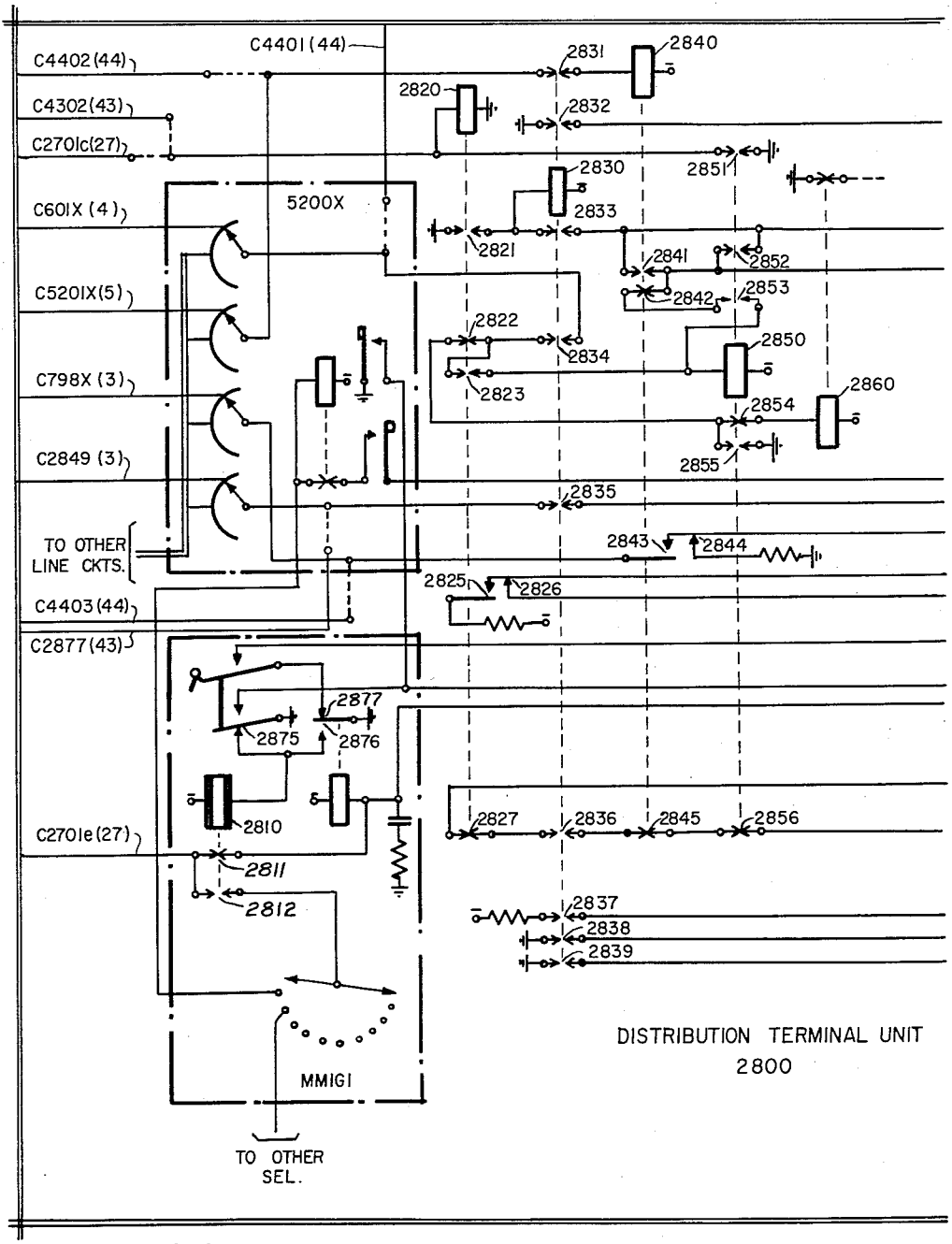
Figure 29:
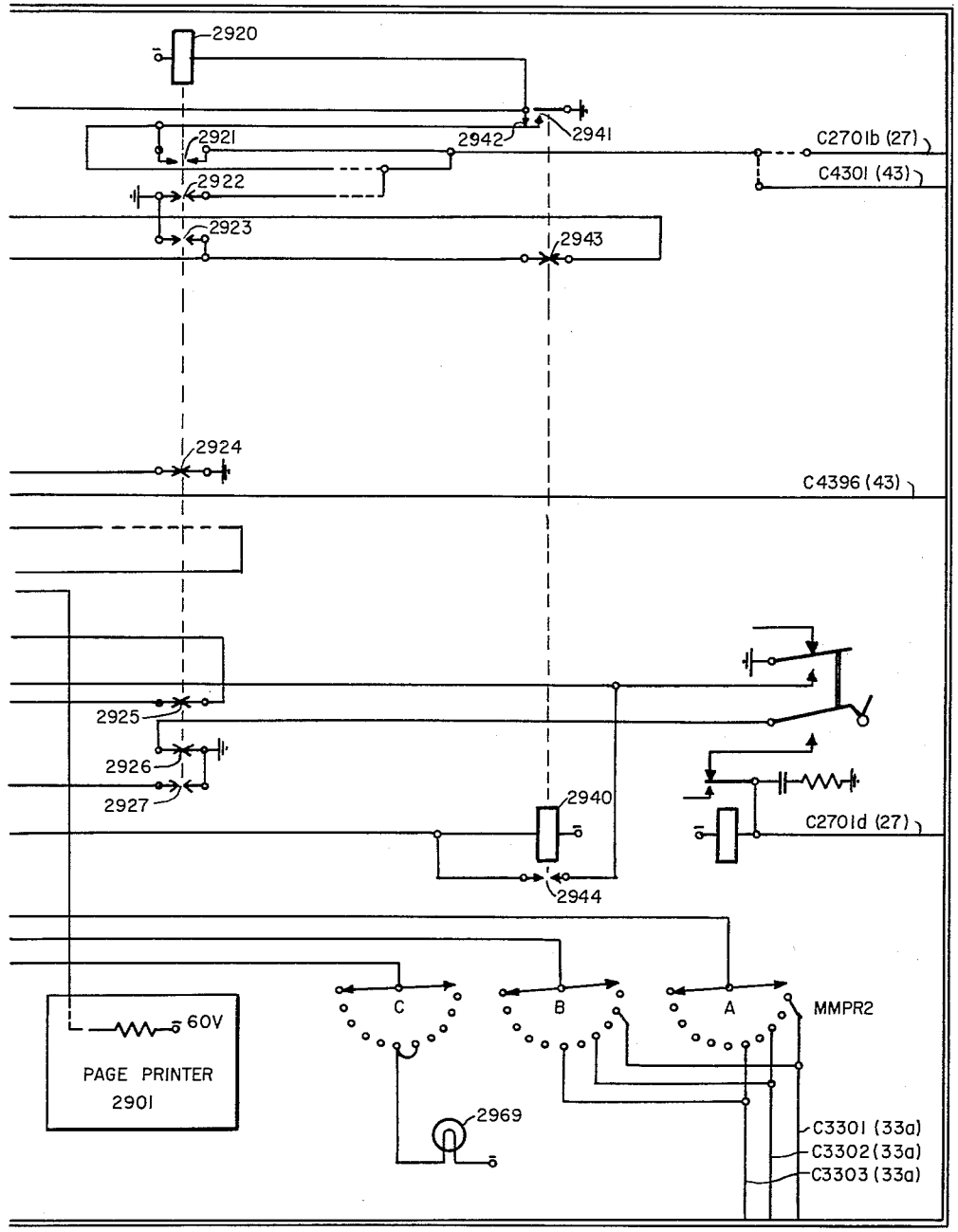
Figure 31:
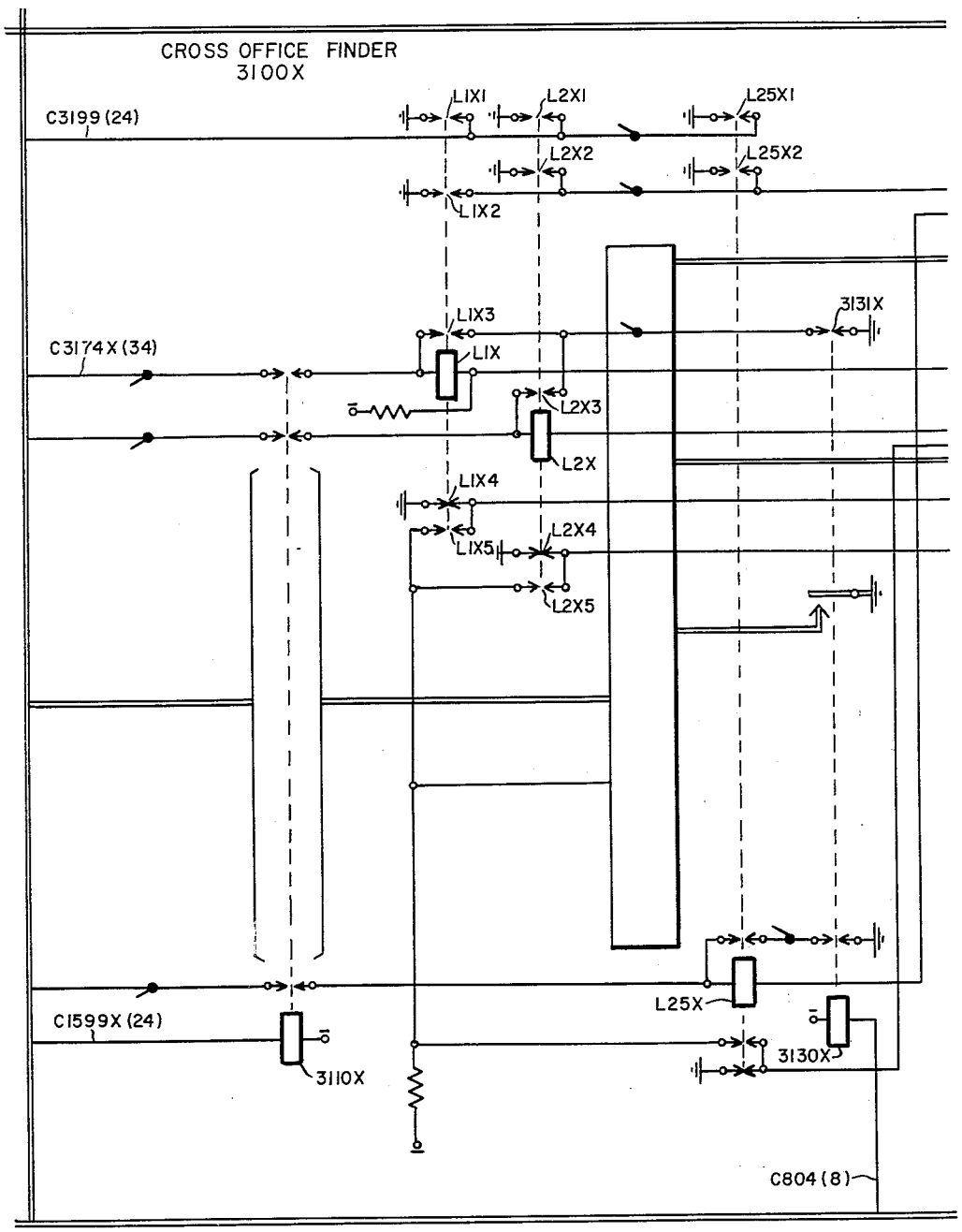
FIGS. 31 and 32 show the details of the Cross Office Unit Finder 3100X, whereby the register searches for a cross office unit.
Figure 32:
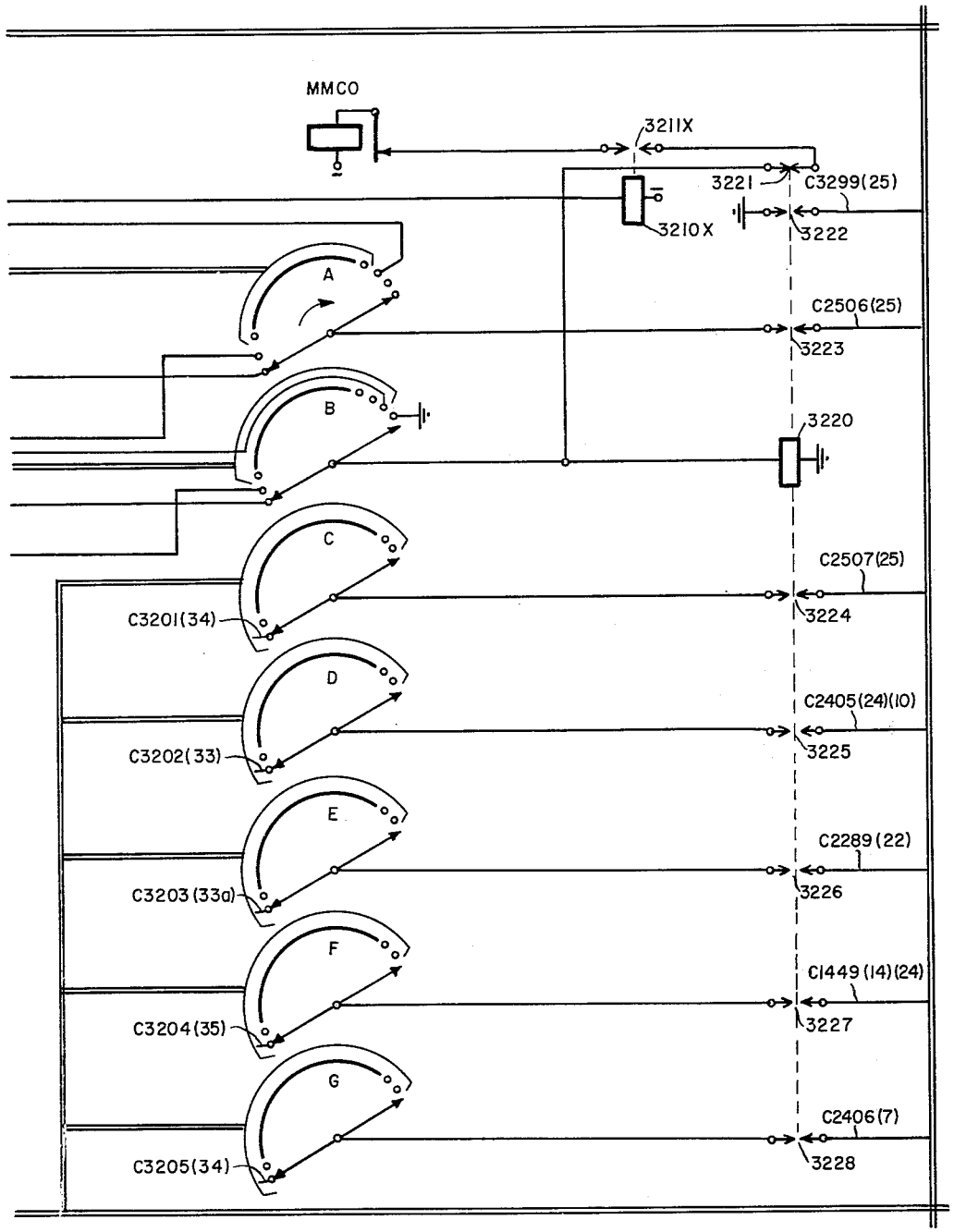
Figure 33:
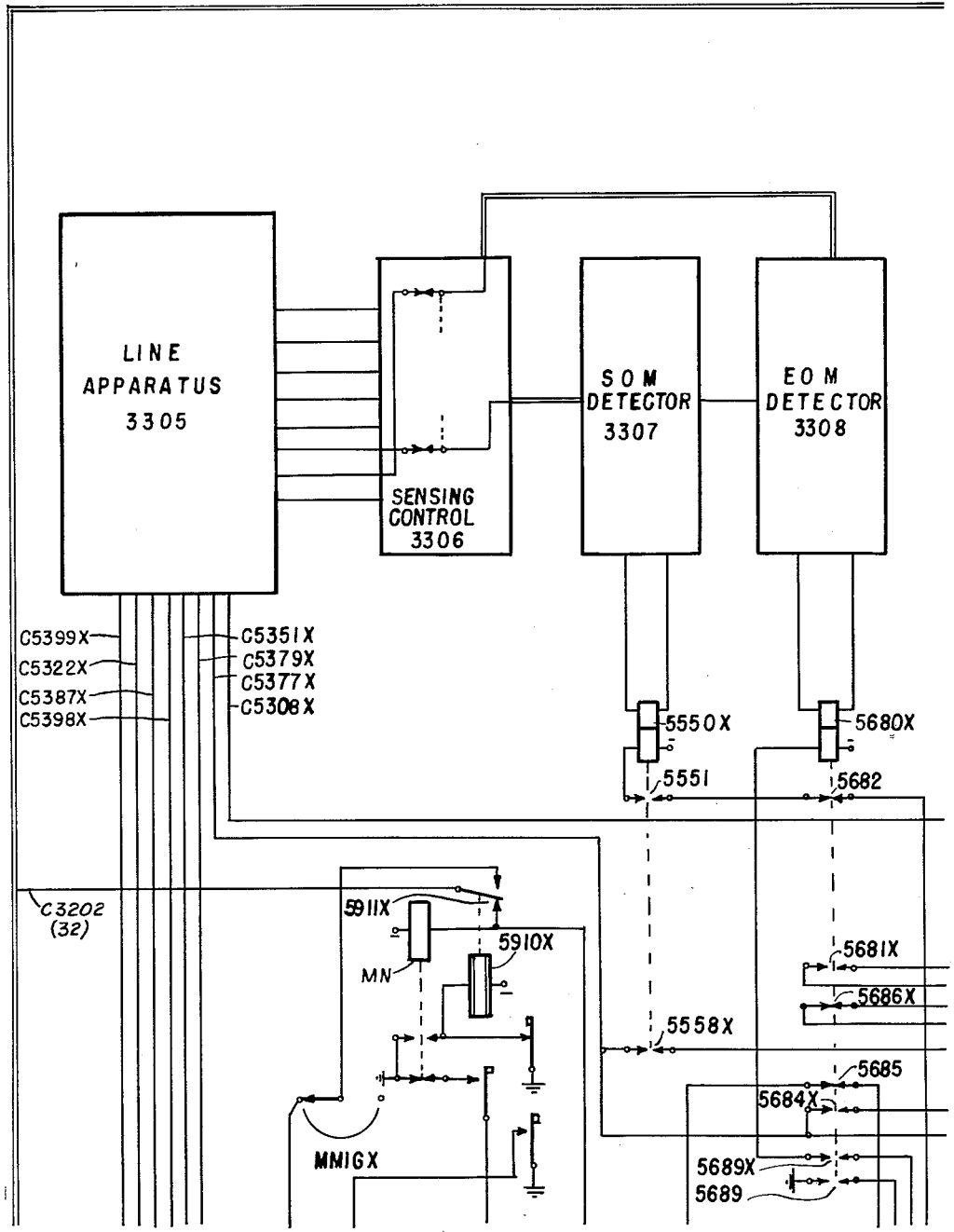
Figure 33A:
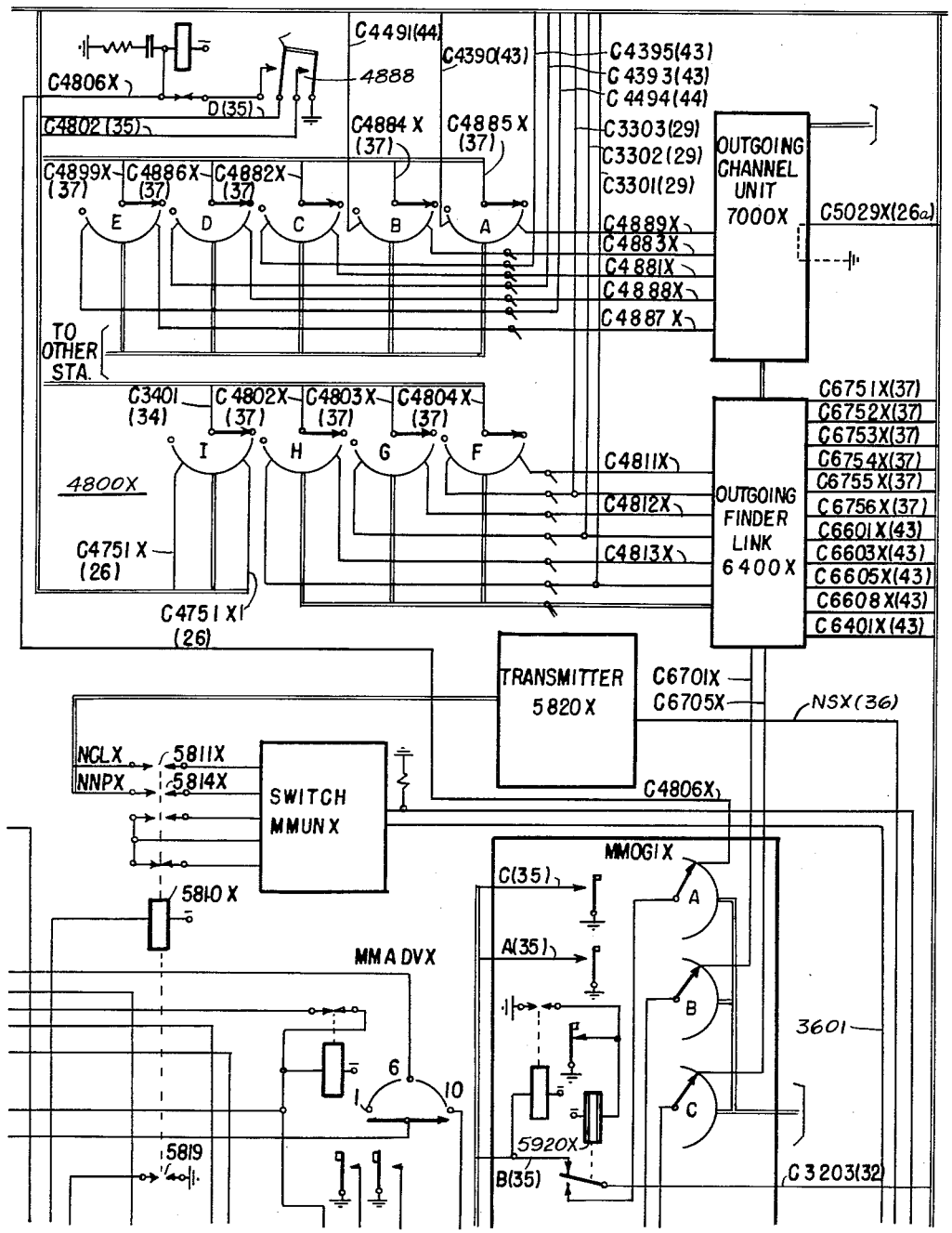
Figure 34:
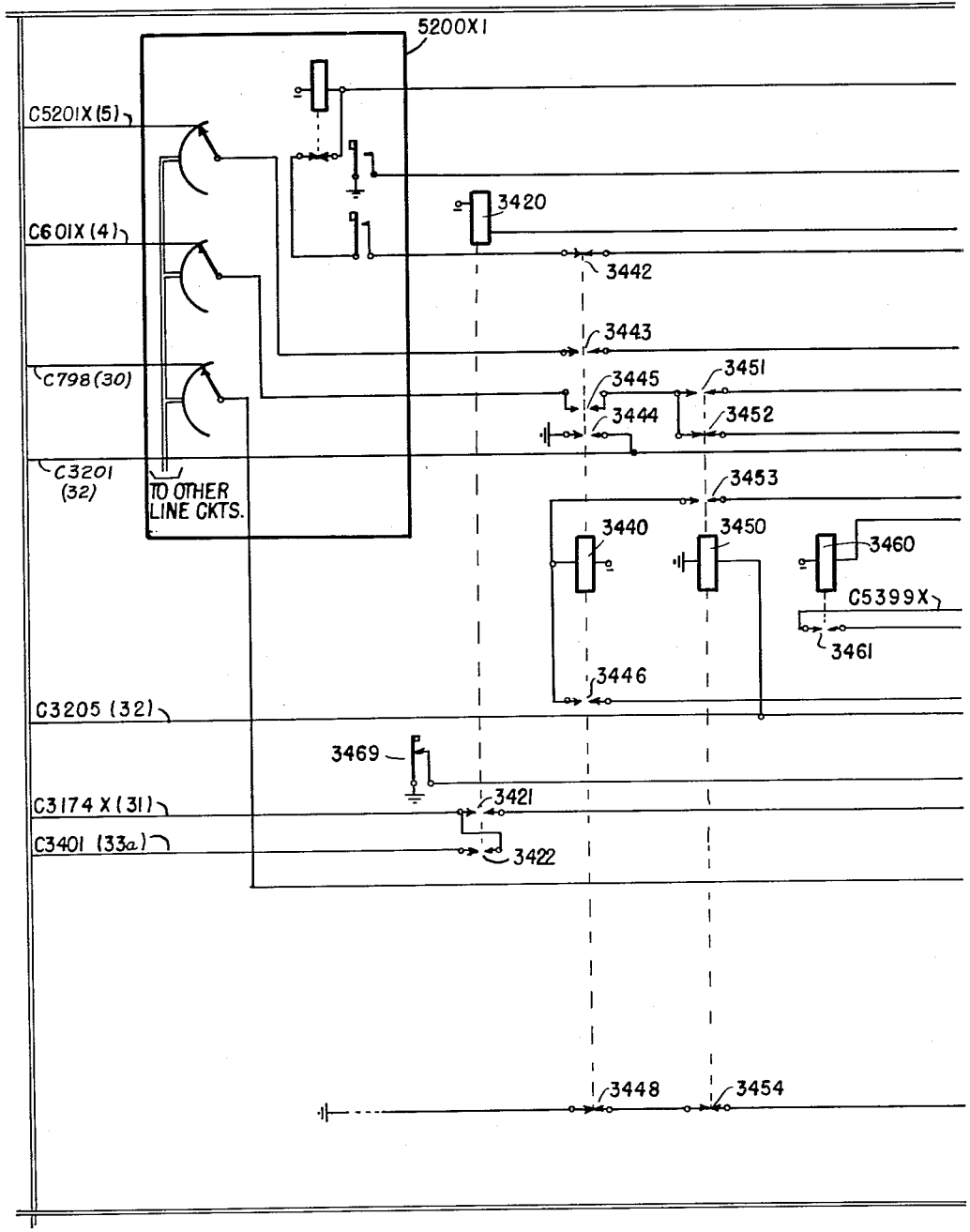
Figure 35:
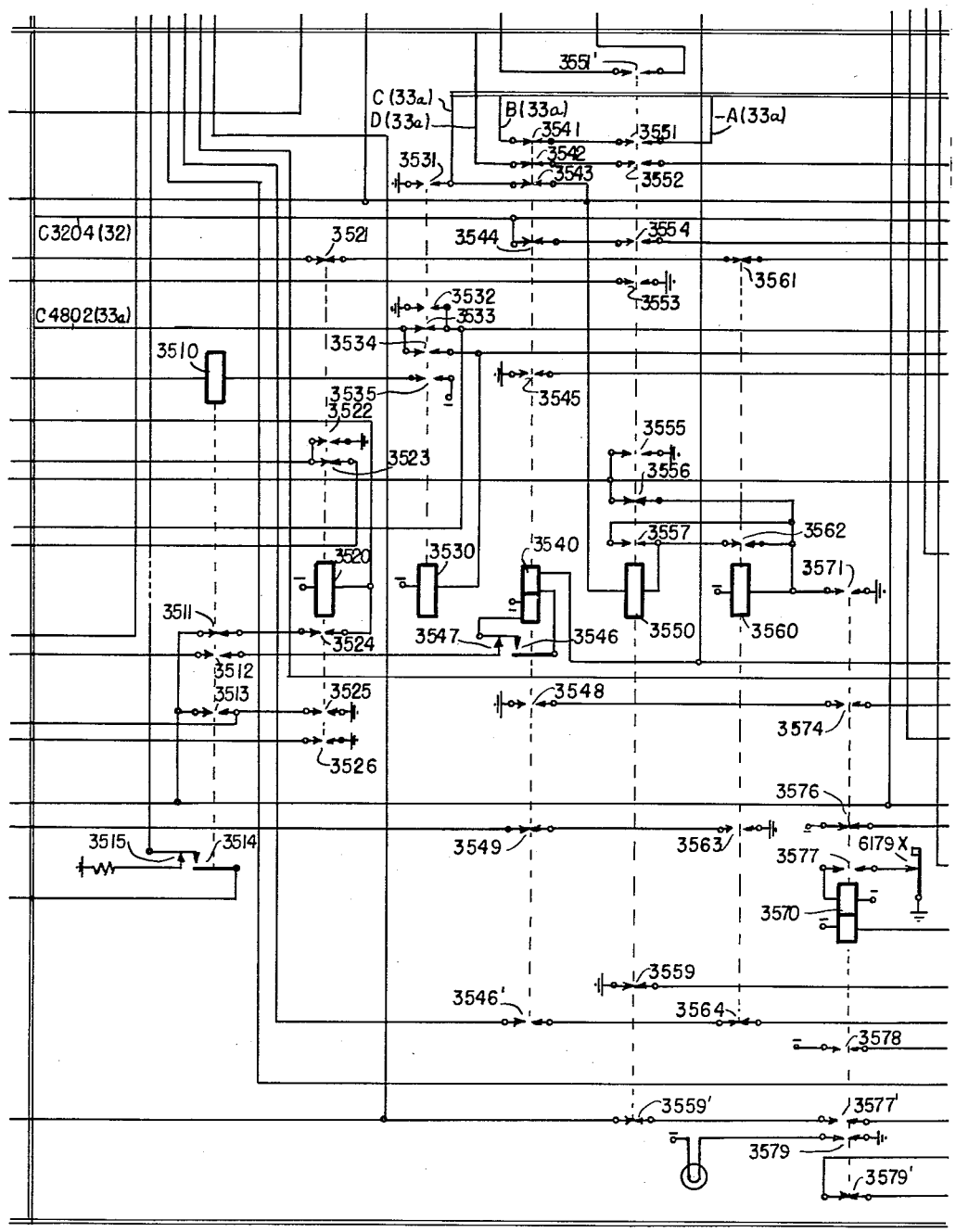
Figure 36:
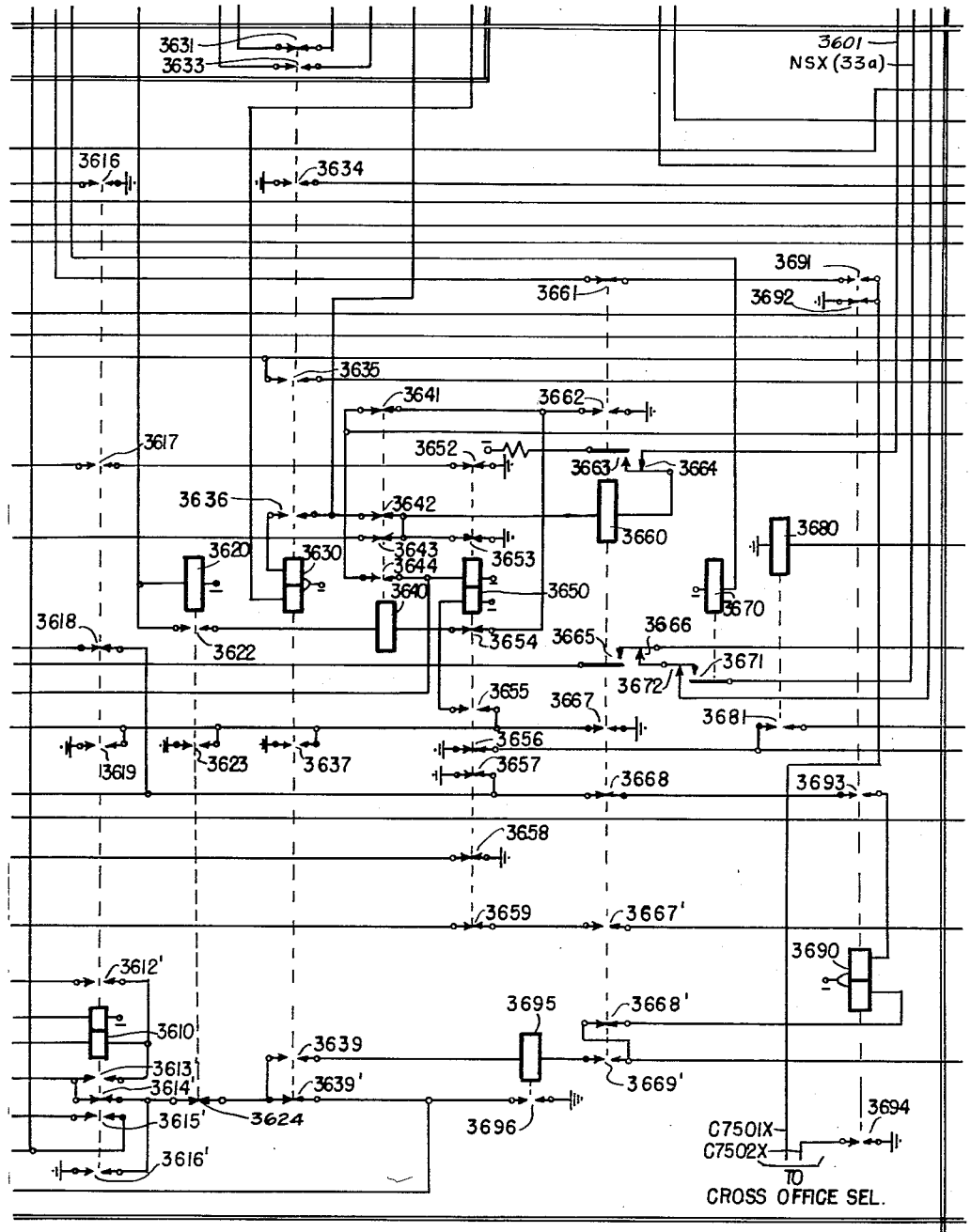
Figure 37:
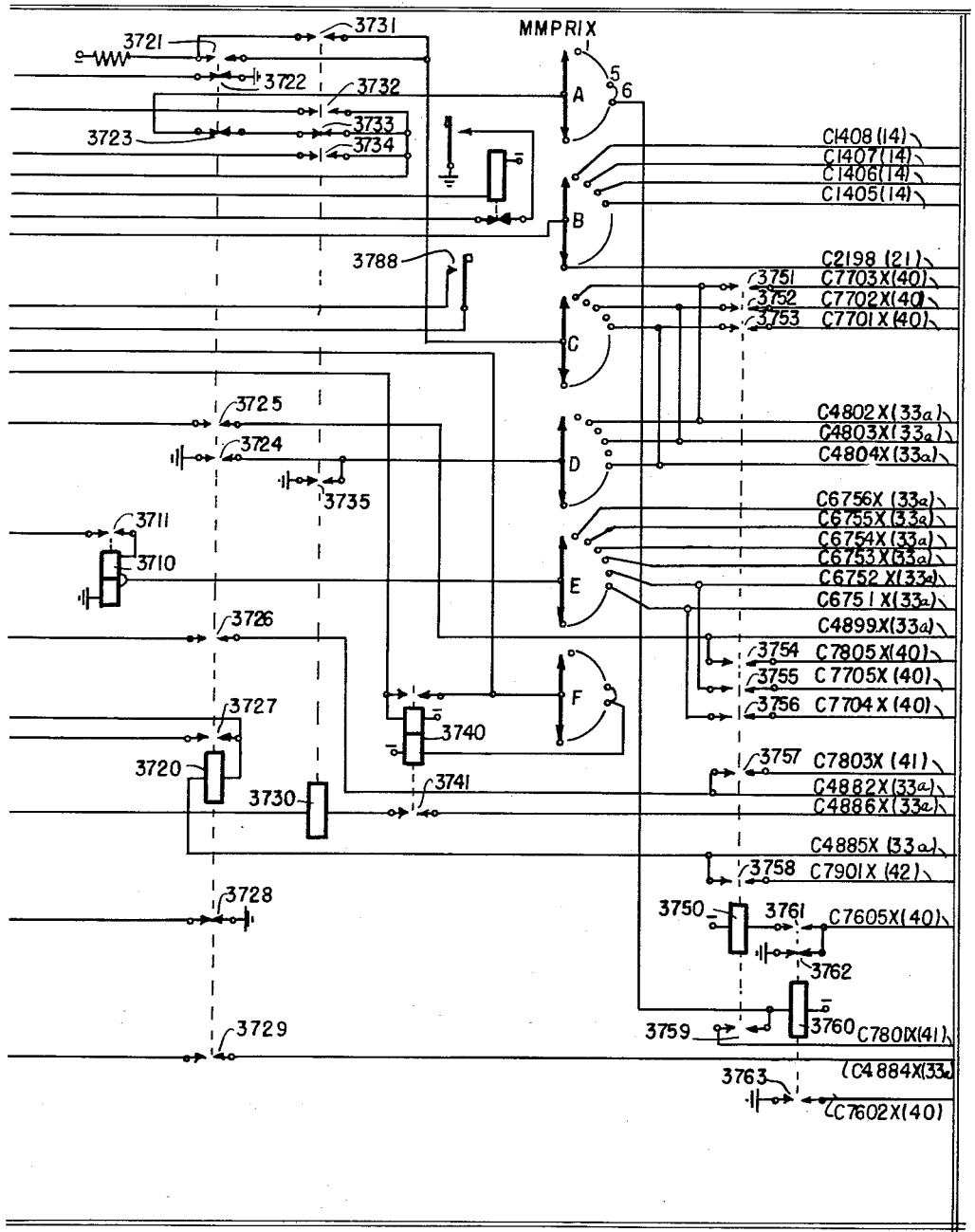

It will be recalled that relay 2330 is operated whenever a test for a preset cross office unit is to be performed. It operates as a result of a translation indicating routing of a low precedence message to a remote station or as a result of failure to find an idle Distribution Terminal Unit for a low precedence message to be routed to a local station. Relay 2460 operates as previously mentioned, on operation of relay 2330. It closes contacts 2462 to extend ground over contacts 2453 to lead C2796X extending to the Common Control Register Assigner 4500X indicated by the block in FIG. 24. The Common Control Register Assigner 4500X functions in a manner described for a corresponding unit in the previously mentioned application to search for and find the present register at which time it extends ground in a manner described in the aforementioned application, over lead C2899X and contacts 2461 to operate relay 2450.

Relay 2450 closes contacts 2451 to extend ground from contacts 2431 and 2441 over lead C1599X(31) for operating relay 3110X in the Cross Office Finder 3100X. This relay functions in a manner described for a corresponding relay in the previously mentioned application to connect the cross office finder register relays L1X—L25X over their respective leads such as C3174X(34) to their respective cross office units in a manner explained in the previously mentioned application. At contacts 2452 ground is extended past contacts 2444 to initiate operation of slow-to-operate relay 2430. At contacts 2453 ground is removed from the common control register assigner start lead 2796X to release the start relay in the common control register assigner 4500X.

Before slow-to-operate relay 2330 operates, ground is extended from contacts 2432 and 2445, past contacts 2336, 2337 and 2338 respectively, past contacts 2345, 2346 and 2347 respectively, past contacts 2454, 2455 and 2456 respectively, to leads C1409(14), C2004(20) and C2006(20) respectively.

Ground on lead C1409(14) is extended past contacts such as 1441 of the operated precedence register relay such as 1440 to the corresponding one of the four low precedence leads C1405(37), C1406(37), C1407(37) or C1408(37) respectively and from there to a corresponding bank contact on level B of the switch marked MMPR1X. Each cross office unit is provided with a similar switch to which the ground is forwarded in a manner explained for a similar arrangement in the previously mentioned application. If desired, leads C1405, C1406, C1407 and C1408 may be multipled in various combinations to permit a preset cross office unit having a message of one low precedence to be tested for use with a message of another low precedence. This permits messages of different low precedences to be stored in the same preset cross office unit and thereby reduce the number thereof.

Ground on lead C2004(20) is extended past the contacts such as TG1c of the operated TG or group register relay such as TG1 in the Terminal Register 2000 to a lead such as C2003(26) to operate relay 2610A in the Terminal Test Unit 2600. Terminal Test Unit 2600 corresponds to the group with which the desired station is associated. If one of the other TG relays for example such as TG6 is operated, the ground is extended over lead C2003e(26) to operate a corresponding relay in Terminal Test Unit 2660 as Unit 2660 corresponds to the sixth group of stations.

Likewise, ground on lead C2006(20) is extended past the contacts such as TT1b of the operated terminal register relay TT1, for example, to a corresponding lead such as C2007(26) extending to each Terminal Test Unit such as 2600 and 2660. The terminal test units are common to all the registers and correspond in number to the number of groups of stations in the system, which in this case is six, and as each includes twenty-five stations a total of one-hundred and fifty stations are accommodated.

Ground on lead C2007(26) is extended past the corresponding one of the twenty-five operated contacts of relay 2610A such as contacts 2610A1 in Terminal Test Unit 2600 to a corresponding terminal on terminal block 2690. This terminal corresponds to the desired station, and as the station is a local station, only one channel extends thereto. It is therefore strapped directly over a lead such as C4751X(33a) to a corresponding station terminal on level I of each outgoing selector switch such as 4800X having access to the desired station.

Each outgoing selector switch that is set to the station extends the ground on lead C4751X(26), past the wiper of level I to a lead such as C3401(34) extending to the associated cross office unit. In the meantime, it will be recalled, that ground is forwarded over one of the four low precedence leads C1405(37)–C1408(37) to the corresponding bank contact of level B of a precedence switch such as MMPR1X in each cross office unit. If the wipers of the cross office precedence switch MMPR1X is set to the contact having ground forwarded thereto, indicating storage of a message of the same precedence, the level B wiper forwards this ground past contacts 3561 and 3521 to energize the relay 3420. Thus a relay corresponding to 3420 in each cross office unit having a message in storage of the same precedence is operated. Relay 3420 closes contacts 3422 to forward the ground, which appears on lead C3401(33a) extending from the cross office outgoing selector switch set to the desired station, to lead C317X(31) to energize one of the register relays L1X–L25X, corresponding to the particular cross office unit. Thus, none, one or more of the register relays L1X–L25X in the cross office finder 3100X are energized, if the corresponding cross office unit has a message of the same precedence in storage and has an outgoing selector switch set to the station to which he message is to be routed.

Relay L1X operates, for example, to close contacts L1X1 and extend ground over lead C3199(24) and energize relay 2440. At contacts such as L1X3 each operated register relay locks operated to contacts such as 3131X. At contacts such as L1X2 each operated register relay energizes relay 3210X. It closes a self-interrupted stepping circuit for the motor magnet of switch MMCO at contacts 3211X from ground extended from the unoperated contacts such as L2X4 of any unoperated register relay with which the switch is associated, the level B wiper of switch MMCO and contacts 3221.

The switch then steps in a self-interrupted manner in search of battery through contacts such as L1X5 by means of which each operated register relay marks its corresponding bank contact on level B of switch MMCO. When battery is found, relay 3220 operates, while the switch magnet remains deenergized. Relay 3220 opens contacts 3221 to open a point in the switch magnet stepping circuit, and connects the cross office set up leads from the register through respective levels of switch MMCO to the cross office unit corresponding to the selected register relay. At contacts 3222 relay 3220 extends ground over lead C3299(25).

In the meantime, relay 2440 operating opens contacts 2441 to remove ground from lead C1599X(31) and restore relay 3110X. Relay 3110X disconnects the register relays L1X–L25X from their cross office units, however the operated ones are held over their respective holding circuits. At contacts 2443 ground is moved from lead C2409(7), which as previously explained extends to lead C1498(23), to cause the lower winding of relay 2340 to energize in series with relay 2330 over the previously prepared circuit therefor. At contacts 2444 the circuit to slow-to-operate relay 2430 is opened, before it can operate. At contacts 2445 ground is removed from leads C1409(14), C2004(20) and C2006(20) and circuits previously described to restore the operated cross office unit relay 3420, the operated terminal test unit relay 2610A and remove ground from lead C2007(26) respectively.

Relay 2340 on operating, opens contacts 2345, 2346 and 2347 to open another point in the circuit for extending ground to leads C1409(14), C2004(20) and C2006(20) respectively. At contacts 2341 it energizes its upper winding from ground on lead C801(8). At contacts 2342 it opens another point in the original circuit for operating relay 2330, and connects lead C1498(14) to lead C1499(14) at contacts 2343. At contacts 2344 it restores relay 2460.

Relay 2460 opens contacts 2461 to restore relay 2450 and enable the common control register assigner 4500X to be associated with another register. Relay 2450 opens contacts 2452 to open another point in the circuit for operating relay 2430 and opens contacts 2453 to open another point in the circuit for extending a start ground from this register to the common control register assigner 4500X.

It will be recalled that relay 3220 on operating extends ground over lead C3299(25) to prepare a holding circuit for relay 2470. At contacts 3223 it returned resistance battery from the right side of the selected cross office register relay such as L1X through level A of switch MMCO to lead C2506(25), and contacts 2512 to ground through the lower winding of relay 2510. To perform a busy test, battery is simultaneously extended from relay 3560, in the selected cross office corresponding to relay L1X, through contacts 3556 to lead C3201(32) and through the wiper of level C of switch MMCO, contacts 3224 and lead C2507(25) to energize the lower winding of relay 2510.

If, in the meantime instead of battery through relay 3560, the cross office unit had placed ground on lead C3201(34) in a manner which will be explained, relay 2510 fails to operate and the register relay L1X restores, as the ground is extended to lead C2507(32) to shunt relays 2510 and L1X. Likewise if another register were attempting to seize the same cross office unit, a low resistance ground from a relay corresponding to 2510 is connected to lead C3201(32) and therefore to lead C2507(32). Relay 2510 or its corresponding relay in the other unit will operate as explained for a similar situation in the aforementioned specification. In this event the cross office unit will place ground on lead C3201(32) to shunt the register relay L1X.

Relay L1X1 restoring opens contacts L1X, L1X2, L1X3 and L1X5. Contacts L1X5 on opening restores relay 3220. The motor magnet stepping circuit is again completed from contacts L1X4, if another register relay in the group L2X–L25X is operated to maintain relay 3210X operated at contacts such as L25X2. This indicates the availability of another cross office unit. The operated register relay also maintains ground on lead C3199(24) at contacts such as L25X1 to maintain relay 2440 operated. Switch MMCO steps in search of the operated register relay, and on finding the same, the procedure for attempting to operate relay 2510 and testing for the busy or idle condition of the corresponding selected cross office unit is repeated.

If the cross office unit busy test is successful relay 2510 operates from the battery extended through relay 3560 to lead C2507(32). It opens contacts 2512 to disconnect lead C2506(32) and the resistance battery from the operated cross office finder register relay L1X for example from the lower winding of relay 2510. It closes contacts 2511 to extend the battery on lead C2507(32) through its upper winding to ground through winding of relay 2480. Relay 3560 in the selected cross office unit now operates in series with the upper winding of relay 2510 and relay 2480. Relay 2480 closes contacts 2481 to energize relay 2470. Relay 2470 closes contacts 2472 to complete its own holding circuit from ground on lead C3299(32).

Relay 3560 in the cross office unit operates to close contacts 3562 to connect lead C3201(32) to the upper winding of relay 3550. At contacts 3561 it opens a point in the circuit to relay 3420 to prevent the operation of that relay in the event another register tests for a preset cross office unit of the same character.

Relay 2470 on operating closes contacts 2478' to extend ground over lead C2407(10) to energize relay 1020. Relay 1020 energizes relay 1040 in a manner already explained, and it in turn completes the stepping circuit for switch MMIGS in a manner explained. It also extends ground on lead C2405(32), as before explained for lead C2405(24). Lead C2405(32) extends past contacts 3225, the level D wiper of switch MMCO to lead C3202(33) and the make contacts of operated slow-to-release relay 5910X to energize the motor magnet of switch MMIGX. This switch is similar to the switch MMIG1 described in conjunction with the distribution terminal unit 2800. It also operates as described for a corresponding switch in the previously mentioned specification to select an incoming selector switch such as 5200X1 associated with the cross office unit and having access to the desired incoming line circuit 300. The switch MMIGX is stepped to select switch 5200X1 in synchronism with switch MMIGS from the periodic ground applied over lead C2405(32) by relay 1040 to lead C3202(33), as previously explained.

Lead C2405(24) is then extended to the selected incoming selector switch 5200X1 on release of relay 5910X. Relay 5910X restores, when the switch motor magnet no longer receives its stepping ground and therefore fails to close its interrupting contacts. Relay 1050 in the finder unit is also then restored, and relay 1030 operates as before described. Switch MMITS is stepped under control of relay 1030 to a position corresponding to the incoming line circuit 300. Relay 1030 applies a periodic ground to lead C2405(32) to step the selected incoming selector switch 5200X1 to the incoming line circuit 300, as described for stepping the switch 5200X. Relay 1060 then operates as before described to extend ground to lead C2303(23).

Ground over lead C2303(23) in this case is extended over contacts 2335 to lead C2301(7) to operate relay 740. Relay 740 operates as previously described to close contacts 741 and connect battery from the lower winding of relay 730 to lead C2406(32), which now extends past contacts 3228, the wiper of level G of switch MMCO, to lead C3205(34) and ground through the winding of relay 3450. At contacts 742 it extends ground past contacts 818 to relay 832 to operate the same, if not already operated. Relay 3450 operates from the battery connected through the lower winding of relay 730.

It closes contacts 3451 to prepare a circuit to relay 3520. At contacts 3453 a circuit is completed to relay 3440 from ground at contacts 3532, as relay 3520 is normally operated in a preset cross office unit as will be explained. Ground from contacts 335, 345 and 496 in the incoming line circuit 300 is now extended over lead C601X(34) past the corresponding level of switch 5200X1 and past contacts 3445 and 3451 to energize relay 3520. At contacts 3444 ground is returned over lead C3201(32) to shunt down relays 2510 and 2480 in the Sequence Control Unit 2300. This ground also maintains relay 3550 shunted. 3447A circuit is completed to the timing control relay (not shown) whose operation will be briefly described later, as its function has already been described for a corresponding relay in the previously mentioned specification.

At contacts 3526 relay 3520 completes a circuit for shunting relay 3450. The direct ground therefrom is also extended to lead C3205(32) and over lead C2406(7) to energize the lower winding of relay 730. Relay 730 removes ground from leads C801(13)(23), C802(21), C803(25) and C804(31) as previously described. At contacts 739 ground is removed from lead C899(13). Relay 3520 completes its own holding circuit from contacts 3524 and 3511 to ground at contacts 3469. At contacts 3525 it completes a holding circuit for relay 3440 over contacts 3446. Relay 3450 restores to open the original operating circuit for relays 3440 and 3520, however they remain operated over their previously described respective holding circuits.

Ground removed from lead C804(31) restores relay 3130X so that any operated one of the register relays L1X–L25X is restored at contacts such as 3131X. Relay 3210X is restored at contacts such as L1X2 and relay 2440 is restored, when ground is removed at contacts such as L1X1 from lead C3199(31). Battery is therefore removed from the level B wiper of switch MMCO to restore relay 3220. Relay 3220 removes ground from lead C3299(25) at contacts 3222. At contacts 3228 it disconnects lead C2406(7) from lead C3205(34) to de-energize the lower winding of relay 730 which remains operated over its upper winding. Ground removed from lead C3299(25) restores relay 2470.

Relay 2470 on restoring opens contacts 2478' to remove ground from lead C2407(10) to restore relay 1020. Relay 1020 on restoring restores relays 1030 and 1040 so that switches MMIGS and MMITS are restored in a manner previously described. Relay 1060 also restores, when switch MMITS steps. It removes ground from lead C2301(23) to restore relay 740. When off-normal springs 1007 and 1007' open, ground is removed from lead C892(8). The upper winding of relay 730 is opened and therefore restored and it again places ground on leads C801(13)(23), C802(21), C803(25) and C805(31) for purposes previously explained. It also places ground on lead C899(13) to reoperate relay 1040 as soon as relay 1360 restores to initiate another translation.

In the meantime ground removed from lead C801(13) (23) opens the holding circuits for relays 1360, 2340 and 2330. Ground removed from lead C802(21) restores the operated one of the terminal register relays in each group TG1–TG6 and TT1–TT25 and OS1–OS3 or TF1–TF9, if operated, and 2010 and 2020. Ground is therefore removed from lead C1304(13) to restore relay 1360, as soon as the holding ground on lead C801(8) is removed. It reoperates relay 1340, as soon as relay 730 restores to place ground on lead C899(13), and initiate another translation of the DDI as explained.

*Unsuccessful preset cross office test*

In the event an operated register relay such as L1X becomes shunted down as explained, switch MMCO continues to step as previously explained in search of another operated register relay such as L2X. In the event, however, that another register relay was not operated or that none was originally operated, ground from contacts such as L1X1 is removed from or not applied to lead C3199(24) so that relay 2440 is restored or not operated. If operated, on restoring relay 2440 closes contacts 2444 to prepare a point in the circuit to relay 2430. At contacts 2445 it re-extends ground from contacts 2432 towards contacts 2336, 2337 and 2338, however, now contacts 2345, 2346 and 2347 are open, as relay 2440 has operated as explained. At contacts 2443 it again extends ground from contacts 2411 to lead C2409(7), which is extended to lead C1498(23) in a manner previously explained. This ground is now extended past contacts 2343 and 2362 to energize relay 2350. Relay 2350 prepares a holding circuit for itself through the lower winding of relay 2360 over contacts 2353 and 2371 to ground on lead C801(8). A search for an empty cross office unit is now initiated.

Relay 2440 is not energized, if none of the cross office register relays L1X–L25X were operated. Relay 2430 therefore eventually operates to open contacts 2433 and 2432. At contacts 2433 ground is removed from lead C2409(7) extending as described to lead C1498(23) to enable relay 2340 to operate. It opens the circuit to relay 2460 at contacts 2344, which restores to open the circuit to relay 2450. Relay 2430 also removes ground at contacts 2432 from leads C1409(14), C2004(20) and C2006(20) for already described purposes. Relay 2450 restores to open the circuit to relay 2430 at contacts 2452. Relay 2430 then replaces ground at contacts 2433 on lead C2409(7) to operate relay 2350 as just described. A search for an empty cross office unit is now initiated in a manner which will be described.

*Empty cross office unit test*

It will be recalled that relay 2350 is operated, when a message has a high precedence designation and is to be routed to a remote station; or when an idle distribution terminal unit is not found for a message having a high precedence designation; or when a preset cross office unit is not available for a message having low precedence designation that is to be routed to either a local or remote station. Relay 2350 initiates a test for an empty cross office unit as will be described.

At contacts 2352 relay 2350 opens the circuit to the lower winding of relay 2340 and to relay 2330. Relay 2330, if operated as a result of a previous preset cross office unit test, restores to close contacts 2334. At contacts 2356 ground from contacts 2313 is extended past contacts 2334 and 2364 to operate relay 2460. Relay 2460 operates to initiate a search by the common control register assigner 4500X for this register as explained. On finding the same, it operates relay 2450, as described. With relays 2350 and 2450 operated, ground is extended from contacts 2432 and 2445, past contacts 2358, 2359 and 2359' respectively, past contacts 2365, 2366 and 2367 respectively and over contacts 2457, 2458 and 2456 respectively to leads C2408(21), C2001(20), and C2006(20) respectively.

Ground on lead C2006(20) is extended past the contacts of the operated terminal register relay such as TT1 to a lead such as 2007(26) corresponding to the operated relay in a manner similar to that described before. Ground on lead C2001(20) is extended past the contacts of the operated terminal register group relay such as TG1 to a lead such as C2002(26). Ground on lead C2002(26) operates the relay 2610F in the Terminal Test United 2600 for example corresponding to relay TG1. Ground on lead C2007(26) is therefore extended past contacts 2610F1 of the 25 operated contacts of relay 2610F to the Terminal Block 2680. This terminal corresponds to the particular station and if it is a single channel station or a local station no jumper is provided. If the station is part of a multichannel arrangement the terminal is jumpered in a manner which will be explained to enable the proper selection of one of the channels.

In the meantime, ground on lead C2408(21) is extended past the unoperated contacts OS3e, OS2e and OS1e of the speed register relays OS1–OS3, if unoperated, as in the case of a message originally routed to a distribution terminal unit, to lead C2198(37) corresponding to speed at which the page printer at the local station can receive transmission. Lead C2198(37) extends to the normal contact of level B of switch MMPR1X at each cross office unit arranged to transmit at that speed. In the event the message is being routed to a remote station one of the relays OS1, OS2 or OS3 corresponding to the speed at which the station can receive a message is operated. Ground on lead C2408(21) is then forwarded past contact OS3f, OS2f or OS1f respectively to lead C2198(37) etc. respectively and to the normal contact on switches corresponding to MMPR1X at each cross office unit arranged to transmit at a corresponding speed.

Lead C2198(37) extends in a manner similar to that explained for a similar lead in the previously mentioned application to the normal contact on level B of a switch such as MMPR1X in the cross office units having a transmitter that operates at the speed at which the reperforator or page printer at the desired station receives character transmission. Each empty cross office unit has a switch corresponding to MMPR1X in its normal position so that, if the ground is extended thereto, it is extended over the switch wiper to operate relay 3420 in a manner explained for the preset cross office unit test.

In this case relay 3420 extends ground from contacts 3563, 3549 and 3421 to lead C3174(31) to energize a corresponding one of the register relays L1X–L25X. It will be noted that relay 3540 is unenergized in the event the cross office unit is empty to enable ground to be extended from contacts 3563 for operating the corresponding register relay in cross office finder 3100X.

The operated register relay or relays extend ground on lead C3199(24) to operate relay 2440, while the cross office finder switch MMCO searches for and finds an operated one of the register relays L1X–L25X in a manner previously explained. On finding an energized register relay such as L1X, relay 3220 is energized to extend ground over lead C3299(25). Relay 2510 operates in series with relay 3560, if the test is successful in a manner previously explained. Thereafter relays 2480 and 3560 are energized in a manner previously explained. Relay 2480 completes the circuit to relay 2470, which completes its own holding circuit to ground on lead C3299(32) as before explained.

In the meantime relay 2440 on operating removes ground from lead C2409(27), which in turn extends in a manner previously described to the lower winding of relay 2360. Relay 2360 therefore operates in series with relay 2350 to energize its upper winding over contacts 2361 to ground on lead C801(8). At contacts 2362 it opens another point in the original circuit to relay 2350, which remains operated through the lower winding of relay 2360. At contacts 2363 relay 2360 connects lead C1499(14) to lead C891(8) to prepare for an intercept test, if necessary. Relay 2440 opens contacts 2444 to prevent operation of relay 2430. It also opens contacts 2445 to remove ground from leads C2006(20), C2408(21) and C2001(20). Ground removed from lead C2001(20) restores relay 2610F, while ground removed from lead C2408(21) opens a point in the circuit to relay 3420.

Relay 2470 operating on a successful test, it will be recalled, extends ground over contacts 2478′ to lead C2407(10) to energize relay 1020. A sequence of operations is then initiated for setting the incoming selector switch such as 5200X1 associated with the selected cross office unit in a manner previously described. In addition, ground is extended from contacts 2354 past contacts 2473 to lead C2488(22) to energize relay 2210. At contacts 2474 ground is extended from contacts 2355 to lead C1505(15) to energize relay 1595. It energizes relay 1580 in a manner previously described, which in turn energizes the motor magnet of switch MMPS.

Simultaneously, relay 1580 extends the energizing ground for the motor magnet of switch MMPS past contacts 1581 to lead C1449(32), contacts 3227 and the level F wiper of switch MMCO associated with the selected cross office unit to lead C3204(35) to energize the motor magnet of the precedence switch MMPR1X in the selected empty cross office unit 3300. Switch MMPS is then stepped to a position corresponding to the message precedence, in a manner described for stepping switch MMPR2 in Terminal Unit 2800, by the periodic application of ground thereto under control of relay 1580. In conjunction Switch MMPR1X in the cross office unit is stepped in synchronism with switch MMPS to a setting corresponding to the message precedence in a described manner. Relay 1590 then restores as explained, and closes contacts 1591 to connect lead C2303(10) to lead C2302(22).

During the time the precedence switch MMPR1X and the incoming selector switch 5200X1 in the Cross Office Unit 3300 are being set to the message precedence and the incoming line circuit 300 respectively, relay 2210 has closed contacts 2214 to extend ground past closed contacts 2253, the self-interrupting springs of the motor magnet of switch MMOGS and contacts 2215 to energize relay 2230. At contacts 2217 it extends ground past contacts such as TT1c of the operated terminal register terminal relay TT1 to a corresponding bank contact on switch MMTS to mark that contact accordingly. The ground for energizing relay 2230 is extended from contacts 2253, the normal contact and wiper of level A of switch MMOGS, and on energization of relay 2230 past contacts 2231 and 2232 respectively. From contacts 2231 the ground is extended to energize the motor magnet of switch MMOGS, while the ground at contacts 2232 is extended past contacts 2255 to lead C2289(32). The ground on lead C2289(32) is extended past contacts 3226, the level E wiper of switch MMCO to lead C3203(33A), past the contacts of energized relay 5920X to energize the motor magnet of switch MMOG1X in the selected cross office unit. Switch MMOG1X is similar to a correspondingly designated switch in the aforementioned application and functions to select an outgoing selector switch such as 4800X having access to the remote station or local station respectively.

The motor magnet of switch MMOGS opens its self-interrupting contacts to deenergize relay 2230. Relay 2230 opens contacts 2231 and 2232 to deenergize the respective motor magnet of switch MMOGS and switch MMOG1X in the cross office unit. Each then takes one step. The wiper of levels A and B of switch MMOG2 are then connected to their respective first contact and a lead such as TA1(20), which extends over cable C2005(20) to the contacts such as TG1f of a group register relay such as TG1. If contacts TG1f are unoperated, ground therefrom maintains slow-to-release relay 2250 energized over the level B wiper. The original operating circuit for relay 2250 is opened, when the switch steps from the normal contact connected to ground on lead C707(7). The switch self-interrupting contacts close to reenergize relay 2230 and the procedure for stepping the switch MMOGS and MMOG1X is repeated with the exception that ground for energizing the respective motor magnets is extended from contacts TG1f, lead TA1(22) and the level A wiper of switch MMOGS. In the cross office unit, the off-normal springs holding relay 5920X operated, open when switch MMOG1X takes its first step. Before relay 5920X can restore, the switch motor magnet receives another energizing spurt if the switch is stepped past the first outgoing selector switch. It closes an associated set of self-interrupting springs to provide another energizing spurt to relay 5920X to hold it operated.

When the switch wipers encounter contacts of the operated group register relay the ground marking is not provided to the bank contacts. In this event, relay 2230 energizes as before, however, ground is not forwarded over the level A wiper to energize the motor magnet of switch MMOGS or the motor magnet of switch MMOGX1 in the cross office unit. Relay 2250 eventually restores to open the operating circuit for relay 2230 at contacts 2253, and instead closes an operating circuit for relay 2240 over contacts 2214, 2252, 2251, the self-interrupting springs of the motor magnet of switch MMTS, contacts 2212 and 2223. At this time, switches MMOG1X and MMOGS have been stepped to a contact corresponding to the selector switch such as 4800X having access to the outgoing channel or distribution terminal unit associated with the desired remote station or local station page printer respectively. In the cross office unit the circuit to slow-to-release relay 5920X is opened at the off-normal springs, when switch MMOGX1 takes its first step. If the motor magnet receives another energizing spurt, it closes the interrupting springs for holding relay 5920X operated, before the relay restores. Relay 5920X maintains lead C3203(32) connected to the switch motor magnet. Lead C2289(32) extending to lead C3203(32) is extended to the motor magnet of the selected outgoing selector switch 4800X over the level A wiper of switch MMOGX1 and lead C4806X(48), on release of relay 5920X. Switch 4800X is selected on the basis of which one of the relays TG1–TG6 is operated and is arranged to provide access to the desired station.

Relay 2240 on energizing extends ground from contacts 2222, past contacts 2241 to energize the motor magnet of switch MMTS. Simultaneously, at contacts 2242 it extends ground from contacts 2222, past contacts 2254 to lead C2289(32) extending to lead C3203(33a). Lead C3203(33a) now extends to the level A wiper of switch MMOGX1 and over lead C4806X to the motor magnet of switch 4800X to energize the motor magnet of the selected outgoing selector switch. The motor magnet of switch MMTS opens its self-interrupting springs to deenergize relay 2240. It in turn opens the energizing circuits for the motor magnet switch MMTS and the outgoing selector switch 4800X at contacts 2241 and 2242 respectively to deenergize those motor magnets and each switch takes one step. At this time, ground is extended from contacts 2217 past the operated contacts such as TT1c to the contact on switch MMTS corresponding to the operated one of the terminal register relays. Relay 2240 is energized, when the motor magnet of switch MMTS recloses its self-interrupting contacts, and it again energizes the motor magnets of switches MMTS and 4800X over described circuits. Relay 2240 is then deenergized, as explained, to in turn deenergize the motor magnets and the wipers of each switch take another step. When the wiper of switch MMTS encounters the grounded contact, the ground thereon is extended to operate relay 2220.

Relay 2220 locks operated over contacts 2224 and 2213. It opens the circuit for relay 2240 at contacts 2223 to prevent operation of that relay, and at contacts 2222 prevents the reenergization of the motor magnets of switches MMTS and the outgoing selector switch 4800X. The wipers of outgoing selector switch 4800X are now set to the terminals corresponding to the desired station. At contacts 2221 relay 2220 connects lead C2302(15) to lead C2301(8).

It will be recalled that relay 1060 is operated, after the incoming selector switch 5200X1 is stepped under the control of switch MMITS. It extends ground from contacts 1062 over lead C2303(15), and when the precedence switch is set, the ground is extended by relay 1590 past contacts 1591 to lead C2302(22). Ground on lead C2302(22) is extended past contacts 2221 on operation of relay 2220 to lead C2301(8) to operate relay 740.

When the outgoing selector switch 4800X is stepped its off-normal springs 4888 close to forward ground over lead C4802(35) to contacts 3533. With switch MMPR1X in cross office unit 3300 stepped, off-normal springs 3788 are close to extend the ground from contacts 3533 to relay 3530, which operates. At contacts 3533 it opens its original operating circuit and completes a holding circuit for itself from contacts 3532 and off-normal springs 3788. At contacts 3531 it connects ground to the side of the upper winding of relay 3550, but this relay remains shunted by ground on lead C3201(32). At contacts 3532 a holding circuit is prepared for relay 3440. At contacts 3534 relay 3530 completes an alternate holding circuit for itself from ground on lead C4802(33a).

Relay 740 closes contacts 741 to connect the lower winding of relay 730 to lead C2406(32) extending to lead C3205(34) in a manner previously explained to ground through relay 3450. At contacts 742, it operates relay 830, if not already operated.

Relay 3450 operates as previously explained to operate relay 3440 from ground at operated contacts 3532. Relay 3440 operates to place direct ground on lead C3201(32) and release relays 2510 and 2480 as already explained. At contacts 3445, it completes a circuit for relay 3520 from ground at the incoming line circuit 300 extended over a wiper of the incoming selector switch 5200X1, as explained. At contacts 3443 battery from contacts 3535 is extended from relay 3510, past the corresponding level of switch 5200X1 to lead C5201X(5) extending to line circuit 300. Relay 3520 extends direct ground back on lead C3205(32) at contacts 3526 to shunt relay 3450 and operate the lower winding of relay 730. At contacts 3525 it completes a holding circuit for relay 3440 over contacts 3446, and at contacts 3524 completes its own holding circuit over contacts 3511 and key contacts 3469. At contacts 3523, it opens a possible circuit from the incoming line circuit ground to relay 3460. At contacts 3522 ground is extended past restored contacts 3452, through contacts 3445 to lead C601X(4) extending to the incoming line circuit 300.

Relay 730 is energized in a manner previously explained, when direct ground is applied to lead C3205(32). It removes ground from leads C801(13)(23), C802(21), C803(25) and C804(31). Ground removed from lead C804(32) restores relay 3130X. It restores the operated register relays L1X–L25X to in turn restore relays 3210 and 3220, as explained. Ground is removed from lead C3199(24) to restore relay 2440, while ground removed from lead C3299(25) restores relay 2470. It opens contacts 2478' to remove ground from lead C2407(10) and restore relay 1020. At contacts 2474 ground is removed from lead C1505(15) to restore relay 1595, and at contacts 2473 ground is removed from lead C2488(24) to restore relay 2210. Switches MMPS, MMIGS and MMITS and relays 1020 and 1030 now restore as previously explained. At off-normal springs 1585, 1007 and 1007' respective grounds are removed from lead C892(8).

The operated one of relays TG1–TG6, TT1–TT25 and OS1–OS3 also restore, when ground is removed from lead C802(21). Likewise relay 2020 and 2010 restore on removal of ground from lead C802(21). Ground is therefore removed from lead C1304(13) and C801(8) to restore relay 1360. Ground removed from lead C801(23) opens the circuit extending through the lower winding of relay 2360 to relay 2350.

Relay 2210 on restoring opens contacts 2213 to open the holding circuit to relay 2220, which restores. At contacts 2211 a self-interrupted homing circuit is completed for the motor magnet of switch MMTS from off-normal springs 2209, and that switch steps home. At off-normal springs 2008 it removes one ground from lead C892(8). Contacts 2216 close a self-interrupted homing circuit for the motor magnet of switch MMOGS from off-normal springs 2219, and switch MMOGS steps home. At off-normal springs 2218, another ground is removed from lead C892(8), when the switch is home. When the switches MMPS, MMIGS, MMITS, MMTS and MMOGS have each been stepped home, off-normal springs 2208, 2218, 1007, 1007' and 1585 are open to remove ground from lead C892(8) and restore relay 730. Relay 730 on restoring places ground on lead C801(13)(23), C802(21), C803(25) and C804(31). At contacts 739 it re-extends ground over lead C899(13) to reenergize relay 1340. A translator seizure operation and another translation then occur in a described manner.

*Unsuccessful empty cross office unit test*

In the event that one of the register relays L1X–L25X was not operated on the test for a cross office unit or if operated fails to remain so during the busy test, as explained, relay 2440 is not operated or restores respectively as explained. In the event relay 2440 is not operated, relay 2430 is operated to remove ground from lead C2409(7) at contacts 2433 and at contacts 2432 from leads C2408(21), C2006(20) and C2001(20). The latter restores relay 2610F. Ground removed from lead C2409(7) enables relay 2360 to operate, and it opens contacts 2364 to restore relay 2460. Relay 2460 in turn restores relay 2450, which opens the circuit to relay 2430 and it restores to reclose ground to lead C2409(7). If relay 2440 were operated and restored before a cross office unit test is complete, ground is again extended over lead C2409(7) without relay 2430 operating as explained.

Lead C2409(7) extends as before described, either to lead C1498(23) or C1499(23) depending on whether the message is high or low precedence. From lead C1498(23) the ground is extended through contacts 2343 and 2363 to lead C891(8), while from lead C1499(23) the ground is extended directly through contacts 2363 to lead C891(8). From lead C891(8) ground is extended, in the event that this is a first translation, and therefore relay 830 is not operated over contacts 831 to contacts 751 and lead C789(23), past contacts 2383 and 2375 to lead C2305(21) and contacts IC2c to energize relay IC2.

Relay IC2 opens contacts IC2a to deenergize the operated one of relays TG1–TG6 and TT1–TT25, and relays 2010 and 2020. This removes ground from lead C1304(13) extending to relay 1360, which remains operated over contacts 1368 and lead C801(8). At contacts IC2c relay IC2 opens its original operating circuit and locks operated to ground on lead C802(8) over contacts IC2b. At contacts IC2f it extends ground to lead C2306(23) and contacts 2374 to energize relay 2370. At contacts IC2e it removes ground from the corresponding terminal of level A of switch MMTFA and extends resistance battery thereto over contacts IC2d to mark that contact accordingly. At contacts IC2h it extends ground over lead C2103(25) to operate relay 2570. At contacts IC2g it extends ground over lead C2199(8) to energize the upper winding of relay 810. At contacts IC2i ground is removed from lead C2701-151(27) and resistance battery is extended thereto at contacts IC2j. This resistance battery is extended over lead C2701-151(27) to mark level A of switch 2700J indicated in the block 2700A–2700J.

Relay 810 closes contacts 811 to extend ground on lead C1304(13) so that relay 1360 is held operated, after relay 730 operates on a successful cross office intercept test. This prevents another translation from taking place. At contacts 813 lead C808(23) is disconnected from lead C2102(21), and at contacts 814 lead C2102(21) is connected through contacts 831 to lead C789(23). At contacts 812 ground is maintained on relay 860 and at contacts 815 the upper winding of relay 720 is energized. At contacts 816 ground is removed from lead C899(13) and at contacts 817 a possible circuit for relay 830 is opened. At contacts 818 relay 810 energizes its upper winding at contacts 1317, and at contacts 819 a circuit is prepared to relay 750. A cross office intercept test is now initiated as will be described.

In the event relay 830 was operated indicating that at least one previous translation had resulted in a cross office unit or distribution terminal unit being set to the incoming line 300, ground is not extended from lead C891(8) to lead C789(23) for operating relay IC2 on release of relay 2440 or its failure to operate, as contacts 831 are open. Instead ground on lead C891(8) is extended past contacts 832 and 822 to operate relay 840. It closes contacts 841 to maintain relay 860 energized. At contacts 842 ground is extended through the lower winding of relay 820, past contacts 853 to lead C902 (9). Any cross office unit or distribution terminal unit connected to the incoming line circuit will now be disconnected therefrom in a "flush out" operation, before the test for an intercept unit takes place.

*Flush out*

Ground on lead C902(9) from relay 820 is extended past contacts 938, the wiper of level I of switch MMIF to lead C404(4) extending to the incoming line circuit 300. This lead extends through the key contacts 405 to battery through the lower winding of relay 490. Relay 490 operates in this circuit, while relay 820 does not. At contacts 493 a circuit is prepared for relay 560. At contacts 492 an energizing circuit for the upper winding of relay 490 is prepared, and at contacts 494 the ground on lead C601X(28)(34) from the connected cross office units and/or distribution terminal units is connected past contacts 553 to the resistance battery at the right side of relay 550 to maintain relay 550 shunted. At contacts 495 ground is connected from contacts 649' to lead C5201X(28) and to the left side of relay 550 respectively. At contacts 496 the direct ground extended to lead C601X(28)(34) from contacts 335 is disconnected therefrom.

Ground on lead C5201X(28)(34) is extended through a corresponding level of each incoming selector switch such as 5200X and 5200X1 associated with the incoming line circuit and over contacts 2831 to operate relay 2840 in the distribution terminal unit 2800 and/or past contacts 3443 to operate relay 3510 in the cross office unit respectively.

The relay corresponding to 2840 in each connected distribution terminal circuit closes its associated contacts 2841 to extend ground from contacts 2923 for holding relay 2830 operated, and at contacts 2842 opens the holding circuit for relay 2850. At contacts 2843 the resistance battery from the page printer is extended to the signal lead of the incoming line circuit transmitter for no purpose at the present time. At contacts 2845 relay 2840 opens a possible operating circuit for relay 2940. Relay 2850 restores when its holding circuit is opened. It opens contacts 2851 to disconnect the direct ground from lead C2701c(27). At contacts 2852 it opens a holding circuit for relay 2830 which remains operated over contacts 2841, etc. At contacts 2855 direct ground is removed from lead C601X(4) and resistance battery from the winding of relay 2850 is connected over contacts 2854 and 2822 to lead C601X(4) extending as described over contacts 494 and 553 to the right side of relay 550 in the incoming line circuit 300.

The relay corresponding to 3510 in each connected cross office unit operates to open its associated contacts 3511 and open the locking circuit to relay 3520. At contacts 3513 ground from key contacts 3469 is connected past contacts 3446 to hold relay 3440 operated. At contacts 3514 it connects the cross office unit reperforator to the incoming line circuit transmitter signal lead for no purpose at the present time. Relay 3520 opens contacts 3522 to remove the ground from lead C601X(4) extending to the incoming line circuit and instead connects battery from the winding of relay 3460, through contacts 3523, 3452 and 3445 to lead C601X(4) and the right side of relay 550. At contacts 3526 it removes the direct ground from lead C3205(32), and at contacts 3525 opens one holding circuit for relay 3440, which remains operated over contacts 3446, 3513 and 3469.

When all grounds have been removed from lead C601X(4) and replaced by battery through relays such as 3460 and 2850 respectively in each cross office unit and/or distribution terminal unit respectively associated with the line circuit 300, relay 550 operates from the ground extended to its left side from contacts 495 and 649'. It closes contacts 551 to connect battery from the winding of relay 560 past contacts 446' and 493 to lead C404(9) extending as before described to ground through the lower winding of relay 820. Relay 820 operates in this circuit, but relay 560 does not.

Relay 820 energizes its upper winding over contacts 823 and 1317X. At contacts 822 it opens the circuit to relay 840, which restores. At contacts 821 it extends the ground on lead C891(23) past contacts 751 to lead C789(23) and from there past contacts 2383 and 2375 to lead C2305(21) extending past contacts IC2c to energize relay IC2. Relay IC2 operates contacts IC2q to extend ground over lead C2199(8) for energizing the upper winding of relay 810. It also at contacts IC2f extends ground over lead C2306(23) and contacts 2374 to energize relay 2370. In addition relay IC2 as before described releases the operated TG, TT and OS relays, if operated, and relays 2010 and 2020. Ground is therefore removed from lead C1304(13). Relay 810 at contacts 811 extends ground over lead C1304(13) to maintain relay 1360 operated and prevent the initiation of another translator operation, after completion of the cross office intercept test. Relay 810 also operates relay 720; removes ground from lead C899(13); opens the original circuit for relay 820, which is held over to holding circuit and at contact 818 energizes its upper winding as previously described. A test for a cross office intercept unit is now initiated as will be described.

Relay 840 restores to open contacts 841 and 842 and close contacts 843. Opening contacts 841 removes one holding ground for relay 860, however, it is now held operated over contacts 812, etc. Opening contacts 842 removes ground from lead C902(9) extending over lead C404(4) to the lower winding of relay 490 so that relay 490 in the incoming line circuit 300 restores. At contacts 495 it disconnects ground from lead C5201X(28)(33) to restore relays 2840 and 3510 in any connected distribution terminal unit and/or cross office unit respectively.

Relay 2840 on restoring opens one holding circuit to relay 2830 at contacts 2841, however, relay 2830 remains operated over contacts 2833, 2943 and 2923. At contacts 2845 a circuit is completed from ground at contacts 2927 over contacts 2827, 2836 and 2856 to relay 2940. Relay 2940 operates contacts 2944 to complete a holding circuit for itself from the respective off-normal springs of switches MMPR2 and MMIG1 and the incoming selector switch 5200X. It opens contacts 2943 to restore relay 2830, which opens the original operating circuit for relay 2940. At contacts 2942 relay 2940 opens the circuit for providing ground from lead C2701b(27) to relay 2920, and ground is placed on lead C2701b(27) at contacts 2941 to retain the unit busy to any testing register. With relay 2830 restored to open contacts 2832, the holding circuit for relay 2920 is opened and that relay restores.

At contacts 2926 relay 2920 completes a self-interrupted homing circuit for switch MMPR2 through the switch off-normal springs and that switch homes to open one of the holding grounds for relay 2940. At contacts 2924 relay 2920 completes a self-interrupted homing circuit for the selector switch 5200X through its off-normal springs. The switch homes to open its off-normal springs and open another holding circuit for relay 2940. Likewise, at contacts 2925 a self-interrupted homing circuit for switch MMIG1 is completed through the off-normal springs of the switch and that switch homes to open its own self-interrupting circuit and the holding ground for relay 2940. When all holding grounds for relay 2940 have been opened, relay 2940 restores to remove the ground from lead C2701b(27) and the distribution terminal unit 2800 is again prepared for seizure by another register. In the event terminal unit 2800 has a terminal converter unit associated therewith, lead C4301(43) is used as a busy test lead and relay 4340 in the converter is operated. Contacts 2941 on opening remove the ground from lead C4301(43) and restores relay 4340.

In the cross office unit release of relay 3510 opens contacts 3513 to restore relay 3440. It opens contacts 3444 to remove ground extended through contacts 3556 and 3562 for shunting relay 3550. Relay 3550 now operates in series with relay 3560 over contacts 3562 to ground at contacts 3531 and at the off-normal springs of the incoming selector switch 5200X1; at the off-normal springs of switch MMIGX and over lead C(33a) and the off-normal springs of switch MMOG1X.

At contacts 3556 relay 3550 opens a point in the original operating circuit for relay 3560, and completes its own holding circuit through contacts 3557. At contacts 3555 it maintains ground on lead C3201(32) to maintain the cross office unit busy to a testing register. At contacts 3551' it extends a self-interrupted homing circuit for switch MMIGX. When switch MMIGX steps home its off-normal springs open to restore the homing circuit. In addition one set of off-normal springs on opening removes one of the operating grounds for relay 3550. At contacts 3553 relay 3550 extends ground over contacts 3442 to the incoming selector switch 5200X1, and operated off-normal springs thereat to complete a self-interrupted homing circuit for that switch. When the switch steps home it removes one ground at its off-normal springs for holding relay 3550 operated. At contacts 3552 ground is extended from contacts 3722 past contacts 3542 to lead (D33a) extending through off-normal springs of the outgoing selector switch 4800X to complete a self-interrupted homing circuit for that switch. When that switch steps home its off-normal springs open to remove one of the holding grounds extended over lead C4802(35) for relay 3530. If relay 3540 is operated, indicating a message in storage, the homing circuit for the outgoing selector switch is incomplete and the switch remains positioned to the station terminals. At contacts 3551 relay 3550 connects lead B(33a) past contacts 3541 to lead A(33a) to complete a self-interrupted homing circuit for the motor magnet of switch MMOG1X. When that switch steps home its off-normal springs open and it removes one of the holding grounds for relay 3550 extended over lead C(35) and contacts 3543. It will be noted that the homing circuit for switch MMOG1X remains incomplete, if relay 3540 is operated. Switch 4800X and switch MMOG1X therefore remain in position, if a message is already in storage at the unit to permit it to be transmitted to the desired station. At contacts 3554 a self-interrupted homing circuit for switch MMPR1X is completed over contacts 3544 and the switch off-normal springs. When that switch homes it opens its off-normal contacts 3788 to remove another holding ground at contacts 3532 from relay 3530. With switches MMPR1X and outgoing selector switch 4800X in their respective home positions relay 3530 restores to open contacts 3531. With switches 5200X1 and MMIGX home and contacts 3531 open, relays 3550 and 3560 restore, and at contacts 3555 ground is removed from lead C3201(32) to enable another register to seize cross office unit. It will be noted that with relay 3540 operated only the incoming selector switch 5200X1 and switch MMIGX are stepped home, and that their respective off-normal springs remove the holding grounds for relays 3550 and 3560 to restore those relays. Relay 3540 being operated prevents the grounds at contacts 3531 or from switches MMPR1X, 4800X or MMOG1X from holding relays 3550 and 3560.

*Cross office intercept test*

A cross office intercept unit must be seized in the event a test for an empty cross office unit is unsuccessful. In this case relay IC2 is operated to in turn operate relays 2370, 2570 and 810 as described. Relay 720 is operated by relay 810 as explained. A cross office intercept unit must also be seized in the event an intercept translation is indicated by the translator operating relay IC1 and relay 720 as before explained. In addition relay 810 may have been operated directly as a result of a trouble condition such as before described. In this case a cross office intercept position must also be seized.

Relay IC1 operates relay 1360 by extending ground over lead C1304(13) from contacts IC1b as before explained, and connects lead C2101(7) to lead C891(8). Relay 1360 on operating closes ground to lead C1306(24) to operate relay 2410. It in turn extends ground over lead C2409(7) to lead C2101(21), which is extended through contacts OS3d, OS2d and OS1d to contacts IC1c and lead C891(8) instead of contacts IC1d and lead C2102(8). Ground on lead C891(8) is extended past contacts 831 and 751 to lead C789(23) for operating IC2 as explained, unless relay 830 is operated, indicating a previous translation has taken place. Relay IC2 operates relays 2370, 2570 and 810, as explained. An intercept operation is now initiated.

In case relay 830 is operated, a "flush out" operation takes place, as described, to disconnect any associated cross office unit and/or distribution terminal unit from line circuit 300. Relay 820 then operates as explained to connect lead C891(21) to lead C789(23). Relay IC2 is then operated to in turn operate relays 2370, 2570 and 810 as described.

Relay 810, if directly operated as a result of a trouble condition, extends ground over lead C1304(13) to operate relay 1360. At contacts 812 it operates relay 860. Relay 1360 operates relay 2410 which extends ground over lead C2409(7) to lead C2101(21). As the terminal register relays are not operated, this ground is extended to lead C2102(8) and past contacts 814 to relay 840 or over lead C789(23) to relay IC2 depending on whether or not previous translations have taken place. If a previous translation has occurred a "flush out" procedure takes place as described and relay IC2 is then operated. At contacts 815 the upper winding of relay 720 is energized. Relay 2370 is operated as described by relay IC2.

Relay 2370 on operating opens its original operating circuit at contacts 2374 and extends the ground on lead C789(7) and contacts 2383 directly thereto at contacts 2273. At contacts 2271 it opens the holding circuits for relays 2350 and 2360, if operated, to restore relay 2350. The upper winding of relay 2360 remains energized by ground on lead C801(8). At contacts 2372 relay 2370 prepares a circuit for relay 2380 to ground on lead C801(8). At contacts 2375 it disconnects ground from lead C2305(21), however relay IC2 remains operated over its holding circuit. At contacts 2376 ground is extended from contacts 2313, 2334 and 2357, past contacts 2384 to operate relay 2560. Relay 2560 connects ground through the winding of relay 2550 to leads C2502(22) and C2501(22) and prepares a circuit for relay 2540 all as explained.

It will be recalled that on operating relay IC2 forwards resistance battery from contacts IC2d to mark a corresponding contact of level A of switch MMTFA. Ground from contacts such as TF1d is forwarded to step switch MMTFA in the manner previously explained in search of contact 10 marked with resistance battery by relay IC2. On stepping to contact 10, the level A wiper forwards resistance battery to operate relay 2550 in a manner previously explained, and switch MMTFA terminates further stepping. Relay 2550 connects ground through relay 2540 to both leads C2401(22) and C2503(22) respectively in a manner explained. With switch MMTFA on contact 10 these leads are extended to the motor magnet and level A wiper of the intercept unit terminal finder switch 2700J indicated by the block marked 2700A–2700J. Only level A of this switch is indicated. The terminal finder switch 2700J then steps in a manner described for switch 2700 in search of an idle intercept unit as indicated by resistance battery forwarded over lead C2701–151(27) by relay IC2.

Lead C2701–151(27) extends to a terminal block (not shown) associated with switch 2700J, the first level A of which is indicated in the block marked 2700A–2700J. The intercept lead C2701–151(27) extends to the terminal block associated with switch 2700J level A and is multipled to contacts 1–15 of switch 2700J level A; to contacts 17–32 and to contacts 34–49, while contacts 16, 33 and 50 are connected to ground. Thus assuming switch 2700J is in its home position, when relay 2550 in the Sequence Control Unit is operated, ground is extended over the level A wiper and the lead C2202q(22) from switch 2700J level A to lead C2503(25), past contacts 2553 and a circuit already described to lead C2401(22) to energize the motor magnet of switch 2700J. It steps its wipers as described for switch 2700. The wiper of level A finds resistance battery extended over lead C2701–151(27) on stepping to its first contact to operate relay 2540 in a manner already described. Relay 2540 locks operated as explained and extends lead C799(7) to relay 2510. It will be noted that connecting lead C2701–151(27) in the aforementioned arrangement to level A of switch 2700J permits each of the cross office intercept units to be tested at these different positions on switch 2700J, without the switch being stepped home. Therefore each cross office intercept unit is connected to three different contacts on switch 2700J. One contact for each unit being in group 1–15, another being in group 17–32 and the last being in group 34–49.

Switch 2700J is then associated with the first cross office intercept unit 3800 for example of the fifteen intercept units provided in the system. Lead C795(7) extending from ground over lead C799(7) and relay 2510 is then extended from the register over the contacts such as 2791 (not shown) associated with terminal finder switch 2700J to a busy test lead such as C2701b(39), for example, extending to the first Cross Office Intercept Unit 3800. In a manner similar to that explained for the Distribution Terminal Unit 2800, lead C2701b(39) extends through contacts such as 3941 to battery through relay 3930. Relay 3930 does not operate in this circuit, while relay 2510 does.

Relay 2510 operates in an explained manner, if the unit is idle, and closes a circuit for relay 2480 in series with relay 3930. Relay 2480 completes a circuit for relay 2470, which opens the stepping circuit for the motor magnet of the terminal finder switch via lead C2401(22) at contacts 2475.

At contacts 2479' relay 2470 extends ground to operate relay 2580. At contacts 2476 relay 2470 now extends ground from contact 2377 to lead C1404(14), and if one of the two higher precedence relays 1480 or 1490 is operated, this ground is extended past contacts 1482 or 1492 respectively to lead C1449(24), contacts 2477, 2548, lead C2798(27), over level D (not shown) of switch 2700J and a lead such as C2710d(39) to operate the high precedence signal relay 3970 in the cross office intercept unit. Relay 3970 locks operated over contacts 3972 and key contacts 3973. At contacts 3971 lamp 3974 is lighted to signal the presence of a high precedence message. At contacts 2478′ ground is extended by relay 2470 over lead C2407(10) to operate relay 1020. Relay 1020 operates to set switch MM1G2 and the incoming selector switch 5200X2, over lead C2405(25) extended to lead C2797(27), level E (not shown) of switch 2700J and lead C2710e(38), to the incoming line circuit 300 in a manner already explained for switches MMIG1 and 5200X.

When the switches are set relay 1060 operates in an explained manner to ground lead C2303(23) extending through contacts 2378 to lead C2301(7) to operate relay 740. Relay 740 connects the lower winding of relay 730 over lead C2406(24) and over already described contacts to lead C2799(27). Lead C2799(27) extends through level C (not shown) of switch 2700J to lead C2710c(38) and ground through relay 3830.

Relay 3830 operates in this circuit to operate relay 3840 at contacts 3831. Relay 3840 extends direct ground to relay 3930 and to lead C2710b(27) at contacts 3842. This holds relay 3930 operated and shunts down relays 2510 and 2480. At contacts 3846 it connects relay 3860 through contacts 3832 to ground on lead C601X(4) extending to the line circuit 300. Relay 3860 extends direct ground to lead C2710c(27) at contacts 3861 and operate relay 730 in an explained manner. The direct ground shunts relay 3830 to restore that relay. Relay 3840 holds operated however over contacts 3845, 3943 and 3935. Relay 3860 holds operated over contacts 3863, 3852 and 3935. It therefore provides an additional circuit for relay 3840 over contacts 3845, 3862 and 3935.

*Unsuccessful cross office intercept test*

If switch 2700J finds ground on lead C2710b(39) either from contacts 3842 or from 3942 indicating the intercept unit is busy, relays 2480 and 2510 in the testing register fail to operate. Likewise relay 2470 fails to operate. The ground on lead C2710b(39) is extended over leads C795(7), C799(25) and lead C2401(22) to a lead such as C2201a(27) extending to the motor magnet of switch 2700J to energize the motor magnet. It steps in a self-interrupted manner to the next contact, and tests the next cross office intercept unit in a manner described for unit 2800. If the unit is idle the incoming selector switch therein is set to line circuit 300 and relay 730 is operated as explained above. If the next unit is busy, the switch continues to step in search of an idle one of the fifteen cross office intercept units. If it finds none, it steps to contact 16 where ground is forwarded from the level A wiper over the lead C2202j(22) and over level C of switch MMTFA to lead C2503(25) to energize relay 2520.

Relay 2520 closes contacts 2521 which in turn operates relay 2530. At contacts 2522 it opens the stepping circuit for the motor magnet of switch 2700J. Relay 2530 closes contacts 2533 to extend ground over lead C2505-(22). This ground is extended over level D of switch MMTFA and the lead C2296 in cable C2299 to relay IC2 to shunt that relay down.

Relay IC2 opens its holding circuit at contacts IC2b, and at contacts IC2e places ground on its corresponding terminal of switch MMTFA level A, while removing resistance battery therefrom at contacts IC2d. Relay 2550 therefore restores. Contacts IC2f open to remove ground from lead C2306(23) for no purpose at the present time. At contacts IC2g relay IC2 removes ground from lead C2199(8) to open the original energizing circuit for relay 810, however, that relay remains energized over its previously described holding circuit. At contacts IC2h ground is removed from lead C2103(25) to restore relay 2570. At contacts IC2i ground is placed on lead C2701-151(27) to mark the bank contacts of switch 2700J level A accordingly. When the switch is again called into use by this register, it will step over contacts 17–32 to test the same group of cross office intercept positions, which as before explained are each respectively multipled to a group of three contacts on switch 2700J.

With relay 2570 restored, ground is extended over contacts 2572 and 2563 to operate relay 2520. It opens contacts 2421 to remove ground from lead C2409(7) extending to lead C789(7) and relay 2370. The lower winding of relay 2380 therefore energizes in series with relay 2370 over contacts 2372 to ground on lead C801(8). The upper winding of relay 2380 is then energized over contacts 2381 to ground on lead C801(8). At contacts 2383 lead C789(7) is disconnected from the lower winding of relay 2380, and at contacts 2382 lead C789(7) is connected to lead C2386(10). At contacts 2384 the circuit to relay 2560 is opened, and it restores to restore relay 2420. Relay 2420 recloses ground to lead C2409(7). This ground is therefore extended over lead C789(23) to lead C2386(10) for energizing the upper winding of relay 1010.

Relay 1010 opens contacts 1011 to open the circuit to relay 910, and at contacts 1012 it connects ground through its lower winding over lead C696X to battery through relay 470 in the incoming line circuit to operate its lower winding. Relay 470 restores in this circuit.

Figure 7:
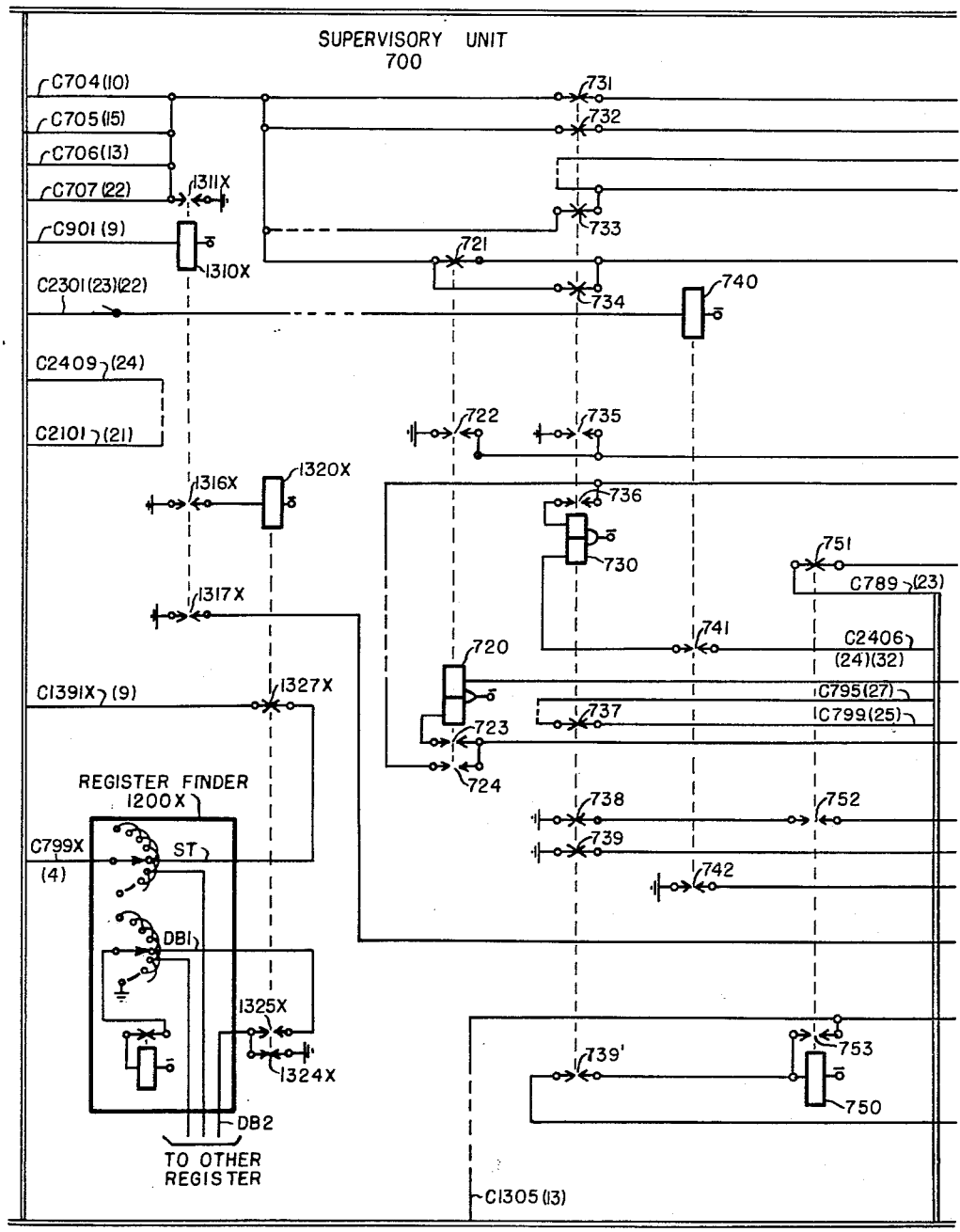
Figure 8:
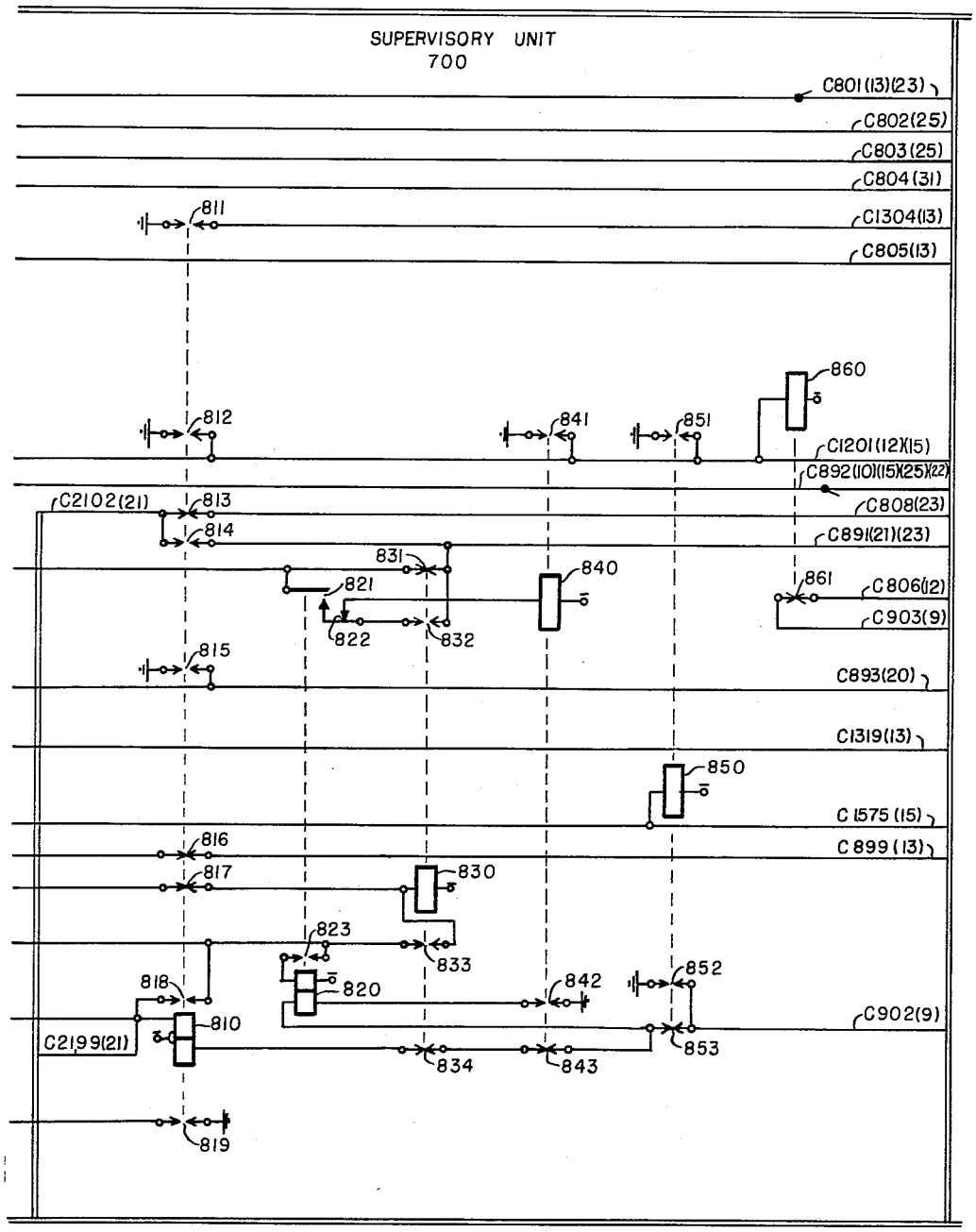
Figure 9:
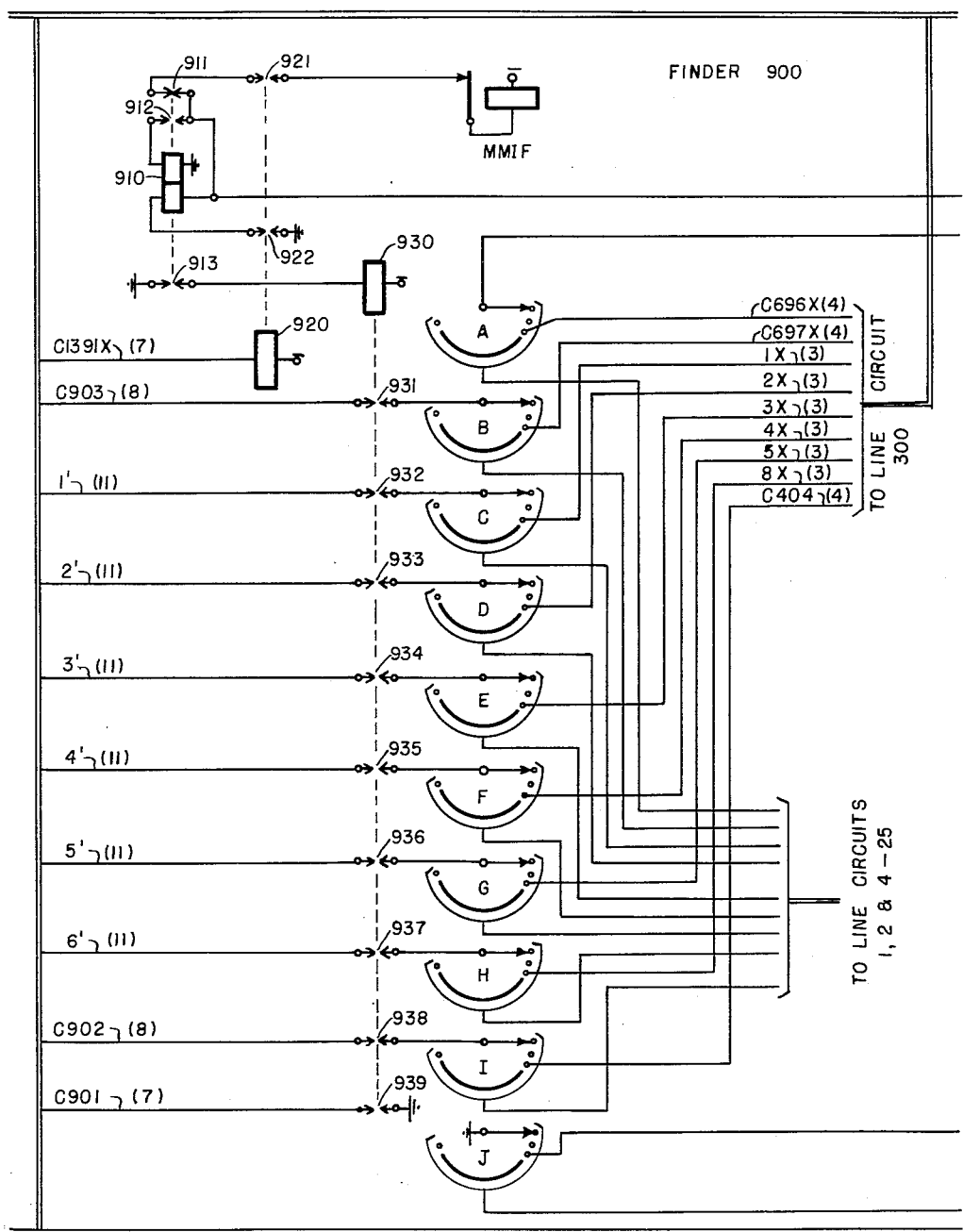
Figure 10:
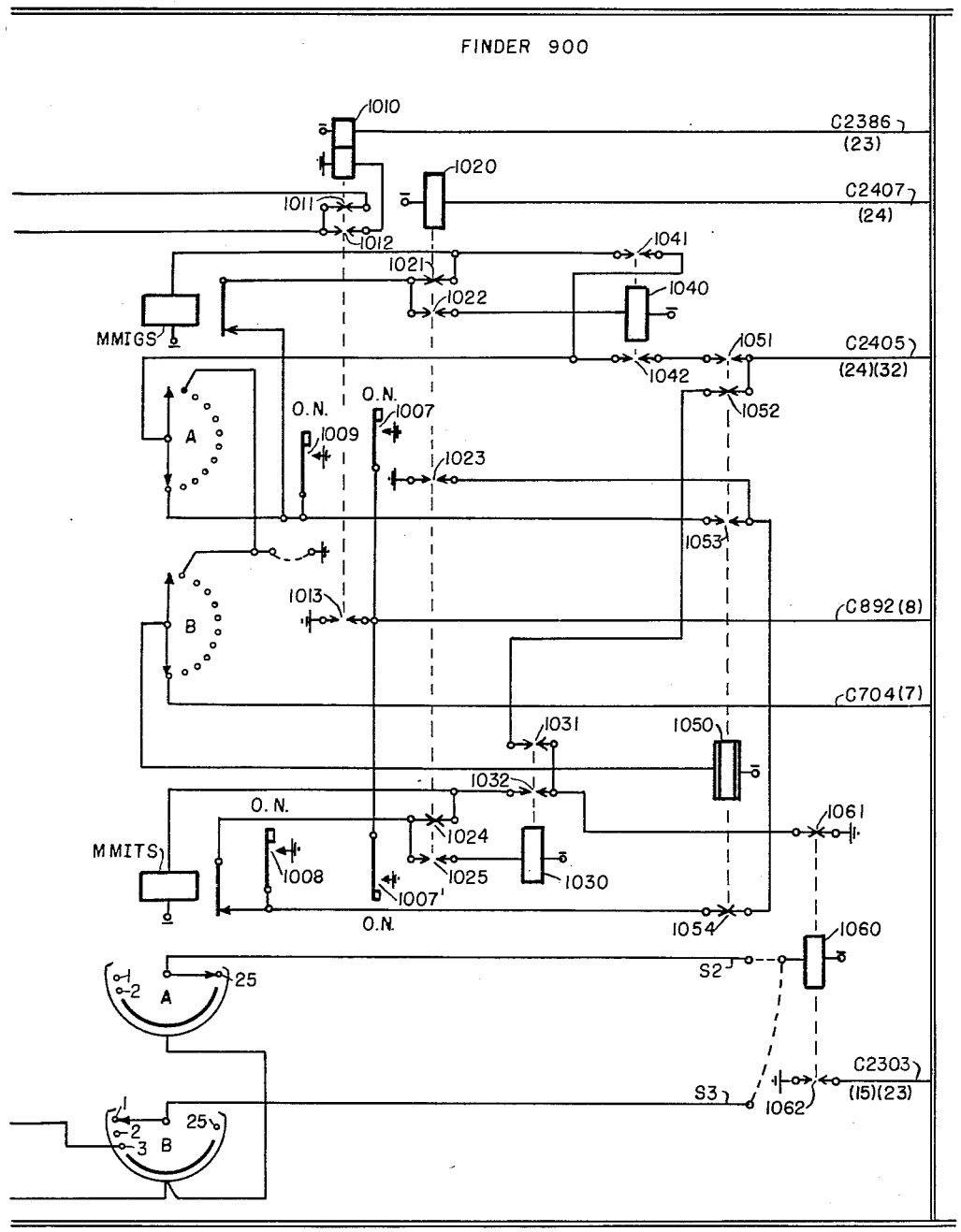
Figure 11:
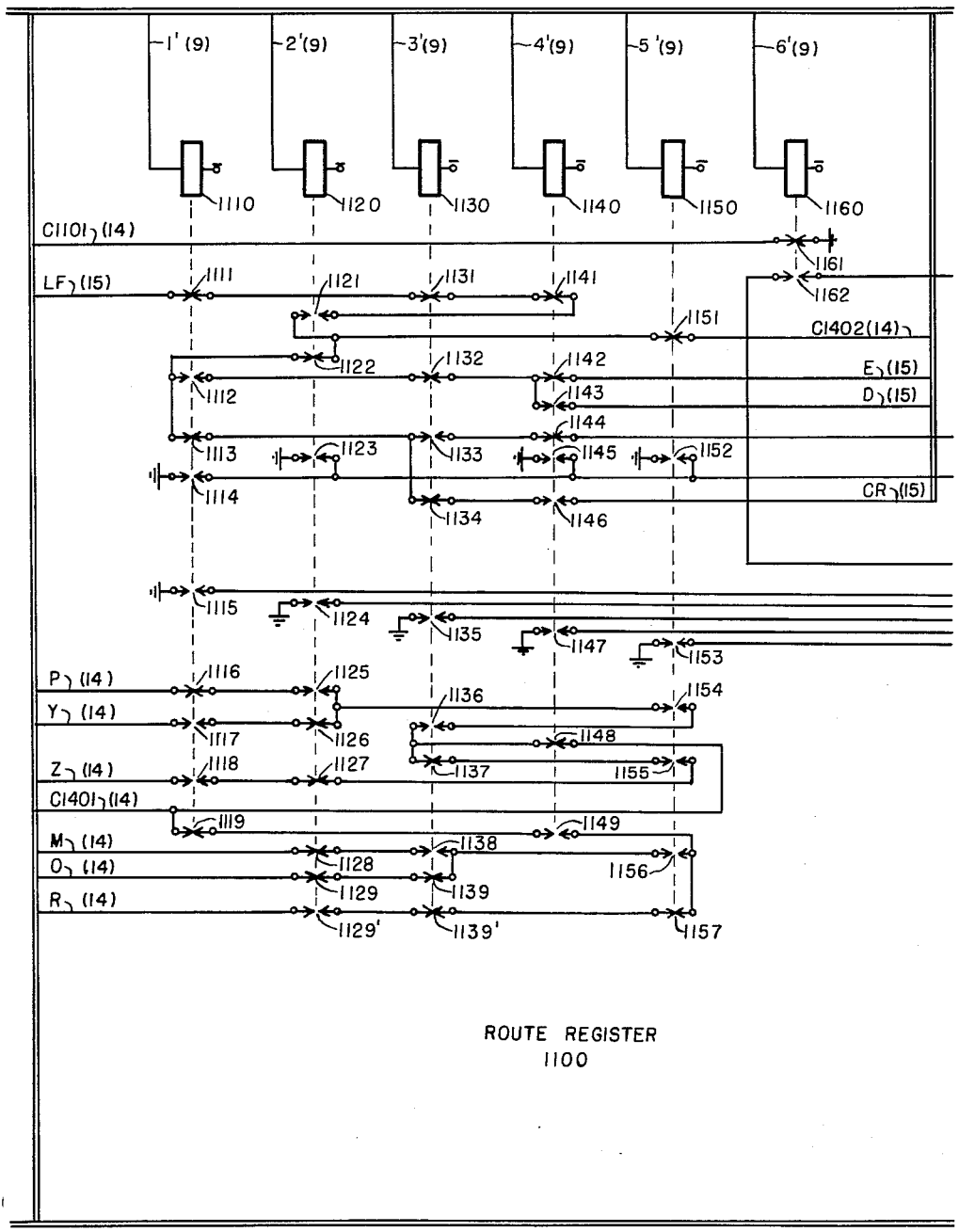

Relay 910 on restoring opens contacts 913 to restore relay 930, which disconnects the respective register leads C903(8), 1′(11)–6′(11) and C902(8) extending to the respective wipers of switch MMIF and the incoming line circuit 300. At contacts 939 it disconnects ground from lead C901(7) to restore relay 1310X (FIG. 7). Relay 1310X removes ground at contacts 1311X from leads C704(10), C705(15), C706(13), C707(22), C801(13) (23), C802(21), C803(25), C804(31) and C805(13). At contacts 1316X it restores relay 1320X, which idles the register to permit it to be seized again. Relay 1310X opens contacts 1317 for restoring relay 810 and relays 820 and 830, if operated. If ground is supplied to lead C1305(7) as a result of relay 1320 being operated, its restoration, as will be described, removes this ground to restore relays 810, 820 and 830.

Ground removed from lead C704(10) restores relay 1050, while ground removed from lead C705(15) restores the operated one of the precedence register relays 1440–1490. This in turn restores precedence relay 1410, and it opens contacts 1412 to restore relay 1590. Ground removed from lead C706(13) restores slow-to-release relay 1310, if operated, or relay 1320, if operated. Relay 1310 removes ground from lead C1305(7) and also from relay 1360. Ground removed from lead C801(13) (23) opens a holding circuit for relay 1360 and restores relays 2370 and 2380. Relay 2380 opens the circuit to the upper winding of relay 1010 at contacts 2382. Ground removed from lead C802(21) restores any operated one of relays OS1, OS2, OS3 or IC1. Another ground is therefore removed from lead C1304(13) if relay IC1 was operated. Ground is removed from lead C803(25) for no purpose, as relay 2470 is not operated on an unsuccessful cross office intercept unit test. Ground removed from lead C804(31) restores relay 3130X. Ground removed from lead C805(13) restores relay 1240.

Relay 1240 at contacts 1241 opens the holding circuit for relays 1220 and 1230, which restore. At contacts 1242 the holding ground for relays R1A–R1E, R2A–R2E and R3A–R3E is opened and they restore. At contacts such as R1A3 ground is removed from lead C1319(8). At contacts 1244 one holding ground for relay 1330 is restored. At contacts 1245, a self-interrupted homing circuit for switch MMTC is completed through off-normal springs 1297. On stepping home it opens off-normal springs 1296 to remove the last holding ground for relay 1330, which restores if operated. With the last ground removed from lead C1319(8) at contacts such as 1334, the holding circuit for the lower winding of 720 is opened.

With relays 810, 720, 1330 and 1360, restored, ground is removed from relay 860, and it restores.

In the incoming line circuit relay 470 on restoring extends ground from contacts 479 past contacts 468 to energize relay 475. At contacts 473 it opens this reader clutch magnet circuit to prevent its operation on restoration of relay 860. Relay 475 closes contacts 478' to complete an alarm circuit not shown, and at contacts 477 extends ground to lead 696(6) to restore relay 1010 in the register. Switch MMIF in the register is now free to step in search of another incoming line circuit. At contacts 477' relay 475 prevents ground from being extended over lead C799X(7) and again initiating operation of the register. From contacts 478 relay 475 completes its holding circuit through a set of key contacts, which the operator can open to release relay 475 at her discretion.

*Last translation*

It will be recalled that the upper winding of relay 720 is operated by the translator either to provide an indication to the register of a last translation for any particular DDI or of an intercept translation. In the event that an intercept routing was indicated, relay IC1 is operated to operate relay IC2, and relays 810 and 2370 operate as described. A "flush out" operation also takes place, if any distribution terminal unit and/or cross office unit has been previously connected to the line circuit to disconnect the same from the line circuit. In the case of a last translation indication provided to the register for a particular DDI on translation of the DDI, relays TG1 and TT1, for example, 2010, 2020, and TF1, for example, or OS1, for example, are operated depending upon whether the routing is intended for a distribution terminal unit or a cross office unit. Relay 1360 also operates as before described, regardless of the type of translation.

Relay 720 on operating opens contact 721 to open one point in the circuit for extending ground to lead C805(13), however, the ground is extended thereto by means of contacts 734. At contacts 722 it maintains ground on relay 860, and at contacts 723 energizes its lower winding from ground on lead C1319(13). At contacts 724 it both extends ground from lead C1319(13) towards relay 730 and extends lead C892(25) (10) (15) (22) to its own winding. Ground on lead C1319 is provided thereto at contacts such as R1A3 and 1334 respectively.

Depending on the translation, distribution terminal unit and/or cross office unit or an intercept unit is selected and set up in a manner previously described. Relay 730 is then operated in a manner previously described. When relay 730 operates, it removes ground at contacts 734 from lead C805(13). This restores relay 1240. In addition it removes ground as previously described from leads C801(13) (23), C802(21), C803(25) and C804(31) for purposes previously described. Relay 730 energizes its upper winding at ground or lead C892(10) (25) (15) (22) and also over contacts 724 to ground on lead C1319(13). Ground is later removed from lead C892(25) (10) (15) (22) in a described manner. In adition at contacts 739' a circuit is completed to relay 750 from contacts 819 in the event relay 810 is operated. It locks operated over contacts 753 and 818 to ground at contacts 1317X, and at contacts 752 prepares a circuit to relay 850.

Relay 1240 restores as before described, to open contacts 1241 to deenergize the respective upper windings of relays 1220 and 1230, which restore. At contacts 1242 relay 1240 removes the holding ground for the operated register relays R1A–R1E, R2A–R2E and R3A–R3E so that they restore. At contacts 1243 it prepares a circuit for extending ground to the motor magnet of switch MMTR. At contacts 1244 it opens one circuit for holding relay 1330 operated. At contacts 1245 relay 1240 completes a homing circuit for switch MMTC from off-normal springs 1297 and that switch steps home. At off-normal springs 1296 the other holding ground for relay 1330 is removed and the relay restores.

Relay 1230 on restoring opens contacts 1231 to remove one ground from lead C1201(8). At contacts 1233 it removes on operating ground for relay 1340. At contacts 1234 ground is again extended to lead C806(8) to prepare for reader clutch magnet operation. With the route register relays R1A, etc. and relay 1330 restored, ground is removed from lead C1319(8) at contacts such as R1A3 and 1334. Therefore as soon as ground is removed from lead C892(25) (10) (15) (22), as explained, from the lower winding of relay 720 and the upper winding of relay 730 and relays 720 and 730 restore. At contacts 722 and 735 respectively operating grounds for relay 860 are removed. Relay 1360 is restored as before described in the event relay 810 is not operated, but the translator seizure operation is not repeated as no circuit is completed to relay 1340. Ground is now reconnected to leads C801(13) (23), C802(21), C803(25), C804(31) and C805(13). In the event relay 810 is unoperated, relay 860 restores, when ground is removed therefor at contacts 722 and 735. Relay 860 on restoring recompletes a circuit previously described to the clutch magnet of the incoming line circuit tape reader and the reader begins to operate and sense the character perforations in the tape.

In the event relay 810 is operated, relay 750 is operated as described. The restoration of relay 730 therefore completes a circuit to relay 850 over contacts 738 and 752. Relay 850 holds relay 860 operated at contacts 851, and at contacts 852 ground is extended to lead C902(9). Ground on lead C902(9) is extended to lead C404(4), key contacts 405 to energize the lower winding of relay 490. The register will now be disconnected from the line circuit and cross office transmission initiated as will be explained. It will also be noted that in this case the circuit to relays 860 and 1360 is maintained at contacts 811 and 812 respectively, while at contacts 815 the circuit to the upper winding of relay 720 is maintained. The reader clutch magnet therefore does not begin operation in this case.

With the tape reader operating, it again senses the message characters. In the event another DDI follows, it is registered in the route register relays R1A–R1E in Route Register 1100 in a manner previously described. The DDI is then translated, as often as required and the necesary number of distribution terminal units and/or cross office units are then conected to line circuit 300 in a maner previously described. On the last translation relay 720 is again operated as before described and the procedure is repeated. In this manner each succeeding DDI is registered in the route register, tranlated and the required distribution terminal units and/or cross office units are conected to line circuit 300 in a manner described.

The last DDI in the mesage tape is followed by a space character, and the characters DE. These in turn are followed by three characters designating the originating station. When the space character is sensed by the tape reader, the sensing relay 1130 is operated to extend ground, as before explained past lead C1202(15) to lead C1501(12) to energize the motor magnet of switch MMTR and relay 1220. Switch MMTR then steps as explained to its first contact. The character D is then read by the tape reader to operate sensing relays 1110 and 1140. They extend ground from lead C1402(11) past contacts 1151, 1122, 1112, 1132 and 1143 to lead D(15). Ground on lead D(15) is extended past contacts 1522 to operate relay 1530 in the Precedence Register 1400. It closes contacts 1532 to extend its battery through the upper winding of relay 1520 to lead C1101(11). Relay 1520 operates in series with relay 1530 from ground extended to lead C1101(14) at contacts 1161, as soon as relay 1160 restores and the sensing relays release to remove the shunting ground from lead D(15). It opens contacts 1522 and closes contacts 1521 and 1523.

When the folowing E character is sensed, relay 1110 is operated to extend ground from lead C1402(14) past contacts 1151, 1122, 1112, 1132 and 1142, over lead E(15) and contacts 1523 to energize the lower winding of relay 1520. Both the characters D and E are registered in the route register relay group R1A–R1E and R2A–R2E respectively in the same manner as described for a routing indicator or DDI. Relay 1160 operating during the sensing cycle removes ground at contacts 1161 from lead C1101(14) to release the relay 1530 and the upper winding of relay 1520. Contacts 1532 open to prevent the circuit to relay 1530 and the upper winding of relay 1520 from being completed at the end of the sensing cycle, and contacts 1531 close. Precedence register relay 1510 operates from battery through the lower winding of relay 1520, contacts 1521 and 1531 to ground on lead C705(7), when the sensing relays release to remove ground from lead E(15). Operated relay 1510 opens contacts 1511 to disconnect lead C1202(12) from lead C1501(12) to prevent switch MMTR in the Route Register 1100 from establishing a circuit to relay 1330. Since relay 1330 does not operate the register cannot demand the translator. The registration in the RG1A–RG1E and RG2A–RG2E relay groups is held until the line circuit is released.

If the register is wired to release from the incoming line circuit, after the DE character sequence is detected, lead D(15) is strapped to lead CR(15) and lead E(15) is strapped to lead LF(15). In this case the ground on lead D(15) is also extended past contacts 1553 to operate precedence register relay 1540. It locks operated through the upper winding of relay 1550 and contacts 1541 to ground on lead C1101(11) at the end of the sensing cycle. Relay 1550 then operates to open contacts 1553. When ground appears on lead E(15), it is extended past contacts 1551 to energize the lower winding of relay 1550, while ground removed from lead C1101(14) causes relay 1540 and the upper winding of relay 1550 to restore. At the end of the sensing cycle relay 1560 energizes in series with the lower winding of relay 1550 over contacts 1552 and 1542 to ground on lead C705(7). Thus in this case relays 1540, 1550 and 1560 operate in the same way and at the same time, as relays 1530, 1520 and 1510 respectively.

If the register is not wired to release after the DE character sequence is sensed, then the aforedescribed strapping is not provided. The tape reader continues to operate and sense the characters of the message, however the sensing relays 1110–1150 complete no detection chain circuits until the first carriage return character succeeding the DE sequence is read. Relay 1140 operates to complete a carriage return detecting chain circuit from ground on lead C1402(11) through contacts 1151, 1122, 1113, 1134 and 1146 to lead CR(15) and contacts 1553 for operating relay 1540. Precedence register relay 1540 prepares a circuit for the upper winding of relay 1550 and operates in series therewith, when relay 1160 restores to place ground on lead C1101(14) and relay 1140 restores to remove ground from lead CR(15). When the line feed character succeeding the carriage return character is read, relay 1120 operates to complete a circuit from lead C1402(11), over contacts 1151, 1121, 1141, 1131 and 1111 to lead LF(15) and contacts 1551 to operate the lower winding of precedence register relay 1550. Relay 1540 restores; when ground is removed from lead C1101(14). When relay 1160 restores to close ground to lead C1101(14) and relay 1120 restores to remove ground from lead LF(15), precedence register relay 1560 operates in series with the lower winding of relay 1550, as described.

Relay 1560 extends ground at contacts 1562 over lead C1201(8) to operate relay 860. This stops the reader as explained. At contacts 1561 ground is extended over lead C1575(8) to operate relay 850. Relay 850 closes contacts 851 to hold relay 860 operated and extends ground over lead C902(9) at contacts 852. The direct ground on lead C902(9) is extended to lead C404(4), key contacts 405 to energize the lower winding of relay 490 as before explained. The register will now be disconnected from the line circuit and cross office transmission initiated as will be explained.

*Register line circuit disconnect and cross office transmission*

Relay 490 operating as described from ground on lead C404(9) closes contacts 495 to extend ground from contacts 649' as previously described to lead C5201X(28) (34), past respective levels of the respective incoming selector switches of any cross office unit and/or distribution terminal unit connected to the line circuit. This ground is extended in a manner previously described to operate the relay corresponding to 2840 and 3510 in any distribution terminal unit or cross office unit connected to the line circuit. In the event line circuit is connected to a cross office intercept unit such as 3800, ground on lead C5201X(38) is extended past the respective level of the associated incoming selector switch such as 5200X2, past contacts 3844 to operate relay 3850.

Relay 3850 at contacts 3853 connects the cross office intercept unit reperforator 3901 through an alarm relay (not shown) and rectifier bridge (not shown) and of a type described in the aforementioned application, over a respective level of the incoming selector switch 5200X2 to the line circuit transmission lead C798X(3), and past contacts 322 and lead C394X to resistance ground at the transmitter indicated by the box marked Line Apparatus 305.

In a similar manner relay 2840 on operating closes contacts 2843 to connect the resistance battery from page printer 2901 at the distribution terminal unit through an alarm relay (not shown) and rectifier bridge (not shown) of a type described in the aforementioned application, over a respective level of the incoming selector switch 5200X to lead C798X(3) extending to resistance ground at the transmitter indicated by the box marked Line Apparatus 305 over contacts 322 and lead C394X. Also each relay such as 3510 in any connected cross office unit at contacts such as 3514 connects resistance battery extended from its reperforator indicated by the box marked Line Apparatus 3305 to lead C5322X and through an alarm relay (not shown) and rectifier bridge (not shown) of a type described in the aforementioned application, over a respective level of switch 5200X1 to lead C798X(3) to resistance ground over contacts 322 and lead C394X at the line circuit transmitter.

Returning now to the cross office intercept unit, relay 3850 at contacts 3851 completes another holding circuit for relay 3840 over contacts 3845 and 3935. At contacts 3852 it restores relay 3860. At contacts 3855 relay 3850 holds open a point in a circuit to relay 3940, while the circuit therefor is further prepared at contacts 3866, as relay 3860 restores. Relay 3860 at contacts 3864 removes ground extended over contacts 3833 and 3846, over the respective level of switch 5200X2 and lead C601X(4) to contacts 494 and the right side of relay 550. At contacts 3865 it connects battery from the winding of relay 3910 through contacts 3833 and 3846 to lead C601X(4) and contacts 494. At contacts 3862 relay 3860 opens one of the holding circuits for relay 3840. With the shunting ground removed from lead C601X(4) and the right side of relay 550, relay 550 operates in a circuit including contacts 495 and 649'.

In a similar fashion a cross office unit and/or distribution terminal unit, if connected to the line circuit, each removes a ground shunting relay 550 in a manner previously explained in the section on "Flush Out."

Relay 550 therefore operates, as soon as all shunting grounds are removed from lead C601X(28)(34), or if the line circuit is connected via lead C601(38) to an intercept unit, the one shunting ground is removed. Relay 550 closes contacts 551 to extend battery from the winding or relay 560 past contacts 546' and 493 to ground on lead C404(9). As this is a direct ground from contacts 852 in the register, relay 560 operates therefrom. At contacts 553 relay 550 disconnects lead C601X(28)(34)(38) from resistance battery and instead at contacts 552 prepares to extend ground thereto.

Relay 560 closes contacts 562 to extend direct ground over contacts 552 and 494 to lead C601X(28)(34)(38). Direct ground on lead C601X(28) is extended in the case of a distribution terminal unit over the respective level of switch 5200X, contacts 2834, 2822, and 2854 to operate relay 2860. In the case of a cross office unit ground on lead C601X(34) is extended past the respective level of switch 5200X1 and contacts 3445, 3452 and 3523 to operate relay 3460. In the event a cross office intercept unit is connected to the line circuit, ground is extended from contacts 562, 552 and 494 over lead C601X(38), a respective level of switch 5200X2, contacts 3846, 3833 and 3865 to operate relay 3910. Relays 2860, 3460 and 3910 each operate to permit the respective associated message receiving apparatus to respond to tape movement for preventing an alarm condition, as long as message reception does not stop for more than a predetermined period of time. This arrangement is not described herein but has been referred to in the aforementioned application to which reference therefor may be made.

At contacts 561 relay 560 in the incoming ling circuit also extends ground from contacts 647 to operate relay 540. At contacts 563 it prepares a circuit to the transmitter clutch magnet.

Relay 540 opens contacts 548' to prevent ground from the transmitter tight tape switch contacts and extending over lead C699X(5) from being forwarded to contacts 634 and to lead C698X, when relay 630 restores. Instead it extends the ground from the tight tape switch contacts and lead C699X(5) over contacts 547' and 551 to relay 560, while opening the original circuit to relay 560 at contacts 546'. With the tape between the reader and transmitter slack the tight tape switch maintains ground on lead C699(5) in a manner explained in the previously mentioned application. This maintains relay 560 operated. Relay 540 locks to ground over contacts 546 and 647, and at contacts 545 completes a circuit for the upper winding of relay 490 over contacts 492, 545 and 647. At contacts 543 relay 540 opens the circuit to the upper winding of relay 460 and to the winding of relay 480, and each restores. At contacts 541 it opens a circuit from the figure shift lead FIG extending to the normal contact of level A of switch MMCNX. At contacts 548 relay 540 opens the point in the circuit to relay 630, which restores. In holding this circuit open, it prevents any subsequent Z's presensed by the transmitter from operating relay 630.

When relay 630 restores it closes contacts 634 to complete a circuit from ground at contacts 563 extending over contacts 336 and 315 to lead C698X for energizing the transmitter clutch magnet and operate the transmitter. The transmitter now senses the tape perforations and extends corresponding signals over lead C394X and past contacts 322 to lead C798X(28)(34) extending over a respective level of switch 5200X1 to the reperforator at a connected cross office unit such as 3300 and/or over a repsective level of switch 5200X to the page printer at a connected distribution terminal unit such as 2800. If a cross office intercept unit such as 3800 is associated with the line circuit instead of the aforementioned units, the transmitter extends the message signals to the reperforator at that unit. The respective message receiving apparatus at the various units operates to provide a message tape at its respective units.

As the transmitter was initially stopped when it pre-sensed the first Z of the first SOM, the first character transmitted to the cross office is the first Z of the first SOM. The message is now transmitted by the cross office to the reperforator or page printer respectively at each connected cross office unit and/or distribution terminal unit respectively. A message sent to the page printer at a distribution terminal unit requires no further processing, while a message transmitted to the cross office unit must be further processed for transmission to a remote station or a page printer at a local station. If the message is being transmitted to a cross office intercept unit, the operator thereat must take the tape upon which received message is perforated, and when proper, reinsert the message tape at the reader of an incoming line circuit. It is then processed as explained so that it may be transmitted to the proper destination. In the event of an intercepted high precedence message intended for a station, which is temporarily closed, she may telephone the message to an attendant thereat.

As the reperforator indicated by the box marked Line Apparatus 3305 in the Cross Office Unit 3300 receives the signals, it perforates and advances the message tape toward the cross office unit reader indicated by the same box, while extending periodic ground pulses on lead C5399X in a known manner. Ground on lead C5399X is extended past now operated contacts 3461 and 3512 to contacts 3547 for energizing the lower winding of the message in storage relay 3540.

Relay 3540 opens its original operating circuit at contacts 3547 and closes contacts 3546 to complete its own holding circuit through its upper winding and contacts 3618 and 5685 in shunt to ground at contacts 3657 and also at key contacts 3469. At contacts 3541 it opens a point in a possible homing circuit for switch MMOG1X. At contacts 3542 it opens a possible homing circuit for the outgoing selector switch 4800X. At contacts 3543 it opens a point in a circuit for relay 3550. At contacts 3544 it opens a point in a possible homing circuit for switch MMPR1X. At contacts 3549 a point is opened in the circuit for enabling a register to seize this cross office unit, if it is idle. At contacts 3545 it extends ground to the wiper of level F of switch MMPR1X.

If switch MMPR1X is standing on its fifth or sixth contact indicating the receipt of a high precedence message, the ground is forwarded to energize the lower winding of relay 3740. Relay 3740 on operating enables this cross office unit to participate in a precedence comparison test for preventing another cross office unit having a lower precedence message from seizing the desired station, although the unit has not yet detected the SOM of the message.

It will be recalled that relay 460 in the Line Circuit 300 restores on operation of relay 540. It opens contacts 465 to disconnect relay 470 from lead C696X(9) to restore relay 910, and at contacts 466 connects ground to lead C696X(9). Placing ground on lead C696X(9) enables switch MMIF in the register to step in search of another line circuit. Relay 460 also opens contacts 467 to prevent ground from being extended to lead C799X(7), when relay 470 restores. Relay 470 on restoring closes contacts 472 to extend ground from off-normal springs 395, past contacts 464 and over contacts 651 to lead C899X(3) to energize the reader clutch magnet. The incoming line circuit reader therefore operates to read the tape and extend it towards the associated transmitter.

Relay 910 on restoring opens the circuit to relay 930 at contacts 913, and that relay in turn opens the circuit for relay 1310X at contacts 939. Relay 1310X opens contacts 1311X to remove ground from leads C704(10), C705(15), C706(13), C707(22), C801(13)(23), C802-(21), C803(25), C804(31), and C805(13) for already described purposes. At contacts 1316X relay 1320X is restored to idle this register and permit it to be seized by another line circuit. At contacts 1317X ground is removed from the respective upper windings of relays 750, 810 and 820, if operated to restore these relays, or if relay 830 is operated it is thereby restored. Relay 750 opens the circuit to relay 850 at contacts 752 in the event it completed the circuit to relay 850 and relay 850 restores. Ground removed from lead C705(15) restores relays 1510, 1520, 1550 and 1560, if operated in addition to the operated one of the precedence register relays 1440–1490. Relay 1560 in the event it was operated to complete the circuit to relay 850, on restoring opens contacts 1561 to restore relay 850. With relays 720, 730, 810, 850, 1230 and 1360 restored, relay 860 is restored. The register is now conditioned to be utilized with another line circuit.

SOM at cross office unit

It will be recalled that the incoming line circuit reader and transmitter operate, when the connected cross office unit and/or distribution terminal unit or intercept unit signal the line circuit to transmit the message. The incoming line circuit reader and the transmitter therefore process the message, which is transmitted cross office, as signals over lead C394X to lead C798X(28)(34)(38) and the reperforator in each cross office unit and/or each connected page printer or intercept unit printer.

The reperforator magnet at the Cross Office Unit 3300 perforates a tape in accordance with the message signals, which perforations are then sensed or read by the cross office reader. The cross office reader and the transmitter operate as one unit and are together with their attendant apparatus indicated by the box marked Line Apparatus 3305.

A slack tape switch arm normally rides the tape between the reperforator and the reader to ground lead C5387X, when the tape is slack. As the reperforator operates from the message signals, it extends the tape toward the reader to provide a slack tape condition. A ground is therefore extended over lead C5387X, contacts 3614′, 3624, 3639′ and 3579′, to lead C5308X to energize the reader transmitter clutch magnet.

The clutch magnet operates the reader transmitter as one unit, with about ten characters of tape between their sensing pins. With slack tape available and the clutch magnet operated, the reader shortly begins to sense the perforations in the tape. The perforations of the tape are converted into ground pulses on leads 1′X, 2′X, 3′X, 4′X, 5′X, 6′X, 7′X and 8′X in a manner similar to that described for leads 1X, 2X, 3X, 4X, 5X, 6X, 7X, C8996X(6) and 8X respectively. The transmitter also operates, however its signal lead C5351X is open at this time.

The reader senses the first character of the SOM, which is Z, and extends ground to lead 6X′ in a manner explained for lead 6X at the incoming unit to operate a relay in the SOM Detector 3307 in a manner explained in the aforementioned application. Leads 1X′–5X′ and 8X′ are then connected to their respective cross office sensing relays indicated by the box marked Sensing Control 3306, while leads 6X′ and 7X′ are disconnected therefrom as explained in the aforementioned specification. The remaining characters of the SOM are then sensed by the tape reader to operated corresponding relays in Sensing Control 3306. These relays in turn extend respective detection chain grounds to relays in the SOM Detector 3307, and after the final C of the SOM is read the SOM relay 5550X is operated in a manner explained for a similar relay in the aforementioned application. Relay 5550X energizes its lower winding over contacts 5551, 5682 and 3658. Its upper winding together with the operated relay in the SOM Detector will be restored on the succeeding sensing cycle and the relay in Sensing Control 3306 is restored thereby to disconnect leads 1′X–5′X and 8′X therefrom all in a manner explained in the aforementioned application. At contacts 5558X operated relay 5550X connects the motor magnet of switch MMADVX to lead C5377X. This lead forwards a pulse provided during each operating cycle of the cross office reader transmitter unit in Line Apparatus 3305. Lead C5377X, which is pulsed once per cycle of the reader transmitter unit, extends ground on the first cycle, after operation of relay 5550X, over contacts 5558X and contacts 3631 to the motor magnet of switch MMADVX. At the end of each ground pulse on lead C5377X, the motor magnet of switch MMADVX deenergizes to step its wiper one step. On the eleventh pulse its wiper is standing on contact number 10 so that the ground from lead C5377X is also extended directly to the lower winding of relay 3630, which operates. As there are about ten characters between the reader and transmitter, counting the same, enables the SOM to reach the transmitter, before relay 3630 is operated.

The upper winding of relay 3630 energizes over contacts 3636 to ground at off-normal springs of switch MMADVX and also to ground over contacts 3642 and 3653. The motor magnet takes a step on cessation of the pulse to deenergize the lower winding of relay 3630. At contacts 3633 a self-interrupted stepping circuit for switch MMADVX is completed through contacts 5686X, from the off-normal springs of switch MMADVX, and the switch steps self-interruptedly home to open its off-normal springs. Lead C5377X is disconnected from the motor magnet at contacts 3631. At contacts 3635 a circuit is completed for the upper winding of relay 3740 from contacts 3545. The circuit to relay 3540 was completed on the start of cross office transmission, if the message is high precedence, as switch MMPR1X then forwards ground from contacts 3545 over level F to energize the lower winding of relay 3740. At contacts 3634 ground is extended over the fifth or sixth contact of level A of switch MMPR1X in the case of a higher precedence message to the winding of relay 3760, which now energizes to initiate a cancel transmission sequence in the event transmission is already in progress to the desired station. At contacts 3639, a circuit is prepared from lead C5387X to relay 3695. At contacts 3639′ lead C5308X is disconnected from lead C5387X to deenergize the motor magnet of the reader transmitter unit. Further operation of the cross office reader is prevented, until the cross office unit has seized an outgoing channel unit or local station and has been provided with the appropriate signal.

Outgoing channel seizure

Operated Relay 3740, as before described, connects battery from Contacts 3576 through the winding of Relay 3730 to Lead C4886X(33a). In the case of a message routed to a distant station, Lead C4886X(33a) is extended past the wiper of Level D of the outgoing selector switch 4800X and over a contact corresponding to the selected outgoing channel to Lead C4888X and to ground through the high resistance winding of a relay in the Outgoing Channel Unit 7000 as described in the aforementioned application. Relay 3730 does not operate in series with the channel unit relay due to the high resistance of the latter, while the channel unit relay does operate as explained for a similar relay in the aforementioned application. Other cross office units may simultaneously extend battery from a relay such as 3730 to ground through the channel relay over Lead C4888X(33a).

If the channel is part of a multichannel group, it extends ground from Lead CH1X to Lead C5029(26a), if this is the last idle outgoing channel in the group for operating the corresponding outgoing multichannel group, Busy Relay 2630 for example. The outgoing channel unit also initiates operation of the Outgoing Finder Line 6400X common to a number of outgoing channel units all in a manner explained in the aforementioned application. As explained in the aforementioned application, the outgoing finder link on finding the outgoing channel unit extends ground back to the channel unit 7000X to Lead C4888X which is connected to Lead C4886X(37) to energize 3730 in Cross Office Unit 3300. A similar relay in each cross office unit attempting to seize the outgoing channel unit is also energized, and a precedence comparison test is now performed.

At Contacts 3731 resistance battery is extended to the wiper of Level C of Switch MMPR1X, and at Contacts 3735 ground is extended to the wiper of Level D of Switch MMPR1X. Bank Contacts 1, 3, and 5 of Level C of Switch MMPR1X are connected to different respective precedence designation Leads C4802(33a), C4803(33a), and C4804(33a), each corresponding to two different message precedences, and which extend to the wipers of Levels H, G, and F respectively of the outgoing selector switch 4800X. Likewise, Contacts 2, 4, and 6, Level D of Switch MMPR1 are respectively connected to Leads C4804(48), C4803(48), and C4802(48). Thus, either ground or −120 volt resistance battery is provided to one lead such as C4802, C4803, or C4804 of the three, depending on which contact switch MMPRX1 is associated with to forward a precedence desgination marking. Each cross office unit having a selector switch such as 4800X set to the outgoing channel forwards a marking corresponding to its message precedence in a similar manner. From Levels F, G, and H of each outgoing selector switch set to the outgoing channel, the respective leads are connected over leads such as C4811X, C4812X, and C4813X to the Outgoing Finder Link 6400X, which is associated with the same outgoing channel as the outgoing selector switches via a switch in the link. The Outgoing Finder Link now performs a precedence comparison test as explained in the aforementioned application.

If Relay 3730 in the cross office unit having the highest precedence has not operated yet, indicating that the SOM of its message has not yet been read, a cross office selector switch associated with the Link 6400X is not connected with the cross office unit. The cross office unit, therefore, cannot seize the outgoing channel unit, but by participating in the precedence comparison test prevents a unit having a message of lower precedence from seizing the outgoing channel unit.

With Relay 3630 operated, Relay 3730 extends ground from Contacts 3634 past Contacts 3734 and 3732 respectively to the wipers of Levels C and B respectively of Switch MMOG1X. The ground on the B wiper of Switch MMOG1X is forwarded over the lead such as C6701X to the Outgoing Finder Link having access to the desired outgoing channel. Each cross office unit has access by means of a switch such as MMOG1X to a number of Outgoing Finder Links via cross office assigner switches (not shown) as explained in the aforementioned application. The ground on Lead C6701X initiates operation of a cross office assigner switch associated with Link 6400X to find the cross office unit 3300 by means of the ground marking on the level C wiper of Switch MMOG1X extended to Lead C6705X in a manner explained in the aforementioned application. At this time the Outgoing Finder Link is connected in multiple with each cross office unit attempting to seize the same outgoing channel.

Leads such as C6751X(33a)–C6756X(33a) extending from Level E of Switch MMPR1X in each cross office unit attempting to seize the channel are now extended via the cross office assigner switch to the Outgoing Finder Link 6400X in a manner explained in the aforementioned application. The Outgoing Finder Link extends battery from a relay in the Channel Unit 7000X to one of the Leads C6751X(37)–C6756X(37) corresponding to the precedence of the cross office unit having the highest precedence message, as indicated by the comparison test. The battery is extended past the Level E wiper of Switch MMPR1X in each cross office unit having such precedence to operate the lower winding of Relay 3710. Of course, if the precedence designation selected by the link 6400X was different than that corresponding to the position of Switch MMPR1X, the battery is not extended to Relay 3710 in that cross office unit. If more than one cross office unit has the same high precedence message, the relay such as 3710 in each unit attempts to operate its contacts, but only one succeeds as explained in the aforementioned application. It extends the battery through its upper winding at Contacts 3711 to the low resistance ground through Relay 3680. Relay 3680 and the aforementioned relay in the channel unit 7000X then operate in a manner explained in the aforementioned application.

Relay 3680 forwards ground from Contacts 3656 over Contacts 3681, through the winding of Relay 3720, over Lead C4885X(33a), the wiper of Level A of the outgoing selector switch 4800X, and Lead C4889X to battery through the winding of a relay in the channel unit 7000X. The channel unit 7000X is therefore seized by the selected cross office unit such as 3300 and the Outgoing Finder Link 6400X released therefrom all in a manner explained in the aforementioned application. Direct ground is also removed from Lead C4888X to restore Relay 3730, which is connected thereto over Lead C4886X(37). Likewise, the circuits to Relays 3710 and 3680 are opened.

Relay 3720 in the cross office unit having the highest precedence message operates in series with the connected channel unit relay in a manner explained in the aforementioned application, before Relay 3680 restores. At Contacts 3727 it completes its own holding circuit from ground at Contacts 3656 and battery on Lead C4885X(33a). At Contacts 3722, it opens an incomplete homing circuit for the outgoing selector switch 4800X. At Contacts 3724 and 3721, ground and resistance battery respectively are extended to Levels D and C respectively of Switch MMPR1X to enable the cross office unit to participate in a precedence test in the event a cancel transmission attempt is made by another cross office unit. At Contacts 3729, it extends Lead C4884X(33a) past Contacts 3668' to the lower winding of Relay 3690. Lead C4884X(33a) extends past Level B of Switch 4800X to Lead C4883X to ground in the outgoing channel unit 7000X in a manner explained in the aforementioned application for a similar lead. Relay 3690 energizes.

The cross office unit will now send an identifying number to a monitor reperforator associated with the outgoing channel unit 7000X so that the particular cross office unit sending the message may later be identified. It therefore secures a markable transmitter for the purpose of sending this number to the monitor reperforator by means of a cross office selector switch (not shown) in a manner explained in the aforementioned application.

Relay 3690 closes Contacts 3693 to energize its upper winding over Contacts 3668 to Contacts 3657 and 3469 respectively. At Contacts 3694 it extends ground over Lead C7502X to initiate operation of the cross office selector switch (not shown). At Contacts 3692 it removes ground from Lead C7501X, and at Contacts 3691 extends Lead C7501X past Contacts 3661 to battery through Relay 5810X to mark this cross office unit to the cross office selector switch. At Contacts 3726, the signal lead C4882X(33a) extending over Switch 4800X and lead C4881X to the channel unit reperforator is extended toward the markable transmitter signal lead NSX.

On finding the demanding cross office unit, ground is extended from the cross office selector switch to Lead C7501X to battery through Relay 5810X as explained in the aforementioned application. Relay 5810X now operates. At Contacts 5811X and 5814X, Relay 5810 extends Leads NCLX and NNPX respectively from the markable transmitter 5820X, into the cross office unit 3300. At Contacts 5819, a circuit is completed to Relay 3670, which operates to connect Lead C4882X(33a), past Contacts 3666 and 3671 to Contacts 3726 and the signal lead NSX of the markable transmitter 5820X.

A stepping circuit is completed under control of Relay 5810X to the motor magnet of the number marking switch indicated by the box MMUNX in a manner described in the aforementioned specification. The markable transmitter 5820X now transmits the cross office unit identifying number over Leads NSX and C4882X(33a) under control of the markings forwarded by Switch MMUNX to the channel unit reperforator.

Switch MMUNX steps as each character is transmitted and eventually connects battery from the clutch magnet of the markable transmitter extended over Lead NCLX past Contacts 5811X to Contacts 3664, the winding of Relay 3660 to ground at Contacts 3653. The clutch magnet can not operate in this circuit. However, Relay 3660 does.

At Contacts 3663 it extends battery through its winding to ground at Contacts 3653 to provide its own holding circuit and opens its original operating circuit at Contacts 3664. At Contacts 3662, ground is extended over Contacts 3641 and 3725 over Lead C4899X(33a) extended via the selector switch 4800X to Lead C4887X. The ground signals the outgoing channel unit 7000X that the cross office unit identifying number is transmitted. At Contacts 3661, it opens the circuit to Relay 5810X, which restores. At Contacts 3668, it opens a circuit to the upper winding of Relay 3690, and at Contacts 3668' it opens the circuit to the lower winding of Relay 3690. Ground from the cross office reader transmitter slack tape contacts is now extended over Lead C5387X, through Contacts 3614', 3624, 3639, the winding of Relay 3695, and over Contacts 3669' to Lead C4884X(33a) extending over Level B of the outgoing selector switch 4800X to Lead C4883X. Relay 3695 completes a circuit for restarting the cross office unit reader transmitter by extending ground over Lead C5308X at Contacts 3696. At Contacts 3666, Relay 3660 disconnects Markable Transmitter Signal Lead NSX from Lead C4882X(33a), and instead, at Contacts 3665, connects Lead C4882(33a) to resistance ground over Lead C5351X and the stop contacts of the cross office transmitter to control the channel unit relay connected to Signal Lead C4881X.

When Relay 5810X restores, it completes a self-interrupted homing circuit for the motor magnet of Switch MMUNX, and at Contacts 5811X and 5814X it disconnects Lead NCLX and NNPX from the cross office unit. At Contacts 5819 it restores Relay 3670, which in turn disconnects Lead NSX from the cross office unit at Contacts 3671.

Relay 3690, which restores when the circuits thereto are opened by Relay 3680, recloses Contacts 3692 to mark the bank contact corresponding to this cross office unit at the cross office selector switch with ground over Lead C7501X. At Contacts 3694 it removes Ground Lead C7502X to restore the cross office selector start relay. The cross office selector switch is now prepared to be used with another cross office unit.

Simultaneously with the sending of an identifying number from the cross office unit to the channel unit monitor reperforator, an SOM, if required by the receiving station, or blanks are sent to the receiving station by a markable transmitter associated with the channel unit as explained in the aforementioned application. After this, the message number is transmitted to the receiving station as explained in the aforementioned application.

As previously described, after the cross office identifying number has been transmitted to the monitor reperforator, ground is extended over Lead C4899X(33a) to Lead C4887X to control a channel unit relay and signal the end of the identifying number transmission. The channel unit then causes the message number to be transmitted following the SOM.

Following transmission of the message number, battery, through a relay in the channel unit, is extended over Lead C4883X Level B of Switch 4800X, Lead C4884X(37), and Contacts 3729 to ground through Relay 3695 as already described over the reader transmitter slack tape switch contacts. Relay 3695 operates and grounds the reader transmitter clutch magnet over Contacts 3696 and Lead C5308X. It starts message sensing and transmission from the transmitter of the cross office unit to the outgoing channel unit 7000X over Lead C5351X extending to Lead C4882X(33a) and C4881X.

*Cross office unit transmission to local station*

It will be recalled that, in the event all the distribution terminal units and associated page printers at particular local stations are busy at the time a register attempts to seize one for the purpose of enabling a message to be transmitted thereto from an incoming line circuit, the message is routed to a cross office unit. In this event the cross office unit to which the message is routed must transmit the message to a page printer at the desired local station. To provide access to a local station from a cross office unit, a distribution terminal converter unit such as 4300 is provided for one distribution terminal unit assigned to any local station, and the cross office unit outgoing selector switch such as 4800 is set to the distribution terminal converter unit associated with the desired local station in an explained manner. If the message is high precedence, Relay 3760 in the cross office unit is operated as explained. A cancellation attempt is then made, as will be explained, if the distribution terminal unit is busy, unless the message is of low precedence. In case of a low precedence message or of a failure to cancel, the cross office unit waits until the terminal unit becomes available.

When the cross office unit has read the SOM and operated relay 3630, it is ready to transmit the message to the local station via the distribution terminal converter unit such as 4300. Relay 3740 in the cross office unit is operated as explained either immediately on message reception in the case of a high precedence message or on reading the SOM in the case of a low precendence message. Relay 3740 at contacts 3741 connects battery from contacts 3576 through the winding of relay 3630, past lead C4886X(33a), over lead C4393(43) extending to Distribution Terminal Converter Unit 4300, contacts 4331 and 4342 through relay 4410 to ground at contacts 4358. Relay 4410 only operates in the just described circuit thereto from the cross office unit.

In the event the terminal converter unit is busy receiving a message from an incoming line circuit, relay 4340 is operated from ground in the associated Distribution Terminal Unit 2800 extended by either contacts 2832 past contacts 2942 or by contacts 2941 to lead C4301(43). It maintains contacts 4342 open to prevent the completion of a circuit to relay 4410.

At contacts 4411, relay 4410 opens the busy test circuit extending from lead C4304(27) to lead C4301(29) by means of which a busy distribution terminal test is performed by a register via the corresponding contact on the terminal finder switch having access to this unit. At Contacts 4412, ground is extended past Contacts 4352 and 4325 to Lead C4304(27) to maintain the particular distribution terminal unit busy to a testing register. At Contacts 4413, Relay 4410 completes a circuit to the lower winding of Relay 4350 through Contacts 4326 and Relay 4350 operates. One or more cross office units may have participated in securing the described operation of Relay 4410, and in the event Relay 4350 is operated thereby, a precedence comparison test takes place as will be described. In a cross office unit having a high precedence message, the connection of Relay 3730 in the circuit to Relay 4410 permits it to participate in the subsequent precedence test, although it is not prepared to transmit its message until the SOM is read. Its Participation prevents a cross office unit having a lower precedence message from seizing the terminal converter unit. If Relay 4320 is operated indicating the associated page printer is receiving a message from a cross office unit, Relay 4350 fails to operate, as Contacts 4326 are open. The cross office units then merely wait until message transmission is complete, and Relay 4320 restores, unless one or more of the waiting cross office units has a high precedence message. In this event, Relay 3760 in the waiting high precedence unit is operated and a cancel transmission sequence is initiated, as will be explained.

Relay 4350, on operating, opens Contacts 4352 to further disconnect the register busy test lead C4304(27) from Relay 2920. Instead, it extends ground at Contacts 4351 past Contacts 4325 to the contact corresponding to this unit in the terminal finder switch having access to this unit to busy the unit to any testing register. At Contacts 4354, Relay 4350 removes ground from Lead C6602X(33a), and at Contacts 4355 extends resistance battery to that lead to mark it in the bank contacts of a switch in the outgoing finder link such as 6400X associated with Terminal Unit 4300. At Contacts 4353 it extends ground to Lead C6601X(33a) to initiate operation of the switch in the outgoing finder link 6400X, which functions in a manner described for similar apparatus in the aforementioned application. The link switch searches for and sets itself under control of the marking battery on Lead C6602X(33a) to this unit. At Contacts 4357, Relay 4350 connects Lead C4393(33a) to Lead C6603X(33a) extending through the aforementioned finder link switch into the outgoing finder link 6400X. At Contacts 4358, Relay 4350 restores Relay 4410. It will be noted that the seizure procedure for the Distributional Terminal Converter Unit is much the same as that for the Outgoing Channel Unit 7000X. Although both are described as using the same Link 6400X, it will be understood that in practice one link services a group of units such as 7000X, and another link services units such as 4300.

When the switch in the Outgoing Finder Link 6400X finds the Terminal Converter Unit, it extends ground to Lead C6401X(43) in a manner explained in the aforementioned application for extending ground to a similarly marked lead, past Contacts 4356 to energize the upper winding of Relay 4350. The outgoing finder link also extends ground to Lead C6603X(43), which is connected, as before described, over Contacts 4357 to Lead C4393(33a) and over Lead C4886X(37) to operate Relay 3730 in each cross office unit connected to the terminal unit and having Relay 3740 therein operated.

Relay 3730 at Contacts 3732 and 3734 forwards ground from Contacts 3634 to the Levels C and B wipers of Switch MMOG1X to Leads C6705X and C6701X to cause a cross office assigner switch associated with Link 6400X to associate itself as explained in the aforementioned application with the cross office unit and connect Leads C6751X(33a)–C6756X(33a) to the Outgoing Finder Line 6400X. At Contacts 3733, the circuit to the lower winding of Relay 3760, if complete, is opened. Relay 3730 also operates to permit its cross office unit to participate in a precedence comparison test performed by the Link 6400X as described in the aforementioned application. That is, Relay 3730 extends ground from Contacts 3735, past the Level D wiper of Switch MMPR1X, if the wiper is associated with Contacts 2, 4, or 6 respectively, to a respective one of the Leads C4802X(33a), C4803X(33a), or C4804X(33a) and extends −120 volt resistance battery past Contacts 3731 and the Level C wiper of Switch MMPR1X, if switch is associated with Contacts 1, 3, or 5 respectively to a respective one of the leads C4802X(33a), C4803X(33a), or C4804X(33a) respectively. Leads C4804X(33a), C4803X(33a), and C4802X(33a) are in turn connected over Levels F, G, and H respectively of Switch 4800X to Leads C3303, C3302, or C3301 respectively, which are connected to the outgoing finder link 6400 as the link switch is set to the same terminal as the switch 4800X. Resistance battery or ground is therefore extended to one of these leads from each switch set to the desired station to provide a marking corresponding to the message precedence in each testing cross office unit to enable the outgoing finder link 6400X to perform a precedence comparison test in a manner described in the aforementioned application. Battery through Relay 4310 is extended over Lead C6608X(33a) and through the outgoing finder link 6400X on performance of the precedence comparison test and via the cross office assignor switch in a manner explained in the aforementioned application to one of the leads C6751X(37)–C6756X(37) corresponding to the message having the highest precedence. The battery marking is extended past the Level E wiper of Switch MMPR1X in each cross office unit having its precedence switch set to the precedence corresponding to the marked lead and extended to ground through the lower winding of Relay 3710. Relay 3710 in one of the cross office units, therefore, operates to extend the battery from Relay 4310 through its own upper winding and to ground through Relay 3680 at Contacts 3711. It will be noted that, in the event the unit having the highest precedence message has not read the SOM to operate Relay 3630, a cross office assignor switch is not associated with that unit, and although it participates in the comparison test to prevent the operation of Relay 3710 in any other cross office unit, Relay 3710 in that unit cannot operate. This prevents any other unit with a lower precedence message from seizing the desired Terminal Unit, which remains available until the SOM is read at the high precedence unit to operate Relay 3630 therein.

Relay 3680 operates in the described circuit therefor together with Relay 4310. At Contacts 4311, ground is extended by Relay 4310 over Lead C6605X(33a) to cause the Outgoing Finder Link 6400X to remove ground from Lead C6603X(43) in a manner described for similar operation in the aforementioned application. Ground removed from Lead C6603X(43), which is connected over Lead C4393(33a) to Lead C4886X(37), restores Relay 3730 in each cross office unit. Relay 3730, on restoring, restores its contacts to remove ground from Lead C6701X and cause the Outgoing Finder Link and the associated assignor switch to initiate restoration. Ground is thereby removed from Lead C6401X(43) to restore the upper winding of Relay 4350. Likewise, the Outgoing Finder Link 6400X, on releasing, opens the circuit between Relay 4310 and Relays 3710 and 3680. Relay 4310 opens Contacts 4311 to remove ground from Lead C6605X(33a). Relay 4350, on restoring, restores ground to Lead C6602X(33a) at Contacts 4353 and removes ground from Lead C6601X(33a) to allow the Outgoing Finder Link 6400X to be used with another unit. At Contacts 4358, ground is again extended through Relay 4410 to Lead C4393(33a) to enable Relay 4410 to reoperate from battery through Relay 3730.

In the meantime, Relay 3680 on operating extends ground from Contacts 3656 through Contacts 3681, through Relay 3720 to Lead C4885X(33a), and over the Level A wiper of Switch 4800X to Lead C4390(43) and through Contacts 4347 and 4429' to battery through the lower winding of Relay 4320. Relays 4320 and 3720 operate in series in this circuit before Relay 3680 restores. The cross office unit has now seized the Distribution Terminal Converter Unit and its associated Distribution Terminal Unit.

At Contacts 3727, Relay 3720 completes its own holding circuit and shunts Contacts 3681. At Contacts 3724 it extends ground to the Level D wiper of Switch MMPR1X and at Contacts 3721 extends resistance battery to the Level C wiper of Switch MMPR1X to enable this unit to participate in a precedence comparison test performed in the event of a cancellation attempt by another unit. At Contacts 3723, a point is opened in the circuit to Relay 3760. At Contacts 3729, Lead C4884X(33a) extending over the Level B wiper of Switch 4800X to Lead C4491(44) is connected past Contacts 3668' to battery through the lower winding of Relay 3690. At Contacts 3726, Lead C4882(33a) is connected through Contacts 3666 and 3672 to resistance ground.

Relay 4320, on operating, opens Contacts 4322 and closes Contacts 4323 to extend ground over Lead C4301(29) Contacts 2931 and 2942 to operate Relay 2920 in the associated Distribution Terminal Unit. At Contacts 4324, Relay 4320 maintains ground on the register busy test lead, and at Contacts 4325 further disconnects this lead from Lead C4301(29). At Contacts 4326, it opens a point in the circuit to the lower winding of Relay 4350. It extends Lead C4393(33a) through Contacts 4327 to shunt Contacts 4331. At Contacts 4328 it prepares a locking circuit for Relay 4440, and at Contacts 4329 it extends battery from Slow-to-release Relay 4440 through Contacts 4444 to Lead C4302(28) to ground through Relay 2820. At Contacts 4321 it extends ground from Contacts 4441 to Lead C4401(28). At Contacts 4328' it extends battery from the upper winding of Relay 4420 and Contacts 4427, past Contacts 4345 to Lead C4494(33a). At Contacts 4329' it prepares a circuit for the lower winding of relay 4420.

In the associated Distribution Terminal Unit 2800, relay 2820 operates from the battery extending from relay 4440 to lead C4302(28), and closes contacts 2821 to operate relay 2830. Relay 2830 locks operated as previously described, and closes contacts 2832 to hold relay 2920 operated. At contacts 2834 it connects battery from the winding of relay 2850 through contacts 2823 to lead C4401(44) having ground thereon, as previously explained, so that relay 2850 now operates. It extends, at contacts 2851, direct ground back over lead C4302(43) and over contacts 4329, 4325, and 4444 to operate relay 4440, while shunting relay 2820.

Relay 4440, on operating, opens contacts 4441 to remove ground from lead C4401(28). However, relay 2850 is now locked operated as before described. At contacts 4443 it completes its own holding circuit from ground extended over contacts 4328 and 4431, while opening its original operating circuit at contacts 4444. At contacts 4447 it connects lead C4395(33a) to lead C4403(28). At contacts 4448 it extends ground from contacts 4434 to lead C4402(28) to operate relay 2840 for an already described purpose. Relay 2840, at contacts 2843, connects lead C4403(44) to the associated page printer 2901. Lead C4395(33a), which is now connected to the page printer 2901, is extend over level C of switch 4800X, lead C4882X(37), past contacts 3726 and 3672 to resistance ground. In addition, relay 2840, at contacts 2842, opens the holding circuit for relay 2850, which restores to connect relay 2860 to lead C4401(44). At contacts 4442, relay 4440 connects ground from contacts 4424 to lead C4491(33a), over lead C4884X(37), contacts 3729 and 3668' to energize the lower winding of relay 3690. Relay 3690 now operates.

Relay 3690, at contacts 3691, extends battery from relay 5810X, through contacts 3661 to lead C7501X to mark this lead to a cross office selector switch (not shown), while at contacts 3692 ground is removed from lead C7501X. At contacts 3694 ground is extended over lead C7502X to initiate operation of the aforementioned cross office selector switch (not shown), to which this unit has access. The cross office selector switch operates in a manner described in the aforementioned application for a similar apparatus to enable a markable transmitter such as 5820X, as described in the aforementioned application, to be associated with the cross office unit. At contacts 3693, relay 3690 completes a circuit over contacts 3668 and 3657 to its upper winding. The cross office selector switch (not shown) operates in a manner described for similar apparatus in the aforementioned application to find this unit, at which time ground is extended over lead C7501X, contacts 3691 and 3661 to operate relay 5810X.

Relay 5810X completes the circuit from the numbering pulse lead NNPX of the markable transmitter, indicated by box 5820X to which the unit now has access, over contacts 5814X to the motor magnet of the marking switch, as described in the aforementioned application and indicated by the box marked MMUNX. At contacts 5811X, relay 5810X completes a circuit over the transmitter clutch lead NCLX to the transmitter clutch magnet. In addition, at contacts 5819, relay 5510X operates salve relay 3670. Relay 3670 removes the resistance ground forwarded to lead C4882X(33a) at contacts 3672, and instead connects the markable transmitter signal lead NSX, past contacts 3671 and 3666, to lead C4882X(33a). This permits the markings on the respective bank contacts of switch MMUNX, which are transmitted through the markable transmitter 5820X to lead C4882X(33a) to be transmitted over an already described circuit extending to the page printer 2901 at the Distribution Terminal Unit 2800. Switch MMUNX is wired to provide a cross office unit identification number as described in the aforementioned application for performing a similar operation. The switch MMUNX controls the markable transmitter to transmit the cross office unit identification number, and then extends battery from the markable transmitter clutch magnet over lead NCLX to lead 3601, contacts 3664, through relay 3660 to ground over contacts 3653 in a manner described for a similar operation in the aforementioned application. Only relay 3660 operates in this circuit.

Relay 3660 closes contacts 3663 and opens contacts 3664. It thus extends battery through its right side and through contacts 3653 to ground to maintain itself operated. At contacts 3665 it extends lead C4882X(33a) to the cross office unit transmitter signal lead C5351X. At contacts 3666 it disconnects lead C4882X(33a) from the markable transmitter signal lead and at contacts 3661 opens the circuit to relay 5810X. Relay 5810X in turn restores relay 3670 and disconnects the markable transmitter 5820X from switch MMUNX. It also completes a homing circuit for switch MMUNX in a manner described in the aforementioned application. Relay 3660, at contacts 3668', opens the circuit to the lower winding of relay 3690, and at contacts 3668 opens the circuit to the upper winding of relay 3690, which restores. On restoring, relay 3690 connects direct ground to lead C7501X and removes ground from lead C7502X. The cross office selector switch can now be used with another cross office unit. At contacts 3662, ground is extended by relay 3660 past contacts 3641 and 3725 to lead C4889X(33a). This ground is therefore extended through the selector switch 4800X to lead C4494(44) and over contacts 4345 and 4328', past contacts 4427 to energize the upper winding of relay 4420. At contacts 3667' a circuit is prepared for the lower winding of relay 3570. At contacts 3669', lead C4884X(33a) is connected through relay 3695 and contacts 3639, past contacts 3624 and 3614' to lead C5387X. Lead C5387X extends to the slack tape switch contacts between the reperforator and reader transmitter unit in the cross office unit indicated by the box marked Transmission Apparatus 3305. With slack tape between the reader and the reperforator, ground is extended over lead C5387X through relay 395 to lead C4884X(33a) and lead C4491(44) past contacts 4442.

Relay 4420, having operated, extends the ground on lead C4491(33a) past contacts 4423 and 4422 to lead C4401(28) to operate relay 2860. At contacts 4424 it disconnects one ground from lead C4491(33a), and at contacts 4421 disconnects one point for forwarding ground to lead C4401(28). At contacts 4428, relay 4420 energizes its lower winding from ground at contacts 4329', and at contacts 4429 prepares a locking circuit for relay 4430. At contacts 4429' it opens the shunt around the upper winding of relay 4320 so that both windings energize in series from ground on lead C4390-(33a). At contacts 4426, ground from relay 4430 is extended from contacts 4446, over contacts 4328' and 4345 to lead C4494(33a), while at contacts 4427 relay 4420 opens the circuit to its own upper winding. With both windings of relay 4320 in series the message can now be canceled, in the event a unit having a message of higher precedence than the present unit must transmit a message to this station.

In the cross office unit relay 3695, on operating, closes contacts 3696 to extend ground over lead C5308X and initiates operation of cross office unit reader and transmitter. The reader transmitter unit reads the message and transmits signals corresponding to the message characters over lead C5351X to lead C4882X(33a) and over an already described circuit to the page printer at the distribution terminal unit.

*Line circuit processing*

At the end of the body of the message, the tape reader at the line circuit 300 senses a number of line feed characters followed by the characters NNNN. These characters indicate the end of the particular message and are referred to as the EOM. When the first line feed character is read by the reader, lead 7X is grounded by the reader to extend that ground over contacts 410X2 and 451 to the detecting chain lead LF, and past contacts 551 to energize a relay in the EOM Detector 400 in a manner explained in the aforementioned application. Thereafter, relay 410X is operated by ground returned thereto from the EOM Detector 400. It disconnects lead 7X from lead LF at contacts 410X2 and connects the sensing leads 1X–5X and 8X to their respective relays in the Sensing Control 350. The remaining characters of the EOM are then sensed and ground extended accordingly on leads 1X–5X to operate the corresponding relays of Sensing Control 350. The sensing control in turn extends ground over the detection chain leads LF and N respectively past contacts 451 and 627' respectively to operate the relays of the EOM Detector 400, as explained in the aforementioned application. The relays of the EOM Detector are operated as each character of the EOM is sensed, as explained in the aforementioned application. When the last N of the EOM is sensed, the ground on lead N, forwarded past contacts 627' is forwarded by the contacts of an operated relay in the EOM Detector to the end of message relay 610 to maintain a shunt on that relay. In addition, the ground is extended past contacts 613 and 622 to energize the upper winding of relay 650. Relay 650 operates to open contacts 651 and disconnect ground from lead C899X(3) for deenergizing the reader clutch magnet and stop the line circuit reader.

When the detection chain ground on lead N is removed, relay 610 energizes from battery through the winding of the last operated relay in the EOM Detector 400 to ground through contacts (not shown) in the EOM Detector, contacts 644 and 333 and key contacts 999X. Relay 410X is restored, as explained in the aforementioned application, on restoration of the last operated relay in the EOM Detector. At contacts 614, relay 610 connects ground through contacts 622 to the upper winding of relay 650, and at contacts 613 it opens the original operating circuit for relay 650. At contacts 618, the circuit to the lower winding of relay 530 is opened, and it restores. It now can be reoperated by an SOM of a succeeding message. At contacts 612, relay 610 extends ground over lead C894X(3) to energize the motor magnet of the units message number comparison switch in the Message Number Comparator 1000X so that the switch is advanced one position when relay 620 operates, as explained in the aforementioned application. Each switch in the Message Number Comparator 1000X is controlled, as explained in the aforementioned application, so that they are positioned to check the message number of the succeeding message.

With the reader stopped the tape between the reader and the transmitter soon becomes tight, and the tape arm actuates the tight tape switch (not shown) to remove ground from lead C699X(5) to restore relay 560, and extend ground over lead C317X(5) extending through contacts 531, closed off-normal springs of switch MMCTGX and contacts 615 to energize relay 620. It locks operated over contacts 623 and 614. Relay 620 opens the circuit to the upper winding of relay 650 at contacts 622. Relay 650, at contacts 651, closes the circuit to the reader clutch magnet over lead C899X(3) to start the reader. At contacts 627' relay 620 opens a point in the incomplete circuit for supplying the detection chain ground over lead N to the EOM Detector 400. At contacts 621, ground is removed from lead C894X(3) to cause the Message Number Comparator 1000X to advance to a position corresponding to the message number of the next message to be received.

Relay 560, on restoring, opens contacts 563 to remove ground from lead C6998X and stop the transmitter. At contacts 561 it opens the original operating circuit to relay 540, which remains operated over its holding circuit. At contacts 562, ground is removed from lead C601X(28) (34) (38). If transmission is occurring to a cross office unit and/or distribution terminal unit, relay 3460 and 2860 respectively therein restore. If transmission is occurring to a cross office intercept unit, relay 3910 therein restores.

With the reader ouperating, tape to the transmitter becomes slack, and relay 560 reoperates when the tape switch contacts reclose to ground lead C699X(5). Relay 560 closes contacts 563 to reoperate the transmitter. At contacts 562 it reoperates relays 3460 and 2860, or if transmission is to an intercept unit, it reoperates relay 3910.

If a new message is received immediately behind the first message, the reader operates to cause the sensing of the succeeding message SOM, and relay 530 reoperates in a manner described. As contacts 618 are now open, it energizes its lower winding over contacts 537 and 333 to key contacts 999X. At contacts 533 it opens a point in the circuit for extending periodic ground from the transmitter numbering contacts (not shown) over lead C316X to step switch MMCTGX, as will be described. The line circuit in this case will not release the unit or units to which it is transmitting, until the first Z of the SOM is presented at the transmitter.

When the figure shift character preceding the first channel number is sensed, a detection chain ground is extended in a manner described, from the contacts of the sensing relays to lead FIG, contacts 534, but as contacts 541 are open at this time, the ground is extended past contacts 626 to switch MMCNX in a manner described. The channel number check at Comparator 1000X is now performed, as before described. Switch MMCNX, which is stepped in the manner described, operates the upper winding of relay 450 as before described. It energizes its other winding over contacts 459 and 627 to ground at contacts 333 and 999X instead of contacts 543. As soon as the first Z of the first SOM is presented at the transmitter, lead C397X(3) extends ground over contacts 459' and 628' to operate relay 630.

Relay 630 closes contacts 631 to complete its own holding circuit over contacts 628' to ground at contacts 333 and 999X. At contacts 634 it opens the transmitter clutch magnet lead C698X(3) to stop the transmitter. At contacts 633 it extends ground over contacts 629' to energize to relay 640. As the first Z of the SOM of the succeeding message is now at the line circuit transmitter, the EOM of the first message has been transmitted cross office.

When one message is not followed immediately by another, the line circuit reperforator must be made to feed out sufficient blank tape to advance the EOM to the reader and the transmitter. When incoming transmission is stopped, the tape pulse contacts (not shown) on the reperforator remain open to remove ground from a lead (not shown) to permit an arrangement such as described in the aforementioned application to connect lead C329X(3) extending from the reader tight tape switch contacts (not shown) via the dotted connection and contacts 521 to the winding of relay 510. As the reader continues to operate, it pulls the tape between the reader and reperforator tight to close its tight tape switch contacts and complete a circuit from ground at off-normal springs 395, contacts 464, 472, and 651 to lead C899X(3), the reader tight tape contacts (not shown), lead C329X(5), the dotted connection and contacts 521 to energize the upper winding of relay 510. The reader clutch magnet deenergizes to stop the reader when the reader slack tape contacts (not shown) open to disconnect lead C899X(3) from the reader.

Relay 510 at contacts 512 extends its operating ground over contacts 524 to relay 520, which operates to open the original operating circuit for relay 510 and itself at contacts 521 and 524 respectively. It closes a new circuit for itself from its original operating ground extended to contacts 522 and 523. At contacts 513, relay 510 opens one of the connections between lead C301X(3) and lead —LX(3), which connection shunts its lower winding, and at contacts 511 extends ground to lead C387X(3) and the reperforator magnet bias windings. Relay 520 opens contacts 526 to open the other shunt around the lower winding of relay 510 so that the lower winding of relay 510 can energize in series with the line conductor —LX(3) and lead C301X(3) extending through the line winding of reperforator magnet to the +L conductor in the incoming Line Apparatus 305. This winding, on energizing, maintains the relay contacts operated once they have been operated, but cannot operate them itself. Thus, although the upper winding restores, the relay contacts now remain operated. At contacts 527, ground is extended over contacts 522 and 524 to maintain relay 520 operated. As slack tape will shortly become available to the reader so that its slack tape switch contacts reclose, the reader will reoperate from ground on lead C899X(3).

Ground on lead C387X(3) allows enough current to flow through the reperforator magnet bias winding to cause the overpowering of the operating windings. The result is a spacing condition that causes blank tape feed-out and EOM of the message is advanced toward the reader. When slack tape becomes available to the reader, the slack tape switch contacts thereat reclose to extend the ground on lead C899X(3) to the reader clutch magnet, and its reoperates. If the distant station again starts transmitting, the loop through the lower winding of relay 510 is opened or polarity is reversed on the line, and its contacts restore to remove ground from lead C387X(3) and stop the reperforator magnet from feeding out blank tape. Relay 510 restores its contacts on reverse polarity due to the fact that the flux therein must drop through zero before building up in the other direction. The SOM of the new message may then be used for a finish cross office transmission signal as described.

When the end of message has been detected at the reader due to the blank tape feed-out, relays 610 and 650 operate, as before described. The reader is stopped at contacts 651, as previously described, and relay 530 is restored as described. It now connects lead C317X(3) to relay 620 at contacts 531, as before described. When the tape to the transmitter becomes tight, lead C317X(3) is grounded to operate relay 620 as described. Relay 560 restores to restore the transmitter clutch magnet at contacts 563, when the tape between the reader and transmitter becomes tight, as before described.

Relay 620 operates to connect the transmitter numbering pulse lead C316X(5) from contacts 533, over contacts 625 to the motor magnet of switch MMCTGX. It also restores relay 650 to start the reader clutch magnet at contacts 651, as described. When tape to the transmitter becomes slack, lead C699X(5) is grounded to operate relay 560, which starts the transmitter as described. Since there is no following SOM to be used as an end of transmission signal, a transmitter cycle count is used instead.

With the tape tight between the reader and transmitter, it is known, within a few characters, just how far the EOM is from the transmitter, after the reader has read the same. Thus, ground pulses on lead C316X(5) from the transmitter pulse contacts (not shown) are extended to pulse the motor magnet of switch MMCTGX once for each transmitter cycle. Twenty-nine cycles are counted before it is assumed that the EOM has been transmitted. The EOM has then been transmitted cross office. When switch MCCTGX steps its wiper to its seventh contact, it has counted twenty-nine pulses. In this position it extends ground past contacts 629′ to energize the lower winding of relay 640.

Relay 640 extends a holding circuit for itself over contacts 629′ from ground at contacts 649, and energizes its upper winding at contacts 646 from ground at key contacts 999X and contacts 333′ extended through contacts 547 and from ground at off-normal springs of switch MMCTGX. At contacts 641 it extends ground to the lower winding of relay 650, which operates to open the reader clutch magnet circuit at contacts 651 and stop the reader. At contacts 649′ it removes the ground from lear C5201X(28)(34)(38), and from relay 550, which restores. The ground removed from lead C5201X(28)(34), of course, restores relays 3510 and 2840 in any connected cross office unit of distribution terminal unit respectively. If a cross office intercept unit is connected to the line circuit, ground removed from lead C5201X(38) restores relay 3850. At the contacts 647, relay 640 restores relay 540 and the upper winding of relay 490. Both relays release their contacts. At contacts 645 a self-interrupted homing circuit for switch MMCTGX is completed from the ground at contacts 999X. When home, it opens its homing circuit at one set of off-normal springs, and removes one holding ground for relay 640 at another set of off-normal springs. As contacts 644 the ground holding relay 610 operated and the relay (not shown) in the EOM Detector 400 is removed to restore these relays. At contacts 648 a locking circuit is completed from contacts 999X and 333, past contacts 632 to relay 630, if it is operated. It holds the transmitter clutch magnet circuit open at contacts 634. At contacts 643 relay 640 removes the holding ground for a relay (not shown), which, if operated, controls the dotted connection between the operating ground from contacts 527 to relay 520. Relay 520, if operated, therefore restores to reestablish the shunt on the lower winding of relay 510 and blank tape feed-out is terminated at contacts 511. At contacts 641 the circuit to the lower winding of relay 650 is opened. It releases to reoperate the reader clutch magnet, which pulls the tape tight between the reader and reperforator.

Relay 540, on restoring, opens contacts 547′ to open the circuit to relay 560. Relay 540, on restoring, also opens contacts 546 to open a circuit for the upper winding of relay 640. Restored relay 610 opens contacts 614 to restore relay 620. It opens contacts 629′ to restore relay 640. At contacts 628′ it opens a holding circuit to relay 630, while relay 640, at contacts 648, opens another circuit for relay 630. Relay 630, if operated indicating the SOM of a succeeding message has reached the transmitter, remains operated over contacts 648, 632, 333, and key contacts 999X. It holds the transmitter circuit open at contacts 634 until relay 540 is again operated to initiate transmission cross office of the succeeding message. Relay 490, on restoring, places ground on lear C601(28)(34)(38).

When the reperforator ceases operation, as explained on blank tape feed-out, the reader pulls the tape therebetween tight and stops, as lead C899X(3) is then discontinued therefrom. In the case of blank tape feed-out, the transmitter clutch magnet circuit is completed at contacts 548' on restoration of 540, and when it pulls the tape tight between the reader and transmitter, the slack tape switch contacts (not shown) therebetween disconnect ground from lead C699X(5) and the transmitter stops.

Relay 3510 in the cross office unit, on restoring, opens the holding circuit to relay 3440 at contacts 3513. At contacts 3514, it disconnects the unit reperforator from lead C798X(3), and at contacts 3515, it connects resistance ground to the reperforator. Relay 3540 removes a shunting ground from relay 3550 so that it operates in series with relay 3560, as already explained. Its operation enables the EOM to be advanced at the cross office unit and to enable a register to establish a connection to the cross office unit all in a manner which will be explained.

In a distribution terminal unit, restoration of relay 2840 opens a holding circuit from relay 2830 at contacts 2841. At contacts 2843, the page printer is disconnected from the signal lead C798X(3), and at contacts 2844 resistance ground is connected thereto. At contacts 2845, relay 2940 is operated to restore relay 2830. Relay 2830 opens contacts 2832 to restore relay 2920, and an aforedescribed release operation now takes place to restore the switches, and permit the unit to be seized by a register.

In a cross office intercept unit, restoration of relay 3850 initiates a series of operations similar to that described for the distribution terminal unit. That is, a circuit is completed at contacts 3855 to relay 3940, which restores relay 3840 at contacts 3943. It in turn restores relay 2930 and the switches are restored, as previously explained.

EOM cross office unit processing

Relay 3510 in the cross office unit on restoring, after transmission of the EOM to the cross office unit, opens a point in the circuit to relay 3440 at contacts 3513, as already described. At contacts 3515 relay 3510 extends resistance ground to lead C5322X and the reperforator line magnet indicated by the box marked Line Apparatus 3305. Relay 3440 opens contacts 3444 to remove shunting ground from relay 3550. At contacts 3442 relay 3440 prepares a self-interrupted homing circuit for switch 5200X1 through the switch off-normal springs. At contacts 3445 and 3443 it disconnects leads C601X(4) and C520X(5) from the cross office unit. Relay 3460 is restored. With contacts 3448 closed, ground controlled by a relay (not shown) and operated via reperforator pulse contacts (not shown) is applied for a predetermined time period, through contacts 3454 to lead C5379X, and causes the reperforator to feed out blank tape for advancing the EOM to the tape reader all in a known manner. This ground is shortly removed to stop blank tape feedout. At contacts 3444 the removal of ground causes relay 3550 to operate in series with 3560 over contacts 3563, the upper winding of relay 3550 to ground at the off-normal springs of swith MMIGX and at off-normal springs of switch 5200X1.

At contacts 3557 relay 3550 provides a shunt for contacts 3562, and at contacts 3556 opens a circuit for applying a shunting ground thereto. At contacts 3554, a homing circuit for switch MMPR1X is prepared, but held open at contacts 3544. At contacts 3555 it places ground on lead C3201 (32) to prevent a register from establishing a connection to this cross office unit. At contacts 3553 it extends ground over now closed contacts 3442, through the off-normal springs of the incoming selector switch 5200X1 and the self-interrupting contacts of its motor magnet. The motor magnet now steps its wipers home in a self-interrupted manner and the off-normal springs open, when the switch is home. One set of off-normal springs thus open to remove a holding ground for relays 3550 and 3560. At contacts 3551' a self-interrupted homing circuit for switch MMIGX is completed through its off-normal springs, and the switch steps its wipers home in a self-interrupted manner. It closes a set of off-normal springs to complete a circuit to slow-to-release relay 5910X. Another set of off-normal springs open to remove a holding ground for relays 3550 and 3560. At contacts 3552 relay 3550 prepares a homing circuit to the motor magnet of the Outgoing Selector Switch 4800X, however as contacts 3542 are open at this time this circuit is not completed. At contacts 3551 a homing circuit for switch MMOG1X is prepared. When off-normal springs at the incoming selector switch and at switch MMIGX open to remove ground from relays 3550 and 3560, both relays restore. Relay 3550 on restoring closes contacts 3556 and opens contacts 3555 to enable a register to seize this cross office unit. If the unit is seized by a register, the incoming line circuit associated with the seizing register begins message transmission to the present preset cross office unit, as already described. The reperforator is operated by the incoming message to provide slack tape to the cross office reader. Therefore slack tape is available to the reader, and the cross office reader operates as explained to pull the message EOM toward the reader transmitter unit. If another register does not seize the present unit and cause message transmission, the received message is not followed by another message in storage. With message transmission occurring to the desired station as explained, the reader transmitter unit continues to operate, after the reperforator has stopped. The tape between the reader reperforator therefore becomes tight.

When the tape between the reader and reperforator becomes tight, the slack tape switch contacts therebetween open to remove ground from lead C5387X and restore relay 3695. Relay 3695 opens contacts 3696 to remove ground from lead C5308X extending to the reader transmitter clutch magnet to stop the unit. Cross office transmission to the outgoing channel or local station then stops. The tight tape switch contacts between the reader and reperforator close to extend ground over lead C5398X, contacts 3546', 3564 to battery through the upper winding of relay 3610.

Relay 3610 opens contacts 3614' and opens the circuit between the slack tape lead C5387X and relay 3695, and at contacts 3613' extends lead C5387X through its own lower winding to battery at contacts 3578. It also completes a holding circuit for its lower winding through contacts 3578 and 3612'. At contacts 3617 it extends ground from contacts 3652 to operate relay 3560 and to maintain relay 3550 shunted. This also prevents seizure by a register. At contacts 3616' ground is extended past contacts 3624 and 3639 to operate relay 3695 over a circuit already described assuming that relays 3630 and 3660 are operated, as explained. Relay 3695 initiates operation of the cross office unit reader as explained. Contacts 3696 in addition to operating the reader also extends ground past contacts 3615', 3677' and 3559' to lead C5379X to cause the reperforator to feed out blank tape to the reader. Slack tape therefore becomes available to the reader. The slack tape switch contacts close to ground lead C5387X, while ground is removed from lead C5398X, when the tight tape contacts open. The ground on lead C5387X extends past contacts 3613' to maintain the lower winding of relay 3610 energized. Ground removed from lead C5398X opens the operating circuit for the upper winding of relay 3610. At contacts 3619 a holding ground is prepared for relay 3750. Its function will be explained. At contacts 3616 a ground is maintained on the left side of relay 3550 to its operator, after relay 3650 operates. At contacts 3618 one holding circuit from ground at key contacts 3469 to relay 3540 is opened.

The cross office reader operates to pull the tape, and sense the line feed character indicating the beginning of the EOM. Lead 7'X forwards ground to initiate operation of the EOM Detector 3308 in a manner described in the aforementioned application. It reoperates the relay (not shown), which connects the reader leads 1'X–5'X and 8' to the Sensing Control 3306 and disconnects leads 6'X and 7'X from the SOM Detector 3307 and the EOM Detector 3307 respectively, in a manner described in the aforementioned application. This relay is released after SOM is read and must be reoperated to permit the EOM to be detected. The Sensing Control 3306 is operated in accordance with characters of the EOM to cause corresponding detection chain grounds to be extended to the EOM Detector, as explained in the aforementioned application. The EOM Detector 3308 is advanced, as described in the aforementioned application, to operate relay 5680X as explained therein.

At contacts 5682 relay 5680X opens the holding circuit to the lower winding of SOM relay 5550X, which restores. The lower winding of relay 5680X energizes over contacts 5689X, 3643 and 3653. At contacts 5685 it opens one of the locking circuits to relay 3540. If relay 3610 is then operated, indicating blank tape feedout is occurring, relay 3540 restores, as its last holding circuit is open. At contacts 5684X it extends lead C5377X to the motor magnet of switch MMADVX. At contacts 5689 it prepares a locking circuit for relay 3650. During the following reader transmitter cycle, the relay in the EOM Detector 3308, which operated in series with the upper winding of relay 5680X restores. It restores the relay in Sensing Control 3306 to disconnect the reader sensing leads 1'X–5'X and 8'X from the relays in Sensing Control 3306.

Lead C5377X is grounded once during each cycle of the cross office reader transmitter unit as explained. That ground is now forwarded over contacts 5684X to energize the motor magnet of switch MMADVX. At the end of each pulse the motor magnet deenergizes to move its wiper one step. On the seventh pulse over lead C5377X, the motor magnet of switch MMADVX is energized, while the ground on lead C5377X is also forwarded past the switch wipers, the sixth bank contact and contacts 5681X to energize relay 3620.

Relay 3620 operates to close contacts 3622 and complete its own holding circuit through the winding of relay 3640 and contacts 3654 to ground at contacts 3662. At contacts 3623 it prepares a holding circuit for relay 3650. At contacts 3624 it prevents ground forwarded over lead C5387X in the event relay 3610 is unoperated or, if it is operated, ground from contacts 3616' from being extended to relay 3695. Relay 3695 and a relay in the Outgoing Channel Unit 7000X are released, when contacts 3624 open. Likewise, if the transmission is occurring to a Terminal Unit such as 2800 removal of ground causes relay 2860 to restore. Relay 3695 removes the ground for operating the clutch magnet of the reader transmitter unit at contacts 3695. Thus the cross office unit transmission ends, after the EOM is read by the cross office reader.

Ground is therefore removed from lead C5377X at the end of the cycle, and switch MMADVX advances. Relay 3640 energizes when the shunting ground on lead C5377X is removed. At contacts 3643 it opens the circuit to the lower winding of relay 5680X, which restores. Relay 3640 opens contacts 3641 and closes contacts 3644 to switch lead C4899X(33a) extending through switch 4800X to lead C4887X from ground to battery through the upper winding of relay 3650. This signals the outgoing unit that the message transmission is completed. The outgoing channel unit now transmits an EOM as explained in the aforementioned application. If transmission is occurring to a local station, placing battery on lead C4899X(33a) extending through switch 4800X to lead C4494(44), contacts 4345, 4328', 4426 and 4446 operates relay 4430. Relay 3650 does not operate in this circuit. At contacts 3642 relay 3640 opens one circuit to the winding of relay 3660.

A self-interrupted stepping circuit for switch MMADVX is completed on release of relay 5680X from ground at its off-normal springs forwarded over contacts 3633 and 5686X. Switch MMADVX steps home to open its homing circuit, and at its other off-normal springs opens the circuit to the upper winding of relay 3630, which restores.

Relay 3650 is now connected over contacts 3644 and 3725 to lead C4899X(33a), level E of the Outgoing Selector Switch 4800 and C4887X to ground through the winding of a relay in Channel Unit 7000X, as explained in the aforementioned application. It does not operate until the channel unit connects direct ground to leads C4887X and C4889X(37) as explained for a similar operation in the aforementioned application.

In the Distribution Terminal Converter Unit relay 4430 locks operated over contacts 4432 and 4429. It opens the circuit to relay 4440 at contacts 4431. At contacts 4434 it removes ground from lead C4402(28) and restores relay 2840. Relay 2840 now causes the associated Distribution Terminal Unit 2800 to restore, as described. At contacts 4433 relay 4430 shunts the upper winding of relay 4320. Relay 4440 on restoring opens the original circuit for relay 4430 at contacts 4446, and at contacts 4447 disconnects the signal circuit. At contacts 4442 lead C4491(33a) is disconnected from lead C4401(28). At contacts 4445 ground is extended to lead C4494(33a) to operate relay 3650.

Relay 3650 opens contacts 3656 to restore relay 3720 and relay 4320 as previously explained. Relay 4320 on restoring opens contacts 4329' to restore relay 4420, which in turn restores relay 4430 at contacts 4429. At contacts 4326 it completes a circuit to the lower winding of relay 4350 from ground at contacts 4413, if relay 4410 is being operated by a cross office unit requiring transmission to this station. If no unit is attempting to transmit relay 4410 is unoperated, so that relay 4350 does not operate. At contacts 4323 it removes ground from lead C4301(29) and thereby removes one of the holding grounds for relay 2920 in the distribution terminal unit 2800. At contacts 4324 it removes ground from the busy test lead 4304(27) to permit a register to seize this circuit, if relay 4410 is not operated. At contacts 4328' it opens a point in the circuit for extending ground to the upper winding of relay 3650 over lead C4494(33a).

*Cross office release*

The outgoing channel unit 7000X signals the cross office unit that it is ready to transmit an EOM by operating relay 3650. Likewise if transmission is to a local station, release of relay 4440 thereat operates relay 3650, as explained. Relay 3650 on operating opens the circuit to relay 3660 at contacts 3653, and at contacts 3656 opens the circuit to relay 3720 and its connected outgoing channel unit relay. If the cross office unit is connected to a Distribution Terminal Unit, ground removed from lead C4885X(33a) extending to lead C4390(43) restores relay 4420. Relay 3650 completes a circuit for its lower winding over contacts 3655 and 3623 and also to contacts 3619, if relay 3610 is operated. Its upper winding is restored when the outgoing channel relay removes ground from lead C4899X(37) in a manner explained in the aforementioned application or when the Terminal Converter Unit removes ground from lead C4494(48) extending to lead C4889X(37) on release of relay 4320. At contacts 3654 relay 3650 restores relay 3620 and 3640. Relay 3620 opens a holding circuit for relay 3650 at contacts 3623. At contacts 3624 the circuit for the reader clutch magnet is reestablished from ground on lead C5387X or at contacts 3616' now extended through contacts 3639' and 3579' to lead C5308X. In the event relay 3610 is operated ground extends past contacts 3615' and 3559' and lead C5379X for blank tape feedout. At contacts 3657, relay 3650 opens a possible holding circuit for relay 3540. If another message is being received or in storage, relay 3540 of course does not restore, as the circuit therefore remains complete through contacts 3618 to key contacts 3469, as relay 3610 was not operated. With relay 3610 operated, relay 3540 is restored on operation of relay 5680X as explained, and it opens the circuit to relay 3740 at contacts 3545. If another message is not in storage, contacts 3652 on opening remove a shunting ground extended through contacts 3617 for relay 3550. It operates in series with relay 3560 as explained. If another message is in storage, relay 3650 was not reoperated to prepare a circuit for 3550 after switch 5200X1 is reset, as relay 3610 is not operated. Relay 3560 on restoring opens one of the holding grounds for relay 3650 at contacts 3667, and at contacts 3669' a point is disconnected between relay 3695 and lead C4884X(33a). If another message is in storage, relay 3610 is unoperated. Relay 3650 therefore restores on release of 3620 and 3660. Relay 3540 remains operated to hold relay 3740 operated. The SOM of the next message may now be read and transmission thereof handled as described.

Relay 3550 operates, if no messages are in storage, to complete a homing circuit over contacts 3722 and 3542 and lead D(33a) for the Outgoing Selector Switch 4800X at contacts 3552, as described. At contacts 3551 it completes a homing circuit for switch MMOGIX, as described, and at contacts 3554 completes a homing circuit for switch MMPR1X, as described. When switch MMOGIX homes it removes a holding ground for relays 3550 and 3560 as described. When switches 4800X and MMPR1X home, respective holding grounds for relay 3530 are removed and it restores as described. At contacts 3531 it removes a holding ground for relays 3550 and 3560. At contacts 3559 relay 3550 opens one circuit for the lower winding of relay 3610. At contacts 3559' the circuit to lead C5379X for providing blank tape feedout is opened and blank tape feedout stops. The reader is operating however and pulls the tape tight. This causes ground to be removed from lead C5387X and placed on lead C5398X. As contacts 3546' are open ground on lead C5398X is ineffective, while ground removed from lead C5387X restores the lower winding of relay 3610. At contacts 3516 relay 3610 removes a holding ground for relays 3550 and 3560. Relay 3610 also opens the last holding circuit for relay 3650 at contacts 3619 and it restores. At contacts 3616' the reader transmitter operating ground is removed from lead C5308X. Relays 3550 and 3560 restore, when the last holding ground therefor is removed. Contacts 3555 then open and 3556 close to permit the cross office unit to be seized as an empty cross office unit.

*Message cancellation*

It will be recalled, that, if a register in searching for an idle distribution terminal unit and page printer, finds none, it seizes a cross office unit. The message is then transmitted from the line circuit to the cross office unit for subsequent transmission to the proper local station. A message destined for a remote station is also routed to a cross office unit for transmission via an outgoing channel such as 7000X to the remote station.

If the message is high precedence, switch MMPR1X in the cross office unit is set to its fifth or its sixth contact in a manner explained. The level F wiper of switch MMPR1X forwards ground from contacts 3545 to operate relay 3740 as explained. Relay 3740 connects lead C4886X(33a) to relay 3730. Lead C4886X(33) is connected to either lead C4393(43) and ground through relay 4410 in the Terminal Converter Unit 4300 or over lead C4888X to ground through a similar relay in the outgoing channel unit 7000X as explained. Relay 3730 does not operate in this circuit, although its associated unit can participate in the precedence comparison test as explained, after which relay 3730 is operated by direct ground, as explained. This prevents a unit of lower precedence from seizing the desired station. If the desired station is busy, the precedence comparison test does not take place. Relay 3730 fails to operate and prevent the operation of relay 3760 at contacts 3733. Therefore, when relay 3630 operates in the cross office unit having the high precedence message, ground from contacts 3634, past contacts 3733 and 3723 and the A wiper of switch MMPR1X to energize the lower winding of relay 3760. This relay initiates a cancel transmission sequence.

At contacts 3763 relay 3760 grounds lead C7602X(40) to initiate operation of the Cancel Transmission Selector Switch indicated by box 7600X. This switch operates in a manner similar to that explained for a similarly marked switch in the aforementioned application. At contacts 3762 a ground marking is removed from lead C7605X(40) extending to a corresponding contact in the bank contacts of the selector switch, and instead battery through relay 3750 is connected at contacts 3761 to lead C7605X(40) to mark this cross office unit in the switch bank. When the cross office selector switch 7600X finds this unit, a relay in the selector switch operates to extend ground over lead C7603X, as explained in the aforementioned application for a similar operation to operation relay 4020.

Relay 4020 opens contacts 4021 to open the circuit to slow-to-operate relay 4210. Relay 4210 closes contacts 4211. At contacts 4022 relay 4020 completes a self-interrupted stepping circuit for the motor magnet switch MMSFX from ground forwarded over a lead such as C7604X, the wiper of level A of switch MMSFX and contacts 4126, if switch MMSFX is associated with an idle selector switch. Switch MMSFX then steps in search of a busy selector switch such as 7600X. If or when switch MMSFX is associated with selector switch 7600X, battery is extended over lead C7604X therefrom as explained in the aforementioned application to prevent switch MMSFX from taking another step. The battery is extended through contacts 4126, the lower winding of relay 4120, through now closed contacts 4211 to ground at contacts 4234.

The lower winding of relay 4120 energizes to open contacts 4126. This disconnects the motor magnet of switch MMSFX from the wiper of level A, and at contacts 4127 relay 4120 extends its operating battery through its upper winding directly to ground through contacts 4234. With the upper winding of relay 4120 connected to switch 7600X, a relay therein operates to connect a low resistance ground back over lead C7605X to operate relay 3750. It also controls the connection of a marking corresponding to the speed of transmission of the selected cross office unit to lead C7607X, as explained in the aforementioned application. At contacts 4128 relay 4120 extends the marking from lead C7607X to a group of speed control relays indicated by the box marked SP to control the relays in a manner described in the aforementioned application for selecting a markable transmitter with a speed of transmission corresponding to the transmitter at the cross office unit. Thus one of the signal leads SG1X, SG2X or SG3X and one of the clutch magnet leads CCL1X, CCL2X or CCL3X of a markable transmitter corresponding in transmission speed to the cross office unit transmtiter are connected to the Cancel Transmission Unit 4000. At the contacts 4129' relay 4120 connects the selected markable transmitter clutch lead CCL1X for example to switch MMCT2X. At contacts 4125 relay 4120 extends ground from contacts 4234 to lead C7801X(37) to provide a holding ground for the lower winding of relay 3760. At contacts 4123 relay 4120 prepares a ground for relays 4150 and 4160, and at contacts 4129 opens a possible homing circuit for switch MMCT2X. At contacts 4122 relay 4120 prepares a holding circuit for relay 4230.

At contacts 4121 ground is extended through a resistance to relay 4010. Both resistance battery and resistance ground are therefore extended through relays 4010 and 4140, contacts 4156, 4222, lead C7901X(37), contacts 3758, lead (C4885X(33a), level A of switch 4800X to either lead C4390(43) or lead C4889X depending on whether transmission is occurring to unit 7000X or Terminal Unit 2800.

Lead C4390(43) extends to battery through the winding of relay 4320 in the Terminal Converter Unit 4300 of the local station to which transmission is taking place, while lead C4889X in the case of the outgoing unit 7000X extends to battery through a similar relay as explained in the aforementioned application. In addition, relays 4140 and 4010 are connected via either one of leads C4390 or C4889X, the outgoing selector switch of the transmitting cross office unit and lead C4885X(37) therein to ground through relay 3720 in the transmitting cross office unit. If battery is connected through both windings of relay 4320 to relays 4140 and 4010 or if battery through a similar arrangement in channel unit 7000X is connected to relays 4140 and 4010, only slow-to-operate relay 4140 operates in this circuit. If one of the windings of relay 4320 or its corresponding relay in unit 7000X is shunted, indicating that certain control signals are being transmitted, relay 4140 does not operate until these signals are transmitted and the shunt removed.

Relay 4140 on operating prepares a circuit for relay 4150 at contacts 4141. If transmission to the local station is proceeding from the incoming line circuit, relay 4340 in the Terminal Converter Unit 4300 is operated. In this case lead C4390(33a) is extended to direct ground through contacts 4346 and 4333 instead of battery through relay 4320. In the event direct ground is connected to lead C4390(33a) both relays 4010 and 4140 operate. Relay 4010 operating causes the Cancel Transmission Unit 4000 to be released from the cross office unit and be associated with the transmitting incoming line circuit, as will be explained.

In the cancelling cross office unit relay 3750 at contacts 3759 connects the ground on lead C7801X(41) to the lower winding of relay 3760. At contacts 3751–3753, relay 3750 connects leads C4802X(33a), C4803X(33a), and C4804X(33a) over leads C7703X(40), C7702X(40), and C7701X(40) respectively to the cancel transmission unit precedence comparison relays indicated by the box marked PC in the Cancel Transmission Unit 4000. This enables that cancel transmission unit to perform a precedence comparison test in a manner similar to that explained for a similar operation in the aforementioned application. Leads C4802X(33a), C4803X(33a), and C4804X(33a) extend over respective levels of switch 4800X, which is set to the terminals of the desired station, to either leads such as C4813X, C4812X, C4811X respectively or to leads such as C3301(29), C3302(29) and C3303(29) respectively. Leads C4813X, C4812X, and C4811X extend to the bank contacts of a cross office unit outgoing selector switch transmitting to unit 7000X, while leads C3301, C3302, and C3303, although they extend to bank contacts of cross office selector switches such as 4800X, are also multiplied to the bank contacts of switch MMPR2 in the terminal unit, which may be receiving message transmission from a cross office unit or incoming line circuit.

If transmission is occurring from a cross office unit, it forwards a precedence marking as explained from contacts 3721 or 3724 therein, over one of the leads C4811X, C4812X, C4813X, C3301, C3302, or C3303, while, if transmission is from a line circuit, relay 2830 forwards a marking over switch MMPR2 to one of the leads C3301, C3302, or C3303. The marking is forwarded over a described circuit to one of the leads C7701X(40), C7702X(40), or C7703X(40) to operate one of the precedence comparison relays indicated by box PC in the cancel unit 4000, as explained in the aforementioned application. At contacts 3755 and 3756 respectively the fifth and sixth bank contacts of level E of switch MMPR1X in the cancelling cross office unit are connected via leads C7705X(40) and C7704X(40) to respective chain contacts of the precedence comparison relays indicated by box PC. Switch MMPR1X, of course, forwards resistance ground from relay 3710 to one of the leads C7705X(40) or C7704X(40), depending on which contact switch MMPR1X is on. If the message being transmitted has a lower precedence than the cancelling message the operated precedence comparison relay indicated by box PC enables the ground on one of the leads C7704X or C7705X to be forwarded to relay 4030. Only relay 4030 operates in this circuit. If the message being transmitted is the same or of higher precedence than the cancelling message, the operated precedence comparison relay prevents the ground from being forwarded to relay 4030. In either event, ground is applied to the operated precedence comparison relay to the lower winding of slow-to-operate relay 4110, as explained for a similar operation in the aforementioned application.

If relay 4030 is not operated by the time relay 4110 operates, indicating a cancel transmission failure, ground is extended from contacts 4115 over contacts 4034 to operate relay 4230. Relay 4230 completes a holding circuit over contacts 4321 and 4114 and also from contacts 4122 through contacts 4231. At contacts 4234 it removes ground from the windings of relay 4120 and wiper A of switch MMSFX, however ground from contacts 3634, switch MMPR1X level A, lead C7801X(41) and its connected relay in switch 7600X operated.

When the transmitting cross office unit has finished message transmission in case of the just described cancel transmission failure, relay 3720 therein restores in the manner explained. It removes either the ground or the −120 volt battery respectively at contacts 3724 and 3721 from lead C4804X(33a) extending via contacts 3753 in the cancelling cross office unit and lead C7701X(40) to the cancel transmission unit comparison test relays indicated by the box PC to restore the operated one of those relays. Likewise, if message transmission was occurring from an incoming line circuit, the end of message signal therefrom results in release of relay 2830, as explained. This relay removes the precedence marking from lead C3303(33a) extending to the precedence test relay indicated by box PC to restore that relay. The restored relay in turn restores relay 4110, which in turn opens the operating circuit for relay 4230 at contacts 4115. In addition it opens one of the holding circuits for relay 4230 at contacts 4114.

With the outgoing channel unit 7000X or the distribution terminal unit 4300 respectively becoming idle, relay 3730 in the cancelling cross office unit operates in the manner previously explained. At contacts 3733 it removes ground from lead C7801X(41) to restore relay 4120. In addition the lower winding of relay 3760 de-energizes, when this ground is removed to open the circuit to relay 3750. It deenergizes relay 3750 and switch 7600X is released at contacts 3763 and 3761. With ground removed from lead C7801X(41), the relay in the switch 7600X, which is connected to relay 4120, restores. Ground is removed from lead C7603X to restore relay 4020. Relay 4020 on restoring reoperates relay 4210 at contacts 4021 and disconnects the motor magnet of switch MMSFX from the level A wiper of switch MMSFX at contacts 4022. Relay 4120 at contacts 4122 opens the holding circuit to relay 4230 and that relay now restores. The cancelling cross office unit which failed in its cancelling attempt may now seize the desired station directly and transmit its message thereto in a manner already described. The Cancel Transmission Unit 4000 which is released therefrom may now be used for the purpose of cancelling another message.

If relay 4030 operates before relay 4110 indicating that the cancelling unit has a higher message precedence than the message in transmission, the circuit to relay 4230 remains incomplete as contacts 4034 open before contacts 4115 close. A circuit is completed, however, as soon as relay 4140 operates over a described circuit, over contacts 4115, 4033, and 4013 to operate relay 4150. At contacts 4031, relay 4030 energizes its upper winding from ground at contacts 4112, as soon as relay 4110 operates.

At contacts 4158, lead C7803X(37), which extends via contacts 3757 to lead C4882X(33a) and over lead C4881X in case of transmission to a remote station to the signal relay (not shown) in the outgoing channel 7000X or over lead C4395(43) in case of transmission to a local station to lead C4403(28) and page printer 2901, is now connected via contacts 4158 and 4224 through the appropriate contacts of the speed relays indicated by box SP to the stop contacts of one of the transmitters selected thereby via one of the leads SG1X, SG2X, or SG3X in a manner described in the aforementioned application.

Relay 4150 operating, as just explained, locks to ground over contacts 4157 and 4123, and at contacts 4156 opens the circuit to relay 4140. At contacts 4155 it extends direct ground over contacts 4222, lead C7901X(37), contacts 3758, lead C4885X(33a) over the outgoing selector switch level A bank contact, multiplied via a lead such as C4889X or C4390 (33a) to the contact of the corresponding selector switch of the transmitting cross office unit, and over a lead such as C4885X(37) thereat to shunt down the relay such as 3720 in a transmitting unit. The ground on lead C4885X(33a) is extended over lead C4390(43), if the connection is to a local station to hold relay 4320 operated, while if the connection is to a remote station ground extended over lead C4889X holds a similar relay in channel unit 7000X operated, as explained in the aforementioned operation.

When released, relay 3720 in the transmitting unit, removes ground at contacts 3724 and —120 volt resistance battery at contacts 3721 from levels D and C respectively of switch MMPR1X in that unit to disconnect the precedence marking from one of the leads C4802(33a)–C4804(33a) and through the outgoing selector switch bank contacts to the operated one of the precedence comparison relays indicated by box PC in the Cancel Transmission Unit 4000. The operated precedence relay on restoring opens the circuit to relay 4110, and it is restored. Relay 4110 opens a possible circuit for relay 4230 at contacts 4115. Relay 4110 also opens the circuit for the upper winding of relay 4030 at contacts 4112, and as the circuit to the lower winding of relay 4030 from either leads C7704X(37) or C7705X(37) is now also opened by the restored precedence comparison relay, relay 4030 restores. At contacts 4159, relay 4150 forwards ground from the self-interrupting contacts of the motor magnet of switch MMCT2X, over now closed contacts 4116 and off-normal springs of switch MMCT2X to energize the motor magnet.

Switch MMCT2X operates in a self-interrupted manner. The original operating circuit for motor magnet opens as the off-normal springs of switch MMCT2X open on the first step, and a new circuit is prepared therefor at another set of its off-normal springs. The selected markable transmitter clutch magnet is now operated from ground extended from the wiper of a level of switch MMCT2X and contacts 4129' and over one of the three leads CCL1X, CCL2X, or CCL3X selected by the speed relays to energize the clutch magnet of the markable transmitter as explained in the aforementioned application. The motor magnet of switch MMCT2X is now stepped one position for ever cycle of the selected markable transmitter by a pulse over the markable transmitter numbering pulse lead CNPX, as explained in the aforementioned application. The clutch magnet is energized for each cycle by ground transmitted from switch MMCT2X, wiper A through contacts 4129' and the selected clutch magnet lead such as CCL1X in a manner similar to that explained in the aforementioned application. A cancel transmission indicia, as indicated by character code markings from the bank contacts of the various levels (not shown) of switch MMCT2X, are forwarded by their respective wipers through the sequentially closed contacts of the transmitter and returned over the one of the leads SG1X, SG2X, or SG3X respectively, of the selected markable transmitter, as explained in the aforementioned application. As explained before, one of the leads SG1X, SG2X, or SG3X is extended over the already described circuit to the signal relay in the outgoing channel unit 7000X or to page printer 2901 respectively, depending on whether the cancelled message was being transmitted to a remote or local station respectively. The cancel transmission indicia then follows the transmitted portion of the cancelled message and indicates that the message is cancelled.

When switch MMCT2X reaches a predetermined position, the operating ground for the transmitter clutch magnet is forwarded from the self-interrupting springs and the A level of switch MMCT2X. When the motor magnet energizes, it removes this ground to deenergize the transmitter clutch magnet. The switch takes another step and connects the clutch magnet lead CCL1X, CCL2X, or CCL3X through contacts 4172 and 4162, the winding of relay 4160 to ground at contacts 4123. The clutch magnet of the markable transmitter does not get enough current to operate in this circuit, but relay 4160 does. The motor magnet of switch MMCT2X therefore remains deenergized as pulses are no longer provided over lead CNPX. Transmission of signals from the Cancel Transmission Unit 4000 is therefore stopped.

Relay 4160 locks operated over contacts 4161 and 4123 and connects battery from relay 4220 at contacts 4163 to lead C7805X(37), contacts 3754, lead C4899X(33a), level E of the outgoing selector switch 4800X, lead C4887X to operate the relay connected thereto in the channel unit 7000X. If the connection is to a local station, and the battery on lead C4899X(33a) is extended to lead C4494(44), contacts 4345, 4328', 4426 and 4446 to operate relay 4430. It initiates an aforementioned release operation and enables the cancelling cross office unit to seize the station in a described manner. The operated relay in the channel unit indicates to the outgoing channel unit that the cancel indicia is transmitted, as explained in the aforementioned application. Relay 4220 in the Cancel Transmission 4000 does not operate in the circuit to relay 4330 or its equivalent relay in channel unit 7000X. The channel unit 7000X then closes direct ground to lead C4887X(33a) as explained in the aforementioned application to operate 4220 in the cancel transmission unit. If the connection is to a local station, relay 4430 operates to release relay 4440, which returns ground over contacts 4445, 4426, 4328', and 4345 to lead C4494(33a) extending to lead C7805X(40) for operating relay 4220.

Relay 4220 operates and extends resistance battery from contacts 4221, through contacts 4113 to precedence test leads C7704X(37) and C7705X(37), one of which is extended via level E of switch MMPR1X to relay 3710 and ground in the cancelling cross office unit. Relay 3710 operates and in turn operates relay 3680 as explained, which closes contacts 3681 to connect ground to relay 3720. Relay 4220 removes ground from lead C7901X (37) at contacts 4222. This allows relay 3720 in the high precedence cross office unit to operate from battery over lead C4885X(33a) through the connected relay in the channel unit 7000X or if the connection is a local station, relay 4320 furnishes the battery therefor. This seizes the channel unit or local station respectively as explained. At contacts 4224 relay 4220 disconnects the signal lead of the cancel transmission markable transmitter from lead C7803X(37).

At contacts 3723, relay 3720 opens the original operating circuit for relay 3760, which remains operated from ground on lead C7801X(41). Operated relay 3720 extends the precedence marking of this cross office unit over switch MMPR1X level C or D to lead C7701X(40) in a manner explained to operate the corresponding one of the precedence comparison relays indicated by box PC.

The operated precedence comparison relay completes a circuit for reoperating relay 4110. It also removes resistance battery from leads C7704X(37) or C7705X(37) respectively, to restore relays 3710 and 3680. Relay 3720 remains operated over its described holding circuit.

Relay 4110 completes a circuit to relay 4230 as explained. Relay 4230 locks to ground from switch MMCT2X off-normal springs and at contacts 4114 and 4122 respectively. Relay 4230 removes ground from lead C7801X(37) at contacts 4234 to release cross office unit relay 3760 and relay 4120. Relay 3760 restores relay 3750, and causes the associated cross office selector switch 7600X to restore. The operated precedence comparison relay restores when relay 3750 opens lead C7701X(40), and it opens the circuit to relay 4110. Relay 4110 opens one holding circuit to relay 4230 at contacts 4114. Relay 4220 restores when relay 3750 opens lead 7805X(40). Released relay 4120 completes a self-interrupting homing circuit for switch MMCT2X from the switch off-normal springs and contacts 4129. Relay 4120 opens the holding circuit for relays 4150 and 4160 at contacts 4123, and opens a holding circuit for relay 4230 at contacts 4122. Relay 4160 disconnects relay 4220 from lead C7805X(37) at contacts 4163. When switch MMCT2X steps its wipers to normal, the off-normal springs open the homing circuit, and another set of springs release relay 4230.

In the transmitting unit released from the receiving unit or station, restoration of relay 3720 thereat completes a circuit to the lower winding of 3570 over contacts 3728, 3667', and 3659. It operates and energizes its upper winding over contacts 3577 and key contacts 6179X. It extends ground at contacts 3579 to provide signal indicating that the message being transmitted from this unit is cancelled. At contacts 3579' it opens lead C5308X, stops the cross office unit reader transmitter, and opens the circuit to relay 3730 at contacts 3576 to prevent this unit from testing again for the receiving unit. It opens a possible circuit for relay 3610 at contacts 3578 to permit normal operation when an operator subsequently backs up the interrupted message tape. At contacts 3577' it opens a possible circuit for blank tape feed-out. It extends ground at contacts 3571 to maintain relay 3560 operated, while preventing operation of relay 3550.

If this is not the last message in storage or if it is, and blank tape feed has not started, relay 3540 is still operated. A circuit is completed therefore through contacts 3548 and 3574 to operate relay 3650. Relay 3650 at contacts 3659 opens the circuit to the lower winding of relay 3570. Relay 3650 releases relays 3630 and 3660 for already described purposes at contacts 3653, and at contacts 3658 restores relay 5550X. Relay 3650 remains operated under control of relay 3570 and 3540, until an operator releases relay 3570 at key 6179X, after first manually backing up the tape so that the SOM can be sensed again. On releasing, relay 3570 opens the circuit to relay 3650 at contacts 3574 to restore it. It also completes a circuit at contacts 3579' from the slack tape lead 5387X to the reader clutch magnet over lead C5308X to initiate operation of the reader. The unit then proceeds to seize the desired station in a described manner.

In the event transmission was occurring to a local station from an incoming line circuit at the time the cancellation procedure was attempted by a cross office unit, relay 4340 in the Distribution Terminal Converter Unit 4300 associated with the local station is operated. It forwards direct ground over lead C4390(33a) from contacts 4333 and 4346 and over an already described circuit through slow-to-operate relay 4140 and relay 4010. Relay 4140 operates to close contacts 4141, however as relay 4140 is slow to operate both relays 4010 and 4030 have already operated in a manner explained. Relay 4010 closes contacts 4014 to forward ground to relay 4230. At contacts 4013 it opens a possible circuit for relay 4150, and at contacts 4012 forwards ground from contacts 4115 as soon as relay 4110 operates, over contacts 4033 to lead C7805X(37). Relay 4230 closes contacts 4231 to complete its own holding circuit from contacts 4114 as soon as relay 4110 operates. At contacts 4234 it removes a holding ground from the windings of relay 4120 and from lead C7801X(37). In addition, relay 4010 forwards resistance battery from contacts 4032 through the contacts of the precedence comparison relays indicated by box PC to the leads C7704X(37) and C7705X(37) to operate relay 3710 in the demanding cross office unit in a manner previously explained. This relay operates relay 3680 in the manner explained to extend grounds through relay 3720.

Ground extended from contacts 4115 through contacts 4033 and 4012 to lead C7805X(37) is extended over contacts 3754, lead C4899X(33a) to lead C4494(33a). As relay 4340 in the Distribution Terminal Converter Unit 4300 is operated in this case, ground is extended past contacts 4344 to operate relay 4330.

Relay 4330 removes ground at contacts 4333 from lead C4390(33a) and instead closes resistance battery thereto at contacts 4334. This resistance battery has extended to the ground through relay 3720 over a previously explained circuit to operate relay 3720. At contacts 4331 lead C4393(33a) is disconnected from relay 4410, to prevent operation of relay 4410 at this time and at contacts 4332 ground is extended from contacts 4343 to hold relay 4330 operated. At contacts 4335 ground is extended to lead C4396(29), contacts 2835, a level of switch 5200X set to the incoming line circuit, lead C2849(3), contacts 331, 619' and 544 to energize relay 310.

Relay 3720 in the cancelling cross office unit operates to restore relay 3760 at contacts 3723. It restores relay 3750. The cross office selector switch 7600X is restored, and relay 4120 in the cancel transmission unit restores all in the manner explained. With relay 3750 restored, the circuits to relays 3710, 4010, 4140, 4030 are opened in an obvious manner, and those relays restore. Likewise the operated precedence comparison relay is restored to restore relay 4110. With relay 4010 restored, the circuit for relay 4230 is opened and that relay also restores as soon as relays 4110 and 4120 restore. The cancel transmission unit is now prepared to be associated with the incoming line circuit.

At the incoming line circuit, relay 310 on operating closes contacts 311 to extend ground from contacts 999X and contacts 333 to hold itself operated. At contacts 315 relay 310 opens the circuit to the reader clutch magnet extending over lead C698X to stop the reader. At contacts 316 it lights an alarm lamp. At contacts 312 it removes ground from lead C301(40) and extends battery thereto from relay 320 at contacts 313 to mark this unit in the banks of the cross office selector switch having access to this unit such as 7600X associated with the Cancel Transmission Unit 4000. At contacts 314 it extends ground overlead C302(40) from contacts 324 to initiate operation of the cross office selector switch such as 7600X having access to this unit. The switch operation is inititated and it finds this unit all in a known manner. A relay therein operates to extend ground over lead C7603X and operate relay 4020 for a purpose already described. Switch MMSFX again initiates operation in the manner described and on finding the cross office selector switch having access to this unit relay 4120 operates to place its low resistance winding in series with the relay in the cross office selector switch and operate that relay. That relay in turn extends a low resistance ground in a known manner over lead C301(3) to operate relay 320 in the incoming line circuit.

Relay 320 opens contacts 324 to remove ground from lead C302(40) and release the start relay in the cross office selector switch. At contacts 323 it extends ground over lead C303(41) to operate relay 4170 in the Cancel Transmission Unit 4000. At contacts 322 it disconnects the transmitter signal lead extending via lead C798X(28) to the page printer at the terminal unit and may also be extended to a cross office unit reperforator. At contacts 321, relay 320 connects lead C798X(28)(34) to lead C7803X(41), which will be extended to a markable transmitter. A cancel transmission sequence will be sent via lead C7803X(41) to lead C798X(28)(34) and each attached receiving unit to indicate that the message being received by that unit is cancelled. At contacts 325 relay 320 extends to battery from relay 330 to lead C304(42).

In the cancel transmission unit 4000, relay 4170 on operating closes contacts 4171 to prepare a circuit for relay 4160, while at contacts 4172 it opens a point in the previously described circuit for relay 4160. At contacts 4173 relay 4170 extends ground to the bank contact at which the markable transmitter was stopped in the previously described cross office unit cancellation sequence. At contacts 4174 it extends ground past contacts 4164 to operate relay 4150. At contacts 4175 ground is extended to a relay (not shown) among the speed control relays indicated by box SP. This ground operates the speed control relay in the box marked SP to extend, in a well known manner, the signal lead SG4 and clutch magnet lead CCL4 of a markable transmitter having a speed comparable to the incoming line circuit transmitter. The signal lead SG4 is extended past contacts 4128 to lead C7803X(3) and the clutch magnet lead CCL4 is extended past contacts 4129' to the wiper of the control level of switch MMCT2X.

With relay 4150 operated, switch MMCT2X makes its first step as previously described and then receives continuous stepping pulses on each cycle of the markable transmitter over lead CNPX. It transmits markings from its various switch levels through the markable transmitter and over lead SG4 to lead C7803X(33). These markings are transmitted as previously described except that now the transmission circuit extends past contacts 321 to lead C798X(28)(34) so that the cancellation sequence is sent to each terminal unit and cross office unit connected to the incoming line circuit. When switch MMCT2X steps to the contact at which relay 4160 was operated in the previously described sequence, relay 4160 fails to operate, as it is disconnected therefrom. Instead ground from 4173 is extended past this level to maintain the clutch magnet of the markable transmitter energized. An additional sequence is therefore transmitted by the switch as it continues to step under control of the markable transmitter.

When this sequence is transmitted the switch steps to another predetermined bank contact and connects ground from contacts 4123 through relay 4160 and through contacts 4171 to the markable transmitter clutch magnet. As before described, only relay 4160 operates in this circuit. Relay 4160 opens contacts 4162 to open the circuit to the markable transmitter clutch magnet, and completes its own locking circuit over contacts 4161 and 4123. At contacts 4165 it extends ground from contacts 4174 to energize relay 4230, which now initiates a previously described release operation. In addition, on closing contacts 4232 it extends ground over lead C304(3) to signal the incoming line circuit that the cancel transmission sequence is finished.

Relay 330 operates from ground on lead C304(3) to open contacts 331 to open the original operating circuit extended over lead C2849(28) to relay 310. At contacts 333 it opens a holding circuit for relay 310, which restores. At contacts 334 it completes its own holding circuit to key contacts 901X. At contacts 336 it opens another point in the transmitter clutch magnet circuit. At contact 335 it opens a point for extending ground to lead C601X(28)(34). At contacts 333 it opens a holding ground for relays already described, and restores relay 530. At contacts 338 the cancel alarm lamp is maintained lighted. At contacts 337 ground is extended to operate relay 340.

At contacts 343 relay 340 energizes the lower winding of relay 640. At contacts 341 it completes a homing circuit for switch MMCNX, if operated. Relay 640 initiates an aforedescribed release operation to disconnect the connected terminal units and cross office units in a manner already described. At contacts 641 it operates relay 650 to stop the line circuit reader, as described. At contacts 342 relay 340 extends its own operating ground past contacts 646 to energize the upper winding of relay 640.

Relay 310 on restoring opens contacts 313 to restore relay 320 and releases the cross office selector switch 7600X. Relay 320 restores to remove ground from lead C303(41) at contacts 323 and releases relay 4170 which opens the circuit for the special relay (not shown) at contacts 4175. The original operating circuit for relay 330 is opened at contacts 325, but it remains operated over its holding circuit. It also removes ground from lead C303(41) to release relay 4170. At contacts 321 it disconnects signal lead 394X from lead C7803X(41) and connects lead C394X to lead C798X(28)(34). An operator on noting the cancel alarm lamp may now back up the tape so that the SOM can be read again. She also opens key 901X to restore relay 330, which in turn restores relay 340 and the alarm lamp. Relay 340 in turn restores relay 640, which restores relay 650. This initiates operation of the reader.

With the incoming line circuit released from the Distribution Terminal Unit, relay 4340 in Terminal Converter Unit 4300 is restored. It opens contacts 4343 to restore relay 4330. At contacts 4347 lead C4390(33a) and relay 3720 are connected to relay 4320 to cause seizure of the Terminal Unit by the cancelling cross office unit, while at contacts 4342 relay 4410 is connected to lead C4393(33a).

*Multi-channel group traffic distribution*

It will be recalled that when a cross office unit is associated with an outgoing channel unit such as 7000X, that if it is part of the multi-channel group and all other units in the group are busy, ground is extended over lead C5029X(26a) to operate a multi-channel busy relay 2630 in a manner explained for a similar operation in the aforementioned application. In this example five multi-channel busy relays 2630, 2630a, 2630b, 2630c, and 2630d are shown. Each of these relays is individual to a multi-channel group which comprises two or more channels or lines extending to the same destination, each channel of which has an outgoing channel unit such as 7000X associated therewith. To provide for a proper traffic distribution over the various channels of each multi-channel group the arrangement described below is provided.

Figure 19:
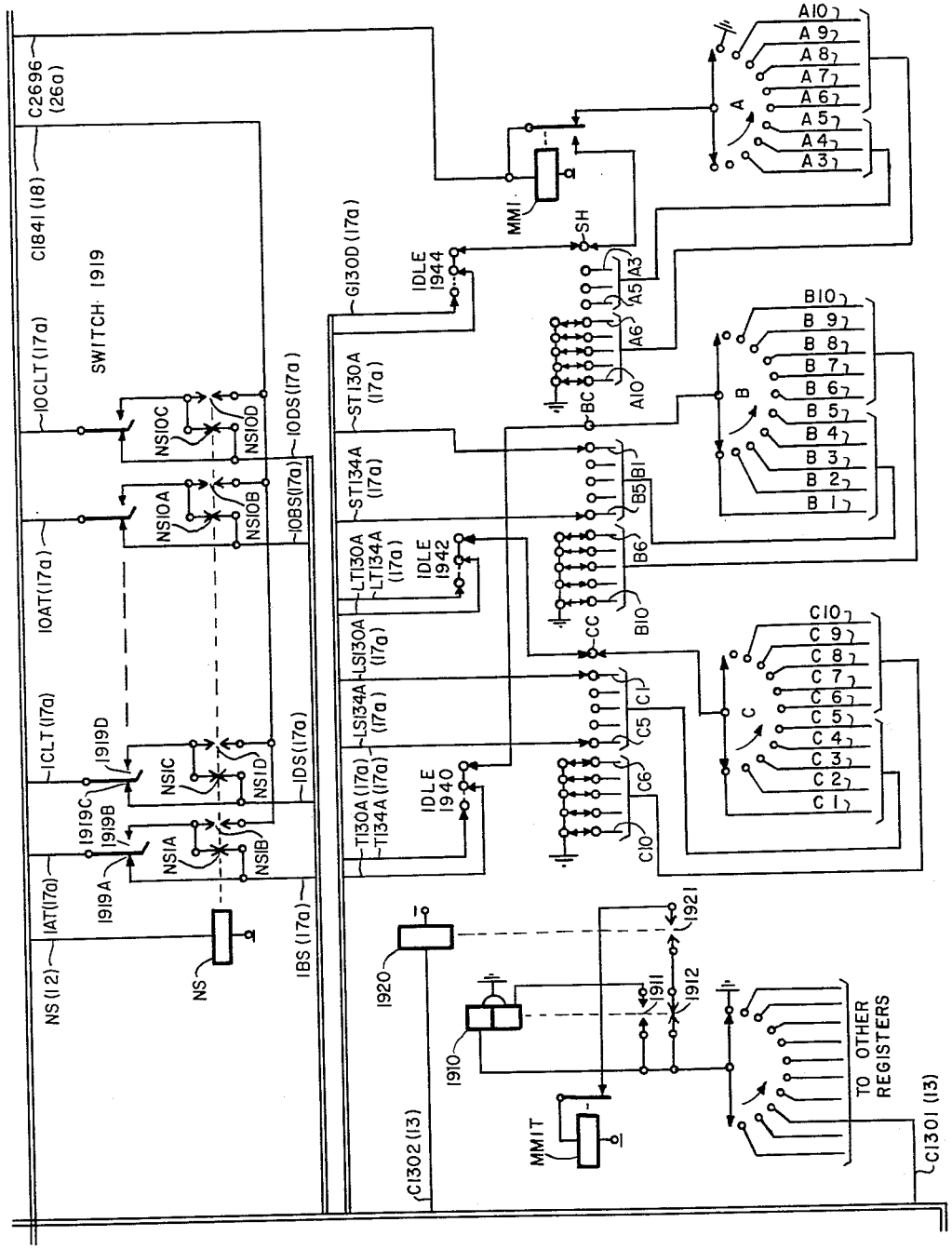
Figure 20:
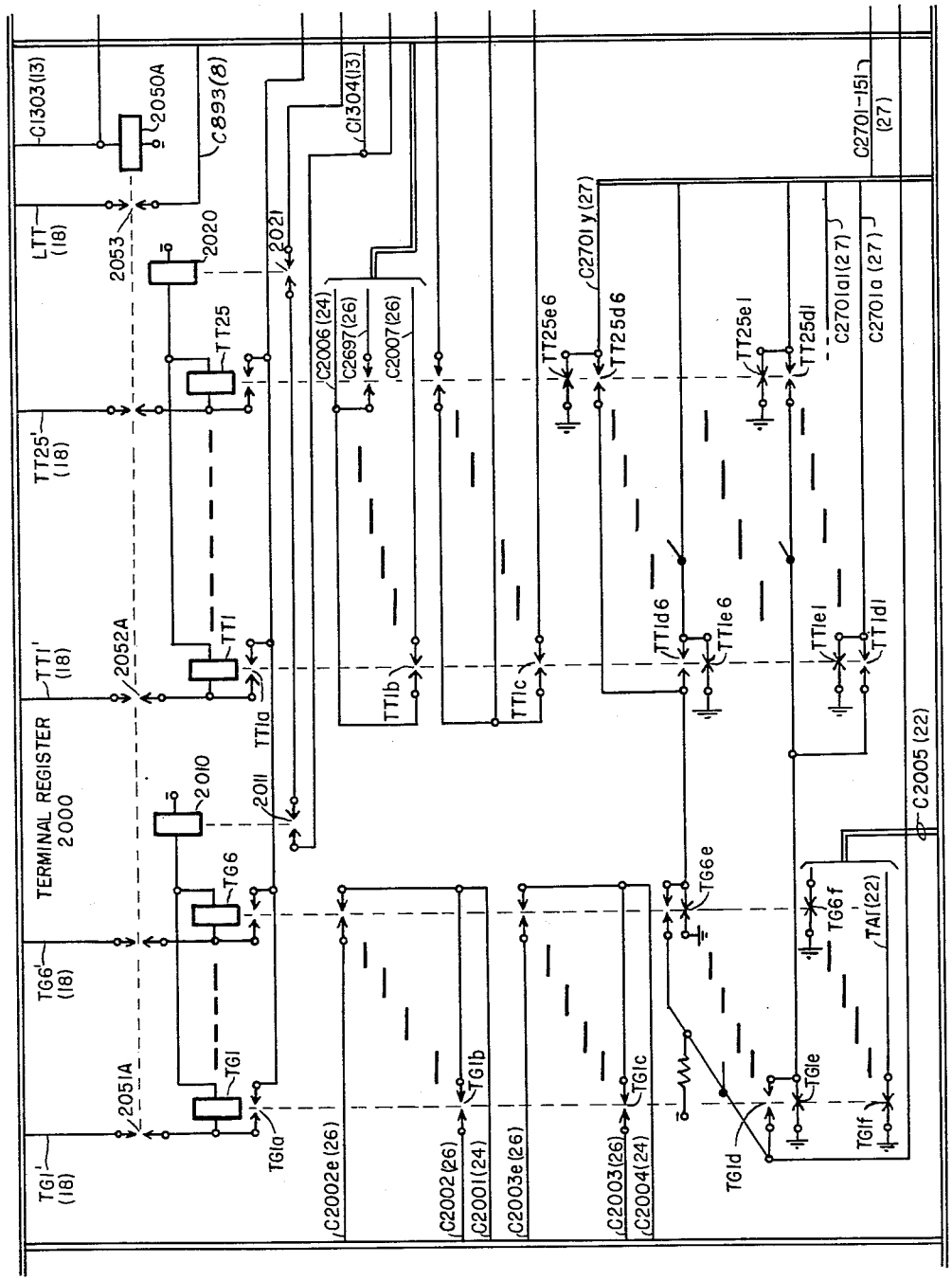
Figure 21:
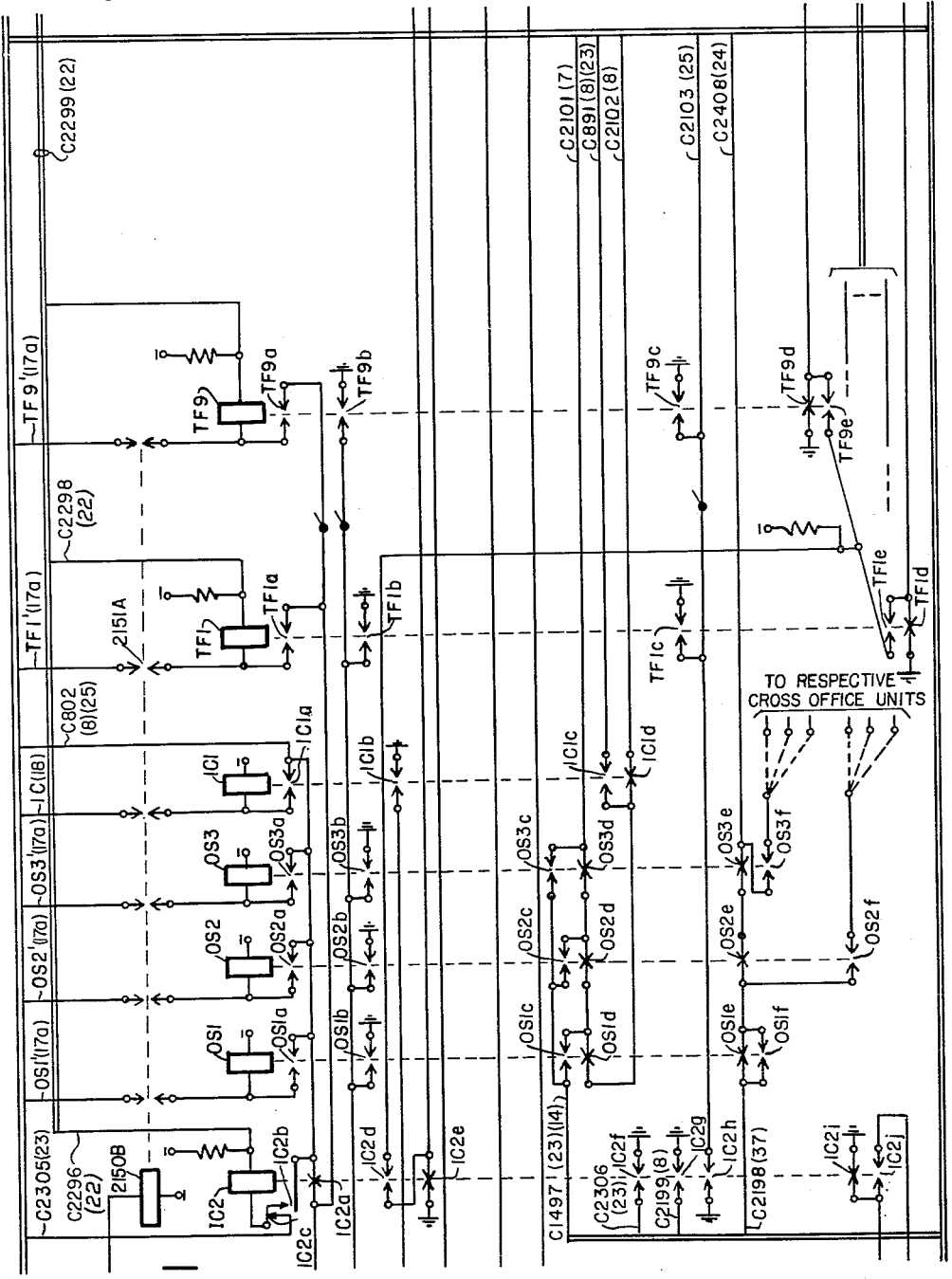
Figure 22:
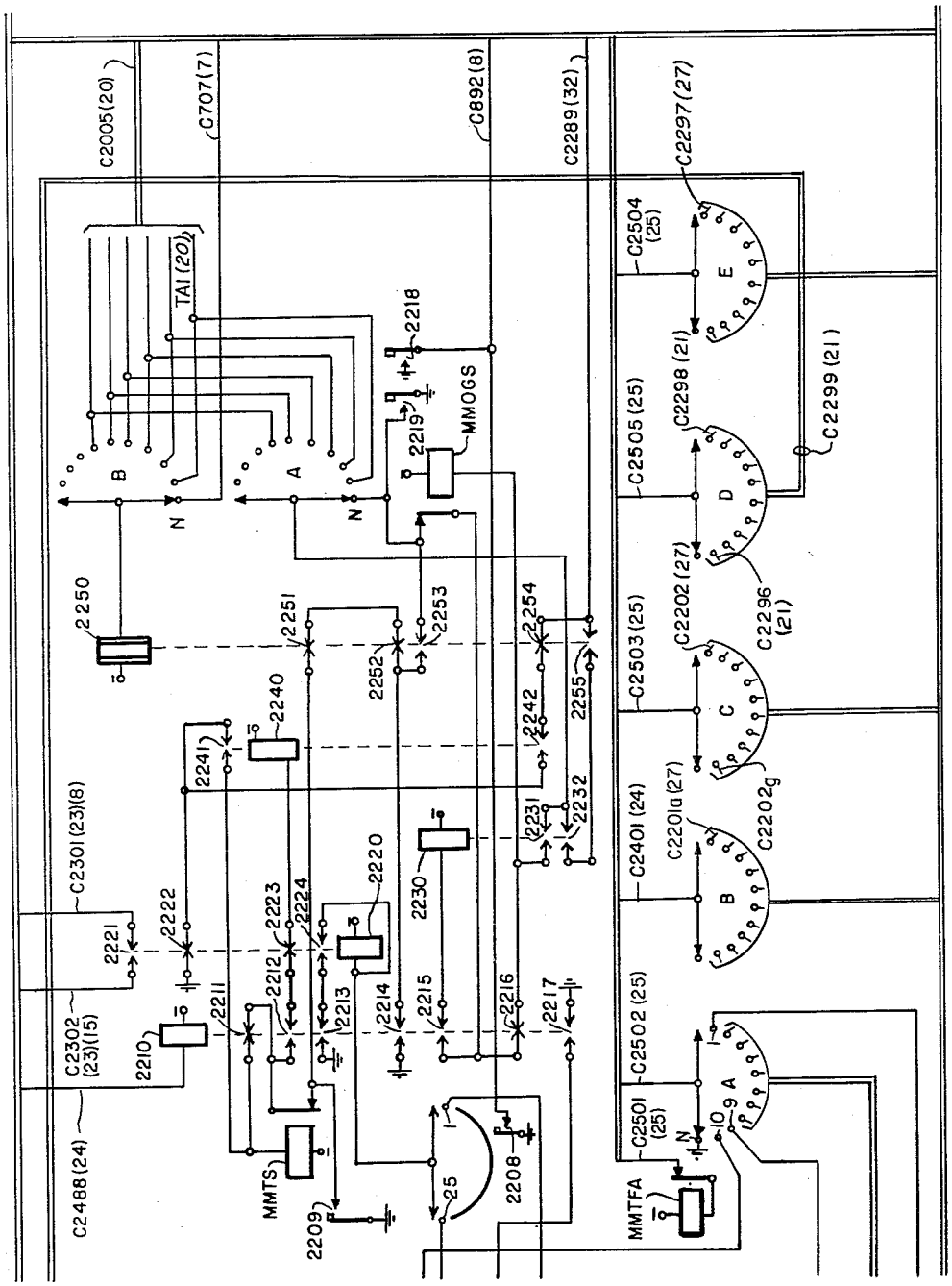
Figure 23:
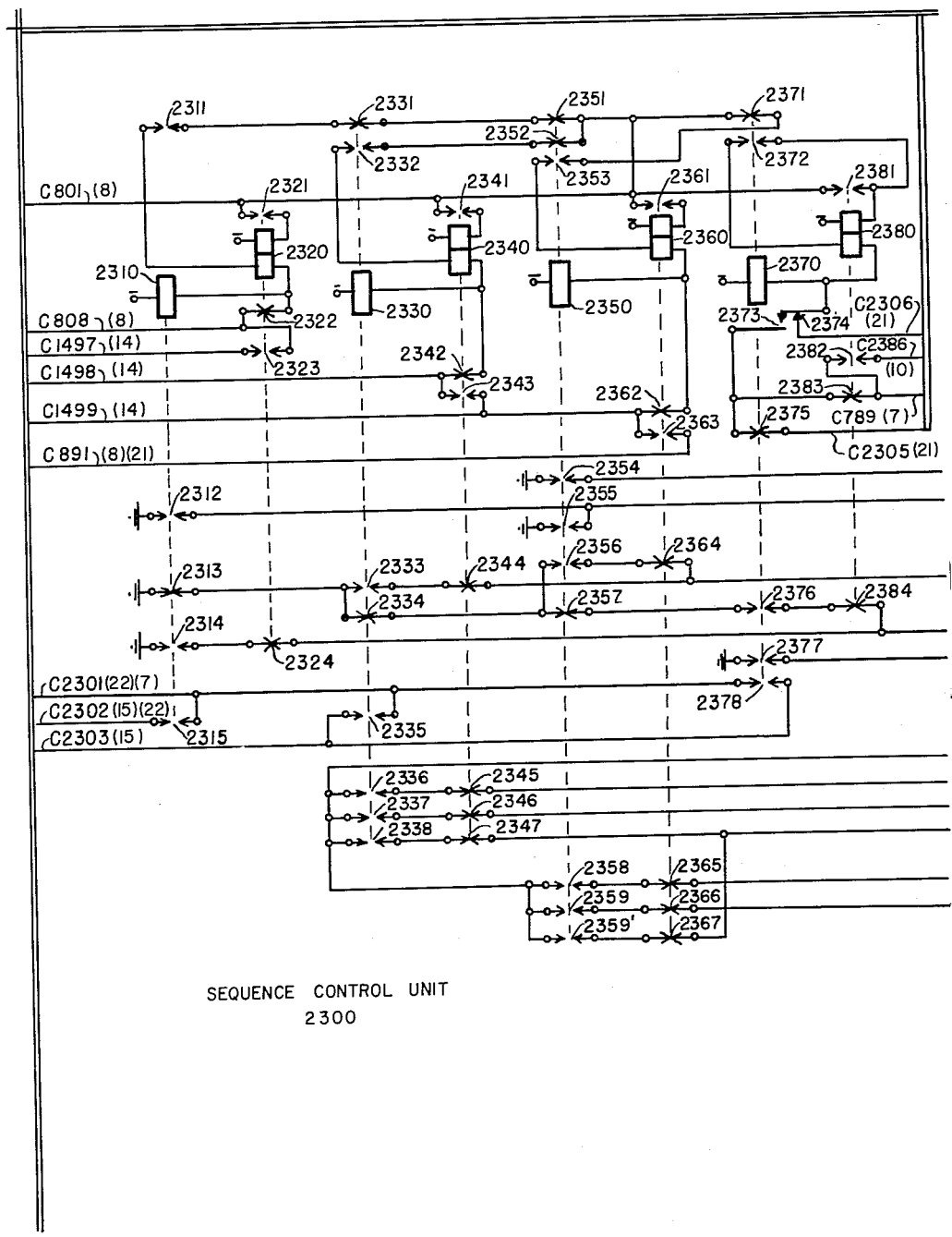

Each multi-channel group is provided with a multi-channel switch individual thereto such as MM1 individual to the group represented by relay 2630 and shown in FIG. 19 of the Translator 1600. Each multi-channel switch such as MM1 in the translator 1600 is arranged to accommodate as many as ten stations for a particular multi-channel group, although in this example, switch MM1 is arranged for a five unit group. The station terminals such as T130–T134 in patch panel 1700A associated with each station of the five station multi-channel group, instead of being jumpered to a corresponding ST terminal in patch panel 1700A, are respectively jumpered via leads such as T130A(19)–T134A(19) to respective terminals in the idle multiple 1940 shown in FIG. 19. Idle multiple 1940 is jumpered to terminal BC, which is connected to the wiper of level B of switch MM1. Similarly station terminals LT130–LT134 in patch panel 1700A of the multi-channel group are jumpered over leads LT130A(19)–LT134A(19) respectively to idle multiple 1942, which in turn is jumpered to terminal CC extending to the wiper of level C of switch MM1. Terminals ST130–ST134 corresponding to the respective stations of the multi-channel group in patch panel 1700a are extended over leads ST130A(19)–ST134A(19) respectively to terminals B1–B5 respectively, which extend to the first to fifth contact respectively of level B of switch MM1. Terminals LS130–LS134 corresponding to the respective stations of the multi-channel group in patch panel 1700a are extended over leads LS130A(19)–LS134A(19) respectively to terminals C1–C5 respectively, which extend to the first to fifth contact respectively of level C switch MM1.

When a translation occurs, which results in a relay tree ground being extended to one of the terminals T130–T135 in a manner described, this ground is forwarded over the respective one of the leads T130A(19) for example to the idle multiple 1940. This ground is therefore forwarded to the wiper of level B of switch MM1, and if the switch is on any one of its first five contacts this ground is extended over that contact to one of the terminals B1–B5. This ground is extended over the corresponding ST lead such as 134A(17a) for example, if the wiper is associated with its fifth contact to terminal ST134 corresponding to the fifth station of the multi-channel group. From here the ground is extended to energize the upper winding of the corresponding station relay S134 for example. This relay corresponds to the fifth station in the multi-channel group thus permitting a translation corresponding to one station in the multi-channel group to be extended to the station relay corresponding to another station in the multi-channel group. The message will therefore be routed over the fifth outgoing channel unit of the multi-channel group.

Likewise in case of a last translation resulting in ground being forwarded to terminal LT130 for example, the ground is extended over lead LT130A(19) to idle multiple 1942. Idle multiple 1942 extends the ground to terminal CC and over the wiper of level C to the contact upon which switch MM1 is standing. Thus the ground is forwarded over the wiper of level C to one of the first five terminals C1–C5 with which it is associated. If the ground is extended to terminal C5, which is jumpered over lead LS134A(17a) to terminal LS134 in patch panel 1700A, the lower winding of the corresponding station relay is operated and the ground extended to provide the last translation indication in a manner described.

The station relays C130–C134, for example, corresponding to respective stations of the multi-channel group, on operation extend ground to the respective terminals such as G130D in column G of patch panel 1700a. A lead such as G130D1(19) extending from one of the four terminals individual to each multi-channel station in column G extends the ground forwarded by the operated station relay via corresponding G terminals to idle multiple 1944 individual to switch MM1. Thus each one of the stations of the multi-channel group extend a ground to a corresponding multiple terminal in idle multiple 1944. The ground on lead G130D1(19), for example, is used to maintain the motor magnet of switch MM1 operated, if already operated, until the translation is complete. A ground is also extended from one of the other station terminals in column G to a corresponding one of the speed terminals OS1A–OS1J for example and from there to corresponding one of the speed marking leads such as OS1' for example in a manner explained.

It will be recalled that on a test for a preset cross office unit, ground was extended over a lead such as C2003(26) to operate relay 2610 to the Terminal Test Unit 2600 corresponding to the group to which the receiving station is assigned. Likewise it will be recalled that in the event of a test for an empty cross office unit, ground was extended over lead C2002(26) to operate relay 2610F in the terminal test unit corresponding to the group to which the receiving station is assigned. It will also be recalled that on either type of test ground is extended over a lead such as C2007(26) corresponding to the station assignment in the group to each of the terminal test units.

Assuming that a preset cross office test occurs for a message destined for a station in multi-channel group and that ground has been forwarded in a manner explained over lead C2003(26) to operate relay 2610 indicating that the station of this multi-channel group is in the corresponding group. Also assuming that relay TT25 in Terminal Register 2000 is operated and that ground from lead C2006(24) is extended to lead C2697(26) corresponding to the last station in the particular group. With relay 2610 operated the ground on lead C2697(26) is extended past contacts 2610A25. This ground, instead of being extended to a lead such as C4751X(33a), which extends to a terminal corresponding to the desired station on the banks of cross office unit outgoing selector switches as previously described, is jumpered to a lead such as C2698(26a). This lead corresponds to the multi-channel group and is extended to contacts such as 2632 of the multi-channel group busy relay 2630 for example.

If the relay 2630 is unoperated, indicating that there is at least one idle channel in the group, the ground on lead C2698(26a) is extended to lead 2696(19) to energize the motor magnet of switch MM1 corresponding to a multi-channel group. The motor magnet energizes and disconnects the wiper of level A from itself. It closes a set of self-interrupting springs to connect terminal SH associated therewith to its winding. If a translation should or is occurring that results in the operation of a station relay corresponding to one of the stations in the multi-channel group, ground extended over a lead such as G130D1 to idle multiple 1944 in a manner explained will be forwarded to the motor magnet to maintain the motor magnet energized during the translation. This will maintain the motor magnet of switch MM1 energized, until the translation is completed or until the ground on lead C2696(19) is removed as explained, whichever is later. Since the ground on lead S2697(26) is not extended to an outgoing selector switch for a preset cross office unit test, test for a present cross office unit fails. A test must therefore be made for an empty cross office unit in an explained manner. The empty cross office unit is then set to a station in the multi-channel group.

The ground on lead C2697(26) forwarded to switch MM1 is restored in a manner described and if no ground is forwarded from a lead such as G130D1(19) via terminal SH to the motor magnet of switch MM1 or when the same is removed, switch MM1 deenergizes to step its wipers. If switch MM1 on stepping to the succeeding contact is still connected to a contact corresponding to one of the multi-channel stations it finds no ground over its level A wiper and steps no further. If on stepping it steps to its sixth bank contact, the level A wiper forwards ground from terminal A6 to energize the motor magnet of switch MM1. As each bank contact of level A, which does not correspond to a channel of the multi-channel group, is connected to ground via terminals A6–A10 respectively, the switch steps in a self-interrupted manner over the remaining contact. It will be noted that only those contacts of level A are jumpered to ground, which do not correspond to channels available in the particular multi-channel group. Thus if there are two channels in the multi-channel group, terminals A3–A10 are each jumpered to ground so that after switch MM1 steps past its second contact, it will step self-interruptedly to its first contact. Thus after the next translation resulting in the energization of the motor magnet of switch MM1, the switch is stepped to a contact corresponding to the succeeding channel of the group to cause the station relay corresponding to that channel to be operated on the following translation, as explained.

When the register tests for an empty cross office unit relay 2610F for example, is operated to close contacts 2610F25. Ground forwarded to, for example, lead 2697(26) is now extended to lead C2699(26a) common to each of the channels of the multi-channel group. With relay 2630 unoperated, this ground is not forwarded and seizure of an empty cross office unit takes place as before as described.

In the event relay 2630 is operated at the time a test for a preset cross office unit takes place, and ground is forwarded from lead C2697(26) to lead C2698(26a), as explained, contacts 2632 are open to prevent the ground from being forwarded to lead C2696(19). In this case ground from lead C2698(26a) is extended over contacts 2633 to lead C2697(26), which in turn is multipled to leads such as C4751X1(33a) extending to respective station terminals on the outgoing selector switches having access to the various stations of the multi-channel unit. This permits a preset cross office unit test to take place as before described.

In the event ground is extended to lead C2699(26a) in a manner described on a test for an empty cross office unit, and relay 2630 is operated to close contacts 2631 the ground on lead C2699(26) is extended to lead C2696(19). It energizes the motor magnet of switch MM1. The test is completed as described, while switch MM1 is stepped when ground is removed from lead C2696(19) to allot the next message to another channel of the multi-channel group. The preceding description has been intended to explain a preferred embodiment of the invention, however the true scope of the invention concept is believed more fully covered in the accompanying claims.

What is claimed is:

1. In a telegraph switching center a recording means whereby an incoming message is recorded, said message comprising a first start of message indicator, a routing indicator whereby said message is routed to the switching center, a second start of message indicator succeeding said first start of message indicator and followed by a plurality of subject matter codes, sensing arrangement individual to said recording means and means for operating said sensing means to sense the individual message characters of said recorded message, registration means for registering a subject matter code, connecting means, controlled by said sensing means when operated in accordance with said recorded second start of message indicator for operating said connecting means to connect said registration means with said sensing means, means operated by said sensing means, when operated in accordance with said recorded subject matter codes for operating said registration means to register each of said subject matter codes, and means successively operated on the registration of each single subject matter code for establishing a message routing procedure including a plurality of destinations in accordance with each registered subject matter code.

2. In a telegraph system having a switching center with a plurality of line circuits whereat respective messages are received and recorded for retransmission, a plurality of different message recording arrangements and an intercept recording arrangement, means for connecting a plurality of said message recording arrangements to one of said line circuits, means operated in response to the recording of a single routing indicia appearing in a recorded message at said one line circuit for operating said connecting means, means for disconnecting said plurality of recording arrangements from said line circuit and for connecting said intercept recording arrangement to said one line circuit, said last means operated in response to a faulty routing indicia appearing in said recorded message.

3. An arrangement such as described in claim 2, including means effective in the event said faulty indicia does not appear in said message for transmitting said recorded message to the connected number of message recording arrangements for recording said message at each of said arrangements.

4. An arrangement such as described in claim 3, including another recording arrangement to which another message has been transmitted and recorded, means operated in response to the recording of said other message for transmitting said other recorded message to one of said plurality of message recording arrangements, and means effective in the event said other recorded message contains a higher recorded priority indicia than the recorded priority indicia recorded in said first message being transmitted to said plurality of message recording arrangements for terminating the transmission of said first message to said plurality of message recording arrangements.

5. A telegraph switching center comprising a line circuit having means for recording a received telegraph message for retransmission in accordance with certain indicia appearing in said message, a plurality of finder switches, a plurality of terminal units, a plurality of cross office units each having means for storing and retransmitting received messages, a plurality of intercept units, allotting means operated responsive to the recording of said certain message indicia in said received message for selecting one of said one finder switches, means responsive to the selection of said one finder switch for thereafter operating said one finder switch to scan certain of said terminal units, said allotting means reoperated in the event each of said certain units are in busy condition for selecting a second of said finder switches, means responsive to said second selection for operating said second selected terminal finder switch for scanning particular ones of said terminal units, means operated in the event all said terminal units are in busy condition for testing the condition of certain of said cross office units, and said allotter means reoperated in the event said certain cross office units are in busy condition for selecting the last of said finder switches for scanning said intercept units.

6. An arrangement such as described in claim 5, including means thereafter operated responsive to the selection of said last finder switch for operting said last selected terminal finder to select and connect with one of said intercept units.

7. An arrangement such as described in claim 6, including selecting means individual to said one intercept unit and operated via said last finder switch in response to said selection and connection for connecting said one intercept unit to said line circuit.

8. In a telegraph system, a telegraph switching center having access to a plurality of stations and provided with apparatus for recording signals of an incoming message, a single predetermined subject matter code designation preassigned to said message, said predetermined subject matter code designation being indicative of the subject matter message information included in the body of said message, said predetermined subject matter code designation transmitted to said switching center and recorded therein prior to the transmission of the body of the message, said predetermined subject matter code designation corresponding to said plurality of stations all of which are to receive said subject matter information, means in said switching center controlled by said recorded predetermined subject matter code designation for decoding and registering said predetermined subject matter code designation a plurality of times, and means controlled in accordance with said decoded and registered designations for retransmitting the signals of said incoming message to said plurality of stations corresponding to said recorded predetermined subject matter code designation.

9. In a telegraph system as claimed in claim 8 wherein said predetermined subject matter code designation comprises a series of character combinations, and means in said switching center controlled by said decoding and registering means in accordance with the series arrangement of said character combination in said subject matter code designation for determining the number of said stations which are to receive said message.

10. In a telegraph system, a telegraph switching center having access to a plurality of stations and provided with apparatus for recording signals of an incoming message, a predetermined subject matter code designation preassigned to said message, said predetermined subject matter code designation being indicative of the subject matter message information included in the body of said message, said predetermined subject matter code designation transmitted to said switching center and recorded therein prior to the transmission of the body of the message, means in said switching center controlled by said recorded predetermined subject matter code designation for registering said subject matter code designation, translating means, means operated responsive to said registration for successively operating said translating means for decoding said registered subject matter code designation a predetermined number of times, each decoding operation selecting a different station until all said plurality of stations have been selected, and means effective after all said stations have been selected for retransmitting the signals of said incoming message to all said selected plurality of stations corresponding to said predetermined subject matter code designation.

11. In a telegraph system as claimed in claim 10 including counting means operated by said translating means in response to each decoding operation, and preassigned connecting means in said translating means corresponding to said predetermined subject matter code designation controlled by said counting means for determining the number of successive decoding operations for said registered subject matter code designation.

12. In a telegraph system, a telegraph switching center having access to a plurality of stations and provided with first recording means for recording a first received message containing a first priority code designation and also containing a first preassigned subject matter code designation, said first subject matter code designation being indicative of the subject matter information included in the body of said first message, means controlled by the recorded first priority code designation for registering said first priority code designation, means controlled by the recorded first subject matter code designation for registering said first subject matter code designation, translating means, means operated responsive to the registration of said first subject matter code designation for operating said translating means to translate said registered first subject matter code designation into a plurality of routing registrations each corresponding to a different one of said stations, a second recording means in said switching center for recording a second received message containing a second priority code designation different from said first priority code designation of said first message and also containing a second subject matter code designation pertaining to the information included in the body of said second message, means controlled by the recorded second priority code designation for registering said second priority code designation, means controlled by the recorded second subject matter code designation for registering said second subject matter code designation, translating means responsive to the registration of said second subject matter code designation for operating said translating means to translate said second subject matter code designation into a second routing registration, and means effective in the event said second routing registration for said second message corresponds to one of said routing registrations of said first message for comparing said second priority registration with said first priority registration.

13. A telegraph system as claimed in claim 12 including means normally effective after establishment of said plurality of routing registrations for said first message for thereafter retransmitting said first recorded message to each of said plurality of stations, and means operated responsive to said comparison of said second priority registration of said second message with said first priority registration of said first message for interrupting the retransmission of said first recorded message to said plurality of stations.

14. A telegraph system as claimed in claim 13, including means effective after said interruption of retransmission of said first message for thereafter transmitting a cancellation code to cause the release of said plurality of routing registrations for said first message.

15. A telegraph system as claimed in claim 14, including means effective after said release of said plurality of routing registrations for said first message for thereafter retransmitting said recorded second message to one of said stations corresponding to said second routing registration.

16. In a telegraph switching center having a plurality of incoming line circuits each having recording means whereby incoming message signals are recorded, said recorded message signals comprising a first start of message indicator, a routing indicator whereby said message is routed to said switching center, a second start of message indicator, one subject matter code, a sensing means individual to each recording means, means for operating said sensing means to read said recorded message characters of said message, and a register common to said line circuits; the improvement comprising means operated responsive to the operation of one of said sensing means reading each of said recorded start of message indicators for connecting said register with the line circuit having said one sensing means, means in said register operated responsive to said one sensing means reading said one recorded subject matter code for registering said one subject matter code, a translator, control means in said register responsive to said subject matter code registration for connecting said register to said translator, routing means in said translator and in said register controlled by said registered subject matter code for translating said registered subject matter code into a first routing registration, a first receiving apparatus corresponding to said first routing registration, completing means operated responsive to the completion of said first routing registration for disconnecting said translator from said register and for connecting said first receiving apparatus to the line circuit having said one recorded subject matter code, means in said register including said control means operated responsive to the said connection of said first receiving apparatus to said line circuit for reconnecting said translator to said register, said routing means operated responsive to reconnection of said translator to said register for translating said registered subject matter code into a second routing registration, a second receiving apparatus corresponding to said second routing registration, means including said completing means operated responsive to the completion of said second routing registration for again disconnecting said translator from said register and for connecting said second receiving apparatus to said line circuit, and means in said line circuit effective after connection of said second receiving apparatus to said line circuit for transmitting said recorded message signals simultaneously to said first and second receiving apparatus.

17. In a telegraph switching system wherein a switching center having access to a plurality of stations is provided with recording means for recording a received message containing a recorded address code whereby said message is routed to said switching center and also containing a recorded subject matter code pertaining to information included in the body of said message, the improvement comprising register means operated responsive to the recording of said subject matter code for completing a single registration of said subject matter code, means operated responsive to said single registration of said subject matter code for providing a plurality of translations and a like plurality of further registrations dependent on the character of said subject matter code, and means operated responsive to completion of said plurality of further registrations for retransmitting said recorded message to a number of said stations corresponding in number ot the number of said plurality of translations and further registrations.

18. In a telegraph switching system including a telegraph switching center having a plurality of incoming lines each terminating in a line circuit whereby telegraph messages each originating from different locations in said system are transmitted to said switching center, said messages each having routing indicia whereby its respective message is transmitted via one of said lines to a corresponding line circuit in said switching center, a recording means in each of said line circuits whereby each incoming message including said routing indicia is recorded, each recorded message also having a recorded predetermined series of message characters and a recorded subject matter code which is indicative of the subject matter information included in the body of said message, a sensing means in each line circuit operated responsive to the recording of a recorded message by said recording means for reading the message characters of said predetermined series and for thereafter reading said subject matter code and for transmitting signals corresponding to said readings, a register common to said line circuits, register connecting means for connecting said register to said sensing means, means operated in response to said sensing means reading and transmitting signals corresponding to said predetermined series of characters in one of said recorded messages for operating said connecting means; the improvement comprising means responsive to said sensing means reading and transmitting signals corresponding to said recorded subject matter code for registering said subject matter code in said register, a translator, translator connecting means operated responsive to said subject matter code registration for connecting said translator to said register, said translator operated responsive to said connection for providing a first translation of said registered subject matter code, a first receiving apparatus corresponding to said first translation, translator register means operated responsive to said first translation for registering said first translation and for controlling said translator connecting means to disconnect said translator from said register, first selecting means operated responsive to said first registered translation for selecting and connecting said first apparatus to the one of said line circuits having said recorded message, said translator connecting means again operated in response to said first selection and connection for again connecting said translator to said register to provide a second translation corresponding to said registered subject matter code, a second receiving apparatus corresponding to said second translation, said translator register means operated responsive to said second translation for registering said second translation and for controlling said translator connecting means to disconnect said translator from said register, second selecting means operated responsive to said second translation registration for selecting and connecting said second receiving apparatus to said one line circuit, and means operated responsive to said second selection and connection for controlling said register connecting means to disconect said register from said sensing arrangement and for causing said message characters of said recorded message to be transmitted to both said first and second receiving apparatus.

19. In a telegraph system having a switching center with a plurality of line circuits whereat respective messages are received and recorded, means individual to each line circuit operated responsive to the recording of a message for retransmitting said recorded message, a plurality of first message recording arrangements and an intercept message recording arrangement, means operated responsive to the single recording of a routing indicia included in said recorded message in one of said line circuits for translating said single recorded routing indicia into a plurality of established routing procedures, means for connecting a like plurality of said first message recording arrangements to said one line circuit operated in accordance with the number of said established message routing procedures, and means for disconnecting said plurality of connected first message recording arrangements from said one line circuit and for connecting said intercept recording arrangement to said one line circuit, said last means operated in response to a recording of a faulty routing indicia in said recorded message.

20. In a telegraph switching center having a line circuit individually connected to a recording means for recording an incoming message containing a routing indicator whereby said incoming message is routed to said switching center, means operated responsive to the receipt of said incoming message for operating said recording means to record said incoming message, a plurality of message receiving units, said recorded incoming message containing a recorded subject matter indicia corresponding to a portion of said plurality of message receiving units, means operated responsive to said recording of said subject matter indicia for providing a single registration of said subject matter indicia, an improvement comprising means operated responsive to said single registration of said subject matter indicia for providing a plurality of successive translations of said single registration to select said portion of said plurality of message receiving units, each said selected message receiving unit being individual to and corresponding to a different one of said successive translations.

21. An arrangement such as claimed in claim 20 including means operated responsive to said selection of said portion of said plurality of message receiving units for connecting said portion of said message receiving units to said line circuit, said portion of connected message receiving units corresponding in number to the number of said successive translations.

22. An arrangement such as claimed in claim 21 including means operated responsive to said connection of said message receiving units to said line circuit for thereafter transmitting said recorded incoming message to each of said connected message receiving units.

23. In a telegraph switching center having a line circuit individually connected to a recording means for recording an incoming message, means operated responsive to the receipt of said incoming message for operating said recording means to record said incoming message, a plurality of stations, said recorded incoming message containing a recorded subject matter indicia corresponding to said plurality of stations, means operated responsive to said recording of said subject matter indicia for providing a single registration of said subject matter indicia, means operated responsive to said single registration of said subject matter indicia for providing a plurality of successive translations, each said successive translation corresponding to a different one of said stations, means operated responsive to each successive translation for connecting the corresponding station to said line circuit, means operated for placing a predetermined one of said stations on night service thereby disabling said predetermined station to receive a message; and means effective in the event said predetermined station is placed on night service and one of said subsequent successive translations corresponds to said predetermined station for disconnecting any previously connected station from said line circuit.

24. In a telegraph switching center having a line circuit individually connected to a recording means for recording an incoming message, means operated responsive to the receipt of said incoming message for operating said recording means to record said incoming message, a plurality of stations, said recorded incoming message containing a recorded subject matter code corresponding to said plurality of stations, register means operated responsive to said recording of said subject matter code for providing a single registration of said subject matter code, translating means operated responsive to said single registration of said subject matter code for providing a plurality of successive translations, each said successive translation corresponding to a different one of said stations, means operated in response to a predetermined number of said translations for transmitting a signal indicating the last of said translations, and means operated responsive to said transmitted signal for erasing said single registration of said subject matter code.

25. An arrangement such as claimed in claim 24 including a second subject matter code recorded in said recorded incoming message, and means including said register means operated after the erasure of said first single registration of said first subject matter code and in accordance with said second recorded subject matter code for providing a second single registration corresponding to said second recorded subject matter code.

26. An arrangement such as claimed in claim 25 wherein said tranlating means is operative in response to the single registration of said second subject matter code for repeatedly translating said single registration of said second subject matter code.

27. In a telegraph switching center, a register, register means in said register operated responsive to the receipt of an incoming message for registering said message, a first and a second station, a first terminal unit individually connected to said first station, a second terminal unit individually connected to said second station, a finder connected to said register, a first set of finder bank contacts connected to said first terminal unit, a second set of finder bank contacts connected to said second terminal unit, marking means in said register controlled by said register means in response to the registration of said incoming message for controlling the operation of said finder to find and connect with said first set of finder bank contacts connected to said first terminal unit, and means effective in the event said first terminal unit is busy receiving another message for controlling said finder over one of the bank contacts of said first set to advance said finder to connect with said second terminal unit over said second set of finder bank contacts.

28. In a telegraph switching center, a line circuit having means for recording an incoming message, a register connected to said line circuit in response to said line circuit reeciving and recording said incoming message, register means in said register operated by said recorded message for registering said recorded message, marking means in said register operated by said register means, a receiving station, a terminal unit individually connected to said station, a finder connected to said register, a set of finder bank contacts connected to said terminal unit, means controlled by said marking means for operating said finder to find and connect with said set of finder bank contacts connected to said terminal unit, a selector switch connected to said terminal unit, and means effective in the event said terminal unit is idle for controlling the operation of said selector switch over one of the bank contacts of said set of finder bank contacts to connect with said line circuit and enable said terminal unit to receive the recorded message from said line circuit.

29. A telegraph switching center as claimed in claim 28 wherein said marking means marks another of said bank contacts of said set of finder bank contacts with one characteristic marking to enable said finder to find and connect with said distribution terminal unit while said marking means marks other similar finder bank contacts of other distribution terminal units with a different characteristic marking to prevent connection with said other distribution terminal units.

30. An arrangement such as claimed in claim 27 including a cross office unit, a cross office finder connected to said register and having access to said cross office unit, and means effective in the event said second terminal unit is busy for operating said cross office finder to find and connect with said idle cross office unit.

31. An arrangement such as claimed in claim 27 including an intercept position, and means effective in the event said second terminal unit is also busy receiving another message for advancing said first finder to connect with said intercept position.

32. A telegraph switching center comprising a line circuit having means for recording a received telegraph message for retransmission in accordance with certain message indicia appearing in said message, a plurality of finder switches, a plurality of terminal units, register marking and allotting means operated responsive to the recording of said certain message indicia in said line circuit for selecting one of said finder switches and for operating said selected one finder switch to scan certain of said terminal units and connect with one of said certain terminal units, selecting means individual to said one certain connected terminal unit operated via said selected one finder switch for connecting said one terminal unit to said line circuit in response to said connection of said one finder switch to said one certain terminal unit, said register marking and allotting means again operated in response to the operation of said selecting means for selecting another of said finder switches and for operating said other selected finder to scan particular ones of said terminal units and connect with one of said particular terminal units, second selecting means individual to said connected one particular terminal unit operated via said selected other one finder switch for connecting said particular terminal unit to said line circuit in response to said connection of said other finder to said one particular terminal unit, and means operated responsive to said last connection of said one particular terminal unit to said line circuit for retransmitting said recorded message from said line circuit to said one certain terminal unit and to said one particular terminal unit.

33. An arrangement such as claimed in claim 32 including a plurality of intercept units, said register marking and allotting means subsequently effective responsive to the operation of said second selecting means for selecting a last one of said finder switches in case said recorded message is to be intercepted, means operated responsive to the selection of said last finder switch for disconnecting said one certain and said one particular terminal units from said line circuit, and means operated responsive to said selection of said last finder switch for operating said last finder switch to select one of said intercept units.

References Cited in the file of this patent

UNITED STATES PATENTS

| 2,766,318 | Bacon | Oct. 9, 1956 |
| 2,805,283 | Stiles | Sept. 3, 1957 |

OTHER REFERENCES

A Fully Automatic Teletypewriter Switching Center for Military Use, By L. Johnston et al., Automatic Electric Technical Journal, pages 77–92, April 1955.